United States Patent [19]

Abbondanti

[11] 4,099,109

[45] Jul. 4, 1978

[54] DIGITAL APPARATUS FOR SYNTHESIZING PULSE WIDTH MODULATED WAVEFORMS AND DIGITAL PULSE WIDTH MODULATED CONTROL SYSTEM

[75] Inventor: Alberto Abbondanti, Pittsburgh, Pa.

[73] Assignee: Westinghouse Electric Corp., Pittsburgh, Pa.

[21] Appl. No.: 728,710

[22] Filed: Oct. 1, 1976

[51] Int. Cl.[2] ........................... H02P 5/36; H02P 7/58

[52] U.S. Cl. .................................... 318/227; 318/230; 318/231; 363/42; 307/265

[58] Field of Search ............... 318/227, 230, 231, 341, 318/345 E, 599; 363/41, 42; 307/265

[56] References Cited

U.S. PATENT DOCUMENTS

| | | | |
|---|---|---|---|
| 3,324,376 | 6/1967 | Hunt | 318/599 |
| 3,538,420 | 11/1970 | Klein | 318/227 |
| 3,820,003 | 6/1974 | Tappeiner et al. | 318/227 |

*Primary Examiner*—B. Dobeck
*Assistant Examiner*—Eugene S. Indyk
*Attorney, Agent, or Firm*—C. M. Lorin

[57] ABSTRACT

Pulse width modulation is produced by digital means. Pulse width modulated waves are stored digitally in a memory and retrieved under control of a voltage signal in order to generate a pulse width modulated wave of predetermined pattern for any discrete value of successive desired output voltage levels. Optimal waveforms are selected and stored which extend only for one quadrant but an alteration of the addressing code based on symmetry yields the mirror image of the stored quadrant while sign modification provides symmetry about the abscissa axis. Also, only a single phase is stored and phase shifting by code alteration of the coded information provides the other phases after retrieval.

The notches characterizing a particular pattern are stored in the form of a digital representation one level along several possible levels defining subdivisions of a given time interval which is itself a submultiple of the total duration of the stored quadrant. A comparator responsive to a series of ramp signals detects in real time the stored levels thereby to effect switching from one state to the other and define one edge of a notch. The notches may extend over several of the ramp signals.

The invention provides, with substantially the same hardware, for a fixed pattern mode of operation in the normal frequency range, and for a free running triangulation mode for the lower frequency range.

The invention applies to the field of induction motor drives with adjustable speed.

17 Claims, 23 Drawing Figures

DIGITAL APPARATUS FOR SYNTHESIZING PULSE WIDTH MODULATED WAVEFORMS AND DIGITAL PULSE WIDTH MODULATED CONTROL SYSTEM

BACKGROUND OF THE INVENTION

The invention relates to the generation of pulse width modulated electrical waveforms. Pulse width modulation is susceptible of many applications, in particular, in system control where the modulation is varied for AC voltage control purposes.

It is well known to use pulse width modulation control techniques in conjunction with force commutated thyristor inverters or other types of switching amplifiers, in order to efficiently produce, from a fixed magnitude direct current input voltage source, an alternating current outut voltage whose fundamental varies in amplitude at will from zero up to a higher limit imposed by the value of the direct current input voltage.

For instance, two reciprocal force commutated thyristors in an inverter power "pole", or two reciprocal transistor-diode pairs connected in the output stage of a switching amplifier, can be activated through the process of pulse width modulation so as to generate across the load waveforms of different selected patterns. (See Electronic Engineers Handbook, McGraw-Hill, 1975, pp. 15–39 to 15–42).

The difference in amplitude of the fundamental wave at the output depends on the size and number of notches present which are defined by transitions between the two constant amplitude levels of the pulse width modulated wave. Typically, a pulse width modulated waveform looks like a train of square pulses of same amplitude and different duration symmetrically disposed in time about a cross-over point recurring at a predetermined repetitive rate, and in which the notches represent the negative image of such series of pulses. Although two waveforms of different patterns may have the same rate of recurrence, i.e., define a fundamental wave of same frequency, the amplitudes of the fundamental waves will be different depending on the size and number of notches during each cycle. Thus, the number of notches per cycle of the generated pulse width modulated wave, their width and their position relative to the associated cross-over point govern the amplitude of the outputted fundamental wave. The presence of a notch is indicative of a change in the conducting pattern of the force commutated thyristors, or the transistor-diode pairs, as the case may be, which are being controllably switched in accordance with a particular pulse width modulation pattern.

As a practical application, the load may be, for instance, one of the phases of a frequency controlled induction motor. Control by pulse width modulation is effected to vary the motor terminal voltage when the frequency varies, as required to keep the flux constant. Another typical application of pulse width modulation is regulating the output voltage on the critical bus of an Uninterruptible Power Supply.

It is known from U.S. Pat. No. 3,947,736, dated Mar. 30, 1976 of Byers to digitally form notches for a PWM wave in accordance with a predetermined arithmetic function.

It is known from "A Digital Logic PWM Speed Control for Single and Polyphase AC Motors" by T. Masur, IEEE-IAS Conference Record of 1973 Annual Meeting, pp. 1–9, to use a Read Only Memory in a PWM control scheme to generate parallel sine-weighted pulse trains which are applied for speed control to several parallel AC induction motors.

It is known from U.S. Pat. No. 3,890,620 issued June 17, 1975 of Donald J. Toman and Roland Coulter, to store in a digital memory digital sample point values signifying various modulation levels required at successive points in time and to read out in timed sequence such values and apply them to modify a carrier wave so as to create modulation thereon.

However, the prior art techniques for modulating an output wave by digital means do not address themselves to the problem of generating a multiplicity of modulation output waves of predetermined quality and of outputting output waves selected for their predetermined characteristic as a function of time and applied in direct relation to a predetermined process variable and according to a control scheme.

It is also known to generate output waveforms having appropriate notches to yield any desired output. See in particular J. Zubek, A. Abbondanti and C. Nordby, "Pulse-Width Modulated Inverter Motor Drives With Improved Modulation" paper presented as IEEE Conference Record of Ninth Annual Meeting of IAS, pp. 998–1006, 1974. It appears from this paper that the merits of a modulation scheme depend to a great deal upon the choice of appropriate patterns of the pulse width modulated generated waves. However, conventional methods for the generation of output waveforms having the appropriate notches to yield any desired output are inherently limited because they use analog signal processing techniques, such as waveform generators, level comparators, time-ratio or transconductance multipliers or analog switches. Analog pulse width modulation methods can satisfy the requirements of actual thyristor systems only if operated within a limited range of output voltage or frequency. Beyond such range, "multimode" modulation is required often involving changing many times the operative mode of the modulator. This results in increased circuit complexity and causes waveform distortions which impair the commutation ability of the inverter. Multi-mode modulation may, at a certain point, become totally unacceptable. A drawback typical of this type of modulation lies in the lack of flexibility to choose a waveform having notches placed at the most desirable position within the cycle. Theoretically, for a desired output amplitude and a given set of system constraints taking into account the limitations of the inverter's commutation circuit, it is possible to analytically determine the pattern of notches which is most suitable. Actually, with an analog system such optimum pattern will rarely be obtained. Only an approximation is possible in practice, which often may be acceptable to a certain degree. However, there are instances where the range of modulation requies the output waveform to vary from 0 to 100% of the maximum amplitude assigned to the fundamental in the system. In such case, the analog modulation methods of the prior art yield at times waveforms of poor quality, far from the desired theoretical shape. Current distortions may become rather large.

The object of the present invention is to overcome the drawbacks of the analog modulation methods of the prior art, to make it possible to generate waveforms having the optimum quality defined by theoretical analysis for any assigned output level, and to implement the generation of such perfect waveforms with circuitry of acceptable complexity and cost, at any rate, with hardware of less complexity and cost than would be required with analog modulation circuits. The result is that the modulation method according to the invention allows a wider range of modulation without sacrifice of commutation capability and efficiency, even for controlled systems of high power rating.

The invention calls for digital techniques instead of analog modulation, and permits a synthesization of the desired waveform in such a way that a considerable freedom of choice is possible in obtaining the waveform pattern as never attained with the conventional analog techniques. Among all theoretically possible waveforms, the waveforms to by synthesized are preferably those which in practical situations have been proved to possess the highest quality, for instance by exhibiting the lowest content of undesirable harmonics within the constraints of a power system given for the implementation of the invention.

More specifically, the novel pulse width modulation method according to the invention is applicable for control of force commutation inverters as used with PWM to achieve output voltage control in variable frequency AC drives or in regulated AC power source such as Uninterruptible Power Supplies. The proposed modulation method is particularly advantageous for these applications since it allows reducing the harmonics to the minimum level conceivable, and offers the best possible use of the installed commutation KVA rating of the inverter system, or of the KVA handling capability of the output transitors, if a transistorized power system is used. The invention offers the best utilization of the system's power stages, thereby to reduce the cost per handled KVA of the PWM system. Moreover, the method according to the present invention affords a substantial improvement in the overall control operation by the smoothness in operation and the resolution of voltage control attained. This is a particularly attractive feature in variable frequency motor drives of large rating which, otherwise, are known to be handicapped by the slow turn-off characteristic of the thyristors. Another remarkable advantage resides in substantial savings with the hardware. Digital treatment on a PWM system suitably designed in accordance with the present invention allows to establish complex LSI logic system circuitry having elaborated circuit functions compacted in small modules and packages. This results in reduced cost and more reliability in the AC motor drives. Therefore, this type of drive can be competitive with DC motor drive despite the greater complexity of the control electronics required in AC drives. Further cost reductions are possible through customized LSI packages implementing the modulation functions in a very limited number of logic packages, and ultimately on a single semiconductor chip.

SUMMARY OF THE INVENTION

The invention relates to pulse width modulation techniques in general, and more particularly to digital techniques for the implementation of pulse width modulated waveforms of predetermined characteristics and for the automatic selection and generation of any such waveforms of predetermined characteristics.

The modulation method according to the present invention makes it possible, by digital means, to synthesize any possible PWM waveforms and therefore affords the possibility of selecting between specially constructed output waveforms of desirable shape the ones fitting a control scheme most suitable for a given power system, which may be a force commutated inverter formed with transistors, or thyristors, as used in variable frequency AC drives or in regulated static AC power supplies.

A digital system is provided including a memory having stored therein digital information in the form of a program having all the information necessary to define a set of PWM waveforms, each PWM waveform corresponding to a specific voltage of a fundamental output wave. Such a set of waveforms related to discrete fundamental voltages can be sufficient to cover the range of modulation of the particular power system with a resolution as required by design. An adjustable voltage reference is applied to the memory, after conversion into digital form, in order to retrieve the stored information relative to the selected PWM waveform. The level of the reference signal determines which one of the available waves is to be retrieved. Through proper memory programming, the retrieved wave yields a fundamental having an amplitude proportional to the reference signal. The rate of retrieval and outputting of the stored digital values is determined by a clock signal having a frequency fixing the frequency of the outputted fundamental wave. One output wave is generated for each of the phases of the system.

The invention is implemented with a minimum memory space to be occupied per wave thereby to accommodate a maximum number of different modulation patterns for a given memory capacity.

While only one cycle needs to be stored in the memory, instead of storing an entire cycle of output waveform, only information defining one quarter of a cycle is actually stored, this being a "quadrant". The other quadrants are reproduced by proper coding of the digital information to take advantage of the symmetry existing about a cross-over point, either as a mirror image, or an an inverted image of the stored quadrant.

Also, only one phase needs to be stored. The circuitry is so designed that the other phases are produced by mere transposition of the stored data in a time phased relationship.

The invention also resides in a special mechanism for selecting stored digital data in accordance with a desired pattern and for retrieving such data in real time to outputting an actual output wave. Digital data are stored in relation to various time intervals representing equal electrical angles extending altogether through one quarter of a cycle. A time controlled clock scans discrete time intervals sequentially at a rate defined by the fundamental frequency to be outputted, and the digital data within the memory are correlated with time. Correlation between the discrete time intervals and the stored data takes into account a unique scheme for storing information requiring minimum storage capacity. According to the invention, the memory has stored therein the same information during any of the equal discrete time intervals. Each stored information represents an individual segment of a quadrant. Such stored information is so selected as to represent one among a number of possible equal subdivisions defining elementary time intervals, or subintervals, of such discrete time interval. As a result, that number of elementary time intervals, or subintervals, represents the resolution between all possible patterns to be stored in the system, since a notch is defined by a change in the level of the output wave at an instant corresponding to one of such subdivisions. A comparator relates the instantaneous count run through the discrete time intervals of the quadrant with the established count representation stored in the memory which defines the particular subdivision where a notch must start or end in the output wave.

Because the memory needs only to contain a list of the selected subdivision identified by rank within any discrete time interval for the successive discrete time intervals, maximum use of storage capacity is possible. Moreover, the concepts of translation by symmetry to pass from one quadrant to the other, as well as the idea of shifting between phases, are readily implemented by mere code alteration at the memory addressing input.

When storing in digital form a representation of the modulation pattern, the more simple approach consists in assigning a Zero for a notch and a One for a pulse along the time reference and to count in real time so many Zeros or Ones thereby to retrieve the waveform sequentially by time increments. This method has the inconvenience to require too many Zeros and Ones if the individual time intervals given by the counter are small relative to the actual cycle of the fundamental wave, or not enough resolution if the counted time intervals are large relative to the actual cycle of the fundamental wave, with the additional drawback in the latter instance that the ability to choose a given pattern is limited by the coarse measure of the time intervals.

The mechanism chosen to implement a synthesization of pulse width modulation consists, according to the present invention, in storing in digital form an analog representation of one of several levels that can be reached by a ramp, to generate in real time with a counter a digital representation of a ramping signal defining between peaks a time interval and to digitally compare in a digital comparator the stored level with the ramping signal for each time interval to cause a reversal of state between a One and a Zero, thereby to establish the front of a notch, or with a signal ramping in the opposite direction to cause a reversal between a Zero and a One, thereby to establish the tail of a notch. This method allows a notch to be established within the time interval defined by the period of the ramping signal. A reversal between state Zero and state One, or conversely, is allowed to occur at an interval boundary, that is, when the ramping signal changes slope. As a result, a notch which is established only once within the time interval by the inherent operation of the digital comparator, may be initiated or terminated on the boundary of a time interval. The notch can be as small as one subdivision of the ramp levels, or extend by overlapping over two or more of the successive discrete time intervals established by the ramping signal.

The switching limitations adopted in this method somewhat reduce the freedom in generating waveforms having many notches per cycle, but they provide at the points of reversal a high resolution in terms of the angular position of the notches within a cycle of the fundamental wave. Most important, despite the limited storage capability when many patterns must be available, the quality of the waveform is greatly improved for each of the patterns, owing to the notches being positioned upon one of the several subdivisions within each of the discrete time intervals.

The invention provides for the generation of a ramp synchronized with the waveform and spanning each of the discrete time intervals. The ramp is subdivided in a number of discrete steps lasting each a fraction of interval called subinterval. The ramp signal is compared through a digital comparator with a stored reference level, affected to each interval as programmed in the memory. The intersection of the ramp with the reference level defines the pattern of the output waveform by reversing from a Zero to a One, or conversely, when the threshold in the comparator is passed in one direction or the other.

From another aspect, the invention also makes digital treatment of a pulse width modulated waveform compatible with the triangular method of modulation.

The approach used for waveform synthesis, according to the invention, is such that the same hardware can be utilized to implement a digital version of what is known in the prior art as the free running "triangulation method" (see J. Zubek, A. Abbondanti and C. Nordby, "Pulse-Width Modulated Inverter Motor Drives With Improved Modulation - SPC-THU-AM1", IEEE Conference, 9th Annual Meeting of IAS, pp. 998–1006, 1974). This method is particularly suitable for low frequency operation of PWM AC drives since it does not impose a lower frequency limit to the modulation range. as does the basic method with the practical limits of storage capacity. Therefore, in order to cover a wider range of output frequencies it is necessary to use another mode of operation of the modulator when below a certain frequency. In the second mode the circuit is said to operate in the "free running triangulation mode". The mode earlier described will be designated hereinafter as the "fixed pattern" mode. The circuitry is designed in accordance to the present invention so that these two modes can be implemented essentially with the same hardware.

When the system changes modes to implement the free running triangulation method, generally the same organization is maintained, but the ramp applied to the comparator becomes a fixed frequency digital "timing wave", as required with a triangle interception modulator.

The invention is generally applicable to most techniques requiring pulse width modulation. It is applicable directly to the control of inverters as described by T. M. Heinrich and R. M. Oates on pages 15–33 to 15–42 in the aforementioned Electronics Engineers Handbook of McGraw-Hill, 1975. As disclosed in U.S. Pat. No. 3,491,282 of T. M. Heinrich et al dated Jan. 20, 1970 (see FIG. 7) pulse width modulation can be used to generate and control the voltage of a sinusoidal wave having harmonic neutralization. The present invention offers an all-digital technique for the same purpose, as can be used in particular for AC power-supply inverters or for motor-drive inverters. This technique offers a great versatility. The need may be to supply equipment with AC power at 60 Hz, at 50 Hz, or 400 Hz. Special motors may have to be driven. In order to fulfill any kind of requirement, all which is needed is to replace the chips which constitute the ROM part of the circuitry. A blank chip can be programmed instantaneously according to a desired set of PWM patterns. A tape containing the original software information is loaded into a ROM programmer which will program the ROM accordingly. A new chip is thus available for installation in the field as required.

DESCRIPTION OF THE PREFERRED EMBODIMENTS

The invention relates to a novel all digital modulation circuit for the generation of pulse width modulated waveforms in general, and more particularly to the application of such modulation circuit to a pulse width modulated inverter of an adjustable frequency motor drive. The invention will now be specifically described in the context of a pulse width modulated inverter driving a squirrel cage induction motor as can be used in adjustable speed drive applications and in traction drives.

Figure 1:
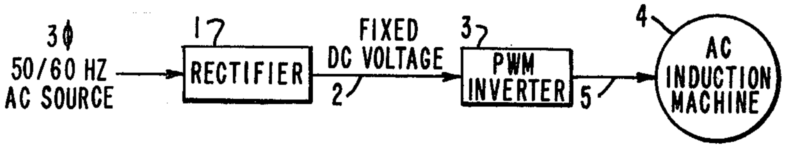
FIG. 1 schematically shows an adjustable speed motor drive system of the PWM type.

As shown in FIG. 1, an adjustable frequency drive system of the PWM type includes a full-wave rectifier 1 supplied from the usual 60 hertz AC network, an inverter 3 which pulse width modulates the fixed output DC voltage on line 2, and an AC induction machine 4 which is supplied with the pulse width modulated wave outputted on line 5 by the inverter.

Figure 2:
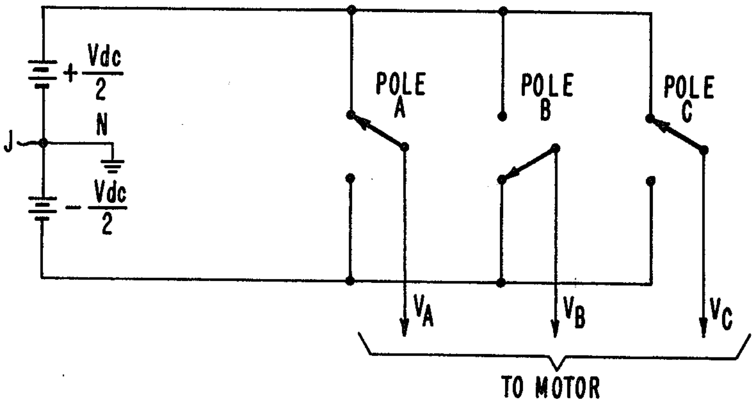
FIG. 2 shows schematically the operation of a PWM inverter.

The pulse width modulated inverter 3 can best be described as the three switches arrangement of FIG. 2 affected to the respective poles A, B, C for the respective phases of the motor 4 of FIG. 1. The fixed voltage Vdc appearing at the input on line 2 of FIG. 1 is symbolized in FIG. 2 as $(+Vdc/2)$ and $(-Vdc/2)$ from two respective batteries having a junction point J connected to ground N. The truth table indicating the necessary correlation between pole voltage levels and line voltage in such three-phase bridge inverter is as follows:

| Pole voltage level | | | Line voltage level | | |
|---|---|---|---|---|---|
| $V_{AO}$ | $V_{BO}$ | $V_{CO}$ | $V_{AB}$ | $V_{BC}$ | $V_{CA}$ |
| (+) | (+) | (+) | 0 | 0 | 0 |
| (−) | (+) | (+) | (−−) | 0 | (++) |
| (+) | (−) | (+) | (++) | (−−) | 0 |
| (+) | (+) | (−) | 0 | (++) | (−−) |
| (−) | (−) | (+) | 0 | (−−) | (++) |
| (+) | (−) | (−) | (++) | 0 | (−−) |
| (−) | (+) | (−) | (−−) | (++) | 0 |
| (−) | (−) | (−) | 0 | 0 | 0 |

Figure 3:
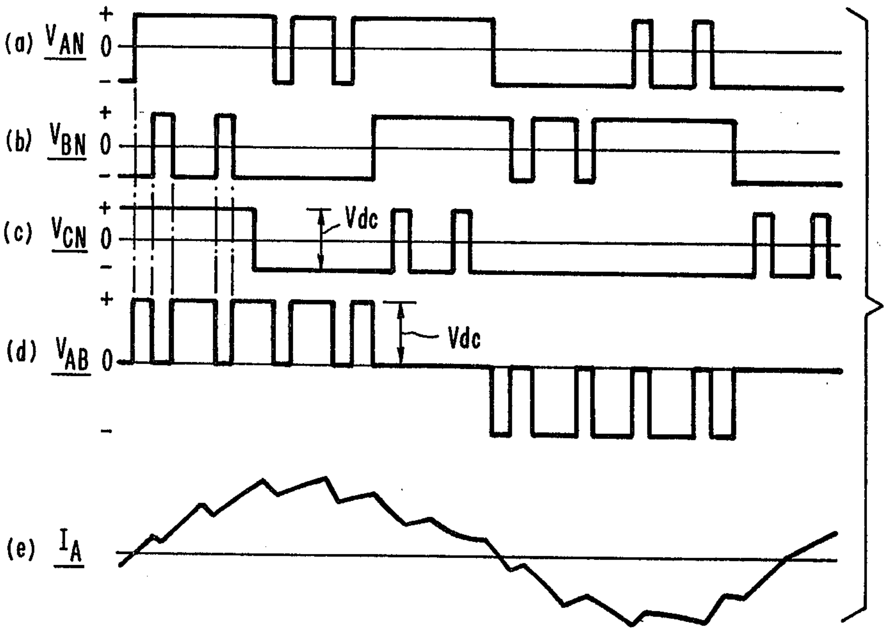
FIG. 3 shows typical pulse wave modulated voltage waveforms (*a*) through (*d*) and the resulting output current curve (*e*))
Figure 5:
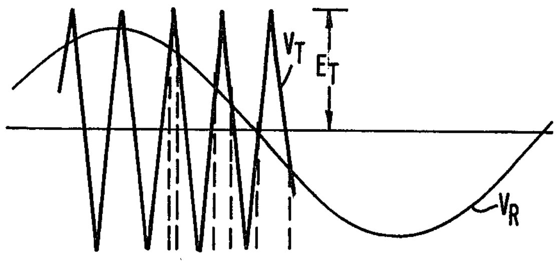
FIG. 5 is descriptive of the triangulation method between a ramp signal and a sinusoidal reference voltage.
Figure 6:
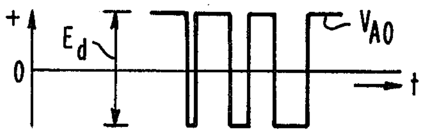
FIG. 6 is the pulse width modulated wave produced by the technique of FIG. 5.

FIG. 3 shows three typical line to DC link neutral voltages $V_{AN}$, $V_{BN}$ and $V_{CN}$ and one of the line to line voltages $V_{AB}$ generated from two of the lines to neutral voltages (poles A and B). Although the output voltage waveform does not come very close to a sine wave, the inductance of the AC machine 4 (FIG. 1) tends to smooth out the pulses, so that the current in the motor is reasonably close to a sinusoidal waveform, as illustrated by curve $I_A$ on FIG. 3. Where the basic method of voltage control is the pulse width modulated square wave, consideration should be given to the constraints imposed by the inverter system, in particular with the three-phase bridge configuration of FIG. 2. These constraints are explained in "Pulse Width Modulated Inverter Motor Drives with Improved Modulation" by J. Zubek, A. Abbondanti and C. J. Nordby in a paper SPC-THU-AM1, pp. 998–1003 presented at the IEEE Conference Ninth Annual Meeting of IAS. In the same paper the "Triangulation Method" of pulse width modulation is described. Briefly, and referring to FIG. 4, the triangular method consists in using a reference waveform generator 10 to generate three reference signals $V_{RA}$, $V_{RB}$, $V_{RC}$ in a symmetrical three-phase relationship intersected by a common timing waveform $V_T$ generated by a timing waveform generator 11. The outputs $V_{AO}$, $V_{BO}$ and $V_{CO}$ are derived from three comparators 12 so as to be at a "high" level whenever the instantaneous input reference level of $V_R$ exceeds the timing wave level of $V_T$ and at a "low" level when it remains under, as illustrated by curves $V_R$, $V_T$ of FIG. 5, and the outputted PWM waveform of FIG. 6 typically representing $V_{AO}$.

The main drawback of the triangulation method is its limited frequency range of utilization. It has been found that the method is usable only for modulation ratios $E_R/E_T$ comprised between zero and one with the condition $f_t/f_r > 9$ beyond which "beats" are generated. This leads to a maximum pole voltage fundamental amplitude of $E_{1m} = E_d/2$, which maximum is lower than the peak fundamental pole voltage $E_{1p}$ possible in a three-phase bridge inverter of given dc link voltage $E_d$. In practice the underutilization is even larger.

The beats exist only because the pulse pattern in the output waveform is not reproduced identical to itself from cycle to cycle and changes. Therefore, a "fixed" pattern with synchronized or phase locked modulation techniques is used instead of a "free running" pattern thereby making is impossible for the beats to exist. The "fixed" pattern mode is used in the range beyond the reach of the triangulation method. In order to retain the advantages of the triangulation method, a multi-mode approach is used combining different modes. At low frequency the modulation operates in one mode characterized by the triangulation method, typically with a triangular timing waveform of fixed amplitude, fixed frequency and independent phase with respect to the reference signals. When a preset inverter operating frequency is detected signaling the actual upper limit for operation in this mode, the system is automatically switched to a second mode characterized by a fixed pattern.

A limitation exists in the fixed pattern method due to the disappearance of a notch when, as a result of excessive increase in magnitude of the reference, the width reduces itself to a point and the notch in fact vanishes. Various techniques exist for eliminating this drawback and a multi-mode operation is again in order.

It will appear from the following description that an increased versatility in generating optimized waveforms is obtained and that a reduced amount of electronics is needed to control a typical motor drive when using the modulation method according to the invention. In pulse width modulated inverter motor drives, the form of the modulation is critical for the performance of the drive. Past experience has shown that, in order to obtain good performance over a wide speed range, complex modulation circuits are required which must operate in several different modes. The techniques of the prior art are of the analog type.

Three drawbacks are characteristic of the analog technique when used in solving the modulation problem in PWM drives. First, the size and complexity of the circuitry results in costly control circuits. As a result direct current drives are generally preferred to alternating current motor drives. The modulation circuitry represents at present about 40% of the circuitry in the control block of an inverter which contributes greatly to the overall costs of the control circuit. Secondly, large amounts of discrete functions have to be spread over several printed circuit boards. This entails poor reliability, since the probability of component failure, the risk of a defective cold solder joint or of connector contact intermittency increase with the number of parts of the circuitry. Thirdly, the analog approach lacks flexibility in creating the best possible waveform in all circumstances. In some situations even the waveforms used are far from being optimal. This is a particularly important aspect with high rating power drives because of the constraints imposed on the choice of modulation by the inverter circuit.

The lack of flexibility of the modulation methods of the prior art and the need for a greater degree of freedom in choosing the modulation patterns, e.g. in placing notches of proper size at exact locations, will appear from a consideration of specific problems encountered in practice.

Figure 7:
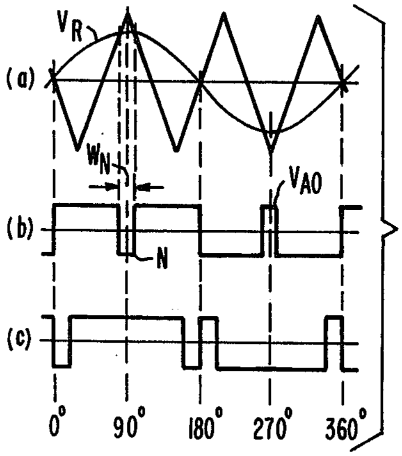
FIG. 7 illustrates three curves (*a*) through (*c*) making apparent the limitation inherent in pulse width modulation by the triangular method.

A first example relates to the situation which arises in an AC motor drive towards the end of the modulation range, when the output fundamental amplitude $E_1$ is about 90% of the maximum achievable amplitude $E_m$ of the unmodulated waveform. Referring to FIG. 7 in this situation, the output waveform is obtained by intersecting, in the modulator circuits, a sine wave reference signal $V_R$ (curve (a)) with a triangular wave $V_T$ and causing a level comparator (and hence the pole output) to toggle at the intercept points, resulting in a pulse width modulated waveform $V_{AO}$ (curve (*b*). Each half cycle of this waveform is characterized by a single notch N of width $W_N$, centered in the half cycle symmetrically with respect to the 90° position. When an increase in output fundamental amplitude is desired, the amplitude of the reference $V_R$ relative to the triangular wave $V_T$ is raised, resulting in a narrowing of the central notch. However, the proper operation of the commutation circuit controlling the conduction of the power pole thyristors requires that the notch width $W_N$ never become lower than the time $t_m$, called the pole "minimum conduction time," a fixed characteristic of the commutation circuit. At the assumed output level it is likely that the notch width has been already reduced very near the lower limit $W_M = t_m$. Therefore, a further output level increase beyond a real time output ranging around 90% can only be obtained by eliminating the notches altogether and switching to "full conduction". This results in an abrupt discontinuity in output voltage amounting to 7-8% (and up to 15-20% in large inverters, penalized by large values of $t_m$), which is generally troublesome. This discontinuity, if allowed to manifest itself in the case of finely regulated power supplies, is in most instances intolerable, and, in the case of motor drives, could cause undesirable torque pulsations and current distortions.

The waveform can be improved by rearranging the notches, towards the end and only towards the end of the modulation range, in such a manner that the "residual" minimum conduction notches that must be abruptly removed when switching to full conduction are located near the 0° and 180° positions of the cycle (curve (*c*)), where, by virtue of the Fourier integral expressing the magnitude of the fundamental, they contribute the least to the output voltage. In this manner, the discontinuity when passing in full conduction, or the sacrifice in modulation range, if the jump to full conduction is not acceptable, can be contained within 2%, at worst 4% for large inverters. Although, conceivably, analog circuits could be devised accomplishing this last minute relocation of the waveform notches, they would add so much complication to the already cumbersome waveform circuitry of a multi-mode analog modulation scheme, that this solution is hardly justified.

Another example of the inconvenience due to the lack of flexibility inherent in the analog modulation methods is encountered in variable frequency motor drives, at the onset of the so-called 5-pulse mode used as second mode (Mode 2).

Figure 8:
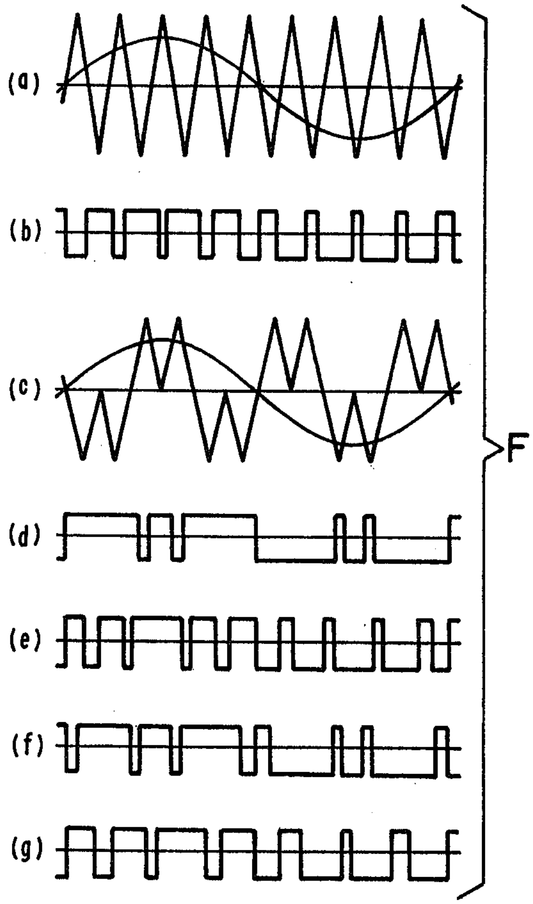
FIG. 8 provides curves (*a*) through (*g*) evidencing another limitation in the use of the triangular method.

Referring to FIG. 8, at the output level for which Mode 1 must be abandoned (typically 63% of maximum, in medium-size inverters), the output waveform in Mode 1 contains about 4 notches (9 polarity switchings) per half cycle (curves (*a*) and (*b*). The narrowest of the notches occurs at the 90° position and lasts the minumum conduction time $t_m$. After mode switching, the same output is obtained with two notches (5 polarity switchings per half cycle, curves (*c*) and (*d*). This drastic reduction in the number of switchings (which corresponds to a reduction in number of pulses of the line-line half cycle from 9 to 5) causes inevitably a severe worsening of the ripple content of the current waveform, resulting from an impairment of the total harmonic distortion figure. In large drives, where the switching from Mode 1 to Mode 2 must occur at output levels considerably lower than 63% (and hence, at considerably lower frequencies), the increase in ripple current is worse due to the lower frequency and may badly overtax the commutation capability.

The impairment in waveform quality at the incipience of Mode 2 could be avoided if, in presence of the misplaced central notch of curve (*b*), the notches were rearranged instead of reducing their number. For instance, given total freedom to create any suitble waveform, the waveform of curve (*b*) could be replaced by the waveform of curve (*e*), which has the same number of switchings and a comparable quality for the desired output level, all its notches lasting more than the critical duration $t_m$. Waveform (*e*) could be used, with a slight narrowing of the notches, to provide outputs somewhat higher than 63%, until the increased operating frequency would make it necessary to reduce the number of switchings in order to avoid exceeding the permissible commutation rate. When this reduction becomes necessary, it is conceivable to switch to waveforms such as curve (*f*) or (*g*) (whichever can be analytically established as being the best for the application). They both possess 7 switchings per half cycle, and are therefore potentially superior to waveform (*d*).

The invention affords a successful implementation by all-digital means of the modulation functions of a PWM drive by eliminating all three drawbacks mentioned above. Thus, it makes it possible to place all the modulator circuitry on a single standard PC board, instead of 6 presently used by some analog models. Since the cost of the controls stems more from the multiplicity of the boards and connectors and the labor necessary to prepare, wire and inspect these boards and connectors, than from the components themselves, a substantial cost reduction is obtained. Typically, digital treatment has made it possible to implement the circuitry with only 50 discrete components and chips, whereas several hundreds were needed in the analog approach. Another consequence is improved reliability. Finally, the quality of the waveforms applied to the motor are distinctly better when the invention is used, especially with large motor drives.

These advantages of a digital approach are likely to become more substantial in the future, since more complex LSI circuits will become available at a lower cost. The overall digital approach will certainly become more attractive when the prices of large capacity memories will drop, as anticipated. Furthermore, once a workable approach has been established by the designer, the way is open to the implementation of a customized LSI design, the modulator-on-a-chip solution, which overcomes any remaining handicaps encountered with AC motor drives.

GENERAL CHARACTERISTICS OF THE MODULATOR CIRCUIT

Figure 9:
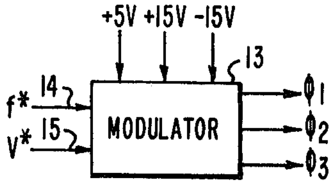
FIG. 9 shows in block diagram a PWM modulator for motor drive control.

Referring to FIG. 9, the modulator circuit 13 is shown controlled by the inverter control circuitry (not shown), generating two analog signals; one analog signal on line 14 is the desired inverter output frequency ($f^*$), the other on line 15 is the desired inverter output voltage (V*). In response to these signals, the modulator delivers three pulse width modulated waveforms $\phi_1$, $\phi_2$, $\phi_3$ at the output. These waveforms are two-level logic signals of the type illustrated in FIG. 10. They are applied to the gating circuits of the inverter (not shown). Each logic signal, as generally known, belongs to an inverter pole and controls the conduction status of the pole thyristors so as to ensure that when the logic signal is at the "high" level or "logic one", the gating of the thyristors in the corresponding pole results in the connection of the pole output terminal to the (+) terminal of the DC link. Conversely, when one of the output logic signals is at the "logic zero" level, the thyristors in the corresponding pole have a conduction status that ensures the connection of the pole output terminal to the (−) terminal of the DC link. The circuitry translating the output logic signal levels into thristor gating signals is not part of the modulator and needs not be described here. Likewise, the circuitry that generates the drive to the commutation thyristors upon a change in the pole status is not part of the modulator. Nor is the circuitry that inserts a "minimum conduction time clamp" signal or the circuitry that overrides the modulation signals to implement the pole current limit.

Figure 10:
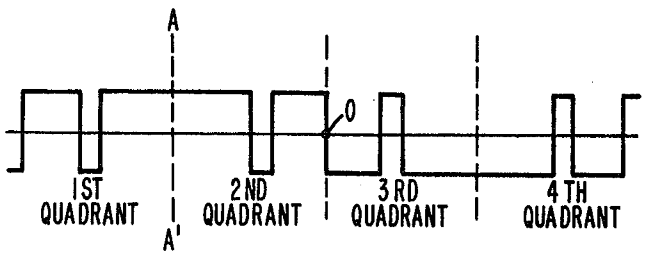
FIG. 10 is typical of a PWM output wave generated during a cycle of operation.

When referenced to a potential exactly halfway between logic zero and logic one, the three output logic signals can be viewed as a scaled down representation of the three inverter output voltages, referenced to the DC neutral. In this representation, the three outputs of the modulation circuits have a fundamental component whose frequency is proportional to the analog input frequency $f^*$ and whose voltage is proportional to the analog input voltage command V*. The three fundamental sinusoids at the three outputs are phase-staggered by 120°, as required for the control of a three-phase bridge. The fundamental voltage and frequency can be independently controlled by separately varying V* and $f^*$. The notches of the PWM waveform of FIG. 10 are positioned so as to implement minimum total harmonic distortion. When some degree of interdependence is used in the variations of V* and f*, so that a roughly constant $V/f$ law is achieved, the positioning of the notches respects the minimum pulse width constraint and the number of notches is made compatible with the requirement of the maximum permissible commutation frequency.

The modulator circuit has two modes of operation. It switches automatically from one mode to the other according to the magnitude of the voltage demand signal V*. The first mode of operation, called hereinafter the "fixed pattern mode", is used for voltages of the fundamental above 40% of maximum, which roughly corresponds to output frequencies above 24 Hz in a dirve of 60 Hz base frequency. In the fixed pattern mode, the notches of the PWM waveforms for a given output fundamental voltage stay at fixed angular positions relative to the fundamental sinusoid. The harmonic voltages are synchronized with the fundamental and the subharmonic voltages are absent.

The second mode of operation, hereinafter called the free "free running" mode, is used for fundamental voltages lower than 40% of the maximum voltage. In this mode, the notches in the PWM waveforms continually move in their angular position relative to the fundamental sinusoid, and change accordingly in width. The waveforms are analogous to the one obtainable by use of the known "triangulation method" without any synchronization between reference wave and timing wave. It has been recognized that this type of waveform is favorable at low inverter frequencies.

The modular circuit includes ROM circuits (Read-Only Memories) having stored therin the information necessary for the generation of a predetermined number of waveforms, each corresponding to a given voltage level. The total voltage range available is typically divided into 64 steps, each corresponding to a desired PWM waveform. Any such waveform has been defined in advance and has been selected for its favorable properties and its compatibility with the constraints of the inverter. Whenever a given voltage level is demanded from the system, a search is made through the "available waveform directory" formed by the ROM for the particular waveform whose fundamental voltage is the closest to the requested level. The stored waveform information is retrieved, and the waveform is implemented on each of the three phases with the required 120° phase shift between phases.

For the 40 higher existing voltage steps, e.g. between 40% and 100% of the maximum voltage, the information stored in the memories relates to the angular position of the level switching that determines the notches. In contrast, for the remaining 24 voltage steps, e.g. from 40% of maximum voltage down to about 8%, the information stored represents a "reference wave" which is to be used in a way similar to the analog "triangulation" method. In fact, this reference wave is intercepted by a digital ramp to produce a digital duplication of the analog triangulation approach. The signal processing technique used in accordance with the present invention permits implementing these two very dissimilar modes of operations with substantially the same hardware, thereby resulting in a reduced number of components.

The waveform-characterizing information stored in the memories relates only to one of the four quadrants of the output fundamental sinusoid, i.e. the first quadrant of the notched square wave present at each of the circuit outputs (shaded part of FIG. 10). The second quadrant is reproduced as a mirror image of the first, with the 90° AA' axis as symmetry axis. The third and fourth quadrants are a repetition of the first and second quadrants with a polarity inversion, i.e. they symmetrically reproduce the first and second quadrant through symmetry center 0. This technique primarily intended to minimize the hardware and the storage capacity, brings with it two additional advantages. The axial symmetry eliminates phase perturbations resulting from the modulation of the voltage amplitude, which is a highly desirable result in induction motor drives to avoid crosstalk between flux control circuits and torque control circuits. The central symmetry automatically eliminates the even harmonic and DC components. The capability of rejection of these unwanted DC components afforded by the present digital method is far superior to what can be achieved with analog circuitry. It becomes, therefore, superfluous to include in the control circuitry DC cancelling circuits. These would be indispensable with the analog approach. More generally, it is observed that the implementation of such symmetry is a direct result of the digital technique used, and would not be conceivable with any analog method of the prior art.

Furthermore, again for the purpose of achieving compactness, the waveform information is stored only for one phase. The necessary three-phase configuration is obtained by multiplexing the stored information between the three phases, according to a technique that will be detailed later. As a result, the phase displacement is obtained with high accuracy, e.g. precisely 120°, within tolerances never achieved with most analog circuits.

THE FIXED PATTERN MODE OF OPERATION

Figure 11:
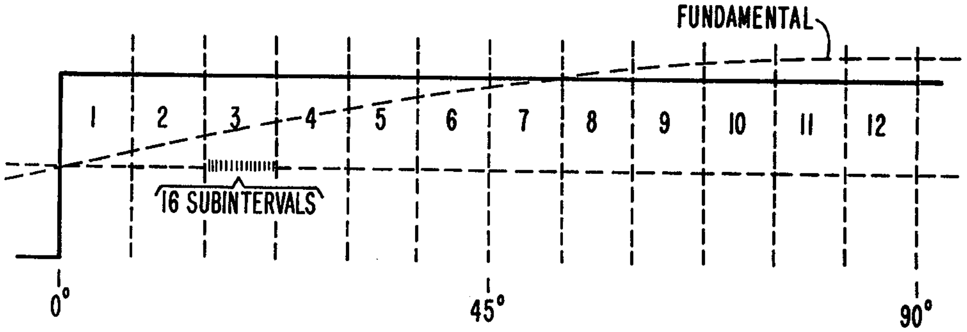
FIG. 11 illustrates for one quadrant how a PWM wave can be reconstructed in accordance with the present invention.

Referring to FIG. 11 an output waveform is shown as an unnotched square wave, such as found for inverter voltages lying above the modulation range. The first quadrant of such a square wave is ideally divided in 12 equal angular intervals, and each intervals is divided in 16 equal subintervals. To implement a modulation, the output state is, at times, changed from one level to the other and then the first level is restored, thereby to form notches. The following constraints are imposed on the switching mechanism of these states. Switching in output level is allowed at an interval boundary. It is also allowed within an interval, but only once per interval, and it must occur at a subinterval boundary.

Figure 12:
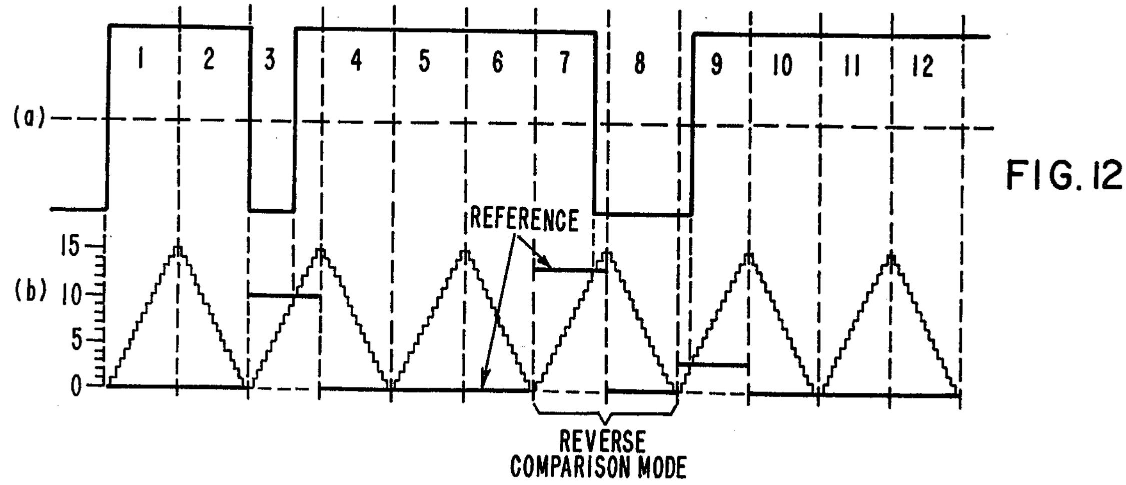
FIG. 12 shows the basic method of creating a PWM wave of desired pattern in accordance with the present invention.

Control of the switching position is obtained through the following technique. A digital ramp signal is generated during successive discrete time intervals. This signal is synchronous with the output waveform. The ramp is obtained by steps, one step at any elementary interval or each sub-interval within the discrete time interval, and it rises during odd-numbered discrete time intervals while declining during even-numbered discrete time intervals. FIG. 12 illustrates by a curve (*b*) a fictitious analog representation of the ramp characterized by a staircase voltage varying from zero to a hypothetical level 15 by increments of 1, in strict phase correlation with the output wave. The ramp is applied to a digital comparator, together with the digital equivalent of a reference level. The state of the output signal is made dependent from the comparator response in two different modes. In one mode, the "normal" mode, the output signal is set at the logic zero level when the ramp value is lower than the reference value and is set at the logic one level when the ramp value equals or exceeds the reference level. Conversely, in a second mode, the "reverse" mode, the output signal is set at the logic one level when the ramp value is lower than the reference value and is set at the logic zero level when the ramp value equals or exceeds the reference value.

The mechanism is illustrated by a curve (*a*) in FIG. 12. The first narrow notch in the third interval is obtained by setting in the interval the reference level at 10 in the fictitious analog circuit used as illustration and operating the comparator in the normal mode. Consequently, there is a switching at the beginning of the interval and also at the end of the tenth subinterval. Switchings are avoided in intervals 1, 2, 4, 5, 6, 10, 11 and 12 by setting the reference level at zero for all these intervals, and operating the comparator in the normal mode. The wide notch in intervals 7, 8 and 9 is obtained by setting in interval 7 the reference level to 13 and the comparator mode to reverse. The output signal is maintained in the logic state throughout interval 8 by setting for this interval the reference level to zero and the comparator mode to reverse. Finally, the trailing edge of the notch is positioned by setting for interval 9 the reference level to 3 and the comparator mode to the normal mode.

In this manner, a given waveform compatible with the limitations of the system is generated by prescribing for each interval both the level of comparison and the mode of operation of the comparator. These data are stored in the memories at an address corresponding to the particular desired waveform.

The rules for the generation of the waveforms evolve from trials and errors by comparison with other modulation techniques and result in the selection of the most suitable for a particular PWM drive application. It can be shown that maximum use of the available storage capacity has been made possible by avoiding an organization which would lend itself to non-readily utilizable apparent advantages, for instance if the ability of switching more than once per interval were used. Thus, by reducing the number of switchings that can be implemented, more of the existing memory capacity can be made available to provide resolution in the position of the switchings, which is most desirable. The described limitation in the number of switchings does not interfere with the synthesis of the best waveforms in the range of voltages for which the fixed pattern mode is used.

As will be seen hereinafter the described procedure adapts itself ideally to (1) the requirement of implementing a full output wave from the information relative to one quadrant; (2) the requirement of obtaining three phases out of a single one; (3) the requirement of operating in the free running mode at low frequency.

Figure 13:
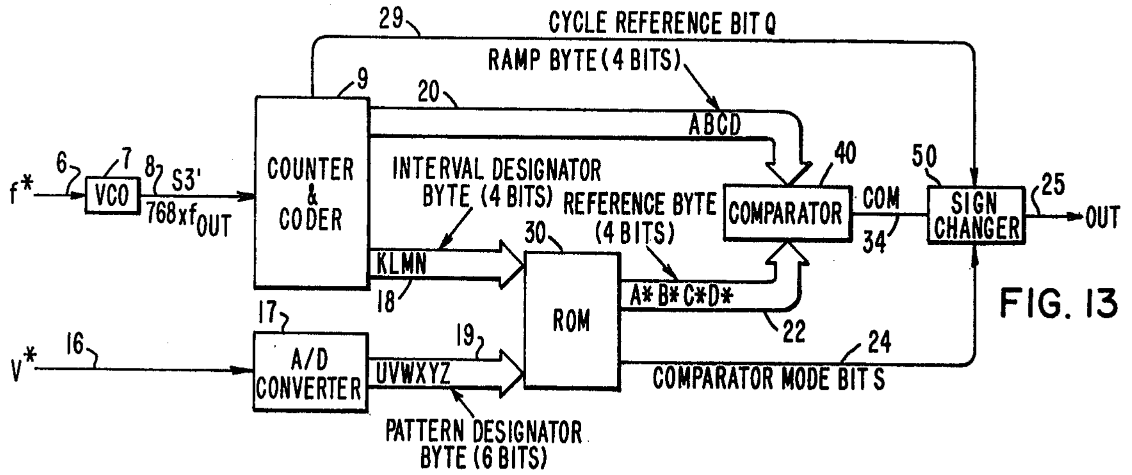
FIG. 13 is a block diagram showing the operation of the modulator according to the invention for a single phase in the fixed pattern mode.

The principle of operation of the modulator circuit can now be explained by reference to the simplified block diagram of FIG. 13. For the sake of simplicity, FIG. 13 depicts only a single phase operation. However, all main functions are represented. The references used are the same as those indicated on the more complete circuit of FIG. 14, which will be more extensively described later.

An analog frequency command $f^*$ is applied on line 6 to a VCO 7 which oscillates at a frequency 768 times higher than the output fundamental frequency. The VCO output on line 8 clocks a counter and coder circuit 9, whose outputs 18, 20, 29, after some code manipulations, include four less significant bits A, B, C, D, on lines 20 representing the up-down ramp of FIG. 12, and four more significant bits K, L, M, N hereinafter called the "interval designator" on lines 18 representing the "names" of the twelve intervals, i.e. 12 digital words each one identifying an interval. Thus, as the system operates, the "names" of the 12 intervals are "spelled" in succession by the four KLMN lines, in their order of occurrence 1, 2, 3 . . . 12. The code selected is such that after reaching 12, the sequence continues as 12, 11, 10, 9 . . . 3, 2, 1, 1, 2, 3 . . . This code arrangement introduces the mirror symmetry between quadrants 1–2 and 3–4 in the output waveform.

The voltage command V* on line 16 is digitized by an A/D converter 17 to generate on line 19 a 6-bit word UVWXYZ having 64 possible states, each one representing the "name" of a desired waveform (i.e. in our terminology, a desired "pattern") of the stipulated fundamental amplitude and a predetermined pulse pattern. The UVWXYZ word outputted on lines 19 is hereinafter called a "pattern designator". Only the 40 upper states of 1, pattern designator are considered in the fixed pattern mode, among the 64 possible states.

The six voltage bits, U, V, W, X, Y, Z on lines 19 and the four interval bits, K, L, M, N on lines 18 are applied as a combined address to a ROM circuit 30, properly programmed. The ROM circuit includes two ROM solid state devices 113, 114. The A/D converter 17 includes solid state devices 117 and 122 for the generation at the output on lines 18 of a digital word UVWXYZ which is the pulse with modulated wave pattern designator, or address to the ROM circuit 30. When the ROM 30 is addressed with a given pattern request from the voltage lines 19, it responds to each successive interval name present at the KLMN lines by generating at its outputs a 4-bit comparator reference word (A*, B*, C*, D*) on lines 22 and a comparator mode bit (S) on line 24. The reference word from lines 22 is applied to a digital comparator 40, together with the up-down ramp word ABCD from lines 20. For a given interval, the reference word remains unchanged through the duration of the interval, while the ramp signal increases or decreases from one of its extreme values to the other. If a switching had been programmed for that interval in the pattern being generated, which in the case of the reference word is other than 0000, the comparator would respond accordingly by switching its state at the programmed moment. Through a sign changer circuit 50, the output on line 34 from comparator 40 is assigned one polarity or the other, according to the level of the comparator mode bit S, also programmed into a memory 115 belonging to the ROM circuit 30 for the addressed pattern UVWXYZ and interval KLMN, as required to establish either a "normal" or a "reverse" comparison mode through circuit 50.

The Sign Changer Circuit 50 is also influenced by a direct line 29 carrying a bit Q derived from solid state device 33 of the Counter-Coder Circuit 9. This bit Q, hereinafter called the "Cycle Reference Bit", determines if the output belongs to quadrants 1–2 or to quadrants 3–4 and ensures the waveform control symmetry property earlier described by reference to FIG. 10. The Q signal is simply a square wave at the fundamental output frequency.

Figure 14:
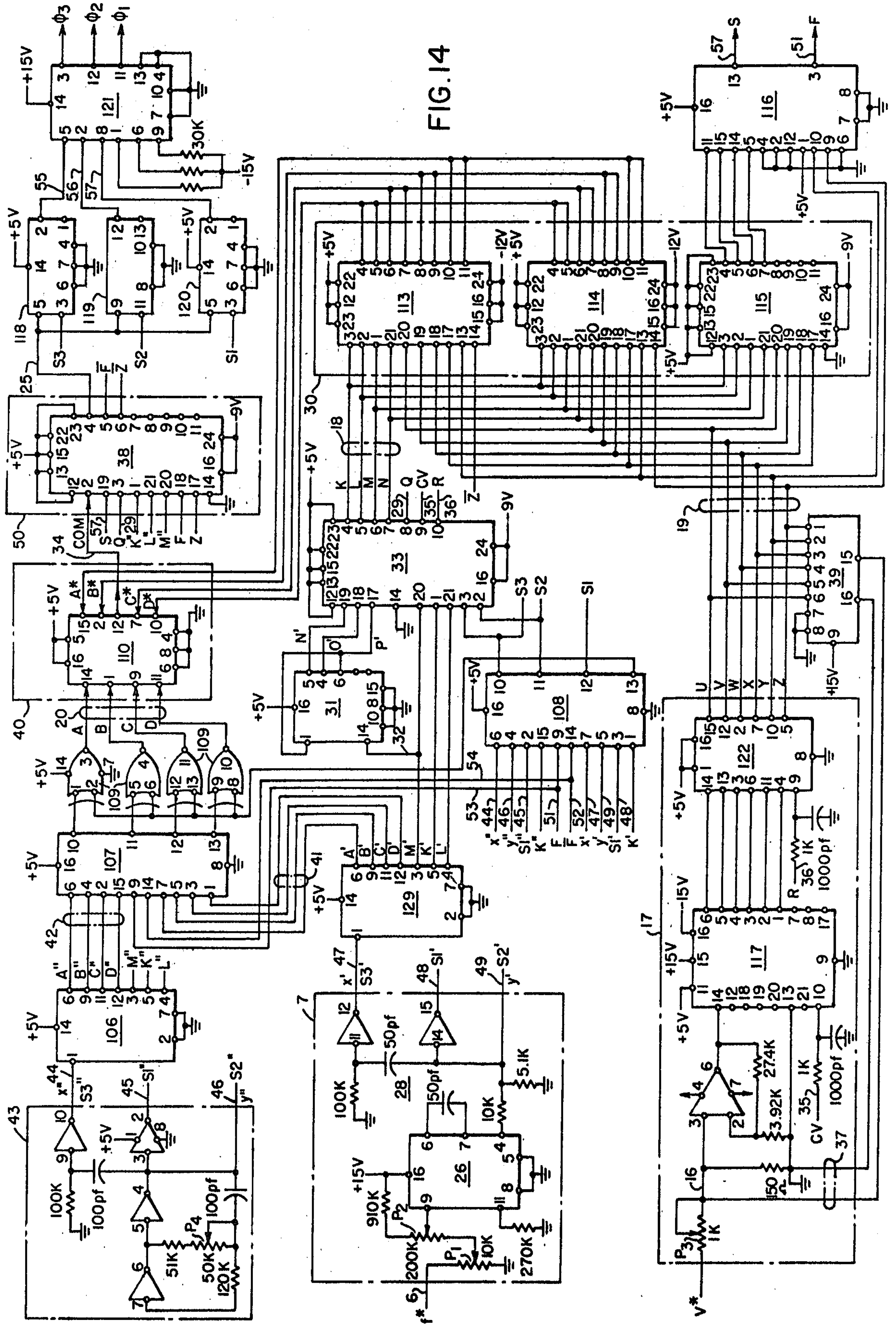
FIG. 14 provides specific circuitry for the implementation of the invention in the fixed pattern as well as in the free running mode.
Figure 15:
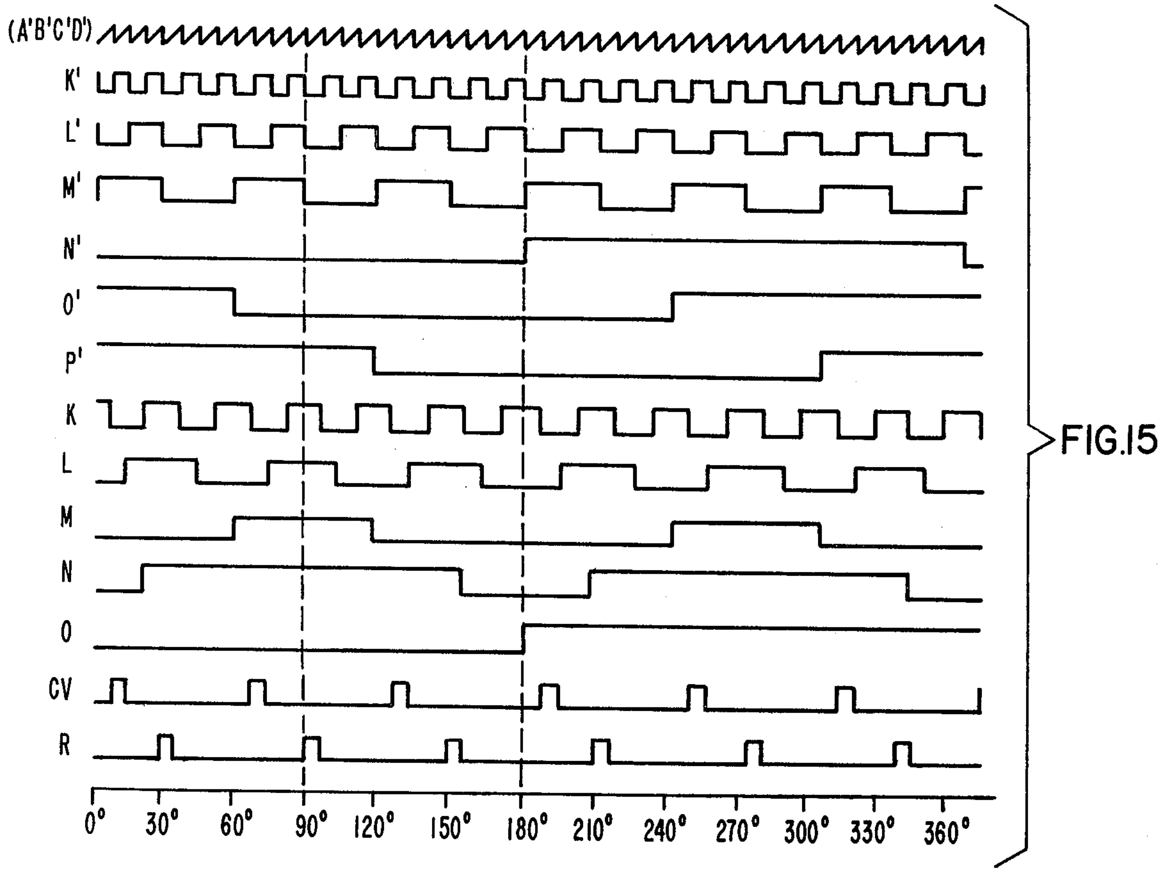
FIG. 15 illustrates the time relation and shape of several basic signals generated in the circuit of FIG. 14.

The circuit diagram of FIG. 14 is illustrative of an implementation of the scheme of FIG. 13. The analog frequency demand signal $f^*$ is applied to circuit 7, which is a voltage control oscillator VCO. The output at pin 4 of the solid state device 26 is a clock signal that goes via line 27 through a timing circuit 28, the purpose of which is to generate signals $S_1'$, $S_2'$ and $S_3'$ affected to the three phase operation of the overall circuit. The clock emerges at pin 12 of timing circuit 28 and is applied as signal $S_2'$ or $S_3'$ to a solid state device 129 which is a 7-bit binary UP counter. The most significant bit out of this counter is M' which is used via line 32 as a clock for solid state device 31 which is a divide-by-six Johnson counter generating N'O'P' at its output. The six lower frequency lines out of this combination of counter devices are K', L', M', N', O', P' and their waveforms are shown at the top of FIG. 15 relative to each other. These lines are applied to solid state device 33, which is an auxiliary ROM device, programmed to perform a code change on the set of signals at its input. The signals emerge from such code changer circuit 33 as lines KLMN, forming the interval designator word, Q on line 29, which is the cycle reference bit and auxiliary signals CV and R, which are associated with the operation of the A/D converter 17 on respective lines 35, 36.

FIG. 15 shows the signals at the output of the code changer device 33 in relation to the inputs. The horizontal scale is graduated in terms of angular positions of the output waveform fundamental. The first line represents the first four bits A'B'C'D' of counter 129. At each half cycle of K', they vary in 16 steps from A'B'C'D' = 0000 to A'B'C'D' = 1111 in a straight binary code. This variation is symbolized by a small ramp, reset at each change of state of K'.

The following Table X provides the identification words of the 12 intervals according to the adopted code.

TABLE X

Figure 4:
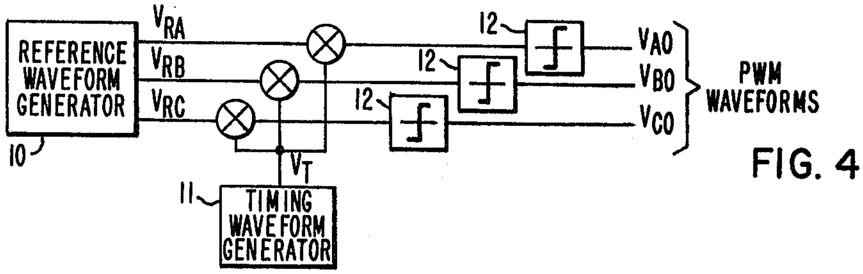
FIG. 4 is a block diagram of a PWM modulator using the triangulation method.

| Interval No. As Per Figure 4 | Internal Binary Designation | | | |
|---|---|---|---|---|
| | K | L | M | N |
| 1 | 1 | 0 | 0 | 0 |
| 2 | 0 | 0 | 0 | 0 |
| 3 | 0 | 1 | 0 | 0 |
| 4 | 1 | 1 | 0 | 0 |
| 5 | 1 | 1 | 0 | 1 |
| 6 | 0 | 1 | 0 | 1 |
| 7 | 0 | 0 | 0 | 1 |
| 8 | 1 | 0 | 0 | 1 |
| 9 | 1 | 0 | 1 | 1 |
| 10 | 0 | 0 | 1 | 1 |
| 11 | 0 | 1 | 1 | 1 |
| 12 | 1 | 1 | 1 | 1 |

The K, L, M, N waveforms of FIG. 15 defining an interval are symmetrical with respect to the 90° axis. As a result, the interval names will be called in reverse sequence in the second quadrant as compared to the first quadrant of an output waveform. This property, coupled with the fact that the ramp information ABCD is, as can be inferred from FIG. 9, also symmetrical with respect to the 90° axis, results in switching positions in the second quadrant that are the mirror image of the switching positions in the first quadrant. A second property of the selected code is that the waveforms are reproduced identical to themselves after the 180° axis, which results in identical half waves in the output signal.

At any given step of the input clock in the system of FIG. 13, the output line has a level which is the proper one for one of the phases of the inverter, say Phase 1, as defined by the pattern currently requested.

Because the selected number of intervals per quarter wave is a multiple of 3, the only change required to adapt FIG. 11 for any other phase is to modify the interval designator word KLMN. For Phase 2, the designator has to assume, at that same clock step, the value it would have assumed 16 intervals later (or 256 clock steps later) in Phase 1. For phase 3, it has to change to the value it would have assumed 32 intervals later in Phase 1.

The technique to instantly convert the output of the circuit of FIG. 13 to the needs of the two other phases consists therefore of applying the proper transformation on KLMN, in such a way that it always corresponds to a 16 or a 32 interval shift. A corresponding transformation has to be operated on the Q bit. The transformation is the one obtained on the KLMN and Q levels on FIG. 15, if, while keeping the upper lines fixed, one would slide the K, L, M, N and Q lines 120° and 240° to the left.

This means that the aforementioned code conversion operated on the K'L'M'N'O'P' lines by device 33 of FIG. 14 while valid as is for Phase 1, must also be altered for Phases 2 and 3. Once the alteration is performed, the entire system responds properly for all phases.

In the light of the above observations, a three-phase operation of the modulator circuit of FIG. 9 is possible. Referring again to FIG. 14, clock signal $S_2'$ on line 49 out of circuit 26 is (through circuit 28) first inverted then processed through a differentiation circuit, resulting in signals $S_1'$ (or $x'$) and $S_3'$, in the sequence shown on FIG. 16.

Signals 1; and $y'$ on respective lines 47, 49 determine which phase the modulator circuit is operative on. When $x = 1$, and $y = 1$, the modulator operates for Phase 1; when $x = 1, y = 0$, the modulator operates for Phase 2; and when $x = 0, y = 1$, the modulator operates for Phase 3. Signals $x'$ and $y'$, together with $S_3'$ of line 48 are applied to solid state device 108 which is a dispatching device routing the signals to its outputs when $F = 0$, $\overline{F} = 1$ on lines 51, 52. This condition corresponds to enabling of the fixed pattern mode and inhibiting of the free running mode. Signals F and $\overline{F}$ also control the routing of signals by dispatching device 107, via lines 53, 54. Thus, in the fixed pattern mode, as assumed for the moment, F = 0. It can be considered that, in circuit 108 and circuit 107 the following pins are short-circuited: 7 and 10; 5 and 11; 3 and 12; 1 and 13. This means that A',B',C',D', rather than A",B",C",D", are transferred by the dispatching circuit 107, whereas from circuit 108: $x' = x$; $y' = y'$ $S_1' = S_1$; $S_2' = S_2$; $S_3' = S_3$. Therefore, the phase controlling signals $x'$, $y'$ are supplied as $x$, $y$ to the code changing circuit 33.

Similarly, signals $S_1'$, $S_2'$ and $S_3'$ are applied as $S_1$, $S_2$ and $S_3$ to the clock inputs of the flip-flops in circuits 118, 119 and 120. These flip-flops "watch" the line "OUT" (line 25) from the circuit 38. Upon command from their clock inputs $S_1$, $S_2$, $S_3$, they sample the state of the line and retain this state until next sampling. The line "OUT" corresponds to the output line 25 in the block diagram of FIG. 13, i.e. it represents the modulator response to the input conditions. The flip-flop output lines 55, 56, 57 of FIG. 14 represent three modulator outputs. The role of circuit 121, interposed between the flip-flops 118, 119, 120 and the actual outputs, $\phi_1$, $\phi_2$, $\phi_3$, consists only in providing level conversion, from the 5V logic to the 15V logic. The central memory 30 of the circuitry of FIG. 14, includes three ROM devices 113, 114, 115. ROM devices 113 and 114 contain the programmed information necessary to generate output waves in the fixed pattern mode, when the state of signals F, $\overline{F}$ so controls, and devices 107, 108 dispatch the four lower group of signals (A',B',C',D' with 107, $x'$,$y'$, $S_3'$ and K' with 108). ROM devices 113 and 114 also contain the programmed information necessary to generate output waves in the free running mode, e.g. when devices 107 and 108 dispatch the upper four signals (A",B",C",D" for 107; x",y", $S_3''$ and K" for 108). In each instance, signals A*B*C*D* are opposed to the inputs ABCD of comparator 40 which specifically consists in FIG. 14 of a solid state device 110 generating an output signal COM on line 34 when the threshold is passed.

Central memory 30 also includes a third ROM device 115 in which the mode status is stored, thereby to generate the proper F signal on line 51 which selects the mode of operation, and the sign status, thereby to generate the proper signal on line 57 which controls the sign circuit 50. The A/D converter 17 associated with the voltage reference signal V* on line 16 includes an ADC converter proper 117 and a latch device 122. Signal CV on line 35 strobes device 117 for initiation of a conversion operation. Signal R on line 36, follows with a sufficient delay to allow completion of the conversion operation to latch the output of device 117 and permit a stable output on lines 17 for UVWXYZ.

Figure 16:
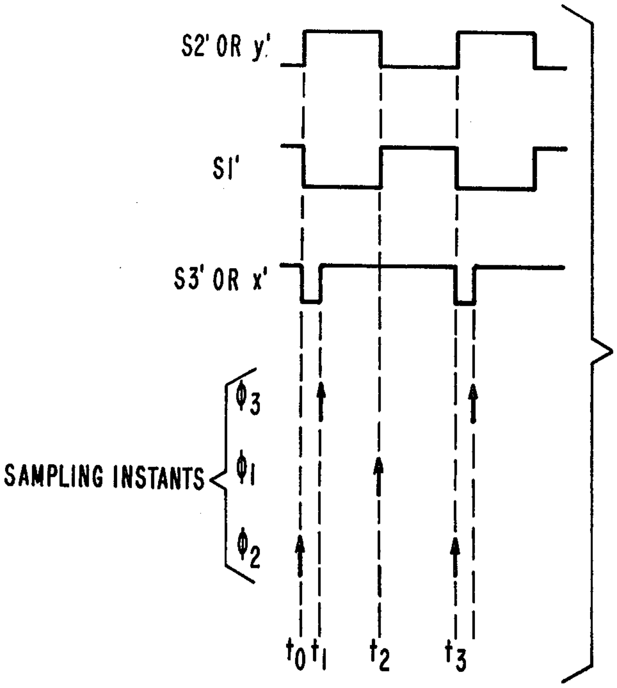
FIG. 16 shows in time relation the signals of FIG. 14 used to determine the operation of the modulator for three phases at the output.

One clock cycle of operation can be described as follows:

The cycle starts with a DOWN-going edge of signal $S_3'$ at $t = t_o$, (FIG. 16). The counters 129 and 31 are indexed by this edge and some of the outputs A' through P' change state. Simultaneously the $x$, $y$ signals at the input of circuit 33 become $x = 0, y = 1$. The code conversion thus takes place as suitable for Phase 3 and the proper designator word KLMN is applied to the ROM section 30, made up of three 2048 bit memories contained in devices 113, 114 and 115. The ROM section responds by up-dating the state of "reference word" A*B*C*D* and of comparator mode bit S. Circuit 116, that generates S, actaully is a multiplexing circuit merely changing the organizatiOn of the output lines of circuit 115 from the available 256 × 8 capability to the needed 1024 × 2 capability. The reference word is applied to the comparator circuit 110, which receives also a ramp word ABCD. The ramp word is originated in circuit 129 in the form A'B'C'D' (straight binary 4-bit UP-only ramp). The word is routed through dispatch circuit 107 to a set of exclusive OR devices 109, where it is converted from an UP-only ramp to an UP-DOWN ramp as symbolized on FIG. 10. At the threshold, comparator 110 generates a signal COM on line 34, applied to sign changer device 38. The sign changer device 38 operates as shown in block 50 of FIG. 13. The COM signal, processed in response to the state of the S bit and in response to the cycle reference bit Q; becomes the OUT signal on line 25. Thus, at the considered clock instant, the OUT line acquires a state correct for Phase 3. Thereafter, at $t = t_1$, after a delay controlled by the value of the capacitor applied to circuit 28, pin 11, signal $S_3'$ changes from 0 to 1. At the corresponding UP-going edge, the flip-flop in circuit 118, clocked by pin 3, samples the OUT line and latches in the state present there at the instant of sampling. This flip-flop will now retain the information pertaining to Phase 3 despite subsequent changes on the OUT line. This information, after level conversion in circuit 121, is available at the $\phi_3$ output.

After the change of state of signal $S_3'$, the $x$, $y$, signals at the input of device 33 acquire at $t = t_1$ the state $x = 1, y = 1$ and device 33 reacts by altering the code conversion so as to confer to K.L.M.N the state suitable to identify the proper Phase 1 interval. Consequently, the modulator reacts by adjusting the OUT line 25 so that it complies with the requirements of Phase 1. Let us note that the OUT line 25 thus changes a short time after being sampled for Phase 3, this short time being the sum of the propagation delays of the $x$, $y$ signals through circuits 108 and 33, the access time of the ROM devices 113, 114 and 115, the delay through the comparator 110 and through circuit 38. This total time delay is sufficient to preclude a racing condition in the sampling of the OUT line 25. When after one half clock period, signal $S_1'$ returns to the "ONE" state at $t = t_2$, the flip-flop in circuit 120, clocked at pin 3 by $S_1'$, samples the OUT line at this positive transition. The state of the OUT line 25 at this moment remains "freezed" in the flip-flop and is presented at output $\phi_1$ as information relating to the PWM waveform of Phase 1.

The change in $S_1'$ is accompanied by a change in $S_2'$. Thus, at $t = t_2$, the $x$, $y$ signals at circuit 33 acquire the state $x = 1$, $y = 0$, which conditions the circuit to operate the code change as required for Phase 2. The modulator OUT line assumes a state corresponding to Phase 2. At $t = t_3$, the positive transition of $S_2'$ at pin 11 of the flip-flop device 119 results in the sampling of the OUT line 25 for the generation of the $\phi_2$ signal.

Referring to FIG. 14, the solid state devices of the circuitry described typically are as follows:

Main ROM devices 113, 114: MM 5203 of National Semiconductor Inc.

Auxiliary ROM devices 115, 33, 38: INTEL 1702 of Intel Inc.

A/D converter 117: ADC 590-8 of Hybrid Systems Corp.

Latch 122: SN 74174 of Texas Instruments

VCO 26: CD 4046 of RCA

Inverter 2 in unit 43 and unit 7: CD 4049 of RCA

Counters 106 and 129: CD 4024 of RCA

Dispatch devices 107,108: CD 4019 of RCA

Counter 31: CD 4018 of RCA

Exclusive-OR gates 109: CD 4030 of RCA

Comparator 110: MC 14585 of Motorola

Flip-Flops 118, 118, 120: CD 4013 of RCA

Level Converter 121: MC 666 of Motorola

Digital-Analog Converter 39: DAC 371-8 of Hybrid Systems Corp.

Scaler operational amplifier 24: 741 of Motorola

The role and operation of the code changer device 33 may be analyzed as follows:

In order to generate the interval designator word KLMN and the other signals of FIG. 15, namely R, CV and Q, and in order to properly alter these signals to serve the purpose of the other two phases, outputs K' through P' from counter 129 and 31 must be processed through a logic circuit, which also responds to the phase identification pair of bits $x$, $y$ from device 108. The role of the logic circuit 33 can be defined by a truth table relating the desired state of the output signals K, L, M, N, Q, CV and R to all possible states of the input signals K', L', M', N', O', P', $x$ and $y$. This truth table is given herebelow on Tables 1*a*, 1*b* and 1*c*.

TABLE 1a.

Truth table for code conversion.
x = 1 y = 1

| P' | O' | N' | M' | L' | K' | R | CV | Q | N | M | L | K |
|---|---|---|---|---|---|---|---|---|---|---|---|---|
| 1 | 1 | 0 | 1 | 0 | 0 | 0 | 0 | 0 | 0 | 0 | 0 | 1 |
| 1 | 1 | 0 | 1 | 0 | 1 | 0 | 0 | 0 | 0 | 0 | 0 | 0 |
| 1 | 1 | 0 | 1 | 1 | 0 | 0 | 1 | 0 | 0 | 0 | 1 | 0 |
| 1 | 1 | 0 | 1 | 1 | 1 | 0 | 0 | 0 | 0 | 0 | 1 | 1 |
| 1 | 1 | 0 | 0 | 0 | 0 | 1 | 0 | 0 | 1 | 0 | 1 | 1 |
| 1 | 1 | 0 | 0 | 0 | 1 | 0 | 0 | 0 | 1 | 0 | 1 | 0 |
| 1 | 1 | 0 | 0 | 1 | 0 | 0 | 0 | 0 | 1 | 0 | 0 | 0 |
| 1 | 1 | 0 | 0 | 1 | 1 | 0 | 0 | 0 | 1 | 0 | 0 | 1 |
| 1 | 0 | 0 | 1 | 0 | 0 | 0 | 0 | 0 | 1 | 1 | 0 | 1 |
| 1 | 0 | 0 | 1 | 0 | 1 | 0 | 0 | 0 | 1 | 1 | 0 | 0 |
| 1 | 0 | 0 | 1 | 1 | 0 | 0 | 1 | 0 | 1 | 1 | 1 | 0 |
| 1 | 0 | 0 | 1 | 1 | 1 | 0 | 0 | 0 | 1 | 1 | 1 | 1 |
| 1 | 0 | 0 | 0 | 0 | 0 | 1 | 0 | 0 | 1 | 1 | 1 | 1 |
| 1 | 0 | 0 | 0 | 0 | 1 | 0 | 0 | 0 | 1 | 1 | 1 | 0 |
| 1 | 0 | 0 | 0 | 1 | 0 | 0 | 0 | 0 | 1 | 1 | 0 | 0 |
| 1 | 0 | 0 | 0 | 1 | 1 | 0 | 0 | 0 | 1 | 1 | 0 | 1 |
| 0 | 0 | 0 | 1 | 0 | 0 | 0 | 0 | 0 | 1 | 0 | 0 | 1 |
| 0 | 0 | 0 | 1 | 0 | 1 | 0 | 0 | 0 | 1 | 0 | 0 | 0 |
| 0 | 0 | 0 | 1 | 1 | 0 | 0 | 1 | 0 | 1 | 0 | 1 | 0 |
| 0 | 0 | 0 | 1 | 1 | 1 | 0 | 0 | 0 | 1 | 0 | 1 | 1 |
| 0 | 0 | 0 | 0 | 0 | 0 | 1 | 0 | 0 | 0 | 0 | 1 | 1 |
| 0 | 0 | 0 | 0 | 0 | 1 | 0 | 0 | 0 | 0 | 0 | 1 | 0 |
| 0 | 0 | 0 | 0 | 1 | 0 | 0 | 0 | 0 | 0 | 0 | 0 | 0 |
| 0 | 0 | 0 | 0 | 1 | 1 | 0 | 0 | 0 | 0 | 0 | 0 | 1 |
| 0 | 0 | 1 | 1 | 0 | 0 | 0 | 0 | 1 | 0 | 0 | 0 | 1 |
| 0 | 0 | 1 | 1 | 0 | 1 | 0 | 0 | 1 | 0 | 0 | 0 | 0 |
| 0 | 0 | 1 | 1 | 1 | 0 | 0 | 1 | 1 | 0 | 0 | 1 | 0 |
| 0 | 0 | 1 | 1 | 1 | 1 | 0 | 0 | 1 | 0 | 0 | 1 | 1 |
| 0 | 0 | 1 | 0 | 0 | 0 | 1 | 0 | 1 | 1 | 0 | 1 | 1 |
| 0 | 0 | 1 | 0 | 0 | 1 | 0 | 0 | 1 | 1 | 0 | 1 | 0 |
| 0 | 0 | 1 | 0 | 1 | 0 | 0 | 0 | 1 | 1 | 0 | 0 | 0 |
| 0 | 0 | 1 | 0 | 1 | 1 | 0 | 0 | 1 | 1 | 0 | 0 | 1 |
| 0 | 1 | 1 | 1 | 0 | 0 | 0 | 0 | 1 | 1 | 1 | 0 | 1 |
| 0 | 1 | 1 | 1 | 0 | 1 | 0 | 0 | 1 | 1 | 1 | 0 | 0 |
| 0 | 1 | 1 | 1 | 1 | 0 | 0 | 1 | 1 | 1 | 1 | 1 | 0 |
| 0 | 1 | 1 | 1 | 1 | 1 | 0 | 0 | 1 | 1 | 1 | 1 | 1 |
| 0 | 1 | 1 | 0 | 0 | 0 | 1 | 0 | 1 | 1 | 1 | 1 | 1 |
| 0 | 1 | 1 | 0 | 0 | 1 | 0 | 0 | 1 | 1 | 1 | 1 | 0 |
| 0 | 1 | 1 | 0 | 1 | 0 | 0 | 0 | 1 | 1 | 1 | 0 | 0 |
| 0 | 1 | 1 | 0 | 1 | 1 | 0 | 0 | 1 | 1 | 1 | 0 | 1 |
| 1 | 1 | 1 | 1 | 0 | 0 | 0 | 0 | 1 | 1 | 0 | 0 | 1 |
| 1 | 1 | 1 | 1 | 0 | 1 | 0 | 0 | 1 | 1 | 0 | 0 | 0 |
| 1 | 1 | 1 | 1 | 1 | 0 | 0 | 1 | 1 | 1 | 0 | 1 | 0 |

TABLE 1a.-continued

| | | | Truth table for code conversion. x = 1 y = 1 | | | | | | | | | |
|---|---|---|---|---|---|---|---|---|---|---|---|---|
| P' | O' | N' | M' | L' | K' | R | CV | Q | N | M | L | K |
| 1 | 1 | 1 | 1 | 1 | 1 | 0 | 0 | 1 | 1 | 0 | 1 | 1 |
| 1 | 1 | 1 | 0 | 0 | 0 | 1 | 0 | 1 | 0 | 0 | 1 | 1 |
| 1 | 1 | 1 | 0 | 0 | 1 | 0 | 0 | 1 | 0 | 0 | 1 | 0 |
| 1 | 1 | 1 | 0 | 1 | 0 | 0 | 0 | 1 | 0 | 0 | 0 | 0 |
| 1 | 1 | 1 | 0 | 1 | 1 | 0 | 0 | 1 | 0 | 0 | 0 | 1 |

Table 1b.

| | | | Truth table for code conversion. x = 0 y = 1 | | | | | | | | | |
|---|---|---|---|---|---|---|---|---|---|---|---|---|
| P' | O' | N' | M' | L' | K' | R | CV | Q | N | M | L | K |
| 1 | 1 | 0 | 1 | 0 | 0 | 0 | 0 | 1 | 1 | 1 | 0 | 1 |
| 1 | 1 | 0 | 1 | 0 | 1 | 0 | 0 | 1 | 1 | 1 | 0 | 0 |
| 1 | 1 | 0 | 1 | 1 | 0 | 0 | 1 | 1 | 1 | 1 | 1 | 0 |
| 1 | 1 | 0 | 1 | 1 | 1 | 0 | 0 | 1 | 1 | 1 | 1 | 1 |
| 1 | 1 | 0 | 0 | 0 | 0 | 1 | 0 | 1 | 1 | 1 | 1 | 1 |
| 1 | 1 | 0 | 0 | 0 | 1 | 0 | 0 | 1 | 1 | 1 | 1 | 0 |
| 1 | 1 | 0 | 0 | 1 | 0 | 0 | 0 | 1 | 1 | 1 | 0 | 0 |
| 1 | 1 | 0 | 0 | 1 | 1 | 0 | 0 | 1 | 1 | 1 | 0 | 1 |
| 1 | 0 | 0 | 1 | 0 | 0 | 0 | 0 | 1 | 1 | 0 | 0 | 1 |
| 1 | 0 | 0 | 1 | 0 | 1 | 0 | 0 | 1 | 1 | 0 | 0 | 0 |
| 1 | 0 | 0 | 1 | 1 | 0 | 0 | 1 | 1 | 1 | 0 | 1 | 0 |
| 1 | 0 | 0 | 1 | 1 | 1 | 0 | 0 | 1 | 1 | 0 | 1 | 1 |
| 1 | 0 | 0 | 0 | 0 | 0 | 1 | 0 | 1 | 0 | 0 | 1 | 1 |
| 1 | 0 | 0 | 0 | 0 | 1 | 0 | 0 | 1 | 0 | 0 | 1 | 0 |
| 1 | 0 | 0 | 0 | 1 | 0 | 0 | 0 | 1 | 0 | 0 | 0 | 0 |
| 1 | 0 | 0 | 0 | 1 | 1 | 0 | 0 | 1 | 0 | 0 | 0 | 1 |
| 0 | 0 | 0 | 1 | 0 | 0 | 0 | 0 | 0 | 0 | 0 | 0 | 1 |
| 0 | 0 | 0 | 1 | 0 | 1 | 0 | 0 | 0 | 0 | 0 | 0 | 0 |
| 0 | 0 | 0 | 1 | 1 | 0 | 0 | 1 | 0 | 0 | 0 | 1 | 0 |
| 0 | 0 | 0 | 1 | 1 | 1 | 0 | 0 | 0 | 0 | 0 | 1 | 1 |
| 0 | 0 | 0 | 0 | 0 | 0 | 1 | 0 | 0 | 1 | 0 | 1 | 1 |
| 0 | 0 | 0 | 0 | 0 | 1 | 0 | 0 | 0 | 1 | 0 | 1 | 0 |
| 0 | 0 | 0 | 0 | 1 | 0 | 0 | 0 | 0 | 1 | 0 | 0 | 0 |
| 0 | 0 | 0 | 0 | 1 | 1 | 0 | 0 | 0 | 1 | 0 | 0 | 1 |
| 0 | 0 | 1 | 1 | 0 | 0 | 0 | 0 | 0 | 1 | 1 | 0 | 1 |
| 0 | 0 | 1 | 1 | 0 | 1 | 0 | 0 | 0 | 1 | 1 | 0 | 0 |
| 0 | 0 | 1 | 1 | 1 | 0 | 0 | 1 | 0 | 1 | 1 | 1 | 0 |
| 0 | 0 | 1 | 1 | 1 | 1 | 0 | 0 | 0 | 1 | 1 | 1 | 1 |
| 0 | 0 | 1 | 0 | 0 | 0 | 1 | 0 | 0 | 1 | 1 | 1 | 1 |
| 0 | 0 | 1 | 0 | 0 | 1 | 0 | 0 | 0 | 1 | 1 | 1 | 0 |
| 0 | 0 | 1 | 0 | 1 | 0 | 0 | 0 | 0 | 1 | 1 | 0 | 0 |
| 0 | 0 | 1 | 0 | 1 | 1 | 0 | 0 | 0 | 1 | 1 | 0 | 1 |
| 0 | 1 | 1 | 1 | 0 | 0 | 0 | 0 | 0 | 1 | 0 | 0 | 1 |
| 0 | 1 | 1 | 1 | 0 | 1 | 0 | 0 | 0 | 1 | 0 | 0 | 0 |
| 0 | 1 | 1 | 1 | 1 | 0 | 0 | 1 | 0 | 1 | 0 | 1 | 0 |
| 0 | 1 | 1 | 1 | 1 | 1 | 0 | 0 | 0 | 1 | 0 | 1 | 1 |
| 0 | 1 | 1 | 0 | 0 | 0 | 1 | 0 | 0 | 0 | 0 | 1 | 1 |
| 0 | 1 | 1 | 0 | 0 | 1 | 0 | 0 | 0 | 0 | 0 | 1 | 0 |
| 0 | 1 | 1 | 0 | 1 | 0 | 0 | 0 | 0 | 0 | 0 | 0 | 0 |
| 0 | 1 | 1 | 0 | 1 | 1 | 0 | 0 | 0 | 0 | 0 | 0 | 1 |
| 1 | 1 | 1 | 1 | 0 | 0 | 0 | 0 | 1 | 0 | 0 | 0 | 1 |
| 1 | 1 | 1 | 1 | 0 | 1 | 0 | 0 | 1 | 0 | 0 | 0 | 0 |
| 1 | 1 | 1 | 1 | 1 | 0 | 0 | 1 | 1 | 0 | 0 | 1 | 0 |
| 1 | 1 | 1 | 1 | 1 | 1 | 0 | 0 | 1 | 0 | 0 | 1 | 1 |
| 1 | 1 | 1 | 0 | 0 | 0 | 1 | 0 | 1 | 1 | 0 | 1 | 1 |
| 1 | 1 | 1 | 0 | 0 | 1 | 0 | 0 | 1 | 1 | 0 | 1 | 0 |
| 1 | 1 | 1 | 0 | 1 | 0 | 0 | 0 | 1 | 1 | 0 | 0 | 0 |
| 1 | 1 | 1 | 0 | 1 | 1 | 0 | 0 | 1 | 1 | 0 | 0 | 1 |

Table 1c.

| | | | Truth table for code conversion. x = 1 y = 0 | | | | | | | | | |
|---|---|---|---|---|---|---|---|---|---|---|---|---|
| P' | O' | N' | M' | L' | K' | R | CV | Q | N | M | L | K |
| 1 | 1 | 0 | 1 | 0 | 0 | 0 | 0 | 0 | 1 | 0 | 0 | 1 |
| 1 | 1 | 0 | 1 | 0 | 1 | 0 | 0 | 0 | 1 | 0 | 0 | 0 |
| 1 | 1 | 0 | 1 | 1 | 0 | 0 | 1 | 0 | 1 | 0 | 1 | 0 |
| 1 | 1 | 0 | 1 | 1 | 1 | 0 | 0 | 0 | 1 | 0 | 1 | 1 |

Table 1c.-continued

| | | | Truth table for code conversion. x = 1 y = 0 | | | | | | | | | |
|---|---|---|---|---|---|---|---|---|---|---|---|---|
| P' | O' | N' | M' | L' | K' | R | CV | Q | N | M | L | K |
| 1 | 1 | 0 | 0 | 0 | 0 | 1 | 0 | 0 | 0 | 0 | 1 | 1 |
| 1 | 1 | 0 | 0 | 0 | 1 | 0 | 0 | 0 | 0 | 0 | 1 | 0 |
| 1 | 1 | 0 | 0 | 1 | 0 | 0 | 0 | 0 | 0 | 0 | 0 | 0 |
| 1 | 1 | 0 | 0 | 1 | 1 | 0 | 0 | 0 | 0 | 0 | 0 | 1 |
| 1 | 0 | 0 | 1 | 0 | 0 | 0 | 0 | 1 | 0 | 0 | 0 | 1 |
| 1 | 0 | 0 | 1 | 0 | 1 | 0 | 0 | 1 | 0 | 0 | 0 | 0 |
| 1 | 0 | 0 | 1 | 1 | 0 | 0 | 1 | 1 | 0 | 0 | 1 | 0 |
| 1 | 0 | 0 | 1 | 1 | 1 | 0 | 0 | 1 | 0 | 0 | 1 | 1 |
| 1 | 0 | 0 | 0 | 0 | 0 | 1 | 0 | 1 | 1 | 0 | 1 | 1 |
| 1 | 0 | 0 | 0 | 0 | 1 | 0 | 0 | 1 | 1 | 0 | 1 | 0 |
| 1 | 0 | 0 | 0 | 1 | 0 | 0 | 0 | 1 | 1 | 0 | 0 | 0 |
| 1 | 0 | 0 | 0 | 1 | 1 | 0 | 0 | 1 | 1 | 0 | 0 | 1 |
| 0 | 0 | 0 | 1 | 0 | 0 | 0 | 0 | 1 | 1 | 1 | 0 | 1 |
| 0 | 0 | 0 | 1 | 0 | 1 | 0 | 0 | 1 | 1 | 1 | 0 | 0 |
| 0 | 0 | 0 | 1 | 1 | 0 | 0 | 1 | 1 | 1 | 1 | 1 | 0 |
| 0 | 0 | 0 | 1 | 1 | 1 | 0 | 0 | 1 | 1 | 1 | 1 | 1 |
| 0 | 0 | 0 | 0 | 0 | 0 | 1 | 0 | 1 | 1 | 1 | 1 | 1 |
| 0 | 0 | 0 | 0 | 0 | 1 | 0 | 0 | 1 | 1 | 1 | 1 | 0 |
| 0 | 0 | 0 | 0 | 1 | 0 | 0 | 0 | 1 | 1 | 1 | 0 | 0 |
| 0 | 0 | 0 | 0 | 1 | 1 | 0 | 0 | 1 | 1 | 1 | 0 | 1 |
| 0 | 0 | 1 | 1 | 0 | 0 | 0 | 0 | 1 | 1 | 0 | 0 | 1 |
| 0 | 0 | 1 | 1 | 0 | 1 | 0 | 0 | 1 | 1 | 0 | 0 | 0 |
| 0 | 0 | 1 | 1 | 1 | 0 | 0 | 1 | 1 | 1 | 0 | 1 | 0 |
| 0 | 0 | 1 | 1 | 1 | 1 | 0 | 0 | 1 | 1 | 0 | 1 | 1 |
| 0 | 0 | 1 | 0 | 0 | 0 | 1 | 0 | 1 | 0 | 0 | 1 | 1 |
| 0 | 0 | 1 | 0 | 0 | 1 | 0 | 0 | 1 | 0 | 0 | 1 | 0 |
| 0 | 0 | 1 | 0 | 1 | 0 | 0 | 0 | 1 | 0 | 0 | 0 | 0 |
| 0 | 0 | 1 | 0 | 1 | 1 | 0 | 0 | 1 | 0 | 0 | 0 | 1 |
| 0 | 1 | 1 | 1 | 0 | 0 | 0 | 0 | 0 | 0 | 0 | 0 | 1 |
| 0 | 1 | 1 | 1 | 0 | 1 | 0 | 0 | 0 | 0 | 0 | 0 | 0 |
| 0 | 1 | 1 | 1 | 1 | 0 | 0 | 1 | 0 | 0 | 0 | 1 | 0 |
| 0 | 1 | 1 | 1 | 1 | 1 | 0 | 0 | 0 | 0 | 0 | 1 | 1 |
| 0 | 1 | 1 | 0 | 0 | 0 | 1 | 0 | 0 | 1 | 0 | 1 | 1 |
| 0 | 1 | 1 | 0 | 0 | 1 | 0 | 0 | 0 | 1 | 0 | 1 | 0 |
| 0 | 1 | 1 | 0 | 1 | 0 | 0 | 0 | 0 | 1 | 0 | 0 | 0 |
| 0 | 1 | 1 | 0 | 1 | 1 | 0 | 0 | 0 | 1 | 0 | 0 | 1 |
| 1 | 1 | 1 | 1 | 0 | 0 | 0 | 0 | 0 | 1 | 1 | 0 | 1 |
| 1 | 1 | 1 | 1 | 0 | 1 | 0 | 0 | 0 | 1 | 1 | 0 | 0 |
| 1 | 1 | 1 | 1 | 1 | 0 | 0 | 1 | 0 | 1 | 1 | 1 | 0 |
| 1 | 1 | 1 | 1 | 1 | 1 | 0 | 0 | 0 | 1 | 1 | 1 | 1 |
| 1 | 1 | 1 | 0 | 0 | 0 | 1 | 0 | 0 | 1 | 1 | 1 | 1 |
| 1 | 1 | 1 | 0 | 0 | 1 | 0 | 0 | 0 | 1 | 1 | 1 | 0 |
| 1 | 1 | 1 | 0 | 1 | 0 | 0 | 0 | 0 | 1 | 1 | 0 | 0 |
| 1 | 1 | 1 | 0 | 1 | 1 | 0 | 0 | 0 | 1 | 1 | 0 | 1 |

It appears that only the variables M, N and Q are affected by a change in value in *x,y*. The correspondence between the other output variables and the state of the input signals is not altered by the phase changing signals.

The implementation chosen for the logic circuit reproducing the above listed truth tables is achieved by a single chip 2048 bit Read Only Memory organized in 256 words of 8 bits each, namely device 33 of FIG. 14. More conventional implementation would require several chips and the use of a ROM is in line with our objective of circuit simplification. The ROM is programmed in order to duplicate the above-mentioned truth tables. Tables 2*a* through 2*d* define the required program by listing the bytes to be stored in each one of the 256 addresses. Each input or output line is identified at the top of the page by the signal identifying symbol used in this discussion and on FIG. 14, by the manufacturer's symbol for that line, assuming an INTEL 1702 chip, and by the pin number.

Table 2a.

| | | | | | | | | | ROM program for circuit 12. | | | | | | | |
|---|---|---|---|---|---|---|---|---|---|---|---|---|---|---|---|---|
| P' A7 17 | O' A6 18 | N' A5 19 | M' A4 20 | L' A3 21 | K' A2 1 | y A1 2 | x A0 3 | Address nr. ↓ | — D8 11 | R D7 10 | CV D6 9 | Q D5 8 | N D4 7 | M D3 6 | L D2 5 | K D1 4 |
| 0 | 0 | 0 | 0 | 0 | 0 | 0 | 0 | 000 | 0 | 0 | 0 | 0 | 0 | 0 | 0 | 0 |
| 0 | 0 | 0 | 0 | 0 | 0 | 0 | 1 | 001 | 0 | 1 | 0 | 1 | 1 | 1 | 1 | 1 |
| 0 | 0 | 0 | 0 | 0 | 0 | 1 | 0 | 002 | 0 | 1 | 0 | 0 | 1 | 0 | 1 | 1 |
| 0 | 0 | 0 | 0 | 0 | 0 | 1 | 1 | 003 | 0 | 1 | 0 | 0 | 0 | 0 | 1 | 1 |
| 0 | 0 | 0 | 0 | 0 | 1 | 0 | 0 | 004 | 0 | 0 | 0 | 0 | 0 | 0 | 0 | 0 |
| 0 | 0 | 0 | 0 | 0 | 1 | 0 | 1 | 005 | 0 | 0 | 0 | 1 | 1 | 1 | 1 | 0 |
| 0 | 0 | 0 | 0 | 0 | 1 | 1 | 0 | 006 | 0 | 0 | 0 | 0 | 1 | 0 | 1 | 0 |
| 0 | 0 | 0 | 0 | 0 | 1 | 1 | 1 | 007 | 0 | 0 | 0 | 0 | 0 | 0 | 1 | 0 |

Table 2a.-continued

ROM program for circuit 12.

| P' A7 17 | O' A6 18 | N' A5 19 | M' A4 20 | L' A3 21 | K' A2 1 | y A1 2 | x A0 3 | Address nr. ↓ | — D8 11 | R D7 10 | CV D6 9 | Q D5 8 | N D4 7 | M D3 6 | L D2 5 | K D1 4 |
|---|---|---|---|---|---|---|---|---|---|---|---|---|---|---|---|---|
| 0 | 0 | 0 | 0 | 1 | 0 | 0 | 0 | 008 | 0 | 0 | 0 | 0 | 0 | 0 | 0 | 0 |
| 0 | 0 | 0 | 0 | 1 | 0 | 0 | 1 | 009 | 0 | 0 | 0 | 1 | 1 | 1 | 0 | 0 |
| 0 | 0 | 0 | 0 | 1 | 0 | 1 | 0 | 010 | 0 | 0 | 0 | 0 | 1 | 0 | 0 | 0 |
| 0 | 0 | 0 | 0 | 1 | 0 | 1 | 1 | 011 | 0 | 0 | 0 | 0 | 0 | 0 | 0 | 0 |
| 0 | 0 | 0 | 0 | 1 | 1 | 0 | 0 | 012 | 0 | 0 | 0 | 0 | 0 | 0 | 0 | 0 |
| 0 | 0 | 0 | 0 | 1 | 1 | 0 | 1 | 013 | 0 | 0 | 0 | 1 | 1 | 1 | 0 | 1 |
| 0 | 0 | 0 | 0 | 1 | 1 | 1 | 0 | 014 | 0 | 0 | 0 | 0 | 1 | 0 | 0 | 1 |
| 0 | 0 | 0 | 0 | 1 | 1 | 1 | 1 | 015 | 0 | 0 | 0 | 0 | 0 | 0 | 0 | 1 |
| 0 | 0 | 0 | 1 | 0 | 0 | 0 | 0 | 016 | 0 | 0 | 0 | 0 | 0 | 0 | 0 | 0 |
| 0 | 0 | 0 | 1 | 0 | 0 | 0 | 1 | 017 | 0 | 0 | 0 | 1 | 1 | 1 | 0 | 1 |
| 0 | 0 | 0 | 1 | 0 | 0 | 1 | 0 | 018 | 0 | 0 | 0 | 0 | 0 | 0 | 0 | 1 |
| 0 | 0 | 0 | 1 | 0 | 0 | 1 | 1 | 019 | 0 | 0 | 0 | 0 | 1 | 0 | 0 | 1 |
| 0 | 0 | 0 | 1 | 0 | 1 | 0 | 0 | 020 | 0 | 0 | 0 | 0 | 0 | 0 | 0 | 0 |
| 0 | 0 | 0 | 1 | 0 | 1 | 0 | 1 | 021 | 0 | 0 | 0 | 1 | 1 | 1 | 0 | 0 |
| 0 | 0 | 0 | 1 | 0 | 1 | 1 | 0 | 022 | 0 | 0 | 0 | 0 | 0 | 0 | 0 | 0 |
| 0 | 0 | 0 | 1 | 0 | 1 | 1 | 1 | 023 | 0 | 0 | 0 | 0 | 1 | 0 | 0 | 0 |
| 0 | 0 | 0 | 1 | 1 | 0 | 0 | 0 | 024 | 0 | 0 | 0 | 0 | 0 | 0 | 0 | 0 |
| 0 | 0 | 0 | 1 | 1 | 0 | 0 | 1 | 025 | 0 | 0 | 1 | 1 | 1 | 1 | 1 | 0 |
| 0 | 0 | 0 | 1 | 1 | 0 | 1 | 0 | 026 | 0 | 0 | 1 | 0 | 0 | 0 | 1 | 0 |
| 0 | 0 | 0 | 1 | 1 | 0 | 1 | 1 | 027 | 0 | 0 | 1 | 0 | 1 | 0 | 1 | 0 |
| 0 | 0 | 0 | 1 | 1 | 1 | 0 | 0 | 028 | 0 | 0 | 0 | 0 | 0 | 0 | 0 | 0 |
| 0 | 0 | 0 | 1 | 1 | 1 | 0 | 1 | 029 | 0 | 0 | 0 | 1 | 1 | 1 | 1 | 1 |
| 0 | 0 | 0 | 1 | 1 | 1 | 1 | 0 | 030 | 0 | 0 | 0 | 0 | 0 | 0 | 1 | 1 |
| 0 | 0 | 0 | 1 | 1 | 1 | 1 | 1 | 031 | 0 | 0 | 0 | 0 | 1 | 0 | 1 | 1 |
| 0 | 0 | 1 | 0 | 0 | 0 | 0 | 0 | 032 | 0 | 0 | 0 | 0 | 0 | 0 | 0 | 0 |
| 0 | 0 | 1 | 0 | 0 | 0 | 0 | 1 | 033 | 0 | 1 | 0 | 1 | 0 | 0 | 1 | 1 |
| 0 | 0 | 1 | 0 | 0 | 0 | 1 | 0 | 034 | 0 | 1 | 0 | 0 | 1 | 1 | 1 | 1 |
| 0 | 0 | 1 | 0 | 0 | 0 | 1 | 1 | 035 | 0 | 1 | 0 | 1 | 1 | 0 | 1 | 1 |
| 0 | 0 | 1 | 0 | 0 | 1 | 0 | 0 | 036 | 0 | 0 | 0 | 0 | 0 | 0 | 0 | 0 |
| 0 | 0 | 1 | 0 | 0 | 1 | 0 | 1 | 037 | 0 | 0 | 0 | 1 | 0 | 0 | 1 | 0 |
| 0 | 0 | 1 | 0 | 0 | 1 | 1 | 0 | 038 | 0 | 0 | 0 | 0 | 1 | 1 | 1 | 0 |
| 0 | 0 | 1 | 0 | 0 | 1 | 1 | 1 | 039 | 0 | 0 | 0 | 1 | 1 | 0 | 1 | 0 |
| 0 | 0 | 1 | 0 | 1 | 0 | 0 | 0 | 040 | 0 | 0 | 0 | 0 | 0 | 0 | 0 | 0 |
| 0 | 0 | 1 | 0 | 1 | 0 | 0 | 1 | 041 | 0 | 0 | 0 | 1 | 0 | 0 | 0 | 0 |
| 0 | 0 | 1 | 0 | 1 | 0 | 1 | 0 | 042 | 0 | 0 | 0 | 0 | 1 | 1 | 0 | 0 |
| 0 | 0 | 1 | 0 | 1 | 0 | 1 | 1 | 043 | 0 | 0 | 0 | 1 | 1 | 0 | 0 | 0 |
| 0 | 0 | 1 | 0 | 1 | 1 | 0 | 0 | 044 | 0 | 0 | 0 | 0 | 0 | 0 | 0 | 0 |
| 0 | 0 | 1 | 0 | 1 | 1 | 0 | 1 | 045 | 0 | 0 | 0 | 1 | 0 | 0 | 0 | 1 |
| 0 | 0 | 1 | 0 | 1 | 1 | 1 | 0 | 046 | 0 | 0 | 0 | 0 | 1 | 1 | 0 | 1 |
| 0 | 0 | 1 | 0 | 1 | 1 | 1 | 1 | 047 | 0 | 0 | 0 | 1 | 1 | 0 | 0 | 1 |
| 0 | 0 | 1 | 1 | 0 | 0 | 0 | 0 | 048 | 0 | 0 | 0 | 0 | 0 | 0 | 0 | 0 |
| 0 | 0 | 1 | 1 | 0 | 0 | 0 | 1 | 049 | 0 | 0 | 0 | 1 | 1 | 0 | 0 | 1 |
| 0 | 0 | 1 | 1 | 0 | 0 | 1 | 0 | 050 | 0 | 0 | 0 | 0 | 1 | 1 | 0 | 1 |
| 0 | 0 | 1 | 1 | 0 | 0 | 1 | 1 | 051 | 0 | 0 | 0 | 1 | 0 | 0 | 0 | 1 |
| 0 | 0 | 1 | 1 | 0 | 1 | 0 | 0 | 052 | 0 | 0 | 0 | 0 | 0 | 0 | 0 | 0 |
| 0 | 0 | 1 | 1 | 0 | 1 | 0 | 1 | 053 | 0 | 0 | 0 | 1 | 1 | 0 | 0 | 0 |
| 0 | 0 | 1 | 1 | 0 | 1 | 1 | 0 | 054 | 0 | 0 | 0 | 0 | 1 | 1 | 0 | 0 |
| 0 | 0 | 1 | 1 | 0 | 1 | 1 | 1 | 055 | 0 | 0 | 0 | 1 | 0 | 0 | 0 | 0 |
| 0 | 0 | 1 | 1 | 1 | 0 | 0 | 0 | 056 | 0 | 0 | 0 | 0 | 0 | 0 | 0 | 0 |
| 0 | 0 | 1 | 1 | 1 | 0 | 0 | 1 | 057 | 0 | 0 | 1 | 1 | 1 | 0 | 1 | 0 |
| 0 | 0 | 1 | 1 | 1 | 0 | 1 | 0 | 058 | 0 | 0 | 1 | 0 | 1 | 1 | 1 | 0 |
| 0 | 0 | 1 | 1 | 1 | 0 | 1 | 1 | 059 | 0 | 0 | 1 | 1 | 0 | 0 | 1 | 0 |
| 0 | 0 | 1 | 1 | 1 | 1 | 0 | 0 | 060 | 0 | 0 | 0 | 0 | 0 | 0 | 0 | 0 |
| 0 | 0 | 1 | 1 | 1 | 1 | 0 | 1 | 061 | 0 | 0 | 0 | 1 | 1 | 0 | 1 | 1 |
| 0 | 0 | 1 | 1 | 1 | 1 | 1 | 0 | 062 | 0 | 0 | 0 | 0 | 1 | 1 | 1 | 1 |
| 0 | 0 | 1 | 1 | 1 | 1 | 1 | 1 | 063 | 0 | 0 | 0 | 1 | 0 | 0 | 1 | 1 |

Table 2b.

ROM program for circuit 12.

| P' A7 17 | O' A6 18 | N' A5 19 | M' A4 20 | L' A3 21 | K' A2 1 | y A1 2 | x A0 3 | Address nr. ↓ | — D8 11 | R D7 10 | CV D6 9 | Q D5 8 | N D4 7 | M D3 6 | L D2 5 | K D1 4 |
|---|---|---|---|---|---|---|---|---|---|---|---|---|---|---|---|---|
| 0 | 1 | 0 | 0 | 0 | 0 | 0 | 0 | 064 | 0 | 0 | 0 | 0 | 0 | 0 | 0 | 0 |
| 0 | 1 | 0 | 0 | 0 | 0 | 0 | 1 | 065 | 0 | 0 | 0 | 0 | 0 | 0 | 0 | 0 |
| 0 | 1 | 0 | 0 | 0 | 0 | 1 | 0 | 066 | 0 | 0 | 0 | 0 | 0 | 0 | 0 | 0 |
| 0 | 1 | 0 | 0 | 0 | 0 | 1 | 1 | 067 | 0 | 0 | 0 | 0 | 0 | 0 | 0 | 0 |
| 0 | 1 | 0 | 0 | 0 | 1 | 0 | 0 | 068 | 0 | 0 | 0 | 0 | 0 | 0 | 0 | 0 |
| 0 | 1 | 0 | 0 | 0 | 1 | 0 | 1 | 069 | 0 | 0 | 0 | 0 | 0 | 0 | 0 | 0 |
| 0 | 1 | 0 | 0 | 0 | 1 | 1 | 0 | 070 | 0 | 0 | 0 | 0 | 0 | 0 | 0 | 0 |
| 0 | 1 | 0 | 0 | 0 | 1 | 1 | 1 | 071 | 0 | 0 | 0 | 0 | 0 | 0 | 0 | 0 |
| 0 | 1 | 0 | 0 | 1 | 0 | 0 | 0 | 072 | 0 | 0 | 0 | 0 | 0 | 0 | 0 | 0 |
| 0 | 1 | 0 | 0 | 1 | 0 | 0 | 1 | 073 | 0 | 0 | 0 | 0 | 0 | 0 | 0 | 0 |
| 0 | 1 | 0 | 0 | 1 | 0 | 1 | 0 | 074 | 0 | 0 | 0 | 0 | 0 | 0 | 0 | 0 |
| 0 | 1 | 0 | 0 | 1 | 0 | 1 | 1 | 075 | 0 | 0 | 0 | 0 | 0 | 0 | 0 | 0 |
| 0 | 1 | 0 | 0 | 1 | 1 | 0 | 0 | 076 | 0 | 0 | 0 | 0 | 0 | 0 | 0 | 0 |
| 0 | 1 | 0 | 0 | 1 | 1 | 0 | 1 | 077 | 0 | 0 | 0 | 0 | 0 | 0 | 0 | 0 |
| 0 | 1 | 0 | 0 | 1 | 1 | 1 | 0 | 078 | 0 | 0 | 0 | 0 | 0 | 0 | 0 | 0 |
| 0 | 1 | 0 | 0 | 1 | 1 | 1 | 1 | 079 | 0 | 0 | 0 | 0 | 0 | 0 | 0 | 0 |
| 0 | 1 | 0 | 1 | 0 | 0 | 0 | 0 | 080 | 0 | 0 | 0 | 0 | 0 | 0 | 0 | 0 |
| 0 | 1 | 0 | 1 | 0 | 0 | 0 | 1 | 081 | 0 | 0 | 0 | 0 | 0 | 0 | 0 | 0 |
| 0 | 1 | 0 | 1 | 0 | 0 | 1 | 0 | 082 | 0 | 0 | 0 | 0 | 0 | 0 | 0 | 0 |
| 0 | 1 | 0 | 1 | 0 | 0 | 1 | 1 | 083 | 0 | 0 | 0 | 0 | 0 | 0 | 0 | 0 |
| 0 | 1 | 0 | 1 | 0 | 1 | 0 | 0 | 084 | 0 | 0 | 0 | 0 | 0 | 0 | 0 | 0 |
| 0 | 1 | 0 | 1 | 0 | 1 | 0 | 1 | 085 | 0 | 0 | 0 | 0 | 0 | 0 | 0 | 0 |
| 0 | 1 | 0 | 1 | 0 | 1 | 1 | 0 | 086 | 0 | 0 | 0 | 0 | 0 | 0 | 0 | 0 |
| 0 | 1 | 0 | 1 | 0 | 1 | 1 | 1 | 087 | 0 | 0 | 0 | 0 | 0 | 0 | 0 | 0 |

Table 2b.-continued

ROM program for circuit 12.

| P' A7 17 | O' A6 18 | N' A5 19 | M' A4 20 | L' A3 21 | K' A2 1 | y A1 2 | x A0 3 | Address nr. ↓ | — D8 11 | R D7 10 | CV D6 9 | Q D5 8 | N D4 7 | M D3 6 | L D2 5 | K D1 4 |
|---|---|---|---|---|---|---|---|---|---|---|---|---|---|---|---|---|
| 0 | 1 | 0 | 1 | 1 | 0 | 0 | 0 | 088 | 0 | 0 | 0 | 0 | 0 | 0 | 0 | 0 |
| 0 | 1 | 0 | 1 | 1 | 0 | 0 | 1 | 089 | 0 | 0 | 0 | 0 | 0 | 0 | 0 | 0 |
| 0 | 1 | 0 | 1 | 1 | 0 | 1 | 0 | 090 | 0 | 0 | 0 | 0 | 0 | 0 | 0 | 0 |
| 0 | 1 | 0 | 1 | 1 | 0 | 1 | 1 | 091 | 0 | 0 | 0 | 0 | 0 | 0 | 0 | 0 |
| 0 | 1 | 0 | 1 | 1 | 1 | 0 | 0 | 092 | 0 | 0 | 0 | 0 | 0 | 0 | 0 | 0 |
| 0 | 1 | 0 | 1 | 1 | 1 | 0 | 1 | 093 | 0 | 0 | 0 | 0 | 0 | 0 | 0 | 0 |
| 0 | 1 | 0 | 1 | 1 | 1 | 1 | 0 | 094 | 0 | 0 | 0 | 0 | 0 | 0 | 0 | 0 |
| 0 | 1 | 0 | 1 | 1 | 1 | 1 | 1 | 095 | 0 | 0 | 0 | 0 | 0 | 0 | 0 | 0 |
| 0 | 1 | 1 | 0 | 0 | 0 | 0 | 0 | 096 | 0 | 0 | 0 | 0 | 0 | 0 | 0 | 0 |
| 0 | 1 | 1 | 0 | 0 | 0 | 0 | 1 | 097 | 0 | 1 | 0 | 0 | 1 | 0 | 1 | 1 |
| 0 | 1 | 1 | 0 | 0 | 0 | 1 | 0 | 098 | 0 | 1 | 0 | 0 | 0 | 0 | 1 | 1 |
| 0 | 1 | 1 | 0 | 0 | 0 | 1 | 1 | 099 | 0 | 1 | 0 | 1 | 1 | 1 | 1 | 1 |
| 0 | 1 | 1 | 0 | 0 | 1 | 0 | 0 | 100 | 0 | 0 | 0 | 0 | 0 | 0 | 0 | 0 |
| 0 | 1 | 1 | 0 | 0 | 1 | 0 | 1 | 101 | 0 | 0 | 0 | 0 | 1 | 0 | 1 | 0 |
| 0 | 1 | 1 | 0 | 0 | 1 | 1 | 0 | 102 | 0 | 0 | 0 | 0 | 0 | 0 | 1 | 0 |
| 0 | 1 | 1 | 0 | 0 | 1 | 1 | 1 | 103 | 0 | 0 | 0 | 1 | 1 | 1 | 1 | 0 |
| 0 | 1 | 1 | 0 | 1 | 0 | 0 | 0 | 104 | 0 | 0 | 0 | 0 | 0 | 0 | 0 | 0 |
| 0 | 1 | 1 | 0 | 1 | 0 | 0 | 1 | 105 | 0 | 0 | 0 | 0 | 1 | 0 | 0 | 0 |
| 0 | 1 | 1 | 0 | 1 | 0 | 1 | 0 | 106 | 0 | 0 | 0 | 0 | 0 | 0 | 0 | 0 |
| 0 | 1 | 1 | 0 | 1 | 0 | 1 | 1 | 107 | 0 | 0 | 0 | 1 | 1 | 1 | 0 | 0 |
| 0 | 1 | 1 | 0 | 1 | 1 | 0 | 0 | 108 | 0 | 0 | 0 | 0 | 0 | 0 | 0 | 0 |
| 0 | 1 | 1 | 0 | 1 | 1 | 0 | 1 | 109 | 0 | 0 | 0 | 0 | 1 | 0 | 0 | 1 |
| 0 | 1 | 1 | 0 | 1 | 1 | 1 | 0 | 110 | 0 | 0 | 0 | 0 | 0 | 0 | 0 | 1 |
| 0 | 1 | 1 | 0 | 1 | 1 | 1 | 1 | 111 | 0 | 0 | 0 | 1 | 1 | 1 | 0 | 1 |
| 0 | 1 | 1 | 1 | 0 | 0 | 0 | 0 | 112 | 0 | 0 | 0 | 0 | 0 | 0 | 0 | 0 |
| 0 | 1 | 1 | 1 | 0 | 0 | 0 | 1 | 113 | 0 | 0 | 0 | 0 | 0 | 0 | 0 | 1 |
| 0 | 1 | 1 | 1 | 0 | 0 | 1 | 0 | 114 | 0 | 0 | 0 | 0 | 1 | 0 | 0 | 1 |
| 0 | 1 | 1 | 1 | 0 | 0 | 1 | 1 | 115 | 0 | 0 | 0 | 1 | 1 | 1 | 0 | 1 |
| 0 | 1 | 1 | 1 | 0 | 1 | 0 | 0 | 116 | 0 | 0 | 0 | 0 | 0 | 0 | 0 | 0 |
| 0 | 1 | 1 | 1 | 0 | 1 | 0 | 1 | 117 | 0 | 0 | 0 | 0 | 0 | 0 | 0 | 0 |
| 0 | 1 | 1 | 1 | 0 | 1 | 1 | 0 | 118 | 0 | 0 | 0 | 0 | 1 | 0 | 0 | 0 |
| 0 | 1 | 1 | 1 | 0 | 1 | 1 | 1 | 119 | 0 | 0 | 0 | 1 | 1 | 1 | 0 | 0 |
| 0 | 1 | 1 | 1 | 1 | 0 | 0 | 0 | 120 | 0 | 0 | 0 | 0 | 0 | 0 | 0 | 0 |
| 0 | 1 | 1 | 1 | 1 | 0 | 0 | 1 | 121 | 0 | 0 | 1 | 0 | 0 | 0 | 1 | 0 |
| 0 | 1 | 1 | 1 | 1 | 0 | 1 | 0 | 122 | 0 | 0 | 1 | 0 | 1 | 0 | 1 | 0 |
| 0 | 1 | 1 | 1 | 1 | 0 | 1 | 1 | 123 | 0 | 0 | 1 | 1 | 1 | 1 | 1 | 0 |
| 0 | 1 | 1 | 1 | 1 | 1 | 0 | 0 | 124 | 0 | 0 | 0 | 0 | 0 | 0 | 0 | 0 |
| 0 | 1 | 1 | 1 | 1 | 1 | 0 | 1 | 125 | 0 | 0 | 0 | 0 | 0 | 0 | 1 | 1 |
| 0 | 1 | 1 | 1 | 1 | 1 | 1 | 0 | 126 | 0 | 0 | 0 | 0 | 1 | 0 | 1 | 1 |
| 0 | 1 | 1 | 1 | 1 | 1 | 1 | 1 | 127 | 0 | 0 | 0 | 1 | 1 | 1 | 1 | 1 |

Table 2c.

ROM program for circuit 12.

| P' A7 17 | O' A6 18 | N' A5 19 | M' A4 20 | L' A3 21 | K' A2 1 | y A1 2 | x A0 3 | Address nr. ↓ | — D8 11 | R D7 10 | CV D6 9 | Q D5 8 | N D4 7 | M D3 6 | L D2 5 | K D1 4 |
|---|---|---|---|---|---|---|---|---|---|---|---|---|---|---|---|---|
| 1 | 0 | 0 | 0 | 0 | 0 | 0 | 0 | 128 | 0 | 9 | 0 | 0 | 0 | 0 | 0 | 0 |
| 1 | 0 | 0 | 0 | 0 | 0 | 0 | 1 | 129 | 0 | 1 | 0 | 1 | 1 | 0 | 1 | 1 |
| 1 | 0 | 0 | 0 | 0 | 0 | 1 | 0 | 130 | 0 | 1 | 0 | 1 | 0 | 0 | 1 | 1 |
| 1 | 0 | 0 | 0 | 0 | 0 | 1 | 1 | 131 | 0 | 1 | 0 | 0 | 1 | 1 | 1 | 1 |
| 1 | 0 | 0 | 0 | 0 | 1 | 0 | 0 | 132 | 0 | 0 | 0 | 0 | 0 | 0 | 0 | 0 |
| 1 | 0 | 0 | 0 | 0 | 1 | 0 | 1 | 133 | 0 | 0 | 0 | 1 | 1 | 0 | 1 | 0 |
| 1 | 0 | 0 | 0 | 0 | 1 | 1 | 0 | 134 | 0 | 0 | 0 | 1 | 0 | 0 | 1 | 0 |
| 1 | 0 | 0 | 0 | 0 | 1 | 1 | 1 | 135 | 0 | 0 | 0 | 0 | 1 | 1 | 1 | 0 |
| 1 | 0 | 0 | 0 | 1 | 0 | 0 | 0 | 136 | 0 | 0 | 0 | 0 | 0 | 0 | 0 | 0 |
| 1 | 0 | 0 | 0 | 1 | 0 | 0 | 1 | 137 | 0 | 0 | 0 | 1 | 1 | 0 | 0 | 0 |
| 1 | 0 | 0 | 0 | 1 | 0 | 1 | 0 | 138 | 0 | 0 | 0 | 1 | 0 | 0 | 0 | 0 |
| 1 | 0 | 0 | 0 | 1 | 0 | 1 | 1 | 139 | 0 | 0 | 0 | 0 | 1 | 1 | 0 | 0 |
| 1 | 0 | 0 | 0 | 1 | 1 | 0 | 0 | 140 | 0 | 0 | 0 | 0 | 0 | 0 | 0 | 0 |
| 1 | 0 | 0 | 0 | 1 | 1 | 0 | 1 | 141 | 0 | 0 | 0 | 1 | 1 | 0 | 0 | 1 |
| 1 | 0 | 0 | 0 | 1 | 1 | 1 | 0 | 142 | 0 | 0 | 0 | 1 | 0 | 0 | 0 | 1 |
| 1 | 0 | 0 | 0 | 1 | 1 | 1 | 1 | 143 | 0 | 0 | 0 | 0 | 1 | 1 | 0 | 1 |
| 1 | 0 | 0 | 1 | 0 | 0 | 0 | 0 | 144 | 0 | 0 | 0 | 0 | 0 | 0 | 0 | 0 |
| 1 | 0 | 0 | 1 | 0 | 0 | 0 | 1 | 145 | 0 | 0 | 0 | 1 | 0 | 0 | 0 | 1 |
| 1 | 0 | 0 | 1 | 0 | 0 | 1 | 0 | 146 | 0 | 0 | 0 | 1 | 1 | 0 | 0 | 1 |
| 1 | 0 | 0 | 1 | 0 | 0 | 1 | 1 | 147 | 0 | 0 | 0 | 0 | 1 | 1 | 0 | 1 |
| 1 | 0 | 0 | 1 | 0 | 1 | 0 | 0 | 148 | 0 | 0 | 0 | 0 | 0 | 0 | 0 | 0 |
| 1 | 0 | 0 | 1 | 0 | 1 | 0 | 1 | 149 | 0 | 0 | 0 | 1 | 0 | 0 | 0 | 0 |
| 1 | 0 | 0 | 1 | 0 | 1 | 1 | 0 | 150 | 0 | 0 | 0 | 1 | 1 | 0 | 0 | 0 |
| 1 | 0 | 0 | 1 | 0 | 1 | 1 | 1 | 151 | 0 | 0 | 0 | 0 | 1 | 1 | 0 | 0 |
| 1 | 0 | 0 | 1 | 1 | 0 | 0 | 0 | 152 | 0 | 0 | 0 | 0 | 0 | 0 | 0 | 0 |
| 1 | 0 | 0 | 1 | 1 | 0 | 0 | 1 | 153 | 0 | 0 | 1 | 1 | 0 | 0 | 1 | 0 |
| 1 | 0 | 0 | 1 | 1 | 0 | 1 | 0 | 154 | 0 | 0 | 1 | 1 | 1 | 0 | 1 | 0 |
| 1 | 0 | 0 | 1 | 1 | 0 | 1 | 1 | 155 | 0 | 0 | 1 | 0 | 1 | 1 | 1 | 0 |
| 1 | 0 | 0 | 1 | 1 | 1 | 0 | 0 | 156 | 0 | 0 | 0 | 0 | 0 | 0 | 0 | 0 |
| 1 | 0 | 0 | 1 | 1 | 1 | 0 | 1 | 157 | 0 | 0 | 0 | 1 | 0 | 0 | 1 | 1 |
| 1 | 0 | 0 | 1 | 1 | 1 | 1 | 0 | 158 | 0 | 0 | 0 | 1 | 1 | 0 | 1 | 1 |
| 1 | 0 | 0 | 1 | 1 | 1 | 1 | 1 | 159 | 0 | 0 | 0 | 0 | 1 | 1 | 1 | 1 |
| 1 | 0 | 1 | 0 | 0 | 0 | 0 | 0 | 160 | 0 | 0 | 0 | 0 | 0 | 0 | 0 | 0 |
| 1 | 0 | 1 | 0 | 0 | 0 | 0 | 1 | 161 | 0 | 0 | 0 | 0 | 0 | 0 | 0 | 0 |
| 1 | 0 | 1 | 0 | 0 | 0 | 1 | 0 | 162 | 0 | 0 | 0 | 0 | 0 | 0 | 0 | 0 |
| 1 | 0 | 1 | 0 | 0 | 0 | 1 | 1 | 163 | 0 | 0 | 0 | 0 | 0 | 0 | 0 | 0 |
| 1 | 0 | 1 | 0 | 0 | 1 | 0 | 0 | 164 | 0 | 0 | 0 | 0 | 0 | 0 | 0 | 0 |
| 1 | 0 | 1 | 0 | 0 | 1 | 0 | 1 | 165 | 0 | 0 | 0 | 0 | 0 | 0 | 0 | 0 |
| 1 | 0 | 1 | 0 | 0 | 1 | 1 | 0 | 166 | 0 | 0 | 0 | 0 | 0 | 0 | 0 | 0 |
| 1 | 0 | 1 | 0 | 0 | 1 | 1 | 1 | 167 | 0 | 0 | 0 | 0 | 0 | 0 | 0 | 0 |

Table 2c.-continued

| | | | | | | | | ROM program for circuit 12. | | | | | | | | |
|---|---|---|---|---|---|---|---|---|---|---|---|---|---|---|---|---|
| P' A7 17 | O' A6 18 | N' A5 19 | M' A4 20 | L' A3 21 | K' A2 1 | y A1 2 | x A0 3 | Address nr. ↓ | — D8 11 | R D7 10 | CV D6 9 | Q D5 8 | N D4 7 | M D3 6 | L D2 5 | K D1 4 |
| 1 | 0 | 1 | 0 | 1 | 0 | 0 | 0 | 168 | 0 | 0 | 0 | 0 | 0 | 0 | 0 | 0 |
| 1 | 0 | 1 | 0 | 1 | 0 | 0 | 1 | 169 | 0 | 0 | 0 | 0 | 0 | 0 | 0 | 0 |
| 1 | 0 | 1 | 0 | 1 | 0 | 1 | 0 | 170 | 0 | 0 | 0 | 0 | 0 | 0 | 0 | 0 |
| 1 | 0 | 1 | 0 | 1 | 0 | 1 | 1 | 171 | 0 | 0 | 0 | 0 | 0 | 0 | 0 | 0 |
| 1 | 0 | 1 | 0 | 1 | 1 | 0 | 0 | 172 | 0 | 0 | 0 | 0 | 0 | 0 | 0 | 0 |
| 1 | 0 | 1 | 0 | 1 | 1 | 0 | 1 | 173 | 0 | 0 | 0 | 0 | 0 | 0 | 0 | 0 |
| 1 | 0 | 1 | 0 | 1 | 1 | 1 | 0 | 174 | 0 | 0 | 0 | 0 | 0 | 0 | 0 | 0 |
| 1 | 0 | 1 | 0 | 1 | 1 | 1 | 1 | 175 | 0 | 0 | 0 | 0 | 0 | 0 | 0 | 0 |
| 1 | 0 | 1 | 1 | 0 | 0 | 0 | 0 | 176 | 0 | 0 | 0 | 0 | 0 | 0 | 0 | 0 |
| 1 | 0 | 1 | 1 | 0 | 0 | 0 | 1 | 177 | 0 | 0 | 0 | 0 | 0 | 0 | 0 | 0 |
| 000 | 1 | 1 | 0 | 0 | 1 | 0 | 178 | 0 | 0 | 0 | 0 | 0 | 0 | 0 | 0 | |
| 1 | 0 | 1 | 1 | 0 | 0 | 1 | 1 | 179 | 0 | 0 | 0 | 0 | 0 | 0 | 0 | 0 |
| 1 | 0 | 1 | 1 | 0 | 1 | 0 | 0 | 180 | 0 | 0 | 0 | 0 | 0 | 0 | 0 | 0 |
| 1 | 0 | 1 | 1 | 0 | 1 | 0 | 1 | 181 | 0 | 0 | 0 | 0 | 0 | 0 | 0 | 0 |
| 1 | 0 | 1 | 1 | 0 | 1 | 1 | 0 | 182 | 0 | 0 | 0 | 0 | 0 | 0 | 0 | 0 |
| 1 | 0 | 1 | 1 | 0 | 1 | 1 | 1 | 183 | 0 | 0 | 0 | 0 | 0 | 0 | 0 | 0 |
| 1 | 0 | 1 | 1 | 1 | 0 | 0 | 0 | 184 | 0 | 0 | 0 | 0 | 0 | 0 | 0 | 0 |
| 1 | 0 | 1 | 1 | 1 | 0 | 0 | 1 | 185 | 0 | 0 | 0 | 0 | 0 | 0 | 0 | 0 |
| 1 | 0 | 1 | 1 | 1 | 0 | 1 | 0 | 186 | 0 | 0 | 0 | 0 | 0 | 0 | 0 | 0 |
| 1 | 0 | 1 | 1 | 1 | 0 | 1 | 1 | 187 | 0 | 0 | 0 | 0 | 0 | 0 | 0 | 0 |
| 1 | 0 | 1 | 1 | 1 | 1 | 0 | 0 | 188 | 0 | 0 | 0 | 0 | 0 | 0 | 0 | 0 |
| 1 | 0 | 1 | 1 | 1 | 1 | 0 | 1 | 189 | 0 | 0 | 0 | 0 | 0 | 0 | 0 | 0 |
| 1 | 0 | 1 | 1 | 1 | 1 | 1 | 0 | 190 | 0 | 0 | 0 | 0 | 0 | 0 | 0 | 0 |
| 1 | 0 | 1 | 1 | 1 | 1 | 1 | 1 | 191 | 0 | 0 | 0 | 0 | 0 | 0 | 0 | 0 |

Table 2d.

| | | | | | | | | ROM program for circuit 12. | | | | | | | | |
|---|---|---|---|---|---|---|---|---|---|---|---|---|---|---|---|---|
| P' A7 17 | O' A6 18 | N' A5 19 | M' A4 20 | L' A3 21 | K' A2 1 | y A1 2 | x A0 3 | Address nr. ↓ | — D8 11 | R D7 10 | CV D6 9 | Q D5 8 | N D4 7 | M D3 6 | L D2 5 | K D1 4 |
| 1 | 1 | 0 | 0 | 0 | 0 | 0 | 0 | 192 | 0 | 0 | 0 | 0 | 0 | 0 | 0 | 0 |
| 1 | 1 | 0 | 0 | 0 | 0 | 0 | 1 | 193 | 0 | 1 | 0 | 0 | 0 | 0 | 1 | 1 |
| 1 | 1 | 0 | 0 | 0 | 0 | 1 | 0 | 194 | 0 | 1 | 0 | 1 | 1 | 1 | 1 | 1 |
| 1 | 1 | 0 | 0 | 0 | 0 | 1 | 1 | 195 | 0 | 1 | 0 | 0 | 1 | 0 | 1 | 1 |
| 1 | 1 | 0 | 0 | 0 | 1 | 0 | 0 | 196 | 0 | 0 | 0 | 0 | 0 | 0 | 0 | 0 |
| 1 | 1 | 0 | 0 | 0 | 1 | 0 | 1 | 197 | 0 | 0 | 0 | 0 | 0 | 0 | 1 | 0 |
| 1 | 1 | 0 | 0 | 0 | 1 | 1 | 0 | 198 | 0 | 0 | 0 | 1 | 1 | 1 | 1 | 0 |
| 1 | 1 | 0 | 0 | 0 | 1 | 1 | 1 | 199 | 0 | 0 | 0 | 0 | 1 | 0 | 1 | 0 |
| 1 | 1 | 0 | 0 | 1 | 0 | 0 | 0 | 200 | 0 | 0 | 0 | 0 | 0 | 0 | 0 | 0 |
| 1 | 1 | 0 | 0 | 1 | 0 | 0 | 1 | 201 | 0 | 0 | 0 | 0 | 0 | 0 | 0 | 0 |
| 1 | 1 | 0 | 0 | 1 | 0 | 1 | 0 | 202 | 0 | 0 | 0 | 1 | 1 | 1 | 0 | 0 |
| 1 | 1 | 0 | 0 | 1 | 0 | 1 | 1 | 203 | 0 | 0 | 0 | 0 | 1 | 0 | 0 | 0 |
| 1 | 1 | 0 | 0 | 1 | 1 | 0 | 0 | 204 | 0 | 0 | 0 | 0 | 0 | 0 | 0 | 0 |
| 1 | 1 | 0 | 0 | 1 | 1 | 0 | 1 | 205 | 0 | 0 | 0 | 0 | 0 | 0 | 0 | 1 |
| 1 | 1 | 0 | 0 | 1 | 1 | 1 | 0 | 206 | 0 | 0 | 0 | 1 | 1 | 1 | 0 | 1 |
| 1 | 1 | 0 | 0 | 1 | 1 | 1 | 1 | 207 | 0 | 0 | 0 | 0 | 1 | 0 | 0 | 1 |
| 1 | 1 | 0 | 1 | 0 | 0 | 0 | 0 | 208 | 0 | 0 | 0 | 0 | 0 | 0 | 0 | 0 |
| 1 | 1 | 0 | 1 | 0 | 0 | 0 | 1 | 209 | 0 | 0 | 0 | 0 | 1 | 0 | 0 | 1 |
| 1 | 1 | 0 | 1 | 0 | 0 | 1 | 0 | 210 | 0 | 0 | 0 | 1 | 1 | 1 | 0 | 1 |
| 1 | 1 | 0 | 1 | 0 | 0 | 1 | 1 | 211 | 0 | 0 | 0 | 0 | 0 | 0 | 0 | 1 |
| 1 | 1 | 0 | 1 | 0 | 1 | 0 | 0 | 212 | 0 | 0 | 0 | 0 | 0 | 0 | 0 | 0 |
| 1 | 1 | 0 | 1 | 0 | 1 | 0 | 1 | 213 | 0 | 0 | 0 | 0 | 1 | 0 | 0 | 0 |
| 1 | 1 | 0 | 1 | 0 | 1 | 1 | 0 | 214 | 0 | 0 | 0 | 1 | 1 | 1 | 0 | 0 |
| 1 | 1 | 0 | 1 | 0 | 1 | 1 | 1 | 215 | 0 | 0 | 0 | 0 | 0 | 0 | 0 | 0 |
| 1 | 1 | 0 | 1 | 1 | 0 | 0 | 0 | 216 | 0 | 0 | 0 | 0 | 0 | 0 | 0 | 0 |
| 1 | 1 | 0 | 1 | 1 | 0 | 0 | 1 | 217 | 0 | 0 | 1 | 0 | 1 | 0 | 1 | 0 |
| 1 | 1 | 0 | 1 | 1 | 0 | 1 | 0 | 218 | 0 | 0 | 1 | 1 | 1 | 1 | 1 | 0 |
| 1 | 1 | 0 | 1 | 1 | 0 | 1 | 1 | 219 | 0 | 0 | 1 | 0 | 0 | 0 | 1 | 0 |
| 1 | 1 | 0 | 1 | 1 | 1 | 0 | 0 | 220 | 0 | 0 | 0 | 0 | 0 | 0 | 0 | 0 |
| 1 | 1 | 0 | 1 | 1 | 1 | 0 | 1 | 221 | 0 | 0 | 0 | 0 | 1 | 0 | 1 | 1 |
| 1 | 1 | 0 | 1 | 1 | 1 | 1 | 0 | 222 | 0 | 0 | 0 | 1 | 1 | 1 | 1 | 1 |
| 1 | 1 | 0 | 1 | 1 | 1 | 1 | 1 | 223 | 0 | 0 | 0 | 0 | 0 | 0 | 1 | 1 |
| 1 | 1 | 1 | 0 | 0 | 0 | 0 | 0 | 224 | 0 | 0 | 0 | 0 | 0 | 0 | 0 | 0 |
| 1 | 1 | 1 | 0 | 0 | 0 | 0 | 1 | 225 | 0 | 1 | 0 | 0 | 1 | 1 | 1 | 1 |
| 1 | 1 | 1 | 0 | 0 | 0 | 1 | 0 | 226 | 0 | 1 | 0 | 1 | 1 | 0 | 1 | 1 |
| 1 | 1 | 1 | 0 | 0 | 0 | 1 | 1 | 227 | 0 | 1 | 0 | 1 | 0 | 0 | 1 | 1 |
| 1 | 1 | 1 | 0 | 0 | 1 | 0 | 0 | 228 | 0 | 0 | 0 | 0 | 0 | 0 | 0 | 0 |
| 1 | 1 | 1 | 0 | 0 | 1 | 0 | 1 | 229 | 0 | 0 | 0 | 0 | 1 | 1 | 1 | 0 |
| 1 | 1 | 1 | 0 | 0 | 1 | 1 | 0 | 230 | 0 | 0 | 0 | 1 | 1 | 0 | 1 | 0 |
| 1 | 1 | 1 | 0 | 0 | 1 | 1 | 1 | 231 | 0 | 0 | 0 | 1 | 0 | 0 | 1 | 0 |
| 1 | 1 | 1 | 0 | 1 | 0 | 0 | 0 | 232 | 0 | 0 | 0 | 0 | 0 | 0 | 0 | 0 |
| 1 | 1 | 1 | 0 | 1 | 0 | 0 | 1 | 233 | 0 | 0 | 0 | 0 | 1 | 1 | 0 | 0 |
| 1 | 1 | 1 | 0 | 1 | 0 | 1 | 0 | 234 | 0 | 0 | 0 | 1 | 1 | 0 | 0 | 0 |
| 1 | 1 | 1 | 0 | 1 | 0 | 1 | 1 | 235 | 0 | 0 | 0 | 1 | 0 | 0 | 0 | 0 |
| 1 | 1 | 1 | 0 | 1 | 1 | 0 | 0 | 236 | 0 | 0 | 0 | 0 | 0 | 0 | 0 | 0 |
| 1 | 1 | 1 | 0 | 1 | 1 | 0 | 1 | 237 | 0 | 0 | 0 | 0 | 1 | 1 | 0 | 1 |
| 1 | 1 | 1 | 0 | 1 | 1 | 1 | 0 | 238 | 0 | 0 | 0 | 1 | 1 | 0 | 0 | 1 |
| 1 | 1 | 1 | 0 | 1 | 1 | 1 | 1 | 239 | 0 | 0 | 0 | 1 | 0 | 0 | 0 | 1 |
| 1 | 1 | 1 | 1 | 0 | 0 | 0 | 0 | 240 | 0 | 0 | 0 | 0 | 0 | 0 | 0 | 0 |
| 1 | 1 | 1 | 1 | 0 | 0 | 0 | 1 | 241 | 0 | 0 | 0 | 0 | 1 | 1 | 0 | 1 |
| 1 | 1 | 1 | 1 | 0 | 0 | 1 | 0 | 242 | 0 | 0 | 0 | 1 | 0 | 0 | 0 | 1 |
| 1 | 1 | 1 | 1 | 0 | 0 | 1 | 1 | 243 | 0 | 0 | 0 | 1 | 1 | 0 | 0 | 1 |
| 1 | 1 | 1 | 1 | 0 | 1 | 0 | 0 | 244 | 0 | 0 | 0 | 0 | 0 | 0 | 0 | 0 |
| 1 | 1 | 1 | 1 | 0 | 1 | 0 | 1 | 245 | 0 | 0 | 0 | 0 | 1 | 1 | 0 | 0 |
| 1 | 1 | 1 | 1 | 0 | 1 | 1 | 0 | 246 | 0 | 0 | 0 | 1 | 0 | 0 | 0 | 0 |
| 1 | 1 | 1 | 1 | 0 | 1 | 1 | 1 | 247 | 0 | 0 | 0 | 1 | 1 | 0 | 0 | 0 |

Table 2d.-continued

| | | | | | | | | ROM program for circuit 12. | | | | | | | | |
|---|---|---|---|---|---|---|---|---|---|---|---|---|---|---|---|---|
| P' A7 17 | O' A6 18 | N' A5 19 | M' A4 20 | L' A3 21 | K' A2 1 | y A1 2 | x A0 3 | Address nr. ↓ | — D8 11 | R D7 10 | CV D6 9 | Q D5 8 | N D4 7 | M D3 6 | L D2 5 | K D1 4 |
| 1 | 1 | 1 | 1 | 1 | 0 | 0 | 0 | 248 | 0 | 0 | 0 | 0 | 0 | 0 | 0 | 0 |
| 1 | 1 | 1 | 1 | 1 | 0 | 0 | 1 | 249 | 0 | 0 | 1 | 0 | 1 | 1 | 1 | 0 |
| 1 | 1 | 1 | 1 | 1 | 0 | 1 | 0 | 250 | 0 | 0 | 1 | 1 | 0 | 0 | 1 | 0 |
| 1 | 1 | 1 | 1 | 1 | 0 | 1 | 1 | 251 | 0 | 0 | 1 | 1 | 1 | 0 | 1 | 0 |
| 1 | 1 | 1 | 1 | 1 | 1 | 0 | 0 | 252 | 0 | 0 | 0 | 0 | 0 | 0 | 0 | 0 |
| 1 | 1 | 1 | 1 | 1 | 1 | 0 | 1 | 253 | 0 | 0 | 0 | 0 | 1 | 1 | 1 | 1 |
| 1 | 1 | 1 | 1 | 1 | 1 | 1 | 0 | 254 | 0 | 0 | 0 | 1 | 0 | 0 | 1 | 1 |
| 1 | 1 | 1 | 1 | 1 | 1 | 1 | 1 | 255 | 0 | 0 | 0 | 1 | 1 | 0 | 1 | 1 |

Considering now the analog voltage command signal V* appearing on line 16 as an input to the A/D converter 17 of FIG. 14, the signal is given a digital form through an A/D counter module 117. The digitized signal is the 6-bit word UVWXYZ used as pattern designator. The entire span of voltage control is thus resolved in 64 equal steps. The Table 3 herebelow gives the correspondence between the states of UVWXYZ and the theoretical magnitude of the requested voltage, in percent of the maximum obtainable voltage.

Table 3.

| | Voltage digitization steps. | | | | | | |
|---|---|---|---|---|---|---|---|
| | A/D CONVERTER LINES | | | | | | OUTPUT VOLTAGE |
| STEP NR. | Z | Y | X | W | V | U | (% OF MAX.) |
| 1 | 1 | 1 | 1 | 1 | 1 | 1 | 100.0 |
| 2 | 1 | 1 | 1 | 1 | 1 | 0 | 98.4 |
| 3 | 1 | 1 | 1 | 1 | 0 | 1 | 96.9 |
| 4 | 1 | 1 | 1 | 1 | 0 | 0 | 95.3 |
| 5 | 1 | 1 | 1 | 0 | 1 | 1 | 93.8 |
| 6 | 1 | 1 | 1 | 0 | 1 | 0 | 92.2 |
| 7 | 1 | 1 | 1 | 0 | 0 | 1 | 90.6 |
| 8 | 1 | 1 | 1 | 0 | 0 | 0 | 89.1 |
| 9 | 1 | 1 | 0 | 1 | 1 | 1 | 87.5 |
| 10 | 1 | 1 | 0 | 1 | 1 | 0 | 85.9 |
| 11 | 1 | 1 | 0 | 1 | 0 | 1 | 84.4 |
| 12 | 1 | 1 | 0 | 1 | 0 | 0 | 82.8 |
| 13 | 1 | 1 | 0 | 0 | 1 | 1 | 81.3 |
| 14 | 1 | 1 | 0 | 0 | 1 | 0 | 79.7 |
| 15 | 1 | 1 | 0 | 0 | 0 | 1 | 78.1 |
| 16 | 1 | 1 | 0 | 0 | 0 | 0 | 76.6 |
| 17 | 1 | 0 | 1 | 1 | 1 | 1 | 75.0 |
| 18 | 1 | 0 | 1 | 1 | 1 | 0 | 73.4 |
| 19 | 1 | 0 | 1 | 1 | 0 | 1 | 71.9 |
| 20 | 1 | 0 | 1 | 1 | 0 | 0 | 70.3 |
| 21 | 1 | 0 | 1 | 0 | 1 | 1 | 68.8 |
| 22 | 1 | 0 | 1 | 0 | 1 | 0 | 67.2 |
| 23 | 1 | 0 | 1 | 0 | 0 | 1 | 65.6 |
| 24 | 1 | 0 | 1 | 0 | 0 | 0 | 64.1 |
| 25 | 1 | 0 | 0 | 1 | 1 | 1 | 62.5 |
| 26 | 1 | 0 | 0 | 1 | 1 | 0 | 60.9 |
| 27 | 1 | 0 | 0 | 1 | 0 | 1 | 59.4 |
| 28 | 1 | 0 | 0 | 1 | 0 | 0 | 57.8 |
| 29 | 1 | 0 | 0 | 0 | 1 | 1 | 56.3 |
| 30 | 1 | 0 | 0 | 0 | 1 | 0 | 54.7 |
| 31 | 1 | 0 | 0 | 0 | 0 | 1 | 53.1 |
| 32 | 1 | 0 | 0 | 0 | 0 | 0 | 51.6 |
| 33 | 0 | 1 | 1 | 1 | 1 | 1 | 50.0 |
| 34 | 0 | 1 | 1 | 1 | 1 | 0 | 48.4 |
| 35 | 0 | 1 | 1 | 1 | 0 | 1 | 46.9 |
| 36 | 0 | 1 | 1 | 1 | 0 | 0 | 45.3 |
| 37 | 0 | 1 | 1 | 0 | 1 | 1 | 43.8 |
| 38 | 0 | 1 | 1 | 0 | 1 | 0 | 42.2 |
| 39 | 0 | 1 | 1 | 0 | 0 | 1 | 40.6 |
| 40 | 0 | 1 | 1 | 0 | 0 | 0 | 39.1 |
| 41 | 0 | 1 | 0 | 1 | 1 | 1 | 37.5 |
| 42 | 0 | 1 | 0 | 1 | 1 | 0 | 35.9 |
| 43 | 0 | 1 | 0 | 1 | 0 | 1 | 34.4 |
| 44 | 0 | 1 | 0 | 1 | 0 | 0 | 32.8 |
| 45 | 0 | 1 | 0 | 0 | 1 | 1 | 31.3 |
| 46 | 0 | 1 | 0 | 0 | 1 | 0 | 29.7 |
| 47 | 0 | 1 | 0 | 0 | 0 | 1 | 28.1 |
| 48 | 0 | 1 | 0 | 0 | 0 | 0 | 26.6 |
| 49 | 0 | 0 | 1 | 1 | 1 | 1 | 25.0 |
| 50 | 0 | 0 | 1 | 1 | 1 | 0 | 23.4 |
| 51 | 0 | 0 | 1 | 1 | 0 | 1 | 21.9 |
| 52 | 0 | 0 | 1 | 1 | 0 | 0 | 20.3 |
| 53 | 0 | 0 | 1 | 0 | 1 | 1 | 18.8 |
| 54 | 0 | 0 | 1 | 0 | 1 | 0 | 17.2 |
| 55 | 0 | 0 | 1 | 0 | 0 | 1 | 15.6 |
| 56 | 0 | 0 | 1 | 0 | 0 | 0 | 14.1 |
| 57 | 0 | 0 | 0 | 1 | 1 | 1 | 12.5 |

Table 3.-continued

| | Voltage digitization steps. | | | | | | |
|---|---|---|---|---|---|---|---|
| | A/D CONVERTER LINES | | | | | | OUTPUT VOLTAGE |
| STEP NR. | Z | Y | X | W | V | U | (% OF MAX.) |
| 58 | 0 | 0 | 0 | 1 | 1 | 0 | 10.9 |
| 59 | 0 | 0 | 0 | 1 | 0 | 1 | 9.4 |
| 60 | 0 | 0 | 0 | 1 | 0 | 0 | 7.8 |
| 61 | 0 | 0 | 0 | 0 | 1 | 1 | 6.3 |
| 62 | 0 | 0 | 0 | 0 | 1 | 0 | 4.7 |
| 63 | 0 | 0 | 0 | 0 | 0 | 1 | 3.1 |
| 64 | 0 | 0 | 0 | 0 | 0 | 0 | 1.6 |

The A/D converter 117 is actuated by pulse CV on line 35 applied to input 10, thereby to cause a conversion. As can be seen from FIG. 15, signal CV is generated six times per cycle of output wave. Thus, the inverter output voltage magnitude has a chance to be updated to new requirements every 1/6 of the fundamental period. Between updating instants, the A/D converter output retains the value assigned at the last CV pulse occurrence.

While A/D converter 117 is executing a conversion, for about 200 microseconds following a leading edge of CV, its output lines are continually changing state at a rate controlled by the A/D converter internal clock. During the conversion time, the A/D converter outputs are meaningless and cannot be treated by the modulator. For this purpose, circuit 122 has been provided. Circuit 122 contains bistable latches, which read the state of the A/D converter outputs upon application of a strobe signal R received on line 36 and reproduce these states at the output, ignoring the variations that may occur between successive R pulses. As seen on FIG. 15, a leading edge of an R pulse occurs 15° after the leading edge of a CV pulse. The time interval between the events is about 700 microseconds at 60 Hertz, exceeding the 200 microsecond conversion time and thus avoiding that the converter lines are used during a conversion. When the CV and R signals are generated on lines 35, 36 from ROM circuit 33, the precaution of filtering these lines before their use must be taken, since ROM circuits often generate spurious narrow pulses ("glitches") that could trigger untimely conversions or samplings.

When the analog voltage to the A/D converter assumes certain values, corresponding to the boundary between two consecutive digitization steps, it may occur that the least significative but U oscillates continuously between its two possible states. For certain transitions, this oscillation can be extended to more bits than the least significative one. This type of oscillation produces unwanted output voltage disturbances and may result in motor torque fluctuations. In order to suppress the oscillations and obtain well defined, non-flickering transitions from one step to the other, some hysteresis has been introduced in the A/D converter transfer function. This is obtained by using a D/A converter 39 (FIG. 14) reconverting the digitized output back to analog form, and summing part of the resulting signal with the analog input, with such polarity that regenerative feedback is obtained. The positive feedback gain used is .2.

Considering the central memory 30 of the apparatus of FIG. 14, typically, forty different waveforms can be produced at the output in the fixed pattern mode to cover the first 40 steps of the voltage control range, coming down from the full voltage step. This information to generate the switching patterns corresponding to these waveforms is stored in the three ROM circuits 113, 114 and 115 of FIG. 14. Each pattern results from an analytical study to provide the required fundamental voltage and minimize the total current harmonic distortion in the motor, while conforming to the inverter constrainst of minimum conduction time and maximum rate of switching.

Figure 17A:
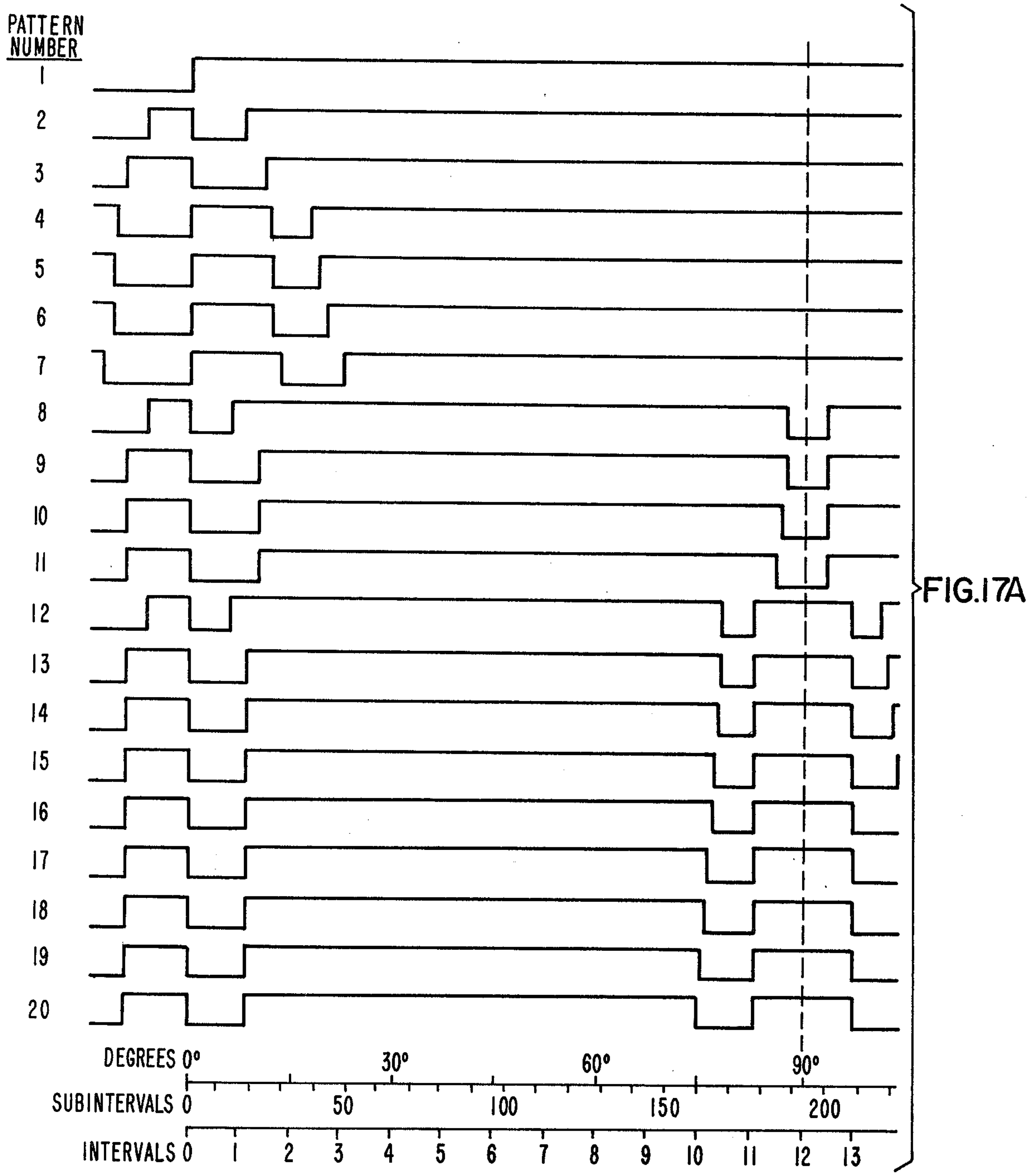
FIGS. 17A, 17B illustrate a set of forty patterns that can be generated with the circuitry of FIG. 14.
Figure 17B:
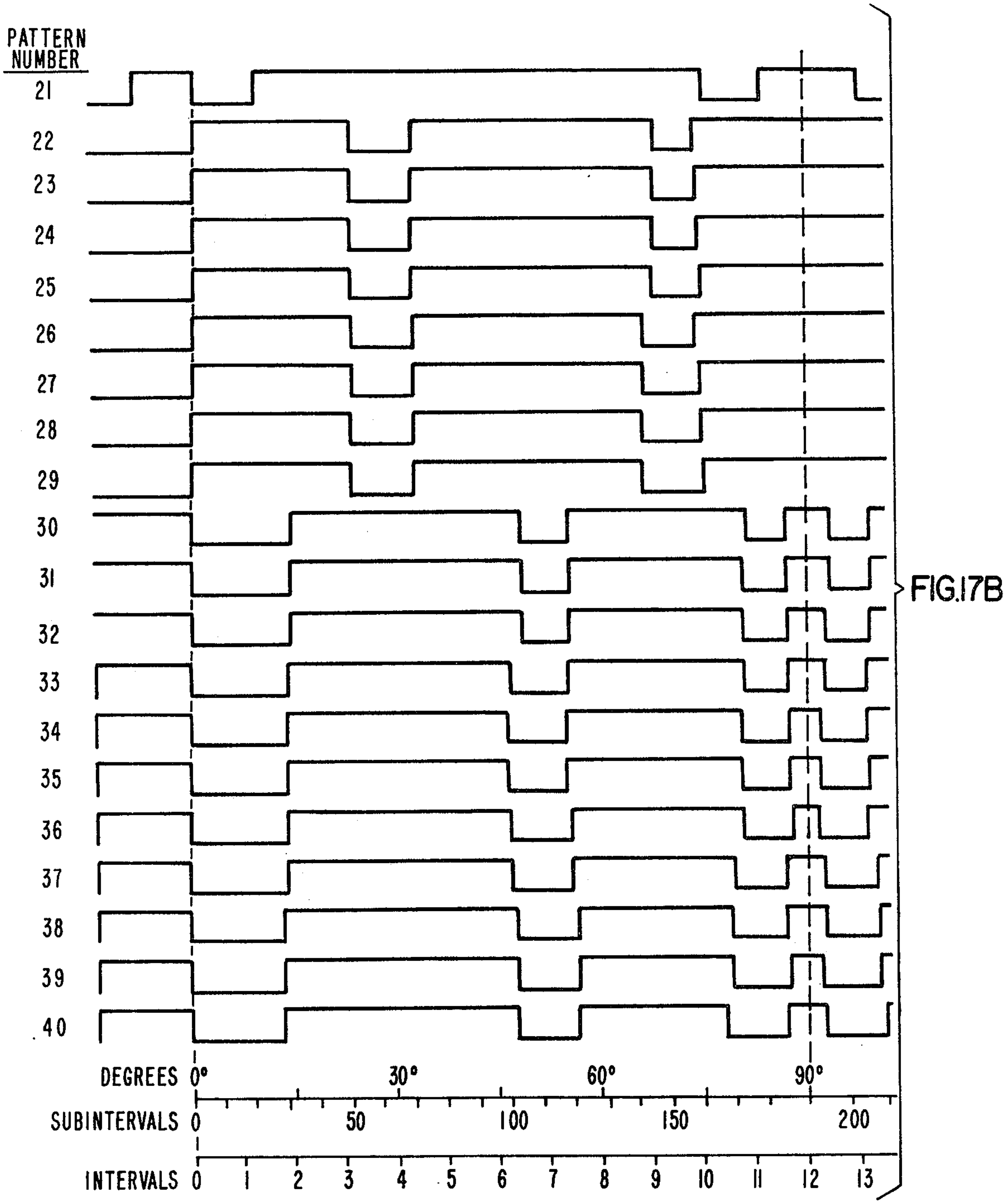

The forty selected patterns for one quarter of an output cycle are shown on FIGS. 17A and 17B. The patterns are numbered from 1 to 40 by order of decreasing fundamental voltage. Herebelow, Table 4 provides a precise definition of the patterns by indicating the switching instants.

These switching instants are defined in terms of subintervals counted from the beginning of the quadrant at angular position zero. As earlier stated, the span from 0° to 90° is divided in 192 subintervals. The waveform level is assumed to be negative at angular position 0. It will change to the positive level after the subinterval defined in column K1, switch back to the negative level after the subinterval defined in column K2, etc. K1 = 0 means that there is a negative-to-positive transition coincident with the angular position 0°; K1 = 15 means that this transition is delayed by 15 subintervals from 0°, i.e. occurs after the 15th subinterval. A (—) sign in a K column means that there is no further level transition in the 1st quadrant.

The patterns have been determined largely by trial and error methods, with the double objective of approximating a desired fundamental voltage and minimizing the harmonic distortion. In addition, the patterns assure a minimum conduction time constraint of at least 250 microseconds and a maximum switching frequency of 360 Hertz. These two conditions are fulfilled by the selected patterns on the assumption that pattern No. 1 is used at 60 Hz and that a constant V/f relationship is used below 60 Hz. In accordance with the modulator circuit of FIG. 14, the patterns must also fulfill the basic condition of exhibiting only one switching per interval and of using only switching instants defined by an integer number of subintervals.

The harmonic distortion is minimized in terms of motor ripple current. For this, an "rms ripple index" is calculated and used as indication of the waveform quality. The ripple index is defined as the ratio between two total current harmonic distortion figures. The first figure represents the total current harmonic distortion caused by the waveform under study. The second figure represents the total current harmonic distortion caused by a full conduction waveform (pattern No. 1) applied to the same load, but at a higher frequency. The ratio of the frequencies is the ratio of the fundamental amplitudes. By this definition, the ripple index represents the rms non-fundamental ripple current generated by the Table 4.

List of stored patterns.

| PATTERN NR. | SWITCHING SUBINTERVALS | | | | | FUNDAMENTAL VOLTAGE | | RIPPLE INDEX |
|---|---|---|---|---|---|---|---|---|
| | K1 | K2 | K3 | K4 | K5 | DESIRED | ACTUAL | |
| 1 | 0 | — | — | — | — | 1.000 | 1.000 | 1.000 |
| 2 | 15 | — | — | — | — | .984 | .985 | .661 |
| 3 | 22 | — | — | — | — | .969 | .968 | .620 |
| 4 | 0 | 24 | 36 | — | — | .953 | .952 | .952 |
| 5 | 0 | 25 | 39 | — | — | .938 | .941 | .579 |
| 6 | 0 | 25 | 42 | — | — | .922 | .925 | .763 |
| 7 | 0 | 28 | 47 | — | — | .906 | .906 | .956 |
| 8 | 13 | 186 | — | — | — | .891 | .891 | .770 |
| 9 | 20 | 186 | — | — | — | .875 | .875 | .705 |
| 10 | 20 | 185 | — | — | — | .859 | .859 | .775 |
| 11 | 20 | 184 | — | — | — | .844 | .842 | .853 |
| 12 | 13 | 167 | 177 | — | — | .828 | .827 | .722 |
| 13 | 19 | 167 | 177 | — | — | .813 | .814 | .697 |
| 14 | 19 | 166 | 177 | — | — | .797 | .798 | .742 |
| 15 | 19 | 165 | 177 | — | — | .781 | .783 | .791 |
| 16 | 19 | 164 | 177 | — | — | .766 | .767 | .841 |
| 17 | 19 | 163 | 177 | — | — | .750 | .751 | .894 |
| 18 | 19 | 162 | 177 | — | — | .734 | .735 | .949 |
| 19 | 19 | 161 | 177 | — | — | .719 | .719 | 1.005 |
| 20 | 19 | 160 | 177 | — | — | .703 | .703 | 1.062 |
| 21 | 19 | 159 | 177 | — | — | .688 | .687 | 1.121 |
| 22 | 0 | 49 | 68 | 144 | 156 | .672 | .672 | 1.048 |
| 23 | 0 | 49 | 68 | 144 | 157 | .656 | .656 | 1.063 |
| 24 | 0 | 49 | 68 | 144 | 158 | .641 | .641 | 1.081 |
| 25 | 0 | 49 | 68 | 144 | 159 | .625 | .625 | 1.104 |
| 26 | 0 | 50 | 69 | 141 | 157 | .609 | .609 | 1.125 |
| 27 | 0 | ;11 50 | 69 | 141 | 158 | .594 | .593 | 1.145 |
| 28 | 0 | 50 | 69 | 141 | 159 | .578 | .578 | 1.167 |
| 29 | 0 | 50 | 69 | 141 | 160 | .563 | .562 | 1.192 |
| 30 | 31 | 102 | 117 | 173 | 185 | .547 | .549 | .951 |
| 31 | 31 | 103 | 118 | 172 | 185 | .531 | .532 | .981 |
| 32 | 31 | 103 | 118 | 172 | 186 | .516 | .516 | 1.019 |
| 33 | 30 | 100 | 118 | 173 | 186 | .500 | .500 | 1.007 |
| 34 | 30 | 99 | 117 | 173 | 187 | .484 | .485 | 1.046 |
| 35 | 30 | 99 | 117 | 172 | 187 | .469 | .469 | 1.067 |
| 36 | 30 | 100 | 119 | 173 | 188 | .453 | .453 | 1.067 |
| 37 | 30 | 100 | 119 | 170 | 186 | .438 | .438 | 1.042 |
| 38 | 29 | 102 | 121 | 169 | 186 | .422 | .422 | 1.043 |
| 39 | 29 | 102 | 121 | 169 | 187 | .406 | .406 | 1.051 |
| 40 | 29 | 102 | 121 | 167 | 186 | .391 | .390 | 1.059 |

waveform, in p.u. of the same ripple current generated by the full conduction square wave at constant V/f. The analytical expression of this definition is:

$$I_R = \left[ \frac{\Sigma \left( \frac{E_n}{n} \right)^2}{\Sigma \left( \frac{1}{n^4} \right)} \right]^{\frac{1}{2}} \cdot \frac{1}{E_1}$$

with $I_R$ = rms ripple index n = harmonic rank (even harmonics and triplens excluded) 5, 7, 11, 13, 17, 19 ...

$E_n$ = amplitude of the nth voltage harmonic $E_1$ = fundamental voltage amplitude This definition rests on the assumption that the load is an induction motor, representing virtually a pure inductive load at any harmonic frequency other than the fundamental frequency.

The BASIC language computer program shown herebelow on Table 5 is used for searching for optimum patterns.

Table 5.

Program for pattern evaluation.

```
100 INPUT K1,K2,K3,K4,K5
110 PRINT 'K1='K1; 'K2='K2; 'K3='K3; 'K4='K4; 'K5='K5
120 A1=.00818123*K1
130 A2=.00818123*K2
140 A3=.00818123*K3
150 A4=.00818123*K4
160 A5=.00818123*K5
170 R0=0
180 DIM U(17),V(17),W(17),X(17),Y(17),E(17),R(17)
190 FOR N=1 TO 17
200 READ P
210 U(N)=COS(P*A1)
220 V(N)=COS(P*A2)
230 W(N)=COS(P*A3)
240 X(N)=COS(P*A4)
250 Y(N)=COS(P*A5)
260 E(N)=(2*U(N)-V(N)+W(N)-X(N)+Y(N))-1)*1.273/P
270 R(N)=(E(N)/P) ↑ 2
280 R0=R0+R(N)
290 NEXT N
300 DATA 1,5,7,11,13,17,19,23,25
310 DATA 29,31,35,37,41,43,47,49
320 R=R0-R(1)
330 T=SQR(R/.0034845)
340 E=E(1)/1.273
350 T=T/E
360 PRINT 'FUNDAMENTAL VOLTAGE='E
370 PRINT 'RIPPLE INDEX ='T
380 PRINT
390 PRINT
400 REST
410 GO TO 100
420 END
END OF FILE
>>
  RUN
?>19,166,177,192,192
K1= 19 K2= 166 K3= 177 K4= 192 K5= 192
FUNDAMENTAL VOLTAGE= .79848425
RIPPLE INDEX = .74240915
?>
```

The pattern to be analyzed is defined by the switching subintervals as discussed in connection with Table 4. The subintervals' numbers are entered in sequence by the operator. The program can accommodate 5 switchings per quarter of wave. When less than 5 switchings are used, the last unused switching subintervals are all entered with the number 192, which represents the last subinterval of the quadrant. Table 5 shows a typical run procedure at the bottom of the listing. The program calculates the fundamental voltage and all harmonic amplitudes up to the 49th harmonic. From that the ripple index is calculated. Both fundamental amplitude and ripple index are printed out. The operator modifies the entry until he obtains the desired voltage. When several solutions exist, the one corresponding to the lowest ripple index is adopted.

Table 4 lists the fundamental voltages corresponding to the 40 adopted patterns. It appears that a small discrepancy may exist between the actual voltage and the desired one, the latter corresponding to the exact division of the voltage range in 64 steps. Table 4 also lists the ripple index of each pattern. The worst ripple index is the one of patter 29. In a constant V/f system, this pattern will produce non-fundamental motor currents whose total rms value is 19% higher than the non-fundamental rms motor currents produced at base frequency by pattern No. 1.

The information necessary to implement the patterns of Table 4 is stored in the Read Only Memory devices 113, 114, 115 (FIG. 14). The required total memory capacity can be computed from the block diagram of FIG. 13, observing that the ROM 30 has 10 input lines (K, L, M, N, U, V, W, X, Y, Z) defining $2^{10}$ = 1024 addresses. In each address, the state of 5 output lines (A*, B*, C*, D*, S) is stored, yielding a total capacity of 1024 × 5 = 5120 bits.

This memory capacity is implemented by using three 2048 bit units. Circuits 113 and 114 are used to generate the comparator reference word A*B*C*D* and circuit 115 to generate the mode bit S.

Circuits 113 and 114 have a 256 × 8 basic organization, i.e. have 8 input lines (K through X) giving 256 addresses and 8 output lines. A ninth input, namely Y, permits to enable either the 4 output lines having an even number (when Y = 1 ) or the 4 output lines having an odd pin number (when Y = 0). The most significative voltage bit Z is used to enable either solid state device 113 (when Z = 1) or solid state device 114 (when Z = 0). Thus device 113 operates only with the first 32 patterns of Table 4, which, as can be deduced from Table 3, have Z = 1. Device 114 operates with the remaining 8 patterns and also is used for the free running mode.

Device 115 also possesses a 256 × 8 organization. Normally, it should have a 1024 × 1 organization, giving the state of a single output line S for each of the 1024 addresses defined by 10 input lines K through Z. To adapt device 115 to such requirements, a "one-out-of-four" selector circuit 116 is used, under control of the two most significative voltage bits Y and Z. Device 116 "reads" output 4 of 115 when Z = 1, Y = 1 and reproduces the state of this line at its own output on line 57 (signal S). When Z or Y changes, other output lines of device 116 are "read", according to the following table:

| Z | Y | Selected output of circuit 115 |
|---|---|---|
| 1 | 1 | 4 |
| 1 | 0 | 5 |
| 0 | 1 | 6 |

In establishing the program to be stored in ROMs 113 and 114, it is observed that the ROM output will be all zeros for any interval in which there is no switching. It suffices therefore to process all intervals for which there is a switching and then fill-up the remaining ROM addresses with "all zero" bytes.

As a practical method of programming, worksheets such as shown in Tables *6a* to *6i*, herebelow, are prepared in which the data of Table 4 are translated in terms of memory addresses and memory outputs.

Table 6a

| Pattern Nr. | Pattern designator byte Z | Y | X | W | V | U | Switching interval designator N | M | L | K | Nr. | Switching subinterval Nr | Nr within interval | Reference byte A* | B* | C* | D* | ROM output A* $B_8$ 11 | A* $B_7$ 10 | B* $B_6$ 9 | B* $B_5$ 8 | C* $B_4$ 7 | C* $B_3$ 6 | D* $B_2$ 5 | D* $B_1$ 4 |
|---|---|---|---|---|---|---|---|---|---|---|---|---|---|---|---|---|---|---|---|---|---|---|---|---|---|
| 2 | 1 | 1 | 1 | 1 | 1 | 0 | 0 | 0 | 0 | 1 | 1 | 15 | 15 | 1 | 1 | 1 | 1 | — | 1 | — | 1 | — | 1 | — | 1 |
| 3 | 1 | 1 | 1 | 1 | 0 | 1 | 0 | 0 | 0 | 0 | 2 | 22 | 6 | 0 | 1 | 0 | 1 | — | 0 | — | 1 | — | 0 | — | 1 |
| 4 | 1 | 1 | 1 | 1 | 0 | 0 | 0 | 0 | 0 | 0 | 2 | 24 | 8 | 1 | 0 | 0 | 0 | — | 1 | — | 0 | — | 0 | — | 0 |
| | | | | | | | 0 | 0 | 1 | 0 | 3 | 36 | 4 | 0 | 1 | 0 | 0 | — | 0 | — | 1 | — | 0 | — | 0 |
| 5 | 1 | 1 | 1 | 0 | 1 | 1 | 0 | 0 | 0 | 0 | 2 | 25 | 9 | 0 | 1 | 1 | 1 | — | 0 | — | 1 | — | 1 | — | 1 |
| | | | | | | | 0 | 0 | 1 | 0 | 3 | 39 | 7 | 0 | 1 | 1 | 1 | — | 0 | — | 1 | — | 1 | — | 1 |
| 6 | 1 | 1 | 1 | 0 | 1 | 0 | 0 | 0 | 0 | 0 | 2 | 25 | 9 | 0 | 1 | 1 | 1 | — | 0 | — | 1 | — | 1 | — | 1 |
| | | | | | | | 0 | 0 | 1 | 0 | 3 | 42 | 10 | 1 | 0 | 1 | 0 | — | 1 | — | 0 | — | 1 | — | 0 |
| 7 | 1 | 1 | 1 | 0 | 0 | 1 | 0 | 0 | 0 | 0 | 2 | 28 | 12 | 0 | 1 | 0 | 0 | — | 0 | — | 1 | — | 0 | — | 0 |
| | | | | | | | 0 | 0 | 1 | 0 | 3 | 47 | 15 | 1 | 1 | 1 | 1 | — | 1 | — | 1 | — | 1 | — | 1 |
| 8 | 1 | 1 | 1 | 0 | 0 | 0 | 0 | 0 | 0 | 1 | 1 | 13 | 13 | 1 | 1 | 0 | 1 | — | 1 | — | 1 | — | 0 | — | 1 |
| | | | | | | | 1 | 1 | 1 | 1 | 12 | 186 | 10 | 0 | 1 | 1 | 0 | — | 0 | — | 1 | — | 1 | — | 0 |
| 9 | 1 | 1 | 0 | 1 | 1 | 1 | 0 | 0 | 0 | 0 | 2 | 20 | 4 | 1 | 1 | 0 | 0 | — | 1 | — | 1 | — | 0 | — | 0 |
| | | | | | | | 1 | 1 | 1 | 1 | 12 | 186 | 10 | 0 | 1 | 1 | 0 | — | 0 | — | 1 | — | 1 | — | 0 |
| | | | | | | | | | | | | | ROM address | | | | | | | | | | | | |

Table 6b

| Pattern Nr. | Pattern designator byte Z | Y | X | W | V | U | Switching interval designator N | M | L | K | Nr. | Switching subinterval Nr | Nr within interval | Reference byte A* | B* | C* | D* | ROM output A* $B_8$ 11 | A* $B_7$ 10 | B* $B_6$ 9 | B* $B_5$ 8 | C* $B_4$ 7 | C* $B_3$ 6 | D* $B_2$ 5 | D* $B_1$ 4 |
|---|---|---|---|---|---|---|---|---|---|---|---|---|---|---|---|---|---|---|---|---|---|---|---|---|---|
| 10 | 1 | 1 | 0 | 1 | 1 | 0 | 0 | 0 | 0 | 0 | 2 | 20 | 4 | 1 | 1 | 0 | 0 | — | 1 | — | 1 | — | 0 | — | 0 |
| | | | | | | | 1 | 1 | 1 | 1 | 12 | 185 | 9 | 0 | 1 | 1 | 1 | — | 0 | — | 1 | — | 1 | — | 1 |
| 11 | 1 | 1 | 0 | 1 | 0 | 1 | 0 | 0 | 0 | 0 | 2 | 20 | 4 | 1 | 1 | 0 | 0 | — | 1 | — | 1 | — | 0 | — | 0 |
| | | | | | | | 1 | 1 | 1 | 1 | 12 | 184 | 8 | 1 | 0 | 0 | 0 | — | 1 | — | 0 | — | 0 | — | 0 |
| | | | | | | | 0 | 0 | 0 | 1 | 1 | 13 | 13 | 1 | 1 | 0 | 1 | — | 1 | — | 1 | — | 0 | — | 1 |
| 12 | 1 | 1 | 0 | 1 | 0 | 0 | 1 | 1 | 1 | 0 | 11 | 167 | 7 | 0 | 1 | 1 | 1 | — | 0 | — | 1 | — | 1 | — | 1 |
| | | | | | | | 1 | 1 | 1 | 1 | 12 | 177 | 1 | 1 | 1 | 1 | 1 | — | 1 | — | 1 | — | 1 | — | 1 |
| | | | | | | | 0 | 0 | 0 | 0 | 2 | 19 | 3 | 1 | 1 | 0 | 1 | — | 1 | — | 1 | — | 0 | — | 1 |
| 13 | 1 | 1 | 0 | 0 | 1 | 1 | 1 | 1 | 1 | 0 | 11 | 167 | 7 | 0 | 1 | 1 | 1 | — | 0 | — | 1 | — | 1 | — | 1 |
| | | | | | | | 1 | 1 | 1 | 1 | 12 | 177 | 1 | 1 | 1 | 1 | 1 | — | 1 | — | 1 | — | 1 | — | 1 |
| | | | | | | | 0 | 0 | 0 | 0 | 2 | 19 | 3 | 1 | 1 | 0 | 1 | — | 1 | — | 1 | — | 0 | — | 1 |
| 14 | 1 | 1 | 0 | 0 | 1 | 0 | 1 | 1 | 1 | 0 | 11 | 166 | 6 | 0 | 1 | 1 | 0 | — | 0 | — | 1 | — | 1 | — | 0 |
| | | | | | | | 1 | 1 | 1 | 1 | 12 | 177 | 1 | 1 | 1 | 1 | 1 | — | 1 | — | 1 | — | 1 | — | 1 |
| | | | | | | | 0 | 0 | 0 | 0 | 2 | 19 | 3 | 1 | 1 | 0 | 1 | — | 1 | — | 1 | — | 0 | — | 1 |
| 15 | 1 | 1 | 0 | 0 | 0 | 1 | 1 | 1 | 1 | 0 | 11 | 165 | 5 | 0 | 1 | 0 | 1 | — | 0 | — | 1 | — | 0 | — | 1 |
| | | | | | | | 1 | 1 | 1 | 1 | 12 | 177 | 1 | 1 | 1 | 1 | 1 | — | 1 | — | 1 | — | 1 | — | 1 |
| | | | | | | | | | | | | | ROM address | | | | | | | | | | | | |

Worksheet for programming circuit 13.

Table 6c

| Pattern Nr. | Pattern designator byte Z | Y | X | W | V | U | Switching interval designator N | M | L | K | Nr. | Switching subinterval Nr | Nr within interval | Reference byte A* | B* | C* | D* | ROM output A* $B_8$ 11 | A* $B_7$ 10 | B* $B_6$ 9 | B* $B_5$ 8 | C* $B_4$ 7 | C* $B_3$ 6 | D* $B_2$ 5 | D* $B_1$ 4 |
|---|---|---|---|---|---|---|---|---|---|---|---|---|---|---|---|---|---|---|---|---|---|---|---|---|---|
| | | | | | | | 0 | 0 | 0 | 0 | 2 | 19 | 3 | 1 | 1 | 0 | 1 | — | 1 | — | 1 | — | 0 | — | 1 |
| 16 | 1 | 1 | 0 | 0 | 0 | 0 | 1 | 1 | 1 | 0 | 11 | 164 | 4 | 0 | 1 | 0 | 0 | — | 0 | — | 1 | — | 0 | — | 0 |
| | | | | | | | 1 | 1 | 1 | 1 | 12 | 177 | 1 | 1 | 1 | 1 | 1 | — | 1 | — | 1 | — | 1 | — | 1 |
| | | | | | | | 0 | 0 | 0 | 0 | 2 | 19 | 3 | 1 | 1 | 0 | 1 | 1 | — | 1 | — | 0 | — | 1 | — |
| 17 | 1 | 0 | 1 | 1 | 1 | 1 | 1 | 1 | 1 | 0 | 11 | 163 | 3 | 0 | 0 | 1 | 1 | 0 | — | 0 | — | 1 | — | 1 | — |
| | | | | | | | 1 | 1 | 1 | 1 | 12 | 177 | 1 | 1 | 1 | 1 | 1 | 1 | — | 1 | — | 1 | — | 1 | — |
| | | | | | | | 0 | 0 | 0 | 0 | 2 | 19 | 3 | 1 | 1 | 0 | 1 | 1 | — | 1 | — | 0 | — | 1 | — |
| 18 | 1 | 0 | 1 | 1 | 1 | 0 | 1 | 1 | 1 | 0 | 11 | 162 | 2 | 0 | 0 | 1 | 0 | 0 | — | 0 | — | 1 | — | 0 | — |
| | | | | | | | 1 | 1 | 1 | 1 | 12 | 177 | 1 | 1 | 1 | 1 | 1 | 1 | — | 1 | — | 1 | — | 1 | — |
| | | | | | | | 0 | 0 | 0 | 0 | 2 | 19 | 3 | 1 | 1 | 0 | 1 | 1 | — | 1 | — | 0 | — | 1 | — |
| 19 | 1 | 0 | 1 | 1 | 0 | 1 | 1 | 1 | 1 | 0 | 11 | 161 | 1 | 0 | 0 | 0 | 1 | 0 | — | 0 | — | 0 | — | 1 | — |
| | | | | | | | 1 | 1 | 1 | 1 | 12 | 177 | 1 | 1 | 1 | 1 | 1 | 1 | — | 1 | — | 1 | — | 1 | — |
| 20 | 1 | 0 | 1 | 1 | 0 | 0 | 0 | 0 | 0 | 0 | 2 | 19 | 3 | 1 | 1 | 0 | 1 | 1 | — | 1 | — | 0 | — | 1 | — |
| | | | | | | | 1 | 1 | 1 | 1 | 12 | 177 | 1 | 1 | 1 | 1 | 1 | 1 | — | 1 | — | 1 | — | 1 | — |
| | | | | | | | | | | | | | ROM address | | | | | | | | | | | | |

Worksheet for programming circuit 13.

Table 6d

| Pattern Nr. | Pattern designator byte Z | Y | X | W | V | U | Switching interval designator N | M | L | K | Nr. | Switching subinterval Nr | Nr within interval | Reference byte A* | B* | C* | D* | ROM output A* $B_8$ 11 | A* $B_7$ 10 | B* $B_6$ 9 | B* $B_5$ 8 | C* $B_4$ 7 | C* $B_3$ 6 | D* $B_2$ 5 | D* $B_1$ 4 |
|---|---|---|---|---|---|---|---|---|---|---|---|---|---|---|---|---|---|---|---|---|---|---|---|---|---|
| | | | | | | | 0 | 0 | 0 | 0 | 2 | 19 | 3 | 1 | 1 | 0 | 1 | 1 | — | 1 | — | 0 | — | 1 | — |
| 21 | 1 | 0 | 1 | 0 | 1 | 1 | 1 | 1 | 0 | 0 | 10 | 159 | 15 | 0 | 0 | 0 | 1 | 0 | — | 0 | — | 0 | — | 1 | — |
| | | | | | | | 1 | 1 | 1 | 1 | 12 | 177 | 1 | 1 | 1 | 1 | 1 | 1 | — | 1 | — | 1 | — | 1 | — |
| | | | | | | | 0 | 0 | 1 | 1 | 4 | 49 | 1 | 1 | 1 | 1 | 1 | 1 | — | 1 | — | 1 | — | 1 | — |
| 22 | 1 | 0 | 1 | 0 | 1 | 0 | 1 | 0 | 1 | 1 | 5 | 68 | 4 | 0 | 1 | 0 | 0 | 0 | — | 1 | — | 0 | — | 0 | — |

Table 6d-continued

| Pattern Nr. | Pattern designator byte Z | Y | X | W | V | U | Switching interval designator N | M | L | K | Nr. | Switching subinterval Nr | Nr within interval | Reference byte A* | B* | C* | D* | ROM output A* $B_8$ 11 | A* $B_7$ 10 | B* $B_6$ 9 | B* $B_5$ 8 | C* $B_4$ 7 | C* $B_3$ 6 | D* $B_2$ 5 | D* $B_1$ 4 |
|---|---|---|---|---|---|---|---|---|---|---|---|---|---|---|---|---|---|---|---|---|---|---|---|---|---|
| | | | | | | | 1 | 1 | 0 | 0 | 10 | 156 | 12 | 0 | 1 | 0 | 0 | 0 | — | 1 | — | 0 | — | 0 | — |
| | | | | | | | 0 | 0 | 1 | 1 | 4 | 49 | 1 | 1 | 1 | 1 | 1 | 1 | — | 1 | — | 1 | — | 1 | — |
| 23 | 1 | 0 | 1 | 0 | 0 | 1 | 1 | 0 | 1 | 1 | 5 | 68 | 4 | 0 | 1 | 0 | 0 | 0 | — | 1 | — | 0 | — | 0 | — |
| | | | | | | | 1 | 1 | 0 | 0 | 10 | 157 | 13 | 0 | 0 | 1 | 1 | 0 | — | 0 | — | 1 | — | 1 | — |
| | | | | | | | 0 | 0 | 1 | 1 | 4 | 49 | 1 | 1 | 1 | 1 | 1 | 1 | — | 1 | — | 1 | — | 1 | — |
| 24 | 1 | 0 | 1 | 0 | 0 | 0 | 1 | 0 | 1 | 1 | 5 | 68 | 4 | 0 | 1 | 0 | 0 | 0 | — | 1 | — | 0 | — | 0 | — |
| | | | | | | | 1 | 1 | 0 | 0 | 10 | 158 | 14 | 0 | 0 | 1 | 0 | 0 | — | 0 | — | 1 | — | 0 | — |
| | | | | | | | 0 | 0 | 1 | 1 | 4 | 49 | 1 | 1 | 1 | 1 | 1 | 1 | — | 1 | — | 1 | — | 1 | — |
| 25 | 1 | 0 | 0 | 1 | 1 | 1 | 1 | 0 | 1 | 1 | 5 | 68 | 4 | 0 | 1 | 0 | 0 | 0 | — | 1 | — | 0 | — | 0 | — |
| | | | | | | | 1 | 1 | 0 | 0 | 10 | 159 | 15 | 0 | 0 | 0 | 1 | 0 | — | 0 | — | 0 | — | 1 | — |
| | | | | | | | | | | | | ROM address | | | | | | | | | | | | | |

Worksheet for programming circuit 13.

Table 6e

| Pattern Nr. | Pattern designator byte Z | Y | X | W | V | U | Switching interval designator N | M | L | K | Nr. | Switching subinterval Nr | Nr within interval | Reference byte A* | B* | C* | D* | ROM output A* $B_8$ 11 | A* $B_7$ 10 | B* $B_6$ 9 | B* $B_5$ 8 | C* $B_4$ 7 | C* $B_3$ 6 | D* $B_2$ 5 | D* $B_1$ 4 |
|---|---|---|---|---|---|---|---|---|---|---|---|---|---|---|---|---|---|---|---|---|---|---|---|---|---|
| | | | | | | | 0 | 0 | 1 | 1 | 4 | 50 | 2 | 1 | 1 | 1 | 0 | 1 | — | 1 | — | 1 | — | 0 | — |
| 26 | 1 | 0 | 0 | 1 | 1 | 0 | 1 | 0 | 1 | 1 | 5 | 69 | 5 | 0 | 1 | 0 | 1 | 0 | — | 1 | — | 0 | — | 1 | — |
| | | | | | | | 1 | 1 | 0 | 1 | 9 | 141 | 13 | 1 | 1 | 0 | 1 | 1 | — | 1 | — | 0 | — | 1 | — |
| | | | | | | | 1 | 1 | 0 | 0 | 10 | 157 | 13 | 0 | 0 | 1 | 1 | 0 | — | 0 | — | 1 | — | 1 | — |
| | | | | | | | 0 | 0 | 1 | 1 | 4 | 50 | 2 | 1 | 1 | 1 | 0 | 1 | — | 1 | — | 1 | — | 0 | — |
| 27 | 1 | 0 | 0 | 1 | 0 | 1 | 1 | 0 | 1 | 1 | 5 | 69 | 5 | 0 | 1 | 0 | 1 | 0 | — | 1 | — | 0 | — | 1 | — |
| | | | | | | | 1 | 1 | 0 | 1 | 9 | 141 | 13 | 1 | 1 | 0 | 1 | 1 | — | 1 | — | 0 | — | 1 | — |
| | | | | | | | 1 | 1 | 0 | 0 | 10 | 158 | 14 | 0 | 0 | 1 | 0 | 0 | — | 0 | — | 1 | — | 0 | — |
| | | | | | | | 0 | 0 | 1 | 1 | 4 | 50 | 2 | 1 | 1 | 1 | 0 | 1 | — | 1 | — | 1 | — | 0 | — |
| 28 | 1 | 0 | 0 | 1 | 0 | 0 | 1 | 0 | 1 | 1 | 5 | 69 | 5 | 0 | 1 | 0 | 1 | 0 | — | 1 | — | 0 | — | 1 | — |
| | | | | | | | 1 | 1 | 0 | 1 | 9 | 141 | 13 | 1 | 1 | 0 | 1 | 1 | — | 1 | — | 0 | — | 1 | — |
| | | | | | | | 1 | 1 | 0 | 0 | 10 | 159 | 15 | 0 | 0 | 0 | 1 | 0 | — | 0 | — | 0 | — | 1 | — |
| | | | | | | | 0 | 0 | 1 | 1 | 4 | 50 | 2 | 1 | 1 | 1 | 0 | 1 | — | 1 | — | 1 | — | 0 | — |
| 29 | 1 | 0 | 0 | 0 | 1 | 1 | 1 | 0 | 1 | 1 | 5 | 69 | 5 | 0 | 1 | 0 | 1 | 0 | — | 1 | — | 0 | — | 1 | — |
| | | | | | | | 1 | 1 | 0 | 1 | 9 | 141 | 13 | 1 | 1 | 0 | 1 | 1 | — | 1 | — | 0 | — | 1 | — |
| | | | | | | | | | | | | ROM address | | | | | | | | | | | | | |

Worksheet for programming circuit 13.

Table 6f

| Pattern Nr. | Pattern designator byte Z | Y | X | W | V | U | Switching interval designator N | M | L | K | Nr. | Switching subinterval Nr | Nr within interval | Reference byte A* | B* | C* | D* | ROM output A* $B_8$ 11 | A* $B_7$ 10 | B* $B_6$ 9 | B* $B_5$ 8 | C* $B_4$ 7 | C* $B_3$ 6 | D* $B_2$ 5 | D* $B_1$ 4 |
|---|---|---|---|---|---|---|---|---|---|---|---|---|---|---|---|---|---|---|---|---|---|---|---|---|---|
| | | | | | | | 0 | 0 | 0 | 0 | 2 | 31 | 15 | 0 | 0 | 0 | 1 | 0 | — | 0 | — | 0 | — | 1 | — |
| | | | | | | | 1 | 0 | 0 | 0 | 7 | 102 | 6 | 0 | 1 | 1 | 0 | 0 | — | 1 | — | 1 | — | 0 | — |
| 30 | 1 | 0 | 0 | 0 | 1 | 0 | 1 | 0 | 0 | 1 | 8 | 117 | 5 | 1 | 0 | 1 | 1 | 1 | — | 0 | — | 1 | — | 1 | — |
| | | | | | | | 1 | 1 | 1 | 0 | 11 | 173 | 13 | 1 | 1 | 0 | 1 | 1 | — | 1 | — | 0 | — | 1 | — |
| | | | | | | | 1 | 1 | 1 | 1 | 12 | 185 | 9 | 0 | 1 | 1 | 1 | 0 | — | 1 | — | 1 | — | 1 | — |
| | | | | | | | 0 | 0 | 0 | 0 | 2 | 31 | 15 | 0 | 0 | 0 | 1 | 0 | — | 0 | — | 0 | — | 1 | — |
| | | | | | | | 1 | 0 | 0 | 0 | 7 | 103 | 7 | 0 | 1 | 1 | 1 | 0 | — | 1 | — | 1 | — | 1 | — |
| 31 | 1 | 0 | 0 | 0 | 0 | 1 | 1 | 0 | 0 | 1 | 8 | 118 | 6 | 1 | 0 | 1 | 0 | 1 | — | 0 | — | 1 | — | 0 | — |
| | | | | | | | 1 | 1 | 1 | 0 | 11 | 172 | 12 | 1 | 1 | 0 | 0 | 1 | — | 1 | — | 0 | — | 0 | — |
| | | | | | | | 1 | 1 | 1 | 1 | 12 | 185 | 9 | 0 | 1 | 1 | 1 | 0 | — | 1 | — | 1 | — | 1 | — |
| | | | | | | | 0 | 0 | 0 | 0 | 2 | 31 | 15 | 0 | 0 | 0 | 1 | 0 | — | 0 | — | 0 | — | 1 | — |
| | | | | | | | 1 | 0 | 0 | 0 | 7 | 103 | 7 | 0 | 1 | 1 | 1 | 0 | — | 1 | — | 1 | — | 1 | — |
| 32 | 1 | 0 | 0 | 0 | 0 | 0 | 1 | 0 | 0 | 1 | 8 | 118 | 6 | 1 | 0 | 1 | 0 | 1 | — | 0 | — | 1 | — | 0 | — |
| | | | | | | | 1 | 1 | 1 | 0 | 11 | 172 | 12 | 1 | 1 | 0 | 0 | 1 | — | 1 | — | 0 | — | 0 | — |
| | | | | | | | 1 | 1 | 1 | 1 | 12 | 186 | 10 | 0 | 1 | 1 | 0 | 0 | — | 1 | — | 1 | — | 0 | — |
| | | | | | | | | | | | | ROM address | | | | | | | | | | | | | |

Worksheet for programming circuit 13.

Table 6g

| Pattern Nr. | Pattern designator byte Z | Y | X | W | V | U | Switching interval designator N | M | L | K | Nr. | Switching subinterval Nr | Nr within interval | Reference byte A* | B* | C* | D* | ROM output A* $B_8$ 11 | A* $B_7$ 10 | B* $B_6$ 9 | B* $B_5$ 8 | C* $B_4$ 7 | C* $B_3$ 6 | D* $B_2$ 5 | D* $B_1$ 4 |
|---|---|---|---|---|---|---|---|---|---|---|---|---|---|---|---|---|---|---|---|---|---|---|---|---|---|
| | | | | | | | 0 | 0 | 0 | 0 | 2 | 30 | 14 | 0 | 0 | 1 | 0 | — | 0 | — | 0 | — | 1 | — | 0 |
| | | | | | | | 1 | 0 | 0 | 0 | 7 | 100 | 4 | 0 | 1 | 0 | 0 | — | 0 | — | 1 | — | 0 | — | 0 |
| 33 | 0 | 1 | 1 | 1 | 1 | 1 | 1 | 0 | 0 | 1 | 8 | 118 | 6 | 1 | 0 | 1 | 0 | — | 1 | — | 0 | — | 1 | — | 0 |
| | | | | | | | 1 | 1 | 1 | 0 | 11 | 173 | 13 | 1 | 1 | 0 | 1 | — | 1 | — | 1 | — | 0 | — | 1 |
| | | | | | | | 1 | 1 | 1 | 1 | 12 | 186 | 10 | 0 | 1 | 1 | 0 | — | 0 | — | 1 | — | 1 | — | 0 |
| | | | | | | | 0 | 0 | 0 | 0 | 2 | 30 | 14 | 0 | 0 | 1 | 0 | — | 0 | — | 0 | — | 1 | — | 0 |
| | | | | | | | 1 | 0 | 0 | 0 | 7 | 93 | 3 | 0 | 0 | 1 | 1 | — | 0 | — | 0 | — | 1 | — | 1 |
| 34 | 0 | 1 | 1 | 1 | 1 | 0 | 1 | 0 | 0 | 1 | 8 | 117 | 5 | 1 | 0 | 1 | 1 | — | 1 | — | 0 | — | 1 | — | 1 |
| | | | | | | | 1 | 1 | 1 | 0 | 11 | 173 | 13 | 1 | 1 | 0 | 1 | — | 1 | — | 1 | — | 0 | — | 1 |
| | | | | | | | 1 | 1 | 1 | 1 | 12 | 187 | 11 | 0 | 1 | 0 | 1 | — | 0 | — | 1 | — | 0 | — | 1 |
| | | | | | | | 0 | 0 | 0 | 0 | 2 | 30 | 14 | 0 | 0 | 1 | 0 | — | 0 | — | 0 | — | 1 | — | 0 |
| | | | | | | | 1 | 0 | 0 | 0 | 7 | 99 | 3 | 0 | 0 | 1 | 1 | — | 0 | — | 0 | — | 1 | — | 1 |
| 35 | 0 | 1 | 1 | 1 | 0 | 1 | 1 | 0 | 0 | 1 | 8 | 117 | 5 | 1 | 0 | 1 | 1 | — | 1 | — | 0 | — | 1 | — | 1 |

Table 6g-continued

| Pattern Nr. | Pattern designator byte | | | | | | Switching interval designator | | | | | Switching subinterval | | | | | | ROM output | | | | | | | |
|---|---|---|---|---|---|---|---|---|---|---|---|---|---|---|---|---|---|---|---|---|---|---|---|---|---|
| | | | | | | | | | | | | | | Reference byte | | | | | | | | | | | |
| | Z | Y | X | W | V | U | N | M | L | K | Nr. | Nr | Nr within interval | A* | B* | C* | D* | A* $B_8$ 11 | A* $B_7$ 10 | B* $B_6$ 9 | B* $B_5$ 8 | C* $B_4$ 7 | C* $B_3$ 6 | D* $B_2$ 5 | D* $B_1$ 4 |
| | | | | | | | 1 | 1 | 1 | 0 | 11 | 172 | 12 | 1 | 1 | 0 | 0 | — | 1 | — | 1 | — | 0 | — | 0 |
| | | | | | | | 1 | 1 | 1 | 1 | 12 | 187 | 11 | 0 | 1 | 0 | 1 | — | 0 | — | 1 | — | 0 | — | 1 |
| | | | | | | | | | | | | | ROM address | | | | | | | | | | | | |

Worksheet for programming circuit 14.

Table 6h

| Pattern Nr. | Pattern designator byte | | | | | | Switching interval designator | | | | | Switching subinterval | | | | | | ROM output | | | | | | | |
|---|---|---|---|---|---|---|---|---|---|---|---|---|---|---|---|---|---|---|---|---|---|---|---|---|---|
| | | | | | | | | | | | | | | Reference byte | | | | | | | | | | | |
| | Z | Y | X | W | V | U | N | M | L | K | Nr. | Nr | Nr within interval | A* | B* | C* | D* | A* $B_8$ 11 | A* $B_7$ 10 | B* $B_6$ 9 | B* $B_5$ 8 | C* $B_4$ 7 | C* $B_3$ 6 | D* $B_2$ 5 | D* $B_1$ 4 |
| | | | | | | | 0 | 0 | 0 | 0 | 2 | 30 | 14 | 0 | 0 | 1 | 0 | — | 0 | — | 0 | — | 1 | — | 0 |
| | | | | | | | 1 | 0 | 0 | 0 | 7 | 100 | 4 | 0 | 1 | 0 | 0 | — | 0 | — | 1 | — | 0 | — | 0 |
| 36 | 0 | 1 | 1 | 1 | 0 | 0 | 1 | 0 | 0 | 1 | 8 | 119 | 7 | 1 | 0 | 0 | 1 | — | 1 | — | 0 | — | 0 | — | 1 |
| | | | | | | | 1 | 1 | 1 | 0 | 11 | 173 | 13 | 1 | 1 | 0 | 1 | — | 1 | — | 1 | — | 0 | — | 1 |
| | | | | | | | 1 | 1 | 1 | 1 | 12 | 188 | 12 | 0 | 1 | 0 | 0 | — | 0 | — | 1 | — | 0 | — | 0 |
| | | | | | | | 0 | 0 | 0 | 0 | 2 | 30 | 14 | 0 | 0 | 1 | 0 | — | 0 | — | 0 | — | 1 | — | 0 |
| | | | | | | | 1 | 0 | 0 | 0 | 7 | 100 | 4 | 0 | 1 | 0 | 0 | — | 0 | — | 1 | — | 0 | — | 0 |
| 37 | 0 | 1 | 1 | 0 | 1 | 1 | 1 | 0 | 0 | 1 | 8 | 119 | 7 | 1 | 0 | 0 | 1 | — | 1 | — | 0 | — | 0 | — | 1 |
| | | | | | | | 1 | 1 | 1 | 0 | 11 | 170 | 10 | 1 | 0 | 1 | 0 | — | 1 | — | 0 | — | 1 | — | 0 |
| | | | | | | | 1 | 1 | 1 | 1 | 12 | 186 | 10 | 0 | 1 | 1 | 0 | — | 0 | — | 1 | — | 1 | — | 0 |
| | | | | | | | 0 | 0 | 0 | 0 | 2 | 29 | 13 | 0 | 0 | 1 | 1 | — | 0 | — | 0 | — | 1 | — | 1 |
| | | | | | | | 1 | 0 | 0 | 0 | 7 | 102 | 6 | 0 | 1 | 1 | 0 | — | 0 | — | 1 | — | 1 | — | 0 |
| 38 | 0 | 1 | 1 | 0 | 1 | 0 | 1 | 0 | 0 | 1 | 8 | 121 | 9 | 0 | 1 | 1 | 1 | — | 0 | — | 1 | — | 1 | — | 1 |
| | | | | | | | 1 | 1 | 1 | 0 | 11 | 169 | 9 | 1 | 0 | 0 | 1 | — | 1 | — | 0 | — | 0 | — | 1 |
| | | | | | | | 1 | 1 | 1 | 1 | 12 | 186 | 10 | 0 | 1 | 1 | 0 | — | 0 | — | 1 | — | 1 | — | 0 |
| | | | | | | | ROM address | | | | | | | | | | | | | | | | | | |

Worksheet for programming circuit 14.

Table 6i

| Pattern Nr. | Pattern designator byte | | | | | | Switching interval designator | | | | | Switching subinterval | | | | | | ROM output | | | | | | | |
|---|---|---|---|---|---|---|---|---|---|---|---|---|---|---|---|---|---|---|---|---|---|---|---|---|---|
| | | | | | | | | | | | | | | Reference byte | | | | | | | | | | | |
| | Z | Y | X | W | V | U | N | M | L | K | Nr. | Nr | Nr within interval | A* | B* | C* | D* | A* $B_8$ 11 | A* $B_7$ 10 | B* $B_6$ 9 | B* $B_5$ 8 | C* $B_4$ 7 | C* $B_3$ 6 | D* $B_2$ 5 | D* $B_1$ 4 |
| | | | | | | | 0 | 0 | 0 | 0 | 2 | 29 | 13 | 0 | 0 | 1 | 1 | — | 0 | — | 0 | — | 1 | — | 1 |
| | | | | | | | 1 | 0 | 0 | 0 | 7 | 102 | 6 | 0 | 1 | 1 | 0 | — | 0 | — | 1 | — | 1 | — | 0 |
| 39 | 0 | 1 | 1 | 0 | 0 | 1 | 1 | 0 | 0 | 1 | 8 | 121 | 9 | 0 | 1 | 1 | 1 | — | 0 | — | 1 | — | 1 | — | 1 |
| | | | | | | | 1 | 1 | 1 | 0 | 11 | 169 | 9 | 1 | 0 | 0 | 1 | — | 1 | — | 0 | — | 0 | — | 1 |
| | | | | | | | 1 | 1 | 1 | 1 | 12 | 187 | 11 | 0 | 1 | 0 | 1 | — | 0 | — | 1 | — | 0 | — | 1 |
| | | | | | | | 0 | 0 | 0 | 0 | 2 | 29 | 13 | 0 | 0 | 1 | 1 | — | 0 | — | 0 | — | 1 | — | 1 |
| | | | | | | | 1 | 0 | 0 | 0 | 7 | 102 | 6 | 0 | 1 | 1 | 0 | — | 0 | — | 1 | — | 1 | — | 0 |
| 40 | 0 | 1 | 1 | 0 | 0 | 0 | 1 | 0 | 0 | 1 | 8 | 121 | 9 | 0 | 1 | 1 | 1 | — | 0 | — | 1 | — | 1 | — | 1 |
| | | | | | | | 1 | 1 | 1 | 0 | 11 | 167 | 7 | 0 | 1 | 1 | 1 | — | 0 | — | 1 | — | 1 | — | 1 |
| | | | | | | | 1 | 1 | 1 | 1 | 12 | 186 | 10 | 0 | 1 | 1 | 0 | — | 0 | — | 1 | — | 1 | — | 0 |
| | | | | | | | ROM address | | | | | | | | | | | | | | | | | | |

Table 7i. Worksheet for programming circuit 14.

For each pattern, the pattern designator byte is first identified from Table 3. This is the A/D converter output for a voltage digitization step corresponding to the pattern number. The state of the six bits U through Z is entered in the chart. For each switching in that pattern, the subinterval number from Table 4 is entered in the "switching subinterval number" column. Next the interval number corresponding to each switching is entered. This number can be read on FIGS. 17A and 17B, or can be calculated by adding one to the quotient of the division by 12 of the subinterval number. The interval number is translated into an interval designator byte by using the code reflected by FIG. 15, and the corresponding states of KLMN are entered. The next step consists of figuring out the "abridged" subinterval numbers in which the switchings occur, within each switching interval. Each one of these numbers, comprised between 0 and 15, is the rest of the division by 12 of the subinterval number. The results are entered in the "switching subinterval number within the interval" column. In correspondence with each of these numbers, the required comparator reference byte (A*B*C*D*) is entered, in accordance with Table 7*a*, or Table 7*b*,

Table 7a (Valid for Odd Switching Interval Numbers)

| Abridged Subinterval Nr (within an interval) | A* | B* | C* | D* |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |

Table 7b (Valid for Even Switching Interval Numbers)

| Abridged Subinterval Nr (within an interval) | A* | B* | C* | D* |
|---|---|---|---|---|
| 0 | 0 | 0 | 0 | 0 |
| 1 | 1 | 1 | 1 | 1 |
| 2 | 1 | 1 | 1 | 0 |

Table 7b-continued

| (Valid for Even Switching Interval Numbers) | | | | |
|---|---|---|---|---|
| Abridged Subinterval Nr (within an interval) | A* | B* | C* | D* |
| 3 | 1 | 1 | 0 | 1 |
| 4 | 1 | 1 | 0 | 0 |
| 5 | 1 | 0 | 1 | 1 |
| 6 | 1 | 0 | 1 | 0 |
| 7 | 1 | 0 | 0 | 1 |
| 8 | 1 | 0 | 0 | 0 |
| 9 | 0 | 1 | 1 | 1 |
| 10 | 0 | 1 | 1 | 0 |
| 11 | 0 | 1 | 0 | 1 |
| 12 | 0 | 1 | 0 | 0 |
| 13 | 0 | 0 | 1 | 1 |
| 14 | 0 | 0 | 1 | 0 |
| 15 | 0 | 0 | 0 | 1 |

The state of the A*B*C*D* bits is also entered in the ROM output column. This column lists the state of the ROM output lines, identified by the signal name in the A*B*C*D* byte (upper row of symbols), by the manufacturer's label given to the line and by the pin number (lower row of numbers). The reference byte is entered under even pin numbers if Y = 1 for the pattern under study or under odd pin numbers if Y = 0. We can see from Tables 7*a* and 7*b* that whenever the subinterval number is an exact multiple of 16, the reference byte is 0000. In such a case, there is no need to enter data in the worksheet, since the purpose is the listing of the non-zero memory locations only. Switchings coincident with a boundary between intervals can therefore be ignored when developing the worksheets.

After completion of the work sheets for all patterns, one obtains a truth table listing all ROM addresses at which non-zero output bytes are stored. By completing the unlisted locations with all zero bytes and arranging the addresses in a straight binary sequence, the following Tables 8*a* through 8*d* and 9*a* through 9*d*, defining respectively the programs for circuits 113 and 114 are obtained.

Table 8a

| | | | | | ROM program for circuit 13. | | | | | | | | | | | |
|---|---|---|---|---|---|---|---|---|---|---|---|---|---|---|---|---|
| Address Nr. ↓ | X A8 17 | W A7 18 | V A6 19 | U A5 20 | N A4 21 | M A3 1 | L A2 2 | K A1 3 | A* B8 11 | A* B7 10 | B* B6 9 | B* B5 8 | C* B4 7 | C* B3 6 | D* B2 5 | D* B1 4 |
| 000 | 0 | 0 | 0 | 0 | 0 | 0 | 0 | 0 | 0 | 1 | 0 | 1 | 0 | 0 | 1 | 1 |
| 001 | 0 | 0 | 0 | 0 | 0 | 0 | 0 | 1 | 0 | 0 | 0 | 0 | 0 | 0 | 0 | 0 |
| 002 | 0 | 0 | 0 | 0 | 0 | 0 | 1 | 0 | 0 | 0 | 0 | 0 | 0 | 0 | 0 | 0 |
| 003 | 0 | 0 | 0 | 0 | 0 | 0 | 1 | 1 | 0 | 0 | 0 | 0 | 0 | 0 | 0 | 0 |
| 004 | 0 | 0 | 0 | 0 | 0 | 1 | 0 | 0 | 0 | 0 | 0 | 0 | 0 | 0 | 0 | 0 |
| 005 | 0 | 0 | 0 | 0 | 0 | 1 | 0 | 1 | 0 | 0 | 0 | 0 | 0 | 0 | 0 | 0 |
| 006 | 0 | 0 | 0 | 0 | 0 | 1 | 1 | 0 | 0 | 0 | 0 | 0 | 0 | 0 | 0 | 0 |
| 007 | 0 | 0 | 0 | 0 | 0 | ! | ! | ! | 0 | 0 | 0 | 0 | 0 | 0 | 0 | 0 |
| 008 | 0 | 0 | 0 | 0 | ! | 0 | 0 | 0 | 0 | 0 | 1 | 0 | 1 | 0 | 1 | 0 |
| 009 | 0 | 0 | 0 | 0 | 1 | 0 | 0 | 1 | 1 | 0 | 0 | 0 | 1 | 0 | 0 | 0 |
| 010 | 0 | 0 | 0 | 0 | 1 | 0 | 1 | 0 | 0 | 0 | 0 | 0 | 0 | 0 | 0 | 0 |
| 011 | 0 | 0 | 0 | 0 | 1 | 0 | 1 | 1 | 0 | 0 | 0 | 0 | 0 | 0 | 0 | 0 |
| 012 | 0 | 0 | 0 | 0 | 1 | 1 | 0 | 0 | 0 | 0 | 0 | 0 | 0 | 0 | 0 | 0 |
| 013 | 0 | 0 | 0 | 0 | 1 | 1 | 0 | 1 | 0 | 0 | 0 | 0 | 0 | 0 | 0 | 0 |
| 014 | 0 | 0 | 0 | 0 | 1 | 1 | 1 | 0 | 1 | 0 | 1 | 1 | 0 | 0 | 0 | 0 |
| 015 | 0 | 0 | 0 | 0 | 1 | 1 | 1 | 1 | 0 | 1 | 1 | 1 | 1 | 1 | 0 | 1 |
| 016 | 0 | 0 | 0 | 1 | 0 | 0 | 0 | 0 | 0 | 1 | 0 | 1 | 0 | 0 | 1 | 1 |
| 017 | 0 | 0 | 0 | 1 | 0 | 0 | 0 | 1 | 0 | 0 | 0 | 0 | 0 | 0 | 0 | 0 |
| 018 | 0 | 0 | 0 | 1 | 0 | 0 | 1 | 0 | 0 | 0 | 0 | 0 | 0 | 0 | 0 | 0 |
| 019 | 0 | 0 | 0 | 1 | 0 | 0 | 1 | 1 | 0 | 0 | 0 | 0 | 0 | 0 | 0 | 0 |
| 020 | 0 | 0 | 0 | 1 | 0 | 1 | 0 | 0 | 0 | 0 | 0 | 0 | 0 | 0 | 0 | 0 |
| 021 | 0 | 0 | 0 | 1 | 0 | 1 | 0 | 1 | 0 | 0 | 0 | 0 | 0 | 0 | 0 | 0 |
| 022 | 0 | 0 | 0 | 1 | 0 | 1 | 1 | 0 | 0 | 0 | 0 | 0 | 0 | 0 | 0 | 0 |
| 023 | 0 | 0 | 0 | 1 | 0 | 1 | 1 | 1 | 0 | 0 | 0 | 0 | 0 | 0 | 0 | 0 |
| 024 | 0 | 0 | 0 | 1 | 1 | 0 | 0 | 0 | 0 | 0 | 1 | 0 | 1 | 0 | 1 | 0 |
| 025 | 0 | 0 | 0 | 1 | 1 | 0 | 0 | 1 | 1 | 0 | 0 | 0 | 1 | 0 | 0 | 0 |
| 026 | 0 | 0 | 0 | 1 | 1 | 0 | 1 | 0 | 0 | 0 | 0 | 0 | 0 | 0 | 0 | 0 |
| 027 | 0 | 0 | 0 | 1 | 1 | 0 | 1 | 1 | 0 | 0 | 0 | 0 | 0 | 0 | 0 | 0 |
| 028 | 0 | 0 | 0 | 1 | 1 | 1 | 0 | 0 | 0 | 0 | 0 | 0 | 0 | 0 | 0 | 0 |
| 029 | 0 | 0 | 0 | 1 | 1 | 1 | 0 | 1 | 0 | 0 | 0 | 0 | 0 | 0 | 0 | 0 |
| 030 | 0 | 0 | 0 | 1 | 1 | 1 | 1 | 0 | 1 | 0 | 1 | 1 | 0 | 0 | 0 | 1 |
| 031 | 0 | 0 | 0 | 1 | 1 | 1 | 1 | 1 | 0 | 1 | 1 | 1 | 1 | 1 | 1 | 1 |
| 032 | 0 | 0 | 1 | 0 | 0 | 0 | 0 | 0 | 0 | 1 | 0 | 1 | 0 | 0 | 1 | 1 |
| 033 | 0 | 0 | 1 | 0 | 0 | 0 | 0 | 1 | 0 | 0 | 0 | 0 | 0 | 0 | 0 | 0 |
| 034 | 0 | 0 | 1 | 0 | 0 | 0 | 1 | 0 | 0 | 0 | 0 | 0 | 0 | 0 | 0 | 0 |
| 035 | 0 | 0 | 1 | 0 | 0 | 0 | 1 | 1 | 0 | 0 | 0 | 0 | 0 | 0 | 0 | 0 |
| 036 | 0 | 0 | 1 | 0 | 0 | 1 | 0 | 0 | 0 | 0 | 0 | 0 | 0 | 0 | 0 | 0 |
| 037 | 0 | 0 | 1 | 0 | 0 | 1 | 0 | 1 | 0 | 0 | 0 | 0 | 0 | 0 | 0 | 0 |
| 038 | 0 | 0 | 1 | 0 | 0 | 1 | 1 | 0 | 0 | 0 | 0 | 0 | 0 | 0 | 0 | 0 |
| 039 | 0 | 0 | 1 | 0 | 0 | 1 | 1 | 1 | 0 | 0 | 0 | 0 | 0 | 0 | 0 | 0 |
| 040 | 0 | 0 | 1 | 0 | 1 | 0 | 0 | 0 | 0 | 0 | 1 | 0 | 1 | 0 | 0 | 0 |
| 041 | 0 | 0 | 1 | 0 | 1 | 0 | 0 | 1 | 1 | 0 | 0 | 0 | 1 | 0 | 1 | 0 |
| 042 | 0 | 0 | 1 | 0 | 1 | 0 | 1 | 0 | 0 | 0 | 0 | 0 | 0 | 0 | 0 | 0 |
| 043 | 0 | 0 | 1 | 0 | 1 | 0 | 1 | 1 | 0 | 0 | 0 | 0 | 0 | 0 | 0 | 0 |
| 044 | 0 | 0 | 1 | 0 | 1 | 1 | 0 | 0 | 0 | 0 | 0 | 0 | 0 | 0 | 0 | 0 |
| 045 | 0 | 0 | 1 | 0 | 1 | 1 | 0 | 1 | 0 | 0 | 0 | 0 | 0 | 0 | 0 | 0 |
| 046 | 0 | 0 | 1 | 0 | 1 | 1 | 1 | 0 | 1 | 0 | 1 | 1 | 0 | 1 | 1 | 0 |
| 047 | 0 | 0 | 1 | 0 | 1 | 1 | 1 | 1 | 0 | 1 | 1 | 1 | 1 | 1 | 1 | 1 |
| 048 | 0 | 0 | 1 | 1 | 0 | 0 | 0 | 0 | 0 | 1 | 0 | 1 | 0 | 0 | 0 | 1 |
| 049 | 0 | 0 | 1 | 1 | 0 | 0 | 0 | 1 | 0 | 0 | 0 | 0 | 0 | 0 | 0 | 0 |
| 050 | 0 | 0 | 1 | 1 | 0 | 0 | 1 | 0 | 0 | 0 | 0 | 0 | 0 | 0 | 0 | 0 |
| 051 | 0 | 0 | 1 | 1 | 0 | 0 | 1 | 1 | 1 | 0 | 1 | 0 | 1 | 0 | 0 | 0 |
| 052 | 0 | 0 | 1 | 1 | 0 | 1 | 0 | 0 | 0 | 0 | 0 | 0 | 0 | 0 | 0 | 0 |
| 053 | 0 | 0 | 1 | 1 | 0 | 1 | 0 | 1 | 0 | 0 | 0 | 0 | 0 | 0 | 0 | 0 |
| 054 | 0 | 0 | 1 | 1 | 0 | 1 | 1 | 0 | 0 | 0 | 0 | 0 | 0 | 0 | 0 | 0 |
| 055 | 0 | 0 | 1 | 1 | 0 | 1 | 1 | 1 | 0 | 0 | 0 | 0 | 0 | 0 | 0 | 0 |
| 056 | 0 | 0 | 1 | 1 | 1 | 0 | 0 | 0 | 0 | 0 | 0 | 0 | 0 | 0 | 0 | 0 |
| 057 | 0 | 0 | 1 | 1 | 1 | 0 | 0 | 1 | 0 | 0 | 0 | 0 | 0 | 0 | 0 | 0 |
| 058 | 0 | 0 | 1 | 1 | 1 | 0 | 1 | 0 | 0 | 0 | 0 | 0 | 0 | 0 | 0 | 0 |
| 059 | 0 | 0 | 1 | 1 | 1 | 0 | 1 | 1 | 0 | 0 | 1 | 0 | 0 | 0 | 1 | 0 |
| 060 | 0 | 0 | 1 | 1 | 1 | 1 | 0 | 0 | 0 | 0 | 0 | 0 | 0 | 0 | 0 | 0 |
| 061 | 0 | 0 | 1 | 1 | 1 | 1 | 0 | 1 | 1 | 0 | 1 | 0 | 0 | 0 | 1 | 0 |

Table 8a-continued

ROM program for circuit 13.

| Address Nr. ↓ | X A8 17 | W A7 18 | V A6 19 | U A5 20 | N A4 21 | M A3 1 | L A2 2 | K A1 3 | A* B8 11 | A* B7 10 | B* B6 9 | B* B5 8 | C* B4 7 | C* B3 6 | D* B2 5 | D* B1 4 |
|---|---|---|---|---|---|---|---|---|---|---|---|---|---|---|---|---|
| 062 | 0 | 0 | 1 | 1 | 1 | 1 | 1 | 0 | 0 | 0 | 0 | 1 | 0 | 1 | 0 | 1 |
| 063 | 0 | 0 | 1 | 1 | 1 | 1 | 1 | 1 | 0 | 1 | 0 | 1 | 0 | 1 | 0 | 1 |

Table 8b

ROM program for circuit 13.

| Address Nr. ↓ | X A8 17 | W A7 18 | V A6 15 | U A5 20 | N A4 21 | M A3 1 | L A2 2 | K A1 3 | A* B8 11 | A* B7 10 | B* B6 9 | B* B5 8 | C* B4 7 | C* B3 6 | D* B2 5 | D* B1 4 |
|---|---|---|---|---|---|---|---|---|---|---|---|---|---|---|---|---|
| 064 | 0 | 1 | 0 | 0 | 0 | 0 | 0 | 0 | 0 | 0 | 0 | 0 | 0 | 0 | 0 | 0 |
| 065 | 0 | 1 | 0 | 0 | 0 | 0 | 0 | 1 | 0 | 1 | 0 | 1 | 0 | 0 | 0 | 1 |
| 066 | 0 | 1 | 0 | 0 | 0 | 0 | 1 | 0 | 0 | 0 | 0 | 0 | 0 | 0 | 0 | 0 |
| 067 | 0 | 1 | 0 | 0 | 0 | 0 | 1 | 1 | 1 | 0 | 1 | 0 | 1 | 0 | 0 | 0 |
| 068 | 0 | 1 | 0 | 0 | 0 | 1 | 0 | 0 | 0 | 0 | 0 | 0 | 0 | 0 | 0 | 0 |
| 069 | 0 | 1 | 0 | 0 | 0 | 1 | 0 | 1 | 0 | 0 | 0 | 0 | 0 | 0 | 0 | 0 |
| 070 | 0 | 1 | 0 | 0 | 0 | 1 | 1 | 0 | 0 | 0 | 0 | 0 | 0 | 0 | 0 | 0 |
| 071 | 0 | 1 | 0 | 0 | 0 | 1 | 1 | 1 | 0 | 0 | 0 | 0 | 0 | 0 | 0 | 0 |
| 072 | 0 | 1 | 0 | 0 | 1 | 0 | 0 | 0 | 0 | 0 | 0 | 0 | 0 | 0 | 0 | 0 |
| 073 | 0 | 1 | 0 | 0 | 1 | 0 | 0 | 1 | 0 | 0 | 0 | 0 | 0 | 0 | 0 | 0 |
| 074 | 0 | 1 | 0 | 0 | 1 | 0 | 1 | 0 | 0 | 0 | 0 | 0 | 0 | 0 | 0 | 0 |
| 075 | 0 | 1 | 0 | 0 | 1 | 0 | 1 | 1 | 0 | 0 | 1 | 0 | 0 | 0 | 1 | 0 |
| 076 | 0 | 1 | 0 | 0 | 1 | 1 | 0 | 0 | 0 | 0 | 0 | 0 | 0 | 0 | 1 | 0 |
| 077 | 0 | 1 | 0 | 0 | 1 | 1 | 0 | 1 | 1 | 0 | 1 | 0 | 0 | 0 | 1 | 0 |
| 078 | 0 | 1 | 0 | 0 | 1 | 1 | 1 | 0 | 0 | 0 | 0 | 1 | 0 | 1 | 0 | 1 |
| 079 | 0 | 1 | 0 | 0 | 1 | 1 | 1 | 1 | 0 | 1 | 0 | 1 | 0 | 1 | 0 | 1 |
| 080 | 0 | 1 | 0 | 1 | 0 | 0 | 0 | 0 | 0 | 1 | 0 | 1 | 0 | 0 | 0 | 0 |
| 081 | 0 | 1 | 0 | 1 | 0 | 0 | 0 | 1 | 0 | 0 | 0 | 0 | 0 | 0 | 0 | 0 |
| 082 | 0 | 1 | 0 | 1 | 0 | 0 | 1 | 0 | 0 | 0 | 0 | 0 | 0 | 0 | 0 | 0 |
| 083 | 0 | 1 | 0 | 1 | 0 | 0 | 1 | 1 | 1 | 0 | 1 | 0 | 1 | 0 | 0 | 0 |
| 084 | 0 | 1 | 0 | 1 | 0 | 1 | 0 | 0 | 0 | 0 | 0 | 0 | 0 | 0 | 0 | 0 |
| 085 | 0 | 1 | 0 | 1 | 0 | 1 | 0 | 1 | 0 | 0 | 0 | 0 | 0 | 0 | 0 | 0 |
| 086 | 0 | 1 | 0 | 1 | 0 | 1 | 1 | 0 | 0 | 0 | 0 | 0 | 0 | 0 | 0 | 0 |
| 087 | 0 | 1 | 0 | 1 | 0 | 1 | 1 | 1 | 0 | 0 | 0 | 0 | 0 | 0 | 0 | 0 |
| 088 | 0 | 1 | 0 | 1 | 1 | 0 | 0 | 0 | 0 | 0 | 0 | 0 | 0 | 0 | 0 | 0 |
| 089 | 0 | 1 | 0 | 1 | 1 | 0 | 0 | 1 | 0 | 0 | 0 | 0 | 0 | 0 | 0 | 0 |
| 090 | 0 | 1 | 0 | 1 | 1 | 0 | 1 | 0 | 0 | 0 | 0 | 0 | 0 | 0 | 0 | 0 |
| 091 | 0 | 1 | 0 | 1 | 1 | 0 | 1 | 1 | 0 | 0 | 1 | 0 | 0 | 0 | 1 | 0 |
| 092 | 0 | 1 | 0 | 1 | 1 | 1 | 0 | 0 | 0 | 0 | 0 | 0 | 1 | 0 | 0 | 0 |
| 093 | 0 | 1 | 0 | 1 | 1 | 1 | 0 | 1 | 1 | 0 | 1 | 0 | 0 | 0 | 1 | 0 |
| 094 | 0 | 1 | 0 | 1 | 1 | 1 | 1 | 0 | 0 | 0 | 0 | 0 | 0 | 0 | 0 | 0 |
| 095 | 0 | 1 | 0 | 1 | 1 | 1 | 1 | 1 | 0 | 1 | 0 | 0 | 0 | 0 | 0 | 0 |
| 096 | 0 | 1 | 1 | 0 | 0 | 0 | 0 | 0 | 0 | 1 | 0 | 1 | 0 | 0 | 0 | 0 |
| 097 | 0 | 1 | 1 | 0 | 0 | 0 | 0 | 1 | 0 | 0 | 0 | 0 | 0 | 0 | 0 | 0 |
| 098 | 0 | 1 | 1 | 0 | 0 | 0 | 1 | 0 | 0 | 0 | 0 | 0 | 0 | 0 | 0 | 0 |
| 099 | 0 | 1 | 1 | 0 | 0 | 0 | 1 | 1 | 1 | 0 | 1 | 0 | 1 | 0 | 0 | 0 |
| 100 | 0 | 1 | 1 | 0 | 0 | 1 | 0 | 0 | 0 | 0 | 0 | 0 | 0 | 0 | 0 | 0 |
| 101 | 0 | 1 | 1 | 0 | 0 | 1 | 0 | 1 | 0 | 0 | 0 | 0 | 0 | 0 | 0 | 0 |
| 102 | 0 | 1 | 1 | 0 | 0 | 1 | 1 | 0 | 0 | 0 | 0 | 0 | 0 | 0 | 0 | 0 |
| 103 | 0 | 1 | 1 | 0 | 0 | 1 | 1 | 1 | 0 | 0 | 0 | 0 | 0 | 0 | 0 | 0 |
| 104 | 0 | 1 | 1 | 0 | 1 | 0 | 0 | 0 | 0 | 0 | 0 | 0 | 0 | 0 | 0 | 0 |
| 105 | 0 | 1 | 1 | 0 | 1 | 0 | 0 | 1 | 0 | 0 | 0 | 0 | 0 | 0 | 0 | 0 |
| 106 | 0 | 1 | 1 | 0 | 1 | 0 | 1 | 0 | 0 | 0 | 0 | 0 | 0 | 0 | 0 | 0 |
| 107 | 0 | 1 | 1 | 0 | 1 | 0 | 1 | 1 | 0 | 0 | 1 | 0 | 0 | 0 | 1 | 0 |
| 108 | 0 | 1 | 1 | 0 | 1 | 1 | 0 | 0 | 0 | 0 | 0 | 0 | 1 | 0 | 1 | 0 |
| 109 | 0 | 1 | 1 | 0 | 1 | 1 | 0 | 1 | 1 | 0 | 1 | 0 | 0 | 0 | 1 | 0 |
| 110 | 0 | 1 | 1 | 0 | 1 | 1 | 1 | 0 | 0 | 0 | 0 | 0 | 0 | 0 | 0 | 0 |
| 111 | 0 | 1 | 1 | 0 | 1 | 1 | 1 | 1 | 0 | 0 | 0 | 1 | 0 | 1 | 0 | 1 |
| 112 | 0 | 1 | 1 | 1 | 0 | 0 | 0 | 0 | 0 | 1 | 0 | 1 | 0 | 0 | 0 | 0 |
| 113 | 0 | 1 | 1 | 1 | 0 | 0 | 0 | 1 | 0 | 0 | 0 | 0 | 0 | 0 | 0 | 0 |
| 114 | 0 | 1 | 1 | 1 | 0 | 0 | 1 | 0 | 0 | 0 | 0 | 0 | 0 | 0 | 0 | 0 |
| 115 | 0 | 1 | 1 | 1 | 0 | 0 | 1 | 1 | 1 | 0 | 1 | 0 | 1 | 0 | 1 | 0 |
| 116 | 0 | 1 | 1 | 1 | 0 | 1 | 0 | 0 | 0 | 0 | 0 | 0 | 0 | 0 | 0 | 0 |
| 117 | 0 | 1 | 1 | 1 | 0 | 1 | 0 | 1 | 0 | 0 | 0 | 0 | 0 | 0 | 0 | 0 |
| 118 | 0 | 1 | 1 | 1 | 0 | 1 | 1 | 0 | 0 | 0 | 0 | 0 | 0 | 0 | 0 | 0 |
| 119 | 0 | 1 | 1 | 1 | 0 | 1 | 1 | 1 | 0 | 0 | 0 | 0 | 0 | 0 | 0 | 0 |
| 120 | 0 | 1 | 1 | 1 | 1 | 0 | 0 | 0 | 0 | 0 | 0 | 0 | 0 | 0 | 0 | 0 |
| 121 | 0 | 1 | 1 | 1 | 1 | 0 | 0 | 1 | 0 | 0 | 0 | 0 | 0 | 0 | 0 | 0 |
| 122 | 0 | 1 | 1 | 1 | 1 | 0 | 1 | 0 | 0 | 0 | 0 | 0 | 0 | 0 | 0 | 0 |
| 123 | 0 | 1 | 1 | 1 | 1 | 0 | 1 | 1 | 0 | 0 | 1 | 0 | 0 | 0 | 0 | 0 |
| 124 | 0 | 1 | 1 | 1 | 1 | 1 | 0 | 0 | 0 | 0 | 0 | 0 | 0 | 0 | 1 | 0 |
| 125 | 0 | 1 | 1 | 1 | 1 | 1 | 0 | 1 | 0 | 0 | 0 | 0 | 0 | 0 | 0 | 0 |
| 126 | 0 | 1 | 1 | 1 | 1 | 1 | 1 | 0 | 0 | 0 | 0 | 0 | 0 | 0 | 0 | 0 |
| 127 | 0 | 1 | 1 | 1 | 1 | 1 | 1 | 1 | 0 | 0 | 0 | 1 | 0 | 1 | 0 | 0 |

Table 8c

ROM program for circuit 13.

| Address Nr. ↓ | X A8 17 | W A7 18 | V A6 15 | U A5 20 | N A4 21 | M A3 1 | L A2 2 | K A1 3 | A* B8 11 | A* B7 10 | B* B6 9 | B* B5 8 | C* B4 7 | C* B3 6 | D* B2 5 | D* B1 4 |
|---|---|---|---|---|---|---|---|---|---|---|---|---|---|---|---|---|
| 128 | 1 | 0 | 0 | 0 | 0 | 0 | 0 | 0 | 0 | 0 | 0 | 0 | 0 | 0 | 0 | 0 |
| 129 | 1 | 0 | 0 | 0 | 0 | 0 | 0 | 1 | 0 | 1 | 0 | 1 | 0 | 0 | 0 | 1 |
| 130 | 1 | 0 | 0 | 0 | 0 | 0 | 1 | 0 | 0 | 0 | 0 | 0 | 0 | 0 | 0 | 0 |
| 131 | 1 | 0 | 0 | 0 | 0 | 0 | 1 | 1 | 1 | 0 | 1 | 0 | 1 | 0 | 1 | 0 |
| 132 | 1 | 0 | 0 | 0 | 0 | 1 | 0 | 0 | 0 | 0 | 0 | 0 | 0 | 0 | 0 | 0 |

Table 8c-continued

ROM program for circuit 13.

| Address Nr. ↓ | X A8 17 | W A7 18 | V A6 15 | U A5 20 | N A4 21 | M A3 1 | L A2 2 | K A1 3 | A* B8 11 | A* B7 10 | B* B6 9 | B* B5 8 | C* B4 7 | C* B3 6 | D* B2 5 | D* B1 4 |
|---|---|---|---|---|---|---|---|---|---|---|---|---|---|---|---|---|
| 133 | 1 | 0 | 0 | 0 | 0 | 1 | 0 | 1 | 0 | 0 | 0 | 0 | 0 | 0 | 0 | 0 |
| 134 | 1 | 0 | 0 | 0 | 0 | 1 | 1 | 0 | 0 | 0 | 0 | 0 | 0 | 0 | 0 | 0 |
| 135 | 1 | 0 | 0 | 0 | 0 | 1 | 1 | 1 | 0 | 0 | 0 | 0 | 0 | 0 | 0 | 0 |
| 136 | 1 | 0 | 0 | 0 | 1 | 0 | 0 | 0 | 0 | 0 | 0 | 0 | 0 | 0 | 0 | 0 |
| 137 | 1 | 0 | 0 | 0 | 1 | 0 | 0 | 1 | 0 | 0 | 0 | 0 | 0 | 0 | 0 | 0 |
| 138 | 1 | 0 | 0 | 0 | 1 | 0 | 1 | 0 | 0 | 0 | 0 | 0 | 0 | 0 | 0 | 0 |
| 139 | 1 | 0 | 0 | 0 | 1 | 0 | 1 | 1 | 0 | 0 | 1 | 0 | 0 | 0 | 0 | 0 |
| 140 | 1 | 0 | 0 | 0 | 1 | 1 | 0 | 0 | 0 | 0 | 0 | 0 | 1 | 0 | 0 | 0 |
| 141 | 1 | 0 | 0 | 0 | 1 | 1 | 0 | 1 | 0 | 0 | 0 | 0 | 0 | 0 | 0 | 0 |
| 142 | 1 | 0 | 0 | 0 | 1 | 1 | 1 | 0 | 0 | 0 | 0 | 0 | 0 | 0 | 0 | 0 |
| 143 | 1 | 0 | 0 | 0 | 1 | 1 | 1 | 1 | 0 | 0 | 0 | 1 | 0 | 1 | 0 | 0 |
| 144 | 1 | 0 | 0 | 1 | 0 | 0 | 0 | 0 | 0 | 0 | 0 | 1 | 0 | 0 | 0 | 0 |
| 145 | 1 | 0 | 0 | 1 | 0 | 0 | 0 | 1 | 0 | 0 | 0 | 0 | 0 | 0 | 0 | 0 |
| 146 | 1 | 0 | 0 | 1 | 0 | 0 | 1 | 0 | 0 | 1 | 0 | 1 | 0 | 1 | 0 | 1 |
| 147 | 1 | 0 | 0 | 1 | 0 | 0 | 1 | 1 | 1 | 0 | 1 | 0 | 1 | 0 | 1 | 0 |
| 148 | 1 | 0 | 0 | 1 | 0 | 1 | 0 | 0 | 0 | 0 | 0 | 0 | 0 | 0 | 0 | 0 |
| 149 | 1 | 0 | 0 | 1 | 0 | 1 | 0 | 1 | 0 | 0 | 0 | 0 | 0 | 0 | 0 | 0 |
| 150 | 1 | 0 | 0 | 1 | 0 | 1 | 1 | 0 | 0 | 0 | 0 | 0 | 0 | 0 | 0 | 0 |
| 151 | 1 | 0 | 0 | 1 | 0 | 1 | 1 | 1 | 0 | 0 | 0 | 0 | 0 | 0 | 0 | 0 |
| 152 | 1 | 0 | 0 | 1 | 1 | 0 | 0 | 0 | 0 | 0 | 0 | 0 | 0 | 0 | 0 | 0 |
| 153 | 1 | 0 | 0 | 1 | 1 | 0 | 0 | 1 | 0 | 0 | 0 | 0 | 0 | 0 | 0 | 0 |
| 154 | 1 | 0 | 0 | 1 | 1 | 0 | 1 | 0 | 0 | 0 | 0 | 0 | 0 | 0 | 0 | 0 |
| 155 | 1 | 0 | 0 | 1 | 1 | 0 | 1 | 1 | 0 | 0 | 1 | 0 | 0 | 0 | 0 | 0 |
| 156 | 1 | 0 | 0 | 1 | 1 | 1 | 0 | 0 | 0 | 0 | 0 | 0 | 1 | 0 | 1 | 0 |
| 157 | 1 | 0 | 0 | 1 | 1 | 1 | 0 | 1 | 0 | 0 | 0 | 0 | 0 | 0 | 0 | 0 |
| 158 | 1 | 0 | 0 | 1 | 1 | 1 | 1 | 0 | 0 | 0 | 0 | 0 | 0 | 0 | 0 | 0 |
| 159 | 1 | 0 | 0 | 1 | 1 | 1 | 1 | 1 | 0 | 0 | 0 | 0 | 0 | 0 | 0 | 0 |
| 160 | 1 | 0 | 1 | 0 | 0 | 0 | 0 | 0 | 0 | 0 | 0 | 1 | 0 | 1 | 0 | 1 |
| 161 | 1 | 0 | 1 | 0 | 0 | 0 | 0 | 1 | 0 | 0 | 0 | 0 | 0 | 0 | 0 | 0 |
| 162 | 1 | 0 | 1 | 0 | 0 | 0 | 1 | 0 | 0 | 1 | 0 | 0 | 0 | 1 | 0 | 0 |
| 163 | 1 | 0 | 1 | 0 | 0 | 0 | 1 | 1 | 1 | 0 | 1 | 0 | 1 | 0 | 1 | 0 |
| 164 | 1 | 0 | 1 | 0 | 0 | 1 | 0 | 0 | 0 | 0 | 0 | 0 | 0 | 0 | 0 | 0 |
| 165 | 1 | 0 | 1 | 0 | 0 | 1 | 0 | 1 | 0 | 0 | 0 | 0 | 0 | 0 | 0 | 0 |
| 166 | 1 | 0 | 1 | 0 | 0 | 1 | 1 | 0 | 0 | 0 | 0 | 0 | 0 | 0 | 0 | 0 |
| 167 | 1 | 0 | 1 | 0 | 0 | 1 | 1 | 1 | 0 | 0 | 0 | 0 | 0 | 0 | 0 | 0 |
| 168 | 1 | 0 | 1 | 0 | 1 | 0 | 0 | 0 | 0 | 0 | 0 | 0 | 0 | 0 | 0 | 0 |
| 169 | 1 | 0 | 1 | 0 | 1 | 0 | 0 | 1 | 0 | 0 | 0 | 0 | 0 | 0 | 0 | 0 |
| 170 | 1 | 0 | 1 | 0 | 1 | 0 | 1 | 0 | 0 | 0 | 0 | 0 | 0 | 0 | 0 | 0 |
| 171 | 1 | 0 | 1 | 0 | 1 | 0 | 1 | 1 | 0 | 0 | 1 | 0 | 0 | 0 | 0 | 0 |
| 172 | 1 | 0 | 1 | 0 | 1 | 1 | 0 | 0 | 0 | 0 | 1 | 0 | 0 | 0 | 0 | 0 |
| 173 | 1 | 0 | 1 | 0 | 1 | 1 | 0 | 1 | 0 | 0 | 0 | 0 | 0 | 0 | 0 | 0 |
| 174 | 1 | 0 | 1 | 0 | 1 | 1 | 1 | 0 | 0 | 0 | 0 | 0 | 0 | 0 | 0 | 0 |
| 175 | 1 | 0 | 1 | 0 | 1 | 1 | 1 | 1 | 0 | 0 | 0 | 0 | 0 | 0 | 0 | 0 |
| 176 | 1 | 0 | 1 | 1 | 0 | 0 | 0 | 0 | 1 | 0 | 1 | 1 | 0 | 1 | 1 | 1 |
| 177 | 1 | 0 | 1 | 1 | 0 | 0 | 0 | 1 | 0 | 0 | 0 | 0 | 0 | 0 | 0 | 0 |
| 178 | 1 | 0 | 1 | 1 | 0 | 0 | 1 | 0 | 0 | 0 | 0 | 1 | 0 | 1 | 0 | 1 |
| 179 | 1 | 0 | 1 | 1 | 0 | 0 | 1 | 1 | 0 | 0 | 0 | 0 | 0 | 0 | 0 | 0 |
| 180 | 1 | 0 | 1 | 1 | 0 | 1 | 0 | 0 | 0 | 0 | 0 | 0 | 0 | 0 | 0 | 0 |
| 181 | 1 | 0 | 1 | 1 | 0 | 1 | 0 | 1 | 0 | 0 | 0 | 0 | 0 | 0 | 0 | 0 |
| 182 | 1 | 0 | 1 | 1 | 0 | 1 | 1 | 0 | 0 | 0 | 0 | 0 | 0 | 0 | 0 | 0 |
| 183 | 1 | 0 | 1 | 1 | 0 | 1 | 1 | 1 | 0 | 0 | 0 | 0 | 0 | 0 | 0 | 0 |
| 184 | 1 | 0 | 1 | 1 | 1 | 0 | 0 | 0 | 0 | 0 | 0 | 0 | 0 | 0 | 0 | 0 |
| 185 | 1 | 0 | 1 | 1 | 1 | 0 | 0 | 1 | 0 | 0 | 0 | 0 | 0 | 0 | 0 | 0 |
| 186 | 1 | 0 | 1 | 1 | 1 | 0 | 1 | 0 | 0 | 0 | 0 | 0 | 0 | 0 | 0 | 0 |
| 187 | 1 | 0 | 1 | 1 | 1 | 0 | 1 | 1 | 0 | 0 | 0 | 0 | 0 | 0 | 0 | 0 |
| 188 | 1 | 0 | 1 | 1 | 1 | 1 | 0 | 0 | 0 | 0 | 0 | 0 | 0 | 0 | 1 | 0 |
| 189 | 1 | 0 | 1 | 1 | 1 | 1 | 0 | 1 | 0 | 0 | 0 | 0 | 0 | 0 | 0 | 0 |
| 190 | 1 | 0 | 1 | 1 | 1 | 1 | 1 | 0 | 0 | 0 | 0 | 0 | 0 | 0 | 0 | 0 |
| 191 | 1 | 0 | 1 | 1 | 1 | 1 | 1 | 1 | 1 | 0 | 1 | 0 | 1 | 0 | 1 | 0 |

Table 8d

ROM program for circuit 13.

| Address Nr. ↓ | X A8 17 | W A7 18 | V A6 19 | U A5 20 | N A4 21 | M A3 1 | L A2 2 | K A1 3 | A* B8 11 | A* B7 10 | B* B6 9 | B* B5 8 | C* B4 7 | C* B3 6 | D* B2 5 | D* B1 4 |
|---|---|---|---|---|---|---|---|---|---|---|---|---|---|---|---|---|
| 192 | 1 | 1 | 0 | 0 | 0 | 0 | 0 | 0 | 1 | 1 | 1 | 0 | 0 | 0 | 1 | 0 |
| 193 | 1 | 1 | 0 | 0 | 0 | 0 | 0 | 1 | 0 | 0 | 0 | 0 | 0 | 0 | 0 | 0 |
| 194 | 1 | 1 | 0 | 0 | 0 | 0 | 1 | 0 | 0 | 0 | 0 | 1 | 0 | 0 | 0 | 0 |
| 195 | 1 | 1 | 0 | 0 | 0 | 0 | 1 | 1 | 0 | 0 | 0 | 0 | 0 | 0 | 0 | 0 |
| 196 | 1 | 1 | 0 | 0 | 0 | 1 | 0 | 0 | 0 | 0 | 0 | 0 | 0 | 0 | 0 | 0 |
| 197 | 1 | 1 | 0 | 0 | 0 | 1 | 0 | 1 | 0 | 0 | 0 | 0 | 0 | 0 | 0 | 0 |
| 198 | 1 | 1 | 0 | 0 | 0 | 1 | 1 | 0 | 0 | 0 | 0 | 0 | 0 | 0 | 0 | 0 |
| 199 | 1 | 1 | 0 | 0 | 0 | 1 | 1 | 1 | 0 | 0 | 0 | 0 | 0 | 0 | 0 | 0 |
| 200 | 1 | 1 | 0 | 0 | 1 | 0 | 0 | 0 | 0 | 0 | 0 | 0 | 0 | 0 | 0 | 0 |
| 201 | 1 | 1 | 0 | 0 | 1 | 0 | 0 | 1 | 0 | 0 | 0 | 0 | 0 | 0 | 0 | 0 |
| 202 | 1 | 1 | 0 | 0 | 1 | 0 | 1 | 0 | 0 | 0 | 0 | 0 | 0 | 0 | 0 | 0 |
| 203 | 1 | 1 | 0 | 0 | 1 | 0 | 1 | 1 | 0 | 0 | 0 | 0 | 0 | 0 | 0 | 0 |
| 204 | 1 | 1 | 0 | 0 | 1 | 1 | 0 | 0 | 0 | 0 | 0 | 0 | 0 | 0 | 0 | 0 |
| 205 | 1 | 1 | 0 | 0 | 1 | 1 | 0 | 1 | 0 | 0 | 0 | 0 | 0 | 0 | 0 | 0 |
| 206 | 1 | 1 | 0 | 0 | 1 | 1 | 1 | 0 | 0 | 0 | 0 | 0 | 0 | 0 | 0 | 0 |
| 207 | 1 | 1 | 0 | 0 | 1 | 1 | 1 | 1 | 1 | 0 | 1 | 0 | 1 | 0 | 1 | 0 |
| 208 | 1 | 1 | 0 | 1 | 0 | 0 | 0 | 0 | 1 | 1 | 1 | 0 | 0 | 1 | 1 | 0 |
| 209 | 1 | 1 | 0 | 1 | 0 | 0 | 0 | 1 | 0 | 0 | 0 | 0 | 0 | 0 | 0 | 0 |
| 210 | 1 | 1 | 0 | 1 | 0 | 0 | 1 | 0 | 0 | 0 | 0 | 0 | 0 | 0 | 0 | 0 |
| 211 | 1 | 1 | 0 | 1 | 0 | 0 | 1 | 1 | 0 | 0 | 0 | 0 | 0 | 0 | 0 | 0 |
| 212 | 1 | 1 | 0 | 1 | 0 | 1 | 0 | 0 | 0 | 0 | 0 | 0 | 0 | 0 | 0 | 0 |

Table 8d-continued

| Address Nr. ↓ | X A8 17 | W A7 18 | V A6 19 | U A5 20 | N A4 21 | M A3 1 | L A2 2 | K A1 3 | A* B8 11 | A* B7 10 | B* B6 9 | B* B5 8 | C* B4 7 | C* B3 6 | D* B2 5 | D* B1 4 |
|---|---|---|---|---|---|---|---|---|---|---|---|---|---|---|---|---|
| | ROM program for circuit 13. | | | | | | | | | | | | | | | |
| 213 | 1 | 1 | 0 | 1 | 0 | 1 | 0 | 1 | 0 | 0 | 0 | 0 | 0 | 0 | 0 | 0 |
| 214 | 1 | 1 | 0 | 1 | 0 | 1 | 1 | 0 | 0 | 0 | 0 | 0 | 0 | 0 | 0 | 0 |
| 215 | 1 | 1 | 0 | 1 | 0 | 1 | 1 | 1 | 0 | 0 | 0 | 0 | 0 | 0 | 0 | 0 |
| 216 | 1 | 1 | 0 | 1 | 1 | 0 | 0 | 0 | 0 | 0 | 0 | 0 | 0 | 0 | 0 | 0 |
| 217 | 1 | 1 | 0 | 1 | 1 | 0 | 0 | 1 | 0 | 0 | 0 | 0 | 0 | 0 | 0 | 0 |
| 218 | 1 | 1 | 0 | 1 | 1 | 0 | 1 | 0 | 0 | 0 | 0 | 0 | 0 | 0 | 0 | 0 |
| 219 | 1 | 1 | 0 | 1 | 1 | 0 | 1 | 1 | 0 | 0 | 0 | 0 | 0 | 0 | 0 | 0 |
| 220 | 1 | 1 | 0 | 1 | 1 | 1 | 0 | 0 | 0 | 0 | 0 | 0 | 0 | 0 | 0 | 0 |
| 221 | 1 | 1 | 0 | 1 | 1 | 1 | 0 | 1 | 0 | 0 | 0 | 0 | 0 | 0 | 0 | 0 |
| 222 | 1 | 1 | 0 | 1 | 1 | 1 | 1 | 0 | 0 | 0 | 0 | 0 | 0 | 0 | 1 | 0 |
| 223 | 1 | 1 | 0 | 1 | 1 | 1 | 1 | 1 | 1 | 0 | 1 | 0 | 1 | 0 | 1 | 0 |
| 224 | 1 | 1 | 1 | 0 | 0 | 0 | 0 | 0 | 1 | 0 | 1 | 0 | 0 | 0 | 1 | 0 |
| 225 | 1 | 1 | 1 | 0 | 0 | 0 | 0 | 1 | 0 | 1 | 0 | 1 | 0 | 1 | 0 | 1 |
| 226 | 1 | 1 | 1 | 0 | 0 | 0 | 1 | 0 | 0 | 0 | 0 | 0 | 0 | 0 | 0 | 0 |
| 227 | 1 | 1 | 1 | 0 | 0 | 0 | 1 | 1 | 0 | 0 | 0 | 0 | 0 | 0 | 0 | 0 |
| 228 | 1 | 1 | 1 | 0 | 0 | 1 | 0 | 0 | 0 | 0 | 0 | 0 | 0 | 0 | 0 | 0 |
| 229 | 1 | 1 | 1 | 0 | 0 | 1 | 0 | 1 | 0 | 0 | 0 | 0 | 0 | 0 | 0 | 0 |
| 230 | 1 | 1 | 1 | 0 | 0 | 1 | 1 | 0 | 0 | 0 | 0 | 0 | 0 | 0 | 0 | 0 |
| 231 | 1 | 1 | 1 | 0 | 0 | 1 | 1 | 1 | 0 | 0 | 0 | 0 | 0 | 0 | 0 | 0 |
| 232 | 1 | 1 | 1 | 0 | 1 | 0 | 0 | 0 | 0 | 0 | 0 | 0 | 0 | 0 | 0 | 0 |
| 233 | 1 | 1 | 1 | 0 | 1 | 0 | 0 | 1 | 0 | 0 | 0 | 0 | 0 | 0 | 0 | 0 |
| 234 | 1 | 1 | 1 | 0 | 1 | 0 | 1 | 0 | 0 | 0 | 0 | 0 | 0 | 0 | 0 | 0 |
| 235 | 1 | 1 | 1 | 0 | 1 | 0 | 1 | 1 | 0 | 0 | 0 | 0 | 0 | 0 | 0 | 0 |
| 236 | 1 | 1 | 1 | 0 | 1 | 1 | 0 | 0 | 0 | 0 | 0 | 0 | 0 | 0 | 0 | 0 |
| 237 | 1 | 1 | 1 | 0 | 1 | 1 | 0 | 1 | 0 | 0 | 0 | 0 | 0 | 0 | 0 | 0 |
| 238 | 1 | 1 | 1 | 0 | 1 | 1 | 1 | 0 | 0 | 0 | 0 | 0 | 1 | 0 | 0 | 0 |
| 239 | 1 | 1 | 1 | 0 | 1 | 1 | 1 | 1 | 1 | 0 | 1 | 0 | 1 | 0 | 1 | 0 |
| 240 | 1 | 1 | 1 | 1 | 0 | 0 | 0 | 0 | 1 | 0 | 1 | 0 | 0 | 0 | 1 | 0 |
| 241 | 1 | 1 | 1 | 1 | 0 | 0 | 0 | 1 | 0 | 0 | 0 | 0 | 0 | 0 | 0 | 0 |
| 242 | 1 | 1 | 1 | 1 | 0 | 0 | 1 | 0 | 0 | 0 | 0 | 0 | 0 | 0 | 0 | 0 |
| 243 | 1 | 1 | 1 | 1 | 0 | 0 | 1 | 1 | 0 | 0 | 0 | 0 | 0 | 0 | 0 | 0 |
| 244 | 1 | 1 | 1 | 1 | 0 | 1 | 0 | 0 | 0 | 0 | 0 | 0 | 0 | 0 | 0 | 0 |
| 245 | 1 | 1 | 1 | 1 | 0 | 1 | 0 | 1 | 0 | 0 | 0 | 0 | 0 | 0 | 0 | 0 |
| 246 | 1 | 1 | 1 | 1 | 0 | 1 | 1 | 0 | 0 | 0 | 0 | 0 | 0 | 0 | 0 | 0 |
| 247 | 1 | 1 | 1 | 1 | 0 | 1 | 1 | 1 | 0 | 0 | 0 | 0 | 0 | 0 | 0 | 0 |
| 248 | 1 | 1 | 1 | 1 | 1 | 0 | 0 | 0 | 0 | 0 | 0 | 0 | 0 | 0 | 0 | 0 |
| 249 | 1 | 1 | 1 | 1 | 1 | 0 | 0 | 1 | 0 | 0 | 0 | 0 | 0 | 0 | 0 | 0 |
| 250 | 1 | 1 | 1 | 1 | 1 | 0 | 1 | 0 | 0 | 0 | 0 | 0 | 0 | 0 | 0 | 0 |
| 251 | 1 | 1 | 1 | 1 | 1 | 0 | 1 | 1 | 0 | 0 | 0 | 0 | 0 | 0 | 0 | 0 |
| 252 | 1 | 1 | 1 | 1 | 1 | 1 | 0 | 0 | 0 | 0 | 0 | 0 | 0 | 0 | 0 | 0 |
| 253 | 1 | 1 | 1 | 1 | 1 | 1 | 0 | 1 | 0 | 0 | 0 | 0 | 0 | 0 | 0 | 0 |
| 254 | 1 | 1 | 1 | 1 | 1 | 1 | 1 | 0 | 0 | 0 | 0 | 0 | 1 | 0 | 1 | 0 |
| 255 | 1 | 1 | 1 | 1 | 1 | 1 | 1 | 1 | 1 | 0 | 1 | 0 | 1 | 0 | 1 | 0 |

Table 9a

| Address Nr. | X A8 17 | W A7 18 | V A6 19 | U A5 20 | N A4 21 | M A3 1 | L A2 2 | K A1 3 | A* B8 11 | A* B7 10 | B* B6 9 | B* B5 8 | C* B4 7 | C* B3 6 | D* B2 5 | D* B1 4 |
|---|---|---|---|---|---|---|---|---|---|---|---|---|---|---|---|---|
| | ROM program for circuit 14. | | | | | | | | | | | | | | | |
| 000 | 0 | 0 | 0 | 0 | 0 | 0 | 0 | 0 | 0 | 0 | 0 | 0 | 0 | 1 | 1 | 0 |
| 001 | 0 | 0 | 0 | 0 | 0 | 0 | 0 | 1 | 0 | 0 | 0 | 0 | 0 | 0 | 0 | 1 |
| 002 | 0 | 0 | 0 | 0 | 0 | 0 | 1 | 0 | 0 | 0 | 0 | 0 | 0 | 1 | 1 | 1 |
| 003 | 0 | 0 | 0 | 0 | 0 | 0 | 1 | 1 | 0 | 0 | 0 | 1 | 0 | 0 | 1 | 1 |
| 004 | 0 | 0 | 0 | 0 | 0 | 1 | 0 | 0 | 0 | 0 | 0 | 0 | 0 | 0 | 0 | 0 |
| 005 | 0 | 0 | 0 | 0 | 0 | 1 | 0 | 1 | 0 | 0 | 0 | 0 | 0 | 0 | 0 | 0 |
| 006 | 0 | 0 | 0 | 0 | 0 | 1 | 1 | 0 | 0 | 0 | 0 | 0 | 0 | 0 | 0 | 0 |
| 007 | 0 | 0 | 0 | 0 | 0 | 1 | 1 | 1 | 0 | 0 | 0 | 0 | 0 | 0 | 0 | 0 |
| 008 | 0 | 0 | 0 | 0 | 1 | 0 | 0 | 0 | 0 | 1 | 0 | 0 | 1 | 0 | 0 | 0 |
| 009 | 0 | 0 | 0 | 0 | 1 | 0 | 0 | 1 | 0 | 1 | 0 | 0 | 1 | 0 | 1 | 1 |
| 010 | 0 | 0 | 0 | 0 | 1 | 0 | 1 | 0 | 0 | 0 | 0 | 1 | 1 | 1 | 0 | 1 |
| 011 | 0 | 0 | 0 | 0 | 1 | 0 | 1 | 1 | 0 | 0 | 0 | 1 | 1 | 1 | 0 | 0 |
| 012 | 0 | 0 | 0 | 0 | 1 | 1 | 0 | 0 | 0 | 1 | 0 | 0 | 1 | 1 | 1 | 0 |
| 013 | 0 | 0 | 0 | 0 | 1 | 1 | 0 | 1 | 0 | 1 | 0 | 0 | 1 | 1 | 1 | 0 |
| 014 | 0 | 0 | 0 | 0 | 1 | 1 | 1 | 0 | 0 | 1 | 0 | 0 | 1 | 1 | 1 | 1 |
| 015 | 0 | 0 | 0 | 0 | 1 | 1 | 1 | 1 | 0 | 1 | 0 | 0 | 1 | 1 | 1 | 1 |
| 016 | 0 | 0 | 0 | 1 | 0 | 0 | 0 | 0 | 0 | 0 | 0 | 0 | 0 | 1 | 1 | 0 |
| 017 | 0 | 0 | 0 | 1 | 0 | 0 | 0 | 1 | 0 | 0 | 0 | 0 | 0 | 0 | 0 | 1 |
| 018 | 0 | 0 | 0 | 1 | 0 | 0 | 1 | 0 | 0 | 0 | 0 | 1 | 0 | 0 | 1 | 0 |
| 019 | 0 | 0 | 0 | 1 | 0 | 0 | 1 | 1 | 0 | 0 | 0 | 1 | 0 | 0 | 1 | 1 |
| 020 | 0 | 0 | 0 | 1 | 0 | 1 | 0 | 0 | 0 | 0 | 0 | 0 | 0 | 0 | 0 | 0 |
| 021 | 0 | 0 | 0 | 1 | 0 | 1 | 0 | 1 | 0 | 0 | 0 | 0 | 0 | 0 | 0 | 0 |
| 022 | 0 | 0 | 0 | 1 | 0 | 1 | 1 | 0 | 0 | 0 | 0 | 0 | 0 | 0 | 0 | 0 |
| 023 | 0 | 0 | 0 | 1 | 0 | 1 | 1 | 1 | 0 | 0 | 0 | 0 | 0 | 0 | 0 | 0 |
| 024 | 0 | 0 | 0 | 1 | 1 | 0 | 0 | 0 | 0 | 1 | 0 | 0 | 1 | 0 | 0 | 0 |
| 025 | 0 | 0 | 0 | 1 | 1 | 0 | 0 | 1 | 0 | 1 | 0 | 0 | 1 | 1 | 1 | 0 |
| 026 | 0 | 0 | 0 | 1 | 1 | 0 | 1 | 0 | 0 | 1 | 0 | 0 | 1 | 0 | 0 | 0 |
| 027 | 0 | 0 | 0 | 1 | 1 | 0 | 1 | 1 | 0 | 0 | 0 | 1 | 1 | 1 | 0 | 0 |
| 028 | 0 | 0 | 0 | 1 | 1 | 1 | 0 | 0 | 0 | 1 | 0 | 0 | 1 | 1 | 1 | 1 |
| 029 | 0 | 0 | 0 | 1 | 1 | 1 | 0 | 1 | 0 | 1 | 0 | 0 | 1 | 1 | 1 | 0 |
| 030 | 0 | 0 | 0 | 1 | 1 | 1 | 1 | 0 | 0 | 1 | 0 | 0 | 1 | 1 | 1 | 1 |
| 031 | 0 | 0 | 0 | 1 | 1 | 1 | 1 | 1 | 0 | 1 | 0 | 1 | 1 | 0 | 1 | 0 |
| 032 | 0 | 0 | 1 | 0 | 0 | 0 | 0 | 0 | 0 | 0 | 0 | 0 | 0 | 1 | 1 | 0 |
| 033 | 0 | 0 | 1 | 0 | 0 | 0 | 0 | 1 | 0 | 0 | 0 | 0 | 0 | 0 | 0 | 1 |
| 034 | 0 | 0 | 1 | 0 | 0 | 0 | 1 | 0 | 0 | 0 | 0 | 1 | 0 | 0 | 1 | 0 |
| 035 | 0 | 0 | 1 | 0 | 0 | 0 | 1 | 1 | 0 | 0 | 0 | 1 | 0 | 0 | 1 | 1 |
| 036 | 0 | 0 | 1 | 0 | 0 | 1 | 0 | 0 | 0 | 0 | 0 | 0 | 0 | 0 | 0 | 0 |

Table 9a-continued

ROM program for circuit 14.

| Address Nr. | X A8 17 | W A7 18 | V A6 19 | U A5 20 | N A4 21 | M A3 1 | L A2 2 | K A1 3 | A* B8 11 | A* B7 10 | B* B6 9 | B* B5 8 | C* B4 7 | C* B3 6 | D* B2 5 | D* B1 4 |
|---|---|---|---|---|---|---|---|---|---|---|---|---|---|---|---|---|
| 037 | 0 | 0 | 1 | 0 | 0 | 1 | 0 | 1 | 0 | 0 | 0 | 0 | 0 | 0 | 0 | 0 |
| 038 | 0 | 0 | 1 | 0 | 0 | 1 | 1 | 0 | 0 | 0 | 0 | 0 | 0 | 0 | 0 | 0 |
| 039 | 0 | 0 | 1 | 0 | 0 | 1 | 1 | 1 | 0 | 0 | 0 | 0 | 0 | 0 | 0 | 0 |
| 040 | 0 | 0 | 1 | 0 | 1 | 0 | 0 | 0 | 0 | 1 | 0 | 0 | 1 | 0 | 0 | 1 |
| 041 | 0 | 0 | 1 | 0 | 1 | 0 | 0 | 1 | 0 | 1 | 0 | 0 | 1 | 1 | 1 | 0 |
| 042 | 0 | 0 | 1 | 0 | 1 | 0 | 1 | 0 | 0 | 1 | 0 | 0 | 1 | 0 | 0 | 0 |
| 043 | 0 | 0 | 1 | 0 | 1 | 0 | 1 | 1 | 0 | 0 | 0 | 1 | 1 | 1 | 0 | 1 |
| 044 | 0 | 0 | 1 | 0 | 1 | 1 | 0 | 0 | 0 | 1 | 0 | 1 | 1 | 0 | 1 | 0 |
| 045 | 0 | 0 | 1 | 0 | 1 | 1 | 0 | 1 | 0 | 1 | 0 | 0 | 1 | 1 | 1 | 1 |
| 046 | 0 | 0 | 1 | 0 | 1 | 1 | 1 | 0 | 0 | 1 | 0 | 1 | 1 | 0 | 1 | 0 |
| 047 | 0 | 0 | 1 | 0 | 1 | 1 | 1 | 1 | 0 | 1 | 0 | 1 | 1 | 0 | 1 | 0 |
| 048 | 0 | 0 | 1 | 1 | 0 | 0 | 0 | 0 | 0 | 0 | 0 | 0 | 0 | 1 | 1 | 1 |
| 049 | 0 | 0 | 1 | 1 | 0 | 0 | 0 | 1 | 0 | 0 | 0 | 0 | 0 | 0 | 0 | 1 |
| 050 | 0 | 0 | 1 | 1 | 0 | 0 | 1 | 0 | 0 | 0 | 0 | 1 | 0 | 0 | 1 | 0 |
| 051 | 0 | 0 | 1 | 1 | 0 | 0 | 1 | 1 | 0 | 0 | 0 | 1 | 0 | 1 | 1 | 0 |
| 052 | 0 | 0 | 1 | 1 | 0 | 1 | 0 | 0 | 0 | 0 | 0 | 0 | 0 | 0 | 0 | 0 |
| 053 | 0 | 0 | 1 | 1 | 0 | 1 | 0 | 1 | 0 | 0 | 0 | 0 | 0 | 0 | 0 | 0 |
| 054 | 0 | 0 | 1 | 1 | 0 | 1 | 1 | 0 | 0 | 0 | 0 | 0 | 0 | 0 | 0 | 0 |
| 055 | 0 | 0 | 1 | 1 | 0 | 1 | 1 | 1 | 0 | 0 | 0 | 0 | 0 | 0 | 0 | 0 |
| 056 | 0 | 0 | 1 | 1 | 1 | 0 | 0 | 0 | 0 | 1 | 0 | 0 | 1 | 1 | 0 | 0 |
| 057 | 0 | 0 | 1 | 1 | 1 | 0 | 0 | 1 | 0 | 1 | 0 | 0 | 1 | 1 | 1 | 0 |
| 058 | 0 | 0 | 1 | 1 | 1 | 0 | 1 | 0 | 0 | 1 | 0 | 0 | 1 | 0 | 0 | 0 |
| 059 | 0 | 0 | 1 | 1 | 1 | 0 | 1 | 1 | 0 | 0 | 0 | 1 | 1 | 1 | 0 | 1 |
| 060 | 0 | 0 | 1 | 1 | 1 | 1 | 0 | 0 | 0 | 1 | 0 | 1 | 1 | 0 | 1 | 0 |
| 061 | 0 | 0 | 1 | 1 | 1 | 1 | 0 | 1 | 0 | 1 | 0 | 1 | 1 | 0 | 1 | 0 |
| 062 | 0 | 0 | 1 | 1 | 1 | 1 | 1 | 0 | 0 | 1 | 0 | 1 | 1 | 0 | 1 | 0 |
| 063 | 0 | 0 | 1 | 1 | 1 | 1 | 1 | 1 | 0 | 1 | 0 | 1 | 1 | 0 | 1 | 1 |

Table 9b

ROM program for circuit 14.

| Address Nr. | X A8 17 | W A7 18 | V A6 15 | U A5 20 | N A4 21 | M A3 1 | L A2 2 | K A1 3 | A* B8 11 | A* B7 10 | B* B6 9 | B* B5 8 | C* B4 7 | C* B3 6 | D* B2 5 | D* B1 4 |
|---|---|---|---|---|---|---|---|---|---|---|---|---|---|---|---|---|
| 064 | 0 | 1 | 0 | 0 | 0 | 0 | 0 | 0 | 0 | 0 | 0 | 0 | 0 | 1 | 1 | 1 |
| 065 | 0 | 1 | 0 | 0 | 0 | 0 | 0 | 1 | 0 | 0 | 0 | 0 | 0 | 0 | 0 | 1 |
| 066 | 0 | 1 | 0 | 0 | 0 | 0 | 1 | 0 | 0 | 0 | 0 | 1 | 0 | 0 | 1 | 1 |
| 067 | 0 | 1 | 0 | 0 | 0 | 0 | 1 | 1 | 0 | 0 | 0 | 1 | 0 | 1 | 1 | 0 |
| 068 | 0 | 1 | 0 | 0 | 0 | 1 | 0 | 0 | 0 | 0 | 0 | 0 | 0 | 0 | 0 | 0 |
| 069 | 0 | 1 | 0 | 0 | 0 | 1 | 0 | 1 | 0 | 0 | 0 | 0 | 0 | 0 | 0 | 0 |
| 070 | 0 | 1 | 0 | 0 | 0 | 1 | 1 | 0 | 0 | 0 | 0 | 0 | 0 | 0 | 0 | 0 |
| 071 | 0 | 1 | 0 | 0 | 0 | 1 | 1 | 1 | 0 | 0 | 0 | 0 | 0 | 0 | 0 | 0 |
| 072 | 0 | 1 | 0 | 0 | 1 | 0 | 0 | 0 | 0 | 1 | 0 | 0 | 1 | 1 | 0 | 0 |
| 073 | 0 | 1 | 0 | 0 | 1 | 0 | 0 | 1 | 0 | 1 | 0 | 0 | 1 | 1 | 1 | 1 |
| 074 | 0 | 1 | 0 | 0 | 1 | 0 | 1 | 0 | 0 | 1 | 0 | 0 | 1 | 0 | 0 | 1 |
| 075 | 0 | 1 | 0 | 0 | 1 | 0 | 1 | 1 | 0 | 0 | 0 | 1 | 1 | 1 | 0 | 1 |
| 076 | 0 | 1 | 0 | 0 | 1 | 1 | 0 | 0 | 0 | 1 | 0 | 1 | 1 | 0 | 1 | 1 |
| 077 | 0 | 1 | 0 | 0 | 1 | 1 | 0 | 1 | 0 | 1 | 0 | 1 | 1 | 0 | 1 | 0 |
| 078 | 0 | 1 | 0 | 0 | 1 | 1 | 1 | 0 | 0 | 1 | 0 | 1 | 1 | 0 | 1 | 1 |
| 079 | 0 | 1 | 0 | 0 | 1 | 1 | 1 | 1 | 0 | 1 | 0 | 1 | 1 | 0 | 1 | 1 |
| 080 | 0 | 1 | 0 | 1 | 0 | 0 | 0 | 0 | 0 | 0 | 0 | 0 | 0 | 1 | 1 | 1 |
| 081 | 0 | 1 | 0 | 1 | 0 | 0 | 0 | 1 | 0 | 0 | 0 | 0 | 0 | 0 | 0 | 1 |
| 082 | 0 | 1 | 0 | 1 | 0 | 0 | 1 | 0 | 0 | 0 | 0 | 1 | 0 | 0 | 1 | 1 |
| 083 | 0 | 1 | 0 | 1 | 0 | 0 | 1 | 1 | 0 | 0 | 0 | 1 | 1 | 1 | 0 | 0 |
| 084 | 0 | 1 | 0 | 1 | 0 | 1 | 0 | 0 | 0 | 0 | 0 | 0 | 0 | 0 | 0 | 0 |
| 085 | 0 | 1 | 0 | 1 | 0 | 1 | 0 | 1 | 0 | 0 | 0 | 0 | 0 | 0 | 0 | 0 |
| 086 | 0 | 1 | 0 | 1 | 0 | 1 | 1 | 0 | 0 | 0 | 0 | 0 | 0 | 0 | 0 | 0 |
| 087 | 0 | 1 | 0 | 1 | 0 | 1 | 1 | 1 | 0 | 0 | 0 | 0 | 0 | 0 | 0 | 0 |
| 088 | 0 | 1 | 0 | 1 | 1 | 0 | 0 | 0 | 0 | 1 | 0 | 0 | 1 | 1 | 1 | 1 |
| 089 | 0 | 1 | 0 | 1 | 1 | 0 | 0 | 1 | 0 | 1 | 0 | 0 | 1 | 1 | 1 | 1 |
| 090 | 0 | 1 | 0 | 1 | 1 | 0 | 1 | 0 | 0 | 1 | 0 | 0 | 1 | 0 | 0 | 1 |
| 091 | 0 | 1 | 0 | 1 | 1 | 0 | 1 | 1 | 0 | 1 | 0 | 0 | 1 | 0 | 0 | 0 |
| 092 | 0 | 1 | 0 | 1 | 1 | 1 | 0 | 0 | 0 | 1 | 1 | 1 | 0 | 0 | 0 | 1 |
| 093 | 0 | 1 | 0 | 1 | 1 | 1 | 0 | 1 | 0 | 1 | 0 | 1 | 1 | 0 | 1 | 1 |
| 094 | 0 | 1 | 0 | 1 | 1 | 1 | 1 | 0 | 0 | 1 | 1 | 1 | 0 | 1 | 0 | 0 |
| 095 | 0 | 1 | 0 | 1 | 1 | 1 | 1 | 1 | 0 | 1 | 1 | 1 | 0 | 1 | 0 | 0 |
| 096 | 0 | 1 | 1 | 0 | 0 | 0 | 0 | 0 | 0 | 0 | 0 | 0 | 0 | 1 | 1 | 1 |
| 097 | 0 | 1 | 1 | 0 | 0 | 0 | 0 | 1 | 0 | 0 | 0 | 0 | 0 | 0 | 0 | 1 |
| 098 | 0 | 1 | 1 | 0 | 0 | 0 | 1 | 0 | 0 | 0 | 0 | 1 | 0 | 0 | 1 | 1 |
| 099 | 0 | 1 | 1 | 0 | 0 | 0 | 1 | 1 | 0 | 0 | 0 | 1 | 1 | 1 | 0 | 1 |
| 100 | 0 | 1 | 1 | 0 | 0 | 1 | 0 | 0 | 0 | 0 | 0 | 0 | 0 | 0 | 0 | 0 |
| 101 | 0 | 1 | 1 | 0 | 0 | 1 | 0 | 1 | 0 | 0 | 0 | 0 | 0 | 0 | 0 | 0 |
| 102 | 0 | 1 | 1 | 0 | 0 | 1 | 1 | 0 | 0 | 0 | 0 | 0 | 0 | 0 | 0 | 0 |
| 103 | 0 | 1 | 1 | 0 | 0 | 1 | 1 | 1 | 0 | 0 | 0 | 0 | 0 | 0 | 0 | 0 |
| 104 | 0 | 1 | 1 | 0 | 1 | 0 | 0 | 0 | 0 | 1 | 0 | 0 | 1 | 1 | 1 | 1 |
| 105 | 0 | 1 | 1 | 0 | 1 | 0 | 0 | 1 | 0 | 1 | 1 | 1 | 0 | 0 | 0 | 0 |
| 106 | 0 | 1 | 1 | 0 | 1 | 0 | 1 | 0 | 0 | 1 | 0 | 0 | 1 | 1 | 1 | 0 |
| 107 | 0 | 1 | 1 | 0 | 1 | 0 | 1 | 1 | 0 | 1 | 0 | 0 | 1 | 0 | 0 | 0 |
| 108 | 0 | 1 | 1 | 0 | 1 | 1 | 0 | 0 | 0 | 1 | 1 | 1 | 0 | 1 | 0 | 0 |
| 109 | 0 | 1 | 1 | 0 | 1 | 1 | 0 | 1 | 0 | 1 | 1 | 1 | 0 | 0 | 0 | 1 |
| 110 | 0 | 1 | 1 | 0 | 1 | 1 | 1 | 0 | 0 | 1 | 1 | 1 | 0 | 1 | 0 | 0 |
| 111 | 0 | 1 | 1 | 0 | 1 | 1 | 1 | 1 | 0 | 1 | 1 | 1 | 0 | 1 | 1 | 1 |
| 112 | 0 | 1 | 1 | 1 | 0 | 0 | 0 | 0 | 0 | 0 | 0 | 0 | 0 | 1 | 1 | 1 |
| 113 | 0 | 1 | 1 | 1 | 0 | 0 | 0 | 1 | 0 | 0 | 0 | 0 | 0 | 0 | 0 | 1 |
| 114 | 0 | 1 | 1 | 1 | 0 | 0 | 1 | 0 | 0 | 0 | 0 | 1 | 1 | 0 | 0 | 1 |
| 115 | 0 | 1 | 1 | 1 | 0 | 0 | 1 | 1 | 0 | 0 | 0 | 1 | 1 | 1 | 0 | 1 |
| 116 | 0 | 1 | 1 | 1 | 0 | 1 | 0 | 0 | 0 | 0 | 0 | 0 | 0 | 0 | 0 | 0 |

Table 9b-continued

ROM program for circuit 14.

| Address<br>Nr. | X<br>A8<br>17 | W<br>A7<br>18 | V<br>A6<br>15 | U<br>A5<br>20 | N<br>A4<br>21 | M<br>A3<br>1 | L<br>A2<br>2 | K<br>A1<br>3 | A*<br>B8<br>11 | A*<br>B7<br>10 | B*<br>B6<br>9 | B*<br>B5<br>8 | C*<br>B4<br>7 | C*<br>B3<br>6 | D*<br>B2<br>5 | D*<br>B1<br>4 |
|---|---|---|---|---|---|---|---|---|---|---|---|---|---|---|---|---|
| 117 | 0 | 1 | 1 | 1 | 0 | 1 | 0 | 1 | 0 | 0 | 0 | 0 | 0 | 0 | 0 | 0 |
| 118 | 0 | 1 | 1 | 1 | 0 | 1 | 1 | 0 | 0 | 0 | 0 | 0 | 0 | 0 | 0 | 0 |
| 119 | 0 | 1 | 1 | 1 | 0 | 1 | 1 | 1 | 0 | 0 | 0 | 0 | 0 | 0 | 0 | 0 |
| 120 | 0 | 1 | 1 | 1 | 1 | 0 | 0 | 0 | 0 | 1 | 1 | 0 | 0 | 1 | 0 | 1 |
| 121 | 0 | 1 | 1 | 1 | 1 | 0 | 0 | 1 | 0 | 1 | 1 | 1 | 0 | 0 | 0 | 1 |
| 122 | 0 | 1 | 1 | 1 | 1 | 0 | 1 | 0 | 0 | 1 | 0 | 0 | 1 | 1 | 1 | 0 |
| 123 | 0 | 1 | 1 | 1 | 1 | 0 | 1 | 1 | 0 | 1 | 0 | 0 | 1 | 0 | 1 | 0 |
| 124 | 0 | 1 | 1 | 1 | 1 | 1 | 0 | 0 | 0 | 1 | 1 | 1 | 0 | 1 | 1 | 1 |
| 125 | 0 | 1 | 1 | 1 | 1 | 1 | 0 | 1 | 0 | 1 | 1 | 1 | 0 | 1 | 1 | 0 |
| 126 | 0 | 1 | 1 | 1 | 1 | 1 | 1 | 0 | 0 | 1 | 1 | 1 | 0 | 1 | 1 | 1 |
| 127 | 0 | 1 | 1 | 1 | 1 | 1 | 1 | 1 | 0 | 1 | 1 | 1 | 0 | 1 | 1 | 1 |

Table 9c

ROM program for circuit 14.

| Address<br>Nr. | X<br>A8<br>17 | W<br>A7<br>18 | V<br>A6<br>19 | U<br>A5<br>20 | N<br>A4<br>21 | M<br>A3<br>1 | L<br>A2<br>2 | K<br>A1<br>3 | A*<br>B8<br>11 | A*<br>B7<br>10 | B*<br>B6<br>9 | B*<br>B5<br>8 | C*<br>B4<br>7 | C*<br>B3<br>6 | D*<br>B2<br>5 | D*<br>B1<br>4 |
|---|---|---|---|---|---|---|---|---|---|---|---|---|---|---|---|---|
| 128 | 1 | 0 | 0 | 0 | 0 | 0 | 0 | 0 | 0 | 0 | 0 | 0 | 0 | 1 | 1 | 1 |
| 129 | 1 | 0 | 0 | 0 | 0 | 0 | 0 | 1 | 0 | 0 | 0 | 0 | 0 | 0 | 1 | 0 |
| 130 | 1 | 0 | 0 | 0 | 0 | 0 | 1 | 0 | 0 | 0 | 0 | 0 | 1 | 0 | 0 | 0 |
| 131 | 1 | 0 | 0 | 0 | 0 | 0 | 1 | 1 | 0 | 0 | 0 | 0 | 1 | 0 | 1 | 0 |
| 132 | 1 | 0 | 0 | 0 | 0 | 1 | 0 | 0 | 0 | 0 | 0 | 0 | 0 | 0 | 0 | 0 |
| 133 | 1 | 0 | 0 | 0 | 0 | 1 | 0 | 1 | 0 | 0 | 0 | 0 | 0 | 0 | 0 | 0 |
| 134 | 1 | 0 | 0 | 0 | 0 | 1 | 1 | 0 | 0 | 0 | 0 | 0 | 0 | 0 | 0 | 0 |
| 135 | 1 | 0 | 0 | 0 | 0 | 1 | 1 | 1 | 0 | 0 | 0 | 0 | 0 | 0 | 0 | 0 |
| 136 | 1 | 0 | 0 | 0 | 1 | 0 | 0 | 0 | 0 | 0 | 1 | 1 | 0 | 1 | 0 | 0 |
| 137 | 1 | 0 | 0 | 0 | 1 | 0 | 0 | 1 | 0 | 0 | 1 | 1 | 0 | 1 | 1 | 1 |
| 138 | 1 | 0 | 0 | 0 | 1 | 0 | 1 | 0 | 0 | 0 | 1 | 0 | 0 | 0 | 0 | 0 |
| 139 | 1 | 0 | 0 | 0 | 1 | 0 | 1 | 1 | 0 | 0 | 0 | 0 | 1 | 0 | 1 | 0 |
| 140 | 1 | 0 | 0 | 0 | 1 | 1 | 0 | 0 | 0 | 0 | 1 | 0 | 0 | 0 | 1 | 0 |
| 141 | 1 | 0 | 0 | 0 | 1 | 1 | 0 | 1 | 0 | 0 | 1 | 0 | 0 | 0 | 1 | 0 |
| 142 | 1 | 0 | 0 | 0 | 1 | 1 | 1 | 0 | 0 | 0 | 1 | 1 | 1 | 1 | 0 | 1 |
| 143 | 1 | 0 | 0 | 0 | 1 | 1 | 1 | 1 | 0 | 0 | 1 | 1 | 1 | 1 | 0 | 0 |
| 144 | 1 | 0 | 0 | 1 | 0 | 0 | 0 | 0 | 0 | 0 | 0 | 0 | 0 | 1 | 1 | 1 |
| 145 | 1 | 0 | 0 | 1 | 0 | 0 | 0 | 1 | 0 | 0 | 0 | 0 | 0 | 0 | 1 | 0 |
| 146 | 1 | 0 | 0 | 1 | 0 | 0 | 1 | 0 | 0 | 0 | 0 | 0 | 1 | 0 | 0 | 0 |
| 147 | 1 | 0 | 0 | 1 | 0 | 0 | 1 | 1 | 0 | 0 | 0 | 0 | 1 | 0 | 1 | 0 |
| 148 | 1 | 0 | 0 | 1 | 0 | 1 | 0 | 0 | 0 | 0 | 0 | 0 | 0 | 0 | 0 | 0 |
| 149 | 1 | 0 | 0 | 1 | 0 | 1 | 0 | 1 | 0 | 0 | 0 | 0 | 0 | 0 | 0 | 0 |
| 150 | 1 | 0 | 0 | 1 | 0 | 1 | 1 | 0 | 0 | 0 | 0 | 0 | 0 | 0 | 0 | 0 |
| 151 | 1 | 0 | 0 | 1 | 0 | 1 | 1 | 1 | 0 | 0 | 0 | 0 | 0 | 0 | 0 | 0 |
| 152 | 1 | 0 | 0 | 1 | 1 | 0 | 0 | 0 | 0 | 0 | 1 | 1 | 0 | 1 | 1 | 0 |
| 153 | 1 | 0 | 0 | 1 | 1 | 0 | 0 | 1 | 0 | 0 | 1 | 1 | 0 | 1 | 1 | 1 |
| 154 | 1 | 0 | 0 | 1 | 1 | 0 | 1 | 0 | 0 | 0 | 1 | 0 | 0 | 0 | 0 | 0 |
| 155 | 1 | 0 | 0 | 1 | 1 | 0 | 1 | 1 | 0 | 0 | 1 | 0 | 0 | 0 | 0 | 0 |
| 156 | 1 | 0 | 0 | 1 | 1 | 1 | 0 | 0 | 0 | 0 | 1 | 0 | 1 | 0 | 0 | 0 |
| 157 | 1 | 0 | 0 | 1 | 1 | 1 | 0 | 1 | 0 | 0 | 1 | 0 | 1 | 0 | 0 | 0 |
| 158 | 1 | 0 | 0 | 1 | 1 | 1 | 1 | 0 | 0 | 1 | 1 | 0 | 1 | 0 | 0 | 1 |
| 159 | 1 | 0 | 0 | 1 | 1 | 1 | 1 | 1 | 0 | 0 | 1 | 1 | 1 | 0 | 0 | 1 |
| 160 | 1 | 0 | 1 | 0 | 0 | 0 | 0 | 0 | 0 | 0 | 0 | 0 | 0 | 1 | 1 | 1 |
| 161 | 1 | 0 | 1 | 0 | 0 | 0 | 0 | 1 | 0 | 0 | 0 | 0 | 0 | 0 | 1 | 0 |
| 162 | 1 | 0 | 1 | 0 | 0 | 0 | 1 | 0 | 0 | 0 | 0 | 0 | 1 | 0 | 0 | 0 |
| 163 | 1 | 0 | 1 | 0 | 0 | 0 | 1 | 1 | 0 | 0 | 0 | 0 | 1 | 0 | 1 | 0 |
| 164 | 1 | 0 | 1 | 0 | 0 | 1 | 0 | 0 | 0 | 0 | 0 | 0 | 0 | 0 | 0 | 0 |
| 165 | 1 | 0 | 1 | 0 | 0 | 1 | 0 | 1 | 0 | 0 | 0 | 0 | 0 | 0 | 0 | 0 |
| 166 | 1 | 0 | 1 | 0 | 0 | 1 | 1 | 0 | 0 | 0 | 0 | 0 | 0 | 0 | 0 | 0 |
| 167 | 1 | 0 | 1 | 0 | 0 | 1 | 1 | 1 | 0 | 0 | 0 | 0 | 0 | 0 | 0 | 0 |
| 168 | 1 | 0 | 1 | 0 | 1 | 0 | 0 | 0 | 0 | 0 | 1 | 1 | 0 | 1 | 1 | 0 |
| 169 | 1 | 0 | 1 | 0 | 1 | 0 | 0 | 1 | 0 | 0 | 1 | 1 | 1 | 1 | 0 | 1 |
| 170 | 1 | 0 | 1 | 0 | 1 | 0 | 1 | 0 | 0 | 0 | 1 | 0 | 0 | 0 | 1 | 0 |
| 171 | 1 | 0 | 1 | 0 | 1 | 0 | 1 | 1 | 0 | 0 | 1 | 0 | 0 | 0 | 0 | 0 |
| 172 | 1 | 0 | 1 | 0 | 1 | 1 | 0 | 0 | 0 | 0 | 1 | 0 | 1 | 0 | 1 | 0 |
| 173 | 1 | 0 | 1 | 0 | 1 | 1 | 0 | 1 | 0 | 0 | 1 | 0 | 1 | 0 | 0 | 0 |
| 174 | 1 | 0 | 1 | 0 | 1 | 1 | 1 | 0 | 0 | 1 | 1 | 0 | 1 | 0 | 1 | 1 |
| 175 | 1 | 0 | 1 | 0 | 1 | 1 | 1 | 1 | 0 | 0 | 1 | 1 | 1 | 1 | 1 | 0 |
| 176 | 1 | 0 | 1 | 1 | 0 | 0 | 0 | 0 | 0 | 0 | 0 | 0 | 1 | 1 | 0 | 0 |
| 177 | 1 | 0 | 1 | 1 | 0 | 0 | 0 | 1 | 0 | 0 | 0 | 0 | 0 | 0 | 1 | 0 |
| 178 | 1 | 0 | 1 | 1 | 0 | 0 | 1 | 0 | 0 | 0 | 0 | 0 | 1 | 0 | 1 | 0 |
| 179 | 1 | 0 | 1 | 1 | 0 | 0 | 1 | 1 | 0 | 0 | 0 | 0 | 1 | 0 | 1 | 0 |
| 180 | 1 | 0 | 1 | 1 | 0 | 1 | 0 | 0 | 0 | 0 | 0 | 0 | 0 | 0 | 0 | 0 |
| 181 | 1 | 0 | 1 | 1 | 0 | 1 | 0 | 1 | 0 | 0 | 0 | 0 | 0 | 0 | 0 | 0 |
| 182 | 1 | 0 | 1 | 1 | 0 | 1 | 1 | 0 | 0 | 0 | 0 | 0 | 0 | 0 | 0 | 0 |
| 183 | 1 | 0 | 1 | 1 | 0 | 1 | 1 | 1 | 0 | 0 | 0 | 0 | 0 | 0 | 0 | 0 |
| 184 | 1 | 0 | 1 | 1 | 1 | 0 | 0 | 0 | 0 | 0 | 1 | 1 | 1 | 0 | 0 | 0 |
| 185 | 1 | 0 | 1 | 1 | 1 | 0 | 0 | 1 | 0 | 1 | 1 | 0 | 1 | 0 | 0 | 1 |
| 186 | 1 | 0 | 1 | 1 | 1 | 0 | 1 | 0 | 0 | 0 | 1 | 0 | 0 | 0 | 1 | 0 |
| 187 | 1 | 0 | 1 | 1 | 1 | 0 | 1 | 1 | 0 | 0 | 1 | 0 | 0 | 0 | 0 | 0 |
| 188 | 1 | 0 | 1 | 1 | 1 | 1 | 0 | 0 | 0 | 0 | 1 | 0 | 1 | 0 | 1 | 0 |
| 189 | 1 | 0 | 1 | 1 | 1 | 1 | 0 | 1 | 0 | 0 | 1 | 0 | 1 | 0 | 1 | 0 |
| 190 | 1 | 0 | 1 | 1 | 1 | 1 | 1 | 0 | 0 | 1 | 1 | 0 | 1 | 1 | 1 | 0 |
| 191 | 1 | 0 | 1 | 1 | 1 | 1 | 1 | 1 | 1 | 0 | 0 | 1 | 0 | 1 | 0 | 0 |

Table 9d

ROM program for circuit 14.

| Address Nr. | X A8 17 | W A7 18 | V A6 19 | U A5 20 | N A4 21 | M A3 1 | L A2 2 | K A1 3 | A* B8 11 | A* B7 10 | B* B6 9 | B* B5 8 | C* B4 7 | C* B3 6 | D* B2 5 | D* B1 4 |
|---|---|---|---|---|---|---|---|---|---|---|---|---|---|---|---|---|
| 192 | 1 | 1 | 0 | 0 | 0 | 0 | 0 | 0 | 0 | 0 | 0 | 0 | 1 | 1 | 0 | 0 |
| 193 | 1 | 1 | 0 | 0 | 0 | 0 | 0 | 1 | 0 | 0 | 0 | 0 | 0 | 0 | 1 | 0 |
| 194 | 1 | 1 | 0 | 0 | 0 | 0 | 1 | 0 | 0 | 0 | 0 | 0 | 1 | 0 | 1 | 0 |
| 195 | 1 | 1 | 0 | 0 | 0 | 0 | 1 | 1 | 0 | 0 | 0 | 0 | 1 | 0 | 1 | 0 |
| 196 | 1 | 1 | 0 | 0 | 0 | 1 | 0 | 0 | 0 | 0 | 0 | 0 | 0 | 0 | 0 | 0 |
| 197 | 1 | 1 | 0 | 0 | 0 | 1 | 0 | 1 | 0 | 0 | 0 | 0 | 0 | 0 | 0 | 0 |
| 198 | 1 | 1 | 0 | 0 | 0 | 1 | 1 | 0 | 0 | 0 | 0 | 0 | 0 | 0 | 0 | 0 |
| 199 | 1 | 1 | 0 | 0 | 0 | 1 | 1 | 1 | 0 | 0 | 0 | 0 | 0 | 0 | 0 | 0 |
| 200 | 1 | 1 | 0 | 0 | 1 | 0 | 0 | 0 | 0 | 0 | 1 | 1 | 1 | 0 | 0 | 0 |
| 201 | 1 | 1 | 0 | 0 | 1 | 0 | 0 | 1 | 0 | 1 | 1 | 0 | 1 | 0 | 1 | 1 |
| 202 | 1 | 1 | 0 | 0 | 1 | 0 | 1 | 0 | 0 | 0 | 1 | 0 | 0 | 0 | 1 | 0 |
| 203 | 1 | 1 | 0 | 0 | 1 | 0 | 1 | 1 | 0 | 0 | 1 | 0 | 0 | 0 | 1 | 0 |
| 204 | 1 | 1 | 0 | 0 | 1 | 1 | 0 | 0 | 1 | 0 | 0 | 0 | 0 | 0 | 0 | 0 |
| 205 | 1 | 1 | 0 | 0 | 1 | 1 | 0 | 1 | 1 | 0 | 0 | 0 | 0 | 0 | 0 | 0 |
| 206 | 1 | 1 | 0 | 0 | 1 | 1 | 1 | 0 | 1 | 1 | 0 | 1 | 0 | 0 | 0 | 1 |
| 207 | 1 | 1 | 0 | 0 | 1 | 1 | 1 | 1 | 1 | 0 | 0 | 1 | 0 | 0 | 0 | 0 |
| 208 | 1 | 1 | 0 | 1 | 0 | 0 | 0 | 0 | 0 | 0 | 0 | 0 | 1 | 1 | 0 | 0 |
| 209 | 1 | 1 | 0 | 1 | 0 | 0 | 0 | 1 | 0 | 0 | 0 | 0 | 0 | 0 | 1 | 0 |
| 210 | 1 | 1 | 0 | 1 | 0 | 0 | 1 | 0 | 0 | 0 | 0 | 0 | 1 | 0 | 1 | 0 |
| 211 | 1 | 1 | 0 | 1 | 0 | 0 | 1 | 1 | 0 | 0 | 1 | 0 | 0 | 0 | 0 | 0 |
| 212 | 1 | 1 | 0 | 1 | 0 | 1 | 0 | 0 | 0 | 0 | 0 | 0 | 0 | 0 | 0 | 0 |
| 213 | 1 | 1 | 0 | 1 | 0 | 1 | 0 | 1 | 0 | 0 | 0 | 0 | 0 | 0 | 0 | 0 |
| 214 | 1 | 1 | 0 | 1 | 0 | 1 | 1 | 0 | 0 | 0 | 0 | 0 | 0 | 0 | 0 | 0 |
| 215 | 1 | 1 | 0 | 1 | 0 | 1 | 1 | 1 | 0 | 0 | 0 | 0 | 0 | 0 | 0 | 0 |
| 216 | 1 | 1 | 0 | 1 | 1 | 0 | 0 | 0 | 0 | 0 | 1 | 0 | 1 | 1 | 1 | 1 |
| 217 | 1 | 1 | 0 | 1 | 1 | 0 | 0 | 1 | 0 | 1 | 1 | 0 | 1 | 1 | 1 | 1 |
| 218 | 1 | 1 | 0 | 1 | 1 | 0 | 1 | 0 | 0 | 0 | 1 | 0 | 1 | 0 | 0 | 0 |
| 219 | 1 | 1 | 0 | 1 | 1 | 0 | 1 | 1 | 0 | 0 | 1 | 0 | 0 | 0 | 1 | 0 |
| 220 | 1 | 1 | 0 | 1 | 1 | 1 | 0 | 0 | 1 | 0 | 0 | 0 | 0 | 0 | 0 | 0 |
| 221 | 1 | 1 | 0 | 1 | 1 | 1 | 0 | 1 | 1 | 0 | 0 | 0 | 0 | 0 | 0 | 0 |
| 222 | 1 | 1 | 0 | 1 | 1 | 1 | 1 | 0 | 1 | 1 | 0 | 1 | 0 | 0 | 1 | 0 |
| 223 | 1 | 1 | 0 | 1 | 1 | 1 | 1 | 1 | 1 | 0 | 0 | 1 | 0 | 0 | 1 | 1 |
| 224 | 1 | 1 | 1 | 0 | 0 | 0 | 0 | 0 | 0 | 0 | 0 | 0 | 1 | 1 | 0 | 0 |
| 225 | 1 | 1 | 1 | 0 | 0 | 0 | 0 | 1 | 0 | 0 | 0 | 0 | 0 | 0 | 1 | 0 |
| 226 | 1 | 1 | 1 | 0 | 0 | 0 | 1 | 0 | 0 | 0 | 0 | 0 | 1 | 0 | 1 | 0 |
| 227 | 1 | 1 | 1 | 0 | 0 | 0 | 1 | 1 | 0 | 0 | 1 | 0 | 0 | 0 | 0 | 0 |
| 228 | 1 | 1 | 1 | 0 | 0 | 1 | 0 | 0 | 0 | 0 | 0 | 0 | 0 | 0 | 0 | 0 |
| 229 | 1 | 1 | 1 | 0 | 0 | 1 | 0 | 1 | 0 | 0 | 0 | 0 | 0 | 0 | 0 | 0 |
| 230 | 1 | 1 | 1 | 0 | 0 | 1 | 1 | 0 | 0 | 0 | 0 | 0 | 0 | 0 | 0 | 0 |
| 231 | 1 | 1 | 1 | 0 | 0 | 1 | 1 | 1 | 0 | 0 | 0 | 0 | 0 | 0 | 0 | 0 |
| 232 | 1 | 1 | 1 | 0 | 1 | 0 | 0 | 0 | 0 | 0 | 1 | 0 | 1 | 1 | 1 | 1 |
| 233 | 1 | 1 | 1 | 0 | 1 | 0 | 0 | 1 | 1 | 1 | 0 | 0 | 0 | 1 | 0 | 1 |
| 234 | 1 | 1 | 1 | 0 | 1 | 0 | 1 | 0 | 0 | 0 | 1 | 0 | 1 | 0 | 0 | 0 |
| 235 | 1 | 1 | 1 | 0 | 1 | 0 | 1 | 1 | 0 | 0 | 1 | 0 | 0 | 0 | 1 | 0 |
| 236 | 1 | 1 | 1 | 0 | 1 | 1 | 0 | 0 | 1 | 0 | 0 | 0 | 0 | 0 | 1 | 0 |
| 237 | 1 | 1 | 1 | 0 | 1 | 1 | 0 | 1 | 1 | 0 | 0 | 0 | 0 | 0 | 1 | 0 |
| 238 | 1 | 1 | 1 | 0 | 1 | 1 | 1 | 0 | 1 | 1 | 0 | 1 | 0 | 0 | 1 | 1 |
| 239 | 1 | 1 | 1 | 0 | 1 | 1 | 1 | 1 | 1 | 0 | 0 | 1 | 1 | 0 | 0 | 1 |
| 240 | 1 | 1 | 1 | 1 | 0 | 0 | 0 | 0 | 0 | 0 | 0 | 0 | 1 | 1 | 0 | 0 |
| 241 | 1 | 1 | 1 | 1 | 0 | 0 | 0 | 1 | 0 | 0 | 0 | 0 | 0 | 0 | 1 | 0 |
| 242 | 1 | 1 | 1 | 1 | 0 | 0 | 1 | 0 | 0 | 0 | 0 | 0 | 1 | 0 | 1 | 0 |
| 243 | 1 | 1 | 1 | 1 | 0 | 0 | 1 | 1 | 0 | 0 | 1 | 0 | 0 | 0 | 1 | 0 |
| 244 | 1 | 1 | 1 | 1 | 0 | 1 | 0 | 0 | 0 | 0 | 0 | 0 | 0 | 0 | 0 | 0 |
| 245 | 1 | 1 | 1 | 1 | 0 | 1 | 0 | 1 | 0 | 0 | 0 | 0 | 0 | 0 | 0 | 0 |
| 246 | 1 | 1 | 1 | 1 | 0 | 1 | 1 | 0 | 0 | 0 | 0 | 0 | 0 | 0 | 0 | 0 |
| 247 | 1 | 1 | 1 | 1 | 0 | 1 | 1 | 1 | 0 | 0 | 0 | 0 | 0 | 0 | 0 | 0 |
| 248 | 1 | 1 | 1 | 1 | 1 | 0 | 0 | 0 | 1 | 0 | 0 | 1 | 0 | 0 | 0 | 0 |
| 249 | 1 | 1 | 1 | 1 | 1 | 0 | 0 | 1 | 1 | 1 | 0 | 0 | 0 | 1 | 0 | 0 |
| 250 | 1 | 1 | 1 | 1 | 1 | 0 | 1 | 0 | 0 | 0 | 1 | 0 | 1 | 0 | 1 | 0 |
| 251 | 1 | 1 | 1 | 1 | 1 | 0 | 1 | 1 | 0 | 0 | 1 | 0 | 0 | 0 | 1 | 0 |
| 252 | 1 | 1 | 1 | 1 | 1 | 1 | 0 | 0 | 1 | 0 | 0 | 0 | 1 | 0 | 0 | 0 |
| 253 | 1 | 1 | 1 | 1 | 1 | 1 | 0 | 1 | 1 | 0 | 0 | 0 | 0 | 0 | 1 | 0 |
| 254 | 1 | 1 | 1 | 1 | 1 | 1 | 1 | 0 | 1 | 1 | 0 | 1 | 1 | 0 | 0 | 1 |
| 255 | 1 | 1 | 1 | 1 | 1 | 1 | 1 | 1 | 1 | 0 | 0 | 1 | 1 | 1 | 0 | 0 |

The program for circuit 114 also includes a section corresponding to the free running mode of operation, that will be described hereinafter. The ROM input and output lines are identified at the top of the tables by the signal names as per FIG. 14 (top row of symbols), by the manufacturer denomination of the signals (middle row of symbols) and by the chip pin number (lower row of symbols).

A similar procedure is followed for the program of device 115. In this case, it is necessary to inspect each pattern and identify the intervals in which a switching occurs, requiring a "reverse" comparison mode. For such intervals, the S bit must assume the state 1. For all other intervals, those for which there is a switching such that the comparator works in the "normal" mode and those for which there is no switching, the S bit is assigned to state 0. A reverse comparison mode is needed whenever there is a transition from the negative level to the positive level occurring in an even-numbered interval or if there is a transition from the positive level to the negative level occurring in an odd-numbered interval. In addition, a reverse comparison mode is needed whenever the pattern's level stays negative throughout an interval.

A direction location in each pattern of the switching intervals requiring the reverse mode is made possible by reference to FIGS. 17A, 17B. The following Tables 10*a*–10*f* are used for this purpose.

Table 10a

Worksheet for programming circuit 15.

| Pattern Nr. | Pattern designator byte | | | | | | Interval requiring mode reversal designator | | | | | ROM outputs | | | | | | | |
|---|---|---|---|---|---|---|---|---|---|---|---|---|---|---|---|---|---|---|---|
| | Z | Y | X | W | V | U | N | M | L | K | Nr. | $D_8$ 11 | $D_7$ 10 | $D_6$ 9 | $D_5$ 8 | $D_4$ 7 | $D_3$ 6 | $D_3$ 5 | $D_1$ 4 |
| 3 | 1 | 1 | 1 | 1 | 0 | 1 | 0 | 0 | 0 | 1 | 1 | | | | | | | | 1 |
| | | | | | | | 0 | 0 | 0 | 0 | 2 | | | | | | | | 1 |
| 9 | 1 | 1 | 0 | 1 | 1 | 1 | 0 | 0 | 0 | 1 | 1 | | | | | | | | 1 |
| | | | | | | | 0 | 0 | 0 | 0 | 2 | | | | | | | | 1 |
| 10 | 1 | 1 | 0 | 1 | 1 | 0 | 0 | 0 | 0 | 1 | 1 | | | | | | | | 1 |
| | | | | | | | 0 | 0 | 0 | 0 | 2 | | | | | | | | 1 |
| 11 | 1 | 1 | 0 | 1 | 0 | 1 | 0 | 0 | 0 | 1 | 1 | | | | | | | | 1 |
| | | | | | | | 0 | 0 | 0 | 0 | 2 | | | | | | | | 1 |
| 12 | 1 | 1 | 0 | 1 | 0 | 0 | 1 | 1 | 1 | 0 | 11 | | | | | | | | 1 |
| | | | | | | | 1 | 1 | 1 | 1 | 12 | | | | | | | | 1 |
| | | | | | | | 0 | 0 | 0 | 1 | 1 | | | | | | | | 1 |
| 13 | 1 | 1 | 0 | 0 | 1 | 1 | 0 | 0 | 0 | 0 | 2 | | | | | | | | 1 |
| | | | | | | | 1 | 1 | 1 | 0 | 11 | | | | | | | | 1 |
| | | | | | | | 1 | 1 | 1 | 1 | 12 | | | | | | | | 1 |
| | | | | | | | 0 | 0 | 0 | 1 | 1 | | | | | | | | 1 |
| 14 | 1 | 1 | 0 | 0 | 1 | 0 | 0 | 0 | 0 | 0 | 2 | | | | | | | | 1 |
| | | | | | | | 1 | 1 | 1 | 0 | 11 | | | | | | | | 1 |
| | | | | | | | 1 | 1 | 1 | 1 | 12 | | | | | | | | 1 |
| | | | | | | | 0 | 0 | 0 | 1 | 1 | | | | | | | | 1 |
| 15 | 1 | 1 | 0 | 0 | 0 | 1 | 0 | 0 | 0 | 0 | 2 | | | | | | | | 1 |
| | | | | | | | 1 | 1 | 1 | 0 | 11 | | | | | | | | 1 |
| | | | | | | | 1 | 1 | 1 | 1 | 12 | | | | | | | | 1 |
| | ROM address | | | | | | | | | | | | | | | | | | |

Table 10b

Worksheet for programming circuit 15.

| Pattern Nr. | Pattern designator byte | | | | | | Interval requiring mode reversal designator | | | | | ROM outputs | | | | | | | |
|---|---|---|---|---|---|---|---|---|---|---|---|---|---|---|---|---|---|---|---|
| | Z | Y | X | W | V | U | N | M | L | K | Nr. | $D_8$ 11 | $D_7$ 10 | $D_6$ 9 | $D_5$ 8 | $D_4$ 7 | $D_3$ 6 | $D_3$ 5 | $D_1$ 4 |
| | | | | | | | 0 | 0 | 0 | 1 | 1 | | | | | | | | 1 |
| 16 | 1 | 1 | 0 | 0 | 0 | 0 | 0 | 0 | 0 | 0 | 2 | | | | | | | | 1 |
| | | | | | | | 1 | 1 | 1 | 0 | 11 | | | | | | | | 1 |
| | | | | | | | 1 | 1 | 1 | 1 | 12 | | | | | | | | 1 |
| | | | | | | | 0 | 0 | 0 | 1 | 1 | | | | | | | 1 | |
| 17 | 1 | 0 | 1 | 1 | 1 | 1 | 0 | 0 | 0 | 0 | 2 | | | | | | | 1 | |
| | | | | | | | 1 | 1 | 1 | 0 | 11 | | | | | | | 1 | |
| | | | | | | | 1 | 1 | 1 | 1 | 12 | | | | | | | 1 | |
| | | | | | | | 0 | 0 | 0 | 1 | 1 | | | | | | | 1 | |
| 18 | 1 | 0 | 1 | 1 | 1 | 0 | 0 | 0 | 0 | 0 | 2 | | | | | | | 1 | |
| | | | | | | | 1 | 1 | 1 | 0 | 11 | | | | | | | 1 | |
| | | | | | | | 1 | 1 | 1 | 1 | 12 | | | | | | | 1 | |
| | | | | | | | 0 | 0 | 0 | 1 | 1 | | | | | | | 1 | |
| 19 | 1 | 0 | 1 | 1 | 0 | 1 | 0 | 0 | 0 | 0 | 2 | | | | | | | 1 | |
| | | | | | | | 1 | 1 | 1 | 0 | 11 | | | | | | | 1 | |
| | | | | | | | 1 | 1 | 1 | 1 | 12 | | | | | | | 1 | |
| | | | | | | | 0 | 0 | 0 | 1 | 1 | | | | | | | 1 | |
| 20 | 1 | 0 | 1 | 1 | 0 | 0 | 0 | 0 | 0 | 0 | 2 | | | | | | | 1 | |
| | | | | | | | 1 | 1 | 1 | 0 | 11 | | | | | | | 1 | |
| | | | | | | | 1 | 1 | 1 | 1 | 12 | | | | | | | 1 | |
| | | | | | | | 0 | 0 | 0 | 1 | 1 | | | | | | | 1 | |
| 21 | 1 | 0 | 1 | 0 | 1 | 1 | 0 | 0 | 0 | 0 | 2 | | | | | | | 1 | |
| | | | | | | | 1 | 1 | 1 | 0 | 11 | | | | | | | 1 | |
| | | | | | | | 1 | 1 | 1 | 1 | 12 | | | | | | | 1 | |
| | ROM address | | | | | | | | | | | | | | | | | | |

Table 10c

Worksheet for programming circuit 15.

| Pattern Nr. | Pattern designator byte | | | | | | Interval requiring mode reversal designator | | | | | ROM outputs | | | | | | | |
|---|---|---|---|---|---|---|---|---|---|---|---|---|---|---|---|---|---|---|---|
| | Z | Y | X | W | V | U | N | M | L | K | Nr. | $D_8$ 11 | $D_7$ 10 | $D_6$ 9 | $D_5$ 8 | $D_4$ 7 | $D_3$ 6 | $D_3$ 5 | $D_1$ 4 |
| 22 | 1 | 0 | 1 | 0 | 1 | 0 | 1 | 1 | 0 | 0 | 10 | | | | | | | 1 | |
| 23 | 1 | 0 | 1 | 0 | 0 | 1 | 1 | 1 | 0 | 0 | 10 | | | | | | | 1 | |
| 24 | 1 | 0 | 1 | 0 | 0 | 0 | 1 | 1 | 0 | 0 | 10 | | | | | | | 1 | |
| 25 | 1 | 0 | 0 | 1 | 1 | 1 | 1 | 1 | 0 | 0 | 10 | | | | | | | 1 | |
| 26 | 1 | 0 | 0 | 1 | 1 | 0 | | | | | 9 | | | | | | | 1 | |
| | | | | | | | 1 | 1 | 0 | 0 | 10 | | | | | | | 1 | |
| 27 | 1 | 0 | 0 | 1 | 0 | 1 | | | | | 9 | | | | | | | 1 | |
| | | | | | | | 1 | 1 | 0 | 0 | 10 | | | | | | | 1 | |
| 28 | 1 | 0 | 0 | 1 | 0 | 0 | | | | | 9 | | | | | | | 1 | |
| | | | | | | | 1 | 1 | 0 | 0 | 10 | | | | | | | 1 | |
| 29 | 1 | 0 | 0 | 0 | 1 | 1 | | | | | 9 | | | | | | | 1 | |
| | | | | | | | 1 | 1 | 0 | 0 | 10 | | | | | | | 1 | |
| | | | | | | | 0 | 0 | 0 | 1 | 1 | | | | | | | 1 | |
| | | | | | | | 0 | 0 | 0 | 0 | 2 | | | | | | | 1 | |
| 30 | 1 | 0 | 0 | 0 | 1 | 0 | 1 | 0 | 0 | 0 | 7 | | | | | | | 1 | |
| | | | | | | | 1 | 0 | 0 | 1 | 8 | | | | | | | 1 | |
| | | | | | | | 1 | 1 | 1 | 0 | 11 | | | | | | | 1 | |
| | | | | | | | 1 | 1 | 1 | 1 | 12 | | | | | | | 1 | |
| | ROM address | | | | | | | | | | | | | | | | | | |

Table 10d

Worksheet for programming circuit 15.

| Pattern | Pattern designator byte | | | | | | Interval requiring mode reversal designator | | | | | ROM outputs | | | | | | | |
|---|---|---|---|---|---|---|---|---|---|---|---|---|---|---|---|---|---|---|---|
| Nr. | Z | Y | X | W | V | U | N | M | L | K | Nr. | $D_8$ 11 | $D_7$ 10 | $D_6$ 9 | $D_5$ 8 | $D_4$ 7 | $D_3$ 6 | $D_3$ 5 | $D_1$ 4 |
| | | | | | | | 0 | 0 | 0 | 1 | 1 | | | | | | | 1 | |
| | | | | | | | 0 | 0 | 0 | 0 | 2 | | | | | | | 1 | |
| 31 | 1 | 0 | 0 | 0 | 0 | 1 | 1 | 0 | 0 | 0 | 7 | | | | | | | 1 | |
| | | | | | | | 1 | 0 | 0 | 1 | 8 | | | | | | | 1 | |
| | | | | | | | 1 | 1 | 1 | 0 | 11 | | | | | | | 1 | |
| | | | | | | | 1 | 1 | 1 | 1 | 12 | | | | | | | 1 | |
| | | | | | | | 0 | 0 | 0 | 1 | 1 | | | | | | | 1 | |
| | | | | | | | 0 | 0 | 0 | 0 | 2 | | | | | | | 1 | |
| 32 | 1 | 0 | 0 | 0 | 0 | 0 | 1 | 0 | 0 | 0 | 7 | | | | | | | 1 | |
| | | | | | | | 1 | 0 | 0 | 1 | 8 | | | | | | | 1 | |
| | | | | | | | 1 | 1 | 1 | 0 | 11 | | | | | | | 1 | |
| | | | | | | | 1 | 1 | 1 | 1 | 12 | | | | | | | 1 | |
| | | | | | | | 0 | 0 | 0 | 1 | 1 | | | | | | 1 | | |
| | | | | | | | 0 | 0 | 0 | 0 | 2 | | | | | | 1 | | |
| 33 | 0 | 1 | 1 | 1 | 1 | 1 | 1 | 0 | 0 | 0 | 7 | | | | | | 1 | | |
| | | | | | | | 1 | 0 | 0 | 1 | 8 | | | | | | 1 | | |
| | | | | | | | 1 | 1 | 1 | 0 | 11 | | | | | | 1 | | |
| | | | | | | | 1 | 1 | 1 | 1 | 12 | | | | | | 1 | | |
| | | | | | | | 0 | 0 | 0 | 1 | 1 | | | | | | 1 | | |
| | | | | | | | 0 | 0 | 0 | 0 | 2 | | | | | | 1 | | |
| 34 | 0 | 1 | 1 | 1 | 1 | 0 | 1 | 0 | 0 | 0 | 7 | | | | | | 1 | | |
| | | | | | | | 1 | 0 | 0 | 1 | 8 | | | | | | 1 | | |
| | | | | | | | 1 | 1 | 1 | 0 | 11 | | | | | | 1 | | |
| | | | | | | | 1 | 1 | 1 | 1 | 12 | | | | | | 1 | | |

ROM address

Table 10e

Worksheet for programming circuit 15.

| Pattern | Pattern designator byte | | | | | | Interval requiring mode reversal designator | | | | | ROM outputs | | | | | | | |
|---|---|---|---|---|---|---|---|---|---|---|---|---|---|---|---|---|---|---|---|
| Nr. | Z | Y | X | W | V | U | N | M | L | K | Nr. | $D_8$ 11 | $D_7$ 10 | $D_6$ 9 | $D_5$ 8 | $D_4$ 7 | $D_3$ 6 | $D_3$ 5 | $D_1$ 4 |
| | | | | | | | 0 | 0 | 0 | 1 | 1 | | | | | | 1 | | |
| | | | | | | | 0 | 0 | 0 | 0 | 2 | | | | | | 1 | | |
| 35 | 0 | 1 | 1 | 1 | 0 | 1 | 1 | 0 | 0 | 0 | 7 | | | | | | 1 | | |
| | | | | | | | 1 | 0 | 0 | 1 | 8 | | | | | | 1 | | |
| | | | | | | | 1 | 1 | 1 | 0 | 11 | | | | | | 1 | | |
| | | | | | | | 1 | 1 | 1 | 1 | 12 | | | | | | 1 | | |
| | | | | | | | 0 | 0 | 0 | 1 | 1 | | | | | | 1 | | |
| | | | | | | | 0 | 0 | 0 | 0 | 2 | | | | | | 1 | | |
| 36 | 0 | 1 | 1 | 1 | 0 | 0 | 1 | 0 | 0 | 0 | 7 | | | | | | 1 | | |
| | | | | | | | 1 | 0 | 0 | 1 | 8 | | | | | | 1 | | |
| | | | | | | | 1 | 1 | 1 | 0 | 11 | | | | | | 1 | | |
| | | | | | | | 1 | 1 | 1 | 1 | 12 | | | | | | 1 | | |
| | | | | | | | 0 | 0 | 0 | 1 | 1 | | | | | | 1 | | |
| | | | | | | | 0 | 0 | 0 | 0 | 2 | | | | | | 1 | | |
| 37 | 0 | 1 | 1 | 0 | 1 | 1 | 1 | 0 | 0 | 0 | 7 | | | | | | 1 | | |
| | | | | | | | 1 | 0 | 0 | 1 | 8 | | | | | | 1 | | |
| | | | | | | | 1 | 1 | 1 | 0 | 11 | | | | | | 1 | | |
| | | | | | | | 1 | 1 | 1 | 1 | 12 | | | | | | 1 | | |
| | | | | | | | 0 | 0 | 0 | 1 | 1 | | | | | | 1 | | |
| | | | | | | | 0 | 0 | 0 | 0 | 2 | | | | | | 1 | | |
| 38 | 0 | 1 | 1 | 0 | 1 | 0 | 1 | 0 | 0 | 0 | 7 | | | | | | 1 | | |
| | | | | | | | 1 | 0 | 0 | 1 | 8 | | | | | | 1 | | |
| | | | | | | | 1 | 1 | 1 | 0 | 11 | | | | | | 1 | | |
| | | | | | | | 1 | 1 | 1 | 1 | 12 | | | | | | 1 | | |

ROM address

Table 10f

Worksheet for programming circuit 15.

| Pattern | Pattern designator byte | | | | | | Interval requiring mode reversal designator | | | | | ROM outputs | | | | | | | |
|---|---|---|---|---|---|---|---|---|---|---|---|---|---|---|---|---|---|---|---|
| Nr. | Z | Y | X | W | V | U | N | M | L | K | Nr. | $D_8$ 11 | $D_7$ 10 | $D_6$ 9 | $D_5$ 8 | $D_4$ 7 | $D_3$ 6 | $D_3$ 5 | $D_1$ 4 |
| | | | | | | | 0 | 0 | 0 | 1 | 1 | | | | | | 1 | | |
| | | | | | | | 0 | 0 | 0 | 0 | 2 | | | | | | 1 | | |
| 39 | 0 | 1 | 1 | 0 | 0 | 1 | 1 | 0 | 0 | 0 | 7 | | | | | | 1 | | |
| | | | | | | | 1 | 0 | 0 | 1 | 8 | | | | | | 1 | | |

Table 10f-continued

| Pattern Nr. | Pattern designator byte: Z | Y | X | W | V | U | Interval requiring mode reversal designator: N | M | L | K | Nr. | ROM outputs: $D_8$ 11 | $D_7$ 10 | $D_6$ 9 | $D_5$ 8 | $D_4$ 7 | $D_3$ 6 | $D_3$ 5 | $D_1$ 4 |
|---|---|---|---|---|---|---|---|---|---|---|---|---|---|---|---|---|---|---|---|
| | | | | | | | 1 | 1 | 1 | 0 | 11 | | | | | | 1 | | |
| | | | | | | | 1 | 1 | 1 | 1 | 12 | | | | | | 1 | | |
| | | | | | | | 0 | 0 | 0 | 1 | 1 | | | | | | 1 | | |
| | | | | | | | 0 | 0 | 0 | 0 | 2 | | | | | | 1 | | |
| 40 | 0 | 1 | 1 | 0 | 0 | 0 | 1 | 0 | 0 | 0 | 7 | | | | | | 1 | | |
| | | | | | | | 1 | 0 | 0 | 1 | 8 | | | | | | 1 | | |
| | | | | | | | 1 | 1 | 1 | 0 | 11 | | | | | | 1 | | |
| | | | | | | | 1 | 1 | 1 | 1 | 12 | | | | | | 1 | | |
| | ROM address | | | | | | | | | | | | | | | | | | |

Worksheet for programming circuit 15.

In the worksheets of Tables 10*a* through 10*f*, the pattern number is stated with the corresponding pattern designator byte as done for Table 6*a* and following, together with the numbers identifying the intervals requiring comparison mode reversal and the corresponding interval designator byte from Table X. In each row, a symbol "1" is entered in one of the ROM output columns. The selected column is a function of the state of the X and Y lines. This procedure results in a truth table, listing, in correspondence of certain ROM addresses (given by the XWVUNMLK word on the worksheets), which of the ROM last three output lines must assume the "one" state. When a "one" is not specified for any of these three lines at a listed address, it must assume the "zero" state. Similarly, all three must assume the "zero" state at an unlisted address. This permits establishing the overall ROM program shown on Tables 11*a* through 11*d* herebelow.

Table 11a

ROM program for circuit 15.

| Address Nr. | X A7 17 | W A6 18 | V A5 19 | U A4 20 | N A3 21 | M A2 1 | L A1 2 | K A0 3 | — D8 11 | — D7 10 | — D6 9 | — D5 8 | F D4 7 | S D3 6 | S D2 5 | S D1 4 |
|---|---|---|---|---|---|---|---|---|---|---|---|---|---|---|---|---|
| 000 | 0 | 0 | 0 | 0 | 0 | 0 | 0 | 0 | 0 | 0 | 0 | 0 | 1 | 0 | 1 | 1 |
| 001 | 0 | 0 | 0 | 0 | 0 | 0 | 0 | 1 | 0 | 0 | 0 | 0 | 1 | 0 | 1 | 1 |
| 002 | 0 | 0 | 0 | 0 | 0 | 0 | 1 | 0 | 0 | 0 | 0 | 0 | 1 | 0 | 0 | 0 |
| 003 | 0 | 0 | 0 | 0 | 0 | 0 | 1 | 1 | 0 | 0 | 0 | 0 | 1 | 0 | 0 | 0 |
| 004 | 0 | 0 | 0 | 0 | 0 | 1 | 0 | 0 | 0 | 0 | 0 | 0 | 1 | 0 | 0 | 0 |
| 005 | 0 | 0 | 0 | 0 | 0 | 1 | 0 | 1 | 0 | 0 | 0 | 0 | 1 | 0 | 0 | 0 |
| 006 | 0 | 0 | 0 | 0 | 0 | 1 | 1 | 0 | 0 | 0 | 0 | 0 | 1 | 0 | 0 | 0 |
| 007 | 0 | 0 | 0 | 0 | 0 | 1 | 1 | 1 | 0 | 0 | 0 | 0 | 1 | 0 | 0 | 0 |
| 008 | 0 | 0 | 0 | 0 | 1 | 0 | 0 | 0 | 0 | 0 | 0 | 0 | 1 | 0 | 1 | 0 |
| 009 | 0 | 0 | 0 | 0 | 1 | 0 | 0 | 1 | 0 | 0 | 0 | 0 | 1 | 0 | 1 | 0 |
| 010 | 0 | 0 | 0 | 0 | 1 | 0 | 1 | 0 | 0 | 0 | 0 | 0 | 1 | 0 | 0 | 0 |
| 011 | 0 | 0 | 0 | 0 | 1 | 0 | 1 | 1 | 0 | 0 | 0 | 0 | 1 | 0 | 0 | 0 |
| 012 | 0 | 0 | 0 | 0 | 1 | 1 | 0 | 0 | 0 | 0 | 0 | 0 | 1 | 0 | 0 | 0 |
| 013 | 0 | 0 | 0 | 0 | 1 | 1 | 0 | 1 | 0 | 0 | 0 | 0 | 1 | 0 | 0 | 0 |
| 014 | 0 | 0 | 0 | 0 | 1 | 1 | 1 | 0 | 0 | 0 | 0 | 0 | 1 | 0 | 1 | 1 |
| 015 | 0 | 0 | 0 | 0 | 1 | 1 | 1 | 1 | 0 | 0 | 0 | 0 | 1 | 0 | 1 | 1 |
| 016 | 0 | 0 | 0 | 1 | 0 | 0 | 0 | 0 | 0 | 0 | 0 | 0 | 1 | 0 | 1 | 1 |
| 017 | 0 | 0 | 0 | 1 | 0 | 0 | 0 | 1 | 0 | 0 | 0 | 0 | 1 | 0 | 1 | 1 |
| 018 | 0 | 0 | 0 | 1 | 0 | 0 | 1 | 0 | 0 | 0 | 0 | 0 | 1 | 0 | 0 | 0 |
| 019 | 0 | 0 | 0 | 1 | 0 | 0 | 1 | 1 | 0 | 0 | 0 | 0 | 1 | 0 | 0 | 0 |
| 020 | 0 | 0 | 0 | 1 | 0 | 1 | 0 | 0 | 0 | 0 | 0 | 0 | 1 | 0 | 0 | 0 |
| 021 | 0 | 0 | 0 | 1 | 0 | 1 | 0 | 1 | 0 | 0 | 0 | 0 | 1 | 0 | 0 | 0 |
| 022 | 0 | 0 | 0 | 1 | 0 | 1 | 1 | 0 | 0 | 0 | 0 | 0 | 1 | 0 | 0 | 0 |
| 023 | 0 | 0 | 0 | 1 | 0 | 1 | 1 | 1 | 0 | 0 | 0 | 0 | 1 | 0 | 0 | 0 |
| 024 | 0 | 0 | 0 | 1 | 1 | 0 | 0 | 0 | 0 | 0 | 0 | 0 | 1 | 0 | 1 | 0 |
| 025 | 0 | 0 | 0 | 1 | 1 | 0 | 0 | 1 | 0 | 0 | 0 | 0 | 1 | 0 | 1 | 0 |
| 026 | 0 | 0 | 0 | 1 | 1 | 0 | 1 | 0 | 0 | 0 | 0 | 0 | 1 | 0 | 0 | 0 |
| 027 | 0 | 0 | 0 | 1 | 1 | 0 | 1 | 1 | 0 | 0 | 0 | 0 | 1 | 0 | 0 | 0 |
| 028 | 0 | 0 | 0 | 1 | 1 | 1 | 0 | 0 | 0 | 0 | 0 | 0 | 1 | 0 | 0 | 0 |
| 029 | 0 | 0 | 0 | 1 | 1 | 1 | 0 | 1 | 0 | 0 | 0 | 0 | 1 | 0 | 0 | 0 |
| 030 | 0 | 0 | 0 | 1 | 1 | 1 | 1 | 0 | 0 | 0 | 0 | 0 | 1 | 0 | 1 | 1 |
| 031 | 0 | 0 | 0 | 1 | 1 | 1 | 1 | 1 | 0 | 0 | 0 | 0 | 1 | 0 | 1 | 1 |
| 032 | 0 | 0 | 1 | 0 | 0 | 0 | 0 | 0 | 0 | 0 | 0 | 0 | 1 | 0 | 1 | 1 |
| 033 | 0 | 0 | 1 | 0 | 0 | 0 | 0 | 1 | 0 | 0 | 0 | 0 | 1 | 0 | 1 | 1 |
| 034 | 0 | 0 | 1 | 0 | 0 | 0 | 1 | 0 | 0 | 0 | 0 | 0 | 1 | 0 | 0 | 0 |
| 035 | 0 | 0 | 1 | 0 | 0 | 0 | 1 | 1 | 0 | 0 | 0 | 0 | 1 | 0 | 0 | 0 |
| 036 | 0 | 0 | 1 | 0 | 0 | 1 | 0 | 0 | 0 | 0 | 0 | 0 | 1 | 0 | 0 | 0 |
| 037 | 0 | 0 | 1 | 0 | 0 | 1 | 0 | 1 | 0 | 0 | 0 | 0 | 1 | 0 | 0 | 0 |
| 038 | 0 | 0 | 1 | 0 | 0 | 1 | 1 | 0 | 0 | 0 | 0 | 0 | 1 | 0 | 0 | 0 |
| 039 | 0 | 0 | 1 | 0 | 0 | 1 | 1 | 1 | 0 | 0 | 0 | 0 | 1 | 0 | 0 | 0 |
| 040 | 0 | 0 | 1 | 0 | 1 | 0 | 0 | 0 | 0 | 0 | 0 | 0 | 1 | 0 | 1 | 0 |
| 041 | 0 | 0 | 1 | 0 | 1 | 0 | 0 | 1 | 0 | 0 | 0 | 0 | 1 | 0 | 1 | 0 |
| 042 | 0 | 0 | 1 | 0 | 1 | 0 | 1 | 0 | 0 | 0 | 0 | 0 | 1 | 0 | 0 | 0 |
| 043 | 0 | 0 | 1 | 0 | 1 | 0 | 1 | 1 | 0 | 0 | 0 | 0 | 1 | 0 | 0 | 0 |
| 044 | 0 | 0 | 1 | 0 | 1 | 1 | 0 | 0 | 0 | 0 | 0 | 0 | 1 | 0 | 0 | 0 |
| 045 | 0 | 0 | 1 | 0 | 1 | 1 | 0 | 1 | 0 | 0 | 0 | 0 | 1 | 0 | 0 | 0 |
| 046 | 0 | 0 | 1 | 0 | 1 | 1 | 1 | 0 | 0 | 0 | 0 | 0 | 1 | 0 | 1 | 1 |
| 047 | 0 | 0 | 1 | 0 | 1 | 1 | 1 | 1 | 0 | 0 | 0 | 0 | 1 | 0 | 1 | 1 |
| 048 | 0 | 0 | 1 | 1 | 0 | 0 | 0 | 0 | 0 | 0 | 0 | 0 | 1 | 0 | 0 | 1 |
| 049 | 0 | 0 | 1 | 1 | 0 | 0 | 0 | 1 | 0 | 0 | 0 | 0 | 1 | 0 | 0 | 1 |
| 050 | 0 | 0 | 1 | 1 | 0 | 0 | 1 | 0 | 0 | 0 | 0 | 0 | 1 | 0 | 0 | 0 |
| 051 | 0 | 0 | 1 | 1 | 0 | 0 | 1 | 1 | 0 | 0 | 0 | 0 | 1 | 0 | 0 | 0 |
| 052 | 0 | 0 | 1 | 1 | 0 | 1 | 0 | 0 | 0 | 0 | 0 | 0 | 1 | 0 | 0 | 0 |
| 053 | 0 | 0 | 1 | 1 | 0 | 1 | 0 | 1 | 0 | 0 | 0 | 0 | 1 | 0 | 0 | 0 |
| 054 | 0 | 0 | 1 | 1 | 0 | 1 | 1 | 0 | 0 | 0 | 0 | 0 | 1 | 0 | 0 | 0 |
| 055 | 0 | 0 | 1 | 1 | 0 | 1 | 1 | 1 | 0 | 0 | 0 | 0 | 1 | 0 | 0 | 0 |

Table 11a-continued

| | ROM program for circuit 15. | | | | | | | | | | | | | | | |
|---|---|---|---|---|---|---|---|---|---|---|---|---|---|---|---|---|
| | X | W | V | U | N | M | L | K | — | — | — | — | F | S | S | S |
| Address | A7 | A6 | A5 | A4 | A3 | A2 | A1 | A0 | D8 | D7 | D6 | D5 | D4 | D3 | D2 | D1 |
| Nr. | 17 | 18 | 19 | 20 | 21 | 1 | 2 | 3 | 11 | 10 | 9 | 8 | 7 | 6 | 5 | 4 |
| 056 | 0 | 0 | 1 | 1 | 1 | 0 | 0 | 0 | 0 | 0 | 0 | 0 | 1 | 0 | 0 | 0 |
| 057 | 0 | 0 | 1 | 1 | 1 | 0 | 0 | 1 | 0 | 0 | 0 | 0 | 1 | 0 | 0 | 0 |
| 058 | 0 | 0 | 1 | 1 | 1 | 0 | 1 | 0 | 0 | 0 | 0 | 0 | 1 | 0 | 0 | 0 |
| 059 | 0 | 0 | 1 | 1 | 1 | 0 | 1 | 1 | 0 | 0 | 0 | 0 | 1 | 0 | 0 | 0 |
| 060 | 0 | 0 | 1 | 1 | 1 | 1 | 0 | 0 | 0 | 0 | 0 | 0 | 1 | 0 | 1 | 0 |
| 061 | 0 | 0 | 1 | 1 | 1 | 1 | 0 | 1 | 0 | 0 | 0 | 0 | 1 | 0 | 1 | 0 |
| 062 | 0 | 0 | 1 | 1 | 1 | 1 | 1 | 0 | 0 | 0 | 0 | 0 | 1 | 0 | 0 | 1 |
| 063 | 0 | 0 | 1 | 1 | 1 | 1 | 1 | 1 | 0 | 0 | 0 | 0 | 1 | 0 | 0 | 1 |

Table 11b

| | ROM program for circuit 15 | | | | | | | | | | | | | | | |
|---|---|---|---|---|---|---|---|---|---|---|---|---|---|---|---|---|
| | X | W | V | U | N | M | L | K | — | — | — | — | F | S | S | S |
| Address | A7 | A6 | A5 | A4 | A3 | A2 | A1 | A0 | D8 | D7 | D6 | D5 | D4 | D3 | D2 | D1 |
| Nr. | 17 | 18 | 19 | 20 | 21 | 1 | 2 | 3 | 11 | 10 | 9 | 8 | 7 | 6 | 5 | 4 |
| 064 | 0 | 1 | 0 | 0 | 0 | 0 | 0 | 0 | 0 | 0 | 0 | 0 | 1 | 0 | 0 | 0 |
| 065 | 0 | 1 | 0 | 0 | 0 | 0 | 0 | 1 | 0 | 0 | 0 | 0 | 1 | 0 | 0 | 0 |
| 066 | 0 | 1 | 0 | 0 | 0 | 0 | 1 | 0 | 0 | 0 | 0 | 0 | 1 | 0 | 0 | 0 |
| 067 | 0 | 1 | 0 | 0 | 0 | 0 | 1 | 1 | 0 | 0 | 0 | 0 | 1 | 0 | 0 | 0 |
| 068 | 0 | 1 | 0 | 0 | 0 | 1 | 0 | 0 | 0 | 0 | 0 | 0 | 1 | 0 | 0 | 0 |
| 069 | 0 | 1 | 0 | 0 | 0 | 1 | 0 | 1 | 0 | 0 | 0 | 0 | 1 | 0 | 0 | 0 |
| 070 | 0 | 1 | 0 | 0 | 0 | 1 | 1 | 0 | 0 | 0 | 0 | 0 | 1 | 0 | 0 | 0 |
| 071 | 0 | 1 | 0 | 0 | 0 | 1 | 1 | 1 | 0 | 0 | 0 | 0 | 1 | 0 | 0 | 0 |
| 072 | 0 | 1 | 0 | 0 | 1 | 0 | 0 | 0 | 0 | 0 | 0 | 0 | 1 | 0 | 0 | 0 |
| 073 | 0 | 1 | 0 | 0 | 1 | 0 | 0 | 1 | 0 | 0 | 0 | 0 | 1 | 0 | 0 | 0 |
| 074 | 0 | 1 | 0 | 0 | 1 | 0 | 1 | 0 | 0 | 0 | 0 | 0 | 1 | 0 | 0 | 0 |
| 075 | 0 | 1 | 0 | 0 | 1 | 0 | 1 | 1 | 0 | 0 | 0 | 0 | 1 | 0 | 0 | 0 |
| 076 | 0 | 1 | 0 | 0 | 1 | 1 | 0 | 0 | 0 | 0 | 0 | 0 | 1 | 0 | 1 | 0 |
| 077 | 0 | 1 | 0 | 0 | 1 | 1 | 0 | 1 | 0 | 0 | 0 | 0 | 1 | 0 | 1 | 0 |
| 078 | 0 | 1 | 0 | 0 | 1 | 1 | 1 | 0 | 0 | 0 | 0 | 0 | 1 | 0 | 0 | 1 |
| 079 | 0 | 1 | 0 | 0 | 1 | 1 | 1 | 1 | 0 | 0 | 0 | 0 | 1 | 0 | 0 | 1 |
| 080 | 0 | 1 | 0 | 1 | 0 | 0 | 0 | 0 | 0 | 0 | 0 | 0 | 1 | 0 | 0 | 1 |
| 081 | 0 | 1 | 0 | 1 | 0 | 0 | 0 | 1 | 0 | 0 | 0 | 0 | 1 | 0 | 0 | 1 |
| 082 | 0 | 1 | 0 | 1 | 0 | 0 | 1 | 0 | 0 | 0 | 0 | 0 | 1 | 0 | 0 | 0 |
| 083 | 0 | 1 | 0 | 1 | 0 | 0 | 1 | 1 | 0 | 0 | 0 | 0 | 1 | 0 | 0 | 0 |
| 084 | 0 | 1 | 0 | 1 | 0 | 1 | 0 | 0 | 0 | 0 | 0 | 0 | 1 | 0 | 0 | 0 |
| 085 | 0 | 1 | 0 | 1 | 0 | 1 | 0 | 1 | 0 | 0 | 0 | 0 | 1 | 0 | 0 | 0 |
| 086 | 0 | 1 | 0 | 1 | 0 | 1 | 1 | 0 | 0 | 0 | 0 | 0 | 1 | 0 | 0 | 0 |
| 087 | 0 | 1 | 0 | 1 | 0 | 1 | 1 | 1 | 0 | 0 | 0 | 0 | 1 | 0 | 0 | 0 |
| 088 | 0 | 1 | 0 | 1 | 1 | 0 | 0 | 0 | 0 | 0 | 0 | 0 | 1 | 0 | 0 | 0 |
| 089 | 0 | 1 | 0 | 1 | 1 | 0 | 0 | 1 | 0 | 0 | 0 | 0 | 1 | 0 | 0 | 0 |
| 090 | 0 | 1 | 0 | 1 | 1 | 0 | 1 | 0 | 0 | 0 | 0 | 0 | 1 | 0 | 0 | 0 |
| 091 | 0 | 1 | 0 | 1 | 1 | 0 | 1 | 1 | 0 | 0 | 0 | 0 | 1 | 0 | 0 | 0 |
| 092 | 0 | 1 | 0 | 1 | 1 | 1 | 0 | 0 | 0 | 0 | 0 | 0 | 1 | 0 | 1 | 0 |
| 093 | 0 | 1 | 0 | 1 | 1 | 1 | 0 | 1 | 0 | 0 | 0 | 0 | 1 | 0 | 1 | 0 |
| 094 | 0 | 1 | 0 | 1 | 1 | 1 | 1 | 0 | 0 | 0 | 0 | 0 | 1 | 0 | 0 | 0 |
| 095 | 0 | 1 | 0 | 1 | 1 | 1 | 1 | 1 | 0 | 0 | 0 | 0 | 1 | 0 | 0 | 0 |
| 096 | 0 | 1 | 1 | 0 | 0 | 0 | 0 | 0 | 0 | 0 | 0 | 0 | 1 | 0 | 0 | 1 |
| 097 | 0 | 1 | 1 | 0 | 0 | 0 | 0 | 1 | 0 | 0 | 0 | 0 | 1 | 0 | 0 | 1 |
| 098 | 0 | 1 | 1 | 0 | 0 | 0 | 1 | 0 | 0 | 0 | 0 | 0 | 1 | 0 | 0 | 0 |
| 099 | 0 | 1 | 1 | 0 | 0 | 0 | 1 | 1 | 0 | 0 | 0 | 0 | 1 | 0 | 0 | 0 |
| 100 | 0 | 1 | 1 | 0 | 0 | 1 | 0 | 0 | 0 | 0 | 0 | 0 | 1 | 0 | 0 | 0 |
| 101 | 0 | 1 | 1 | 0 | 0 | 1 | 0 | 1 | 0 | 0 | 0 | 0 | 1 | 0 | 0 | 0 |
| 102 | 0 | 1 | 1 | 0 | 0 | 1 | 1 | 0 | 0 | 0 | 0 | 0 | 1 | 0 | 0 | 0 |
| 103 | 0 | 1 | 1 | 0 | 0 | 1 | 1 | 1 | 0 | 0 | 0 | 0 | 1 | 0 | 0 | 0 |
| 104 | 0 | 1 | 1 | 0 | 1 | 0 | 0 | 0 | 0 | 0 | 0 | 0 | 1 | 0 | 0 | 0 |
| 105 | 0 | 1 | 1 | 0 | 1 | 0 | 0 | 1 | 0 | 0 | 0 | 0 | 1 | 0 | 0 | 0 |
| 106 | 0 | 1 | 1 | 0 | 1 | 0 | 1 | 0 | 0 | 0 | 0 | 0 | 1 | 0 | 0 | 0 |
| 107 | 0 | 1 | 1 | 0 | 1 | 0 | 1 | 1 | 0 | 0 | 0 | 0 | 1 | 0 | 0 | 0 |
| 108 | 0 | 1 | 1 | 0 | 1 | 1 | 0 | 0 | 0 | 0 | 0 | 0 | 1 | 0 | 1 | 0 |
| 109 | 0 | 1 | 1 | 0 | 1 | 1 | 0 | 1 | 0 | 0 | 0 | 0 | 1 | 0 | 1 | 0 |
| 110 | 0 | 1 | 1 | 0 | 1 | 1 | 1 | 0 | 0 | 0 | 0 | 0 | 1 | 0 | 0 | 0 |
| 111 | 0 | 1 | 1 | 0 | 1 | 1 | 1 | 1 | 0 | 0 | 0 | 0 | 1 | 0 | 0 | 0 |
| 112 | 0 | 1 | 1 | 1 | 0 | 0 | 0 | 0 | 0 | 0 | 0 | 0 | 1 | 0 | 0 | 1 |
| 113 | 0 | 1 | 1 | 1 | 0 | 0 | 0 | 1 | 0 | 0 | 0 | 0 | 1 | 0 | 0 | 1 |
| 114 | 0 | 1 | 1 | 1 | 0 | 0 | 1 | 0 | 0 | 0 | 0 | 0 | 1 | 0 | 0 | 0 |
| 115 | 0 | 1 | 1 | 1 | 0 | 0 | 1 | 1 | 0 | 0 | 0 | 0 | 1 | 0 | 0 | 0 |
| 116 | 0 | 1 | 1 | 1 | 0 | 1 | 0 | 0 | 0 | 0 | 0 | 0 | 1 | 0 | 0 | 0 |
| 117 | 0 | 1 | 1 | 1 | 0 | 1 | 0 | 1 | 0 | 0 | 0 | 0 | 1 | 0 | 0 | 0 |
| 118 | 0 | 1 | 1 | 1 | 0 | 1 | 1 | 0 | 0 | 0 | 0 | 0 | 1 | 0 | 0 | 0 |
| 119 | 0 | 1 | 1 | 1 | 0 | 1 | 1 | 1 | 0 | 0 | 0 | 0 | 1 | 0 | 0 | 0 |
| 120 | 0 | 1 | 1 | 1 | 1 | 0 | 0 | 0 | 0 | 0 | 0 | 0 | 1 | 0 | 0 | 0 |
| 121 | 0 | 1 | 1 | 1 | 1 | 0 | 0 | 1 | 0 | 0 | 0 | 0 | 1 | 0 | 0 | 0 |
| 122 | 0 | 1 | 1 | 1 | 1 | 0 | 1 | 0 | 0 | 0 | 0 | 0 | 1 | 0 | 0 | 0 |
| 123 | 0 | 1 | 1 | 1 | 1 | 0 | 1 | 1 | 0 | 0 | 0 | 0 | 1 | 0 | 0 | 0 |
| 124 | 0 | 1 | 1 | 1 | 1 | 1 | 0 | 0 | 0 | 0 | 0 | 0 | 1 | 0 | 1 | 0 |
| 125 | 0 | 1 | 1 | 1 | 1 | 1 | 0 | 1 | 0 | 0 | 0 | 0 | 1 | 0 | 0 | 0 |
| 126 | 0 | 1 | 1 | 1 | 1 | 1 | 1 | 0 | 0 | 0 | 0 | 0 | 1 | 0 | 0 | 0 |
| 127 | 0 | 1 | 1 | 1 | 1 | 1 | 1 | 1 | 0 | 0 | 0 | 0 | 1 | 0 | 0 | 0 |

Table 11c

| Address Nr. | X A7 17 | W A6 18 | V A5 19 | U A4 20 | N A3 21 | M A2 1 | L A1 2 | K A0 3 | — D8 11 | — D7 10 | — D6 9 | — D5 8 | F D4 7 | S D3 6 | S D2 5 | S D1 4 |
|---|---|---|---|---|---|---|---|---|---|---|---|---|---|---|---|---|
| | ROM program for circuit 15. | | | | | | | | | | | | | | | |
| 128 | 1 | 0 | 0 | 0 | 0 | 0 | 0 | 0 | 0 | 0 | 0 | 0 | 0 | 1 | 0 | 0 |
| 129 | 1 | 0 | 0 | 0 | 0 | 0 | 0 | 1 | 0 | 0 | 0 | 0 | 0 | 1 | 0 | 0 |
| 130 | 1 | 0 | 0 | 0 | 0 | 0 | 1 | 0 | 0 | 0 | 0 | 0 | 0 | 0 | 0 | 0 |
| 131 | 1 | 0 | 0 | 0 | 0 | 0 | 1 | 1 | 0 | 0 | 0 | 0 | 0 | 0 | 0 | 0 |
| 132 | 1 | 0 | 0 | 0 | 0 | 1 | 0 | 0 | 0 | 0 | 0 | 0 | 0 | 0 | 0 | 0 |
| 133 | 1 | 0 | 0 | 0 | 0 | 1 | 0 | 1 | 0 | 0 | 0 | 0 | 0 | 0 | 0 | 0 |
| 134 | 1 | 0 | 0 | 0 | 0 | 1 | 1 | 0 | 0 | 0 | 0 | 0 | 0 | 0 | 0 | 0 |
| 135 | 1 | 0 | 0 | 0 | 0 | 1 | 1 | 1 | 0 | 0 | 0 | 0 | 0 | 0 | 0 | 0 |
| 136 | 1 | 0 | 0 | 0 | 1 | 0 | 0 | 0 | 0 | 0 | 0 | 0 | 0 | 1 | 0 | 0 |
| 137 | 1 | 0 | 0 | 0 | 1 | 0 | 0 | 1 | 0 | 0 | 0 | 0 | 0 | 1 | 0 | 0 |
| 138 | 1 | 0 | 0 | 0 | 1 | 0 | 1 | 0 | 0 | 0 | 0 | 0 | 0 | 0 | 0 | 0 |
| 139 | 1 | 0 | 0 | 0 | 1 | 0 | 1 | 1 | 0 | 0 | 0 | 0 | 0 | 0 | 0 | 0 |
| 140 | 1 | 0 | 0 | 0 | 1 | 1 | 0 | 0 | 0 | 0 | 0 | 0 | 0 | 0 | 1 | 0 |
| 141 | 1 | 0 | 0 | 0 | 1 | 1 | 0 | 1 | 0 | 0 | 0 | 0 | 0 | 0 | 0 | 0 |
| 142 | 1 | 0 | 0 | 0 | 1 | 1 | 1 | 0 | 0 | 0 | 0 | 0 | 0 | 1 | 0 | 0 |
| 143 | 1 | 0 | 0 | 0 | 1 | 1 | 1 | 1 | 0 | 0 | 0 | 0 | 0 | 1 | 0 | 0 |
| 144 | 1 | 0 | 0 | 1 | 0 | 0 | 0 | 0 | 0 | 0 | 0 | 0 | 0 | 1 | 0 | 0 |
| 145 | 1 | 0 | 0 | 1 | 0 | 0 | 0 | 1 | 0 | 0 | 0 | 0 | 0 | 1 | 0 | 0 |
| 146 | 1 | 0 | 0 | 1 | 0 | 0 | 1 | 0 | 0 | 0 | 0 | 0 | 0 | 0 | 0 | 0 |
| 147 | 1 | 0 | 0 | 1 | 0 | 0 | 1 | 1 | 0 | 0 | 0 | 0 | 0 | 0 | 0 | 0 |
| 148 | 1 | 0 | 0 | 1 | 0 | 1 | 0 | 0 | 0 | 0 | 0 | 0 | 0 | 0 | 0 | 0 |
| 149 | 1 | 0 | 0 | 1 | 0 | 1 | 0 | 1 | 0 | 0 | 0 | 0 | 0 | 0 | 0 | 0 |
| 150 | 1 | 0 | 0 | 1 | 0 | 1 | 1 | 0 | 0 | 0 | 0 | 0 | 0 | 0 | 0 | 0 |
| 151 | 1 | 0 | 0 | 1 | 0 | 1 | 1 | 1 | 0 | 0 | 0 | 0 | 0 | 0 | 0 | 0 |
| 152 | 1 | 0 | 0 | 1 | 1 | 0 | 0 | 0 | 0 | 0 | 0 | 0 | 0 | 1 | 0 | 0 |
| 153 | 1 | 0 | 0 | 1 | 1 | 0 | 0 | 1 | 0 | 0 | 0 | 0 | 0 | 1 | 0 | 0 |
| 154 | 1 | 0 | 0 | 1 | 1 | 0 | 1 | 0 | 0 | 0 | 0 | 0 | 0 | 0 | 0 | 0 |
| 155 | 1 | 0 | 0 | 1 | 1 | 0 | 1 | 1 | 0 | 0 | 0 | 0 | 0 | 0 | 0 | 0 |
| 156 | 1 | 0 | 0 | 1 | 1 | 1 | 0 | 0 | 0 | 0 | 0 | 0 | 0 | 0 | 1 | 0 |
| 157 | 1 | 0 | 0 | 1 | 1 | 1 | 0 | 1 | 0 | 0 | 0 | 0 | 0 | 0 | 0 | 0 |
| 158 | 1 | 0 | 0 | 1 | 1 | 1 | 1 | 0 | 0 | 0 | 0 | 0 | 0 | 1 | 0 | 0 |
| 159 | 1 | 0 | 0 | 1 | 1 | 1 | 1 | 1 | 0 | 0 | 0 | 0 | 0 | 1 | 0 | 0 |
| 160 | 1 | 0 | 1 | 0 | 0 | 0 | 0 | 0 | 0 | 0 | 0 | 0 | 0 | 1 | 0 | 0 |
| 161 | 1 | 0 | 1 | 0 | 0 | 0 | 0 | 1 | 0 | 0 | 0 | 0 | 0 | 1 | 0 | 0 |
| 162 | 1 | 0 | 1 | 0 | 0 | 0 | 1 | 0 | 0 | 0 | 0 | 0 | 0 | 0 | 0 | 0 |
| 163 | 1 | 0 | 1 | 0 | 0 | 0 | 1 | 1 | 0 | 0 | 0 | 0 | 0 | 0 | 0 | 0 |
| 164 | 1 | 0 | 1 | 0 | 0 | 1 | 0 | 0 | 0 | 0 | 0 | 0 | 0 | 0 | 0 | 0 |
| 165 | 1 | 0 | 1 | 0 | 0 | 1 | 0 | 1 | 0 | 0 | 0 | 0 | 0 | 0 | 0 | 0 |
| 166 | 1 | 0 | 1 | 0 | 0 | 1 | 1 | 0 | 0 | 0 | 0 | 0 | 0 | 0 | 0 | 0 |
| 167 | 1 | 0 | 1 | 0 | 0 | 1 | 1 | 1 | 0 | 0 | 0 | 0 | 0 | 0 | 0 | 0 |
| 168 | 1 | 0 | 1 | 0 | 1 | 0 | 0 | 0 | 0 | 0 | 0 | 0 | 0 | 1 | 0 | 0 |
| 169 | 1 | 0 | 1 | 0 | 1 | 0 | 0 | 1 | 0 | 0 | 0 | 0 | 0 | 1 | 0 | 0 |
| 170 | 1 | 0 | 1 | 0 | 1 | 0 | 1 | 0 | 0 | 0 | 0 | 0 | 0 | 0 | 0 | 0 |
| 171 | 1 | 0 | 1 | 0 | 1 | 0 | 1 | 1 | 0 | 0 | 0 | 0 | 0 | 0 | 0 | 0 |
| 172 | 1 | 0 | 1 | 0 | 1 | 1 | 0 | 0 | 0 | 0 | 0 | 0 | 0 | 0 | 1 | 0 |
| 173 | 1 | 0 | 1 | 0 | 1 | 1 | 0 | 1 | 0 | 0 | 0 | 0 | 0 | 0 | 0 | 0 |
| 174 | 1 | 0 | 1 | 0 | 1 | 1 | 1 | 0 | 0 | 0 | 0 | 0 | 0 | 1 | 0 | 0 |
| 175 | 1 | 0 | 1 | 0 | 1 | 1 | 1 | 1 | 0 | 0 | 0 | 0 | 0 | 1 | 0 | 0 |
| 176 | 1 | 0 | 1 | 1 | 0 | 0 | 0 | 0 | 0 | 0 | 0 | 0 | 0 | 1 | 1 | 0 |
| 177 | 1 | 0 | 1 | 1 | 0 | 0 | 0 | 1 | 0 | 0 | 0 | 0 | 0 | 1 | 1 | 0 |
| 178 | 1 | 0 | 1 | 1 | 0 | 0 | 1 | 0 | 0 | 0 | 0 | 0 | 0 | 0 | 0 | 0 |
| 179 | 1 | 0 | 1 | 1 | 0 | 0 | 1 | 1 | 0 | 0 | 0 | 0 | 0 | 0 | 0 | 0 |
| 180 | 1 | 0 | 1 | 1 | 0 | 1 | 0 | 0 | 0 | 0 | 0 | 0 | 0 | 0 | 0 | 0 |
| 181 | 1 | 0 | 1 | 1 | 0 | 1 | 0 | 1 | 0 | 0 | 0 | 0 | 0 | 0 | 0 | 0 |
| 182 | 1 | 0 | 1 | 1 | 0 | 1 | 1 | 0 | 0 | 0 | 0 | 0 | 0 | 0 | 0 | 0 |
| 183 | 1 | 0 | 1 | 1 | 0 | 1 | 1 | 1 | 0 | 0 | 0 | 0 | 0 | 0 | 0 | 0 |
| 184 | 1 | 0 | 1 | 1 | 1 | 0 | 0 | 0 | 0 | 0 | 0 | 0 | 0 | 1 | 0 | 0 |
| 185 | 1 | 0 | 1 | 1 | 1 | 0 | 0 | 1 | 0 | 0 | 0 | 0 | 0 | 1 | 0 | 0 |
| 186 | 1 | 0 | 1 | 1 | 1 | 0 | 1 | 0 | 0 | 0 | 0 | 0 | 0 | 0 | 0 | 0 |
| 187 | 1 | 0 | 1 | 1 | 1 | 0 | 1 | 1 | 0 | 0 | 0 | 0 | 0 | 0 | 0 | 0 |
| 188 | 1 | 0 | 1 | 1 | 1 | 1 | 0 | 0 | 0 | 0 | 0 | 0 | 0 | 0 | 0 | 0 |
| 189 | 1 | 0 | 1 | 1 | 1 | 1 | 0 | 1 | 0 | 0 | 0 | 0 | 0 | 0 | 0 | 0 |
| 190 | 1 | 0 | 1 | 1 | 1 | 1 | 1 | 0 | 0 | 0 | 0 | 0 | 0 | 1 | 1 | 0 |
| 191 | 1 | 0 | 1 | 1 | 1 | 1 | 1 | 1 | 0 | 0 | 0 | 0 | 0 | 1 | 1 | 0 |

Table 11d.

| Address Nr. ↓ | X A7 17 | W A6 18 | V A5 19 | U A4 20 | N A3 1 | M A2 2 | L A1 3 | K A0 11 | — D8 10 | — D7 9 | — D6 8 | — D5 7 | F D4 6 | S D3 5 | S D2 4 | S D1 |
|---|---|---|---|---|---|---|---|---|---|---|---|---|---|---|---|---|
| | ROM program for circuit 15. | | | | | | | | | | | | | | | |
| 192 | 1 | 1 | 0 | 0 | 0 | 0 | 0 | 0 | 0 | 0 | 0 | 0 | 0 | 1 | 1 | 0 |
| 193 | 1 | 1 | 0 | 0 | 0 | 0 | 0 | 1 | 0 | 0 | 0 | 0 | 0 | 1 | 1 | 0 |
| 194 | 1 | 1 | 0 | 0 | 0 | 0 | 1 | 0 | 0 | 0 | 0 | 0 | 0 | 0 | 0 | 0 |
| 195 | 1 | 1 | 0 | 0 | 0 | 0 | 1 | 1 | 0 | 0 | 0 | 0 | 0 | 0 | 0 | 0 |
| 196 | 1 | 1 | 0 | 0 | 0 | 1 | 0 | 0 | 0 | 0 | 0 | 0 | 0 | 0 | 0 | 0 |
| 197 | 1 | 1 | 0 | 0 | 0 | 1 | 0 | 1 | 0 | 0 | 0 | 0 | 0 | 0 | 0 | 0 |
| 198 | 1 | 1 | 0 | 0 | 0 | 1 | 1 | 0 | 0 | 0 | 0 | 0 | 0 | 0 | 0 | 0 |
| 199 | 1 | 1 | 0 | 0 | 0 | 1 | 1 | 1 | 0 | 0 | 0 | 0 | 0 | 0 | 0 | 0 |
| 200 | 1 | 1 | 0 | 0 | 1 | 0 | 0 | 0 | 0 | 0 | 0 | 0 | 0 | 1 | 0 | 0 |
| 201 | 1 | 1 | 0 | 0 | 1 | 0 | 0 | 1 | 0 | 0 | 0 | 0 | 0 | 1 | 0 | 0 |
| 202 | 1 | 1 | 0 | 0 | 1 | 0 | 1 | 0 | 0 | 0 | 0 | 0 | 0 | 0 | 0 | 0 |
| 203 | 1 | 1 | 0 | 0 | 1 | 0 | 1 | 1 | 0 | 0 | 0 | 0 | 0 | 0 | 0 | 0 |
| 204 | 1 | 1 | 0 | 0 | 1 | 1 | 0 | 0 | 0 | 0 | 0 | 0 | 0 | 0 | 0 | 0 |
| 205 | 1 | 1 | 0 | 0 | 1 | 1 | 0 | 1 | 0 | 0 | 0 | 0 | 0 | 0 | 0 | 0 |
| 206 | 1 | 1 | 0 | 0 | 1 | 1 | 1 | 0 | 0 | 0 | 0 | 0 | 0 | 1 | 1 | 0 |
| 207 | 1 | 1 | 0 | 0 | 1 | 1 | 1 | 1 | 0 | 0 | 0 | 0 | 0 | 1 | 1 | 0 |

Table 11d.-continued

ROM program for circuit 15.

| Address Nr. ↓ | X A7 17 | W A6 18 | V A5 19 | U A4 20 | N A3 1 | M A2 2 | L A1 3 | K A0 11 | — D8 10 | — D7 9 | — D6 8 | — D5 7 | F D4 6 | S D3 5 | S D2 4 | S D1 |
|---|---|---|---|---|---|---|---|---|---|---|---|---|---|---|---|---|
| 208 | 1 | 1 | 0 | 1 | 0 | 0 | 0 | 0 | 0 | 0 | 0 | 0 | 0 | 1 | 1 | 1 |
| 209 | 1 | 1 | 0 | 1 | 0 | 0 | 0 | 1 | 0 | 0 | 0 | 0 | 0 | 1 | 1 | 1 |
| 210 | 1 | 1 | 0 | 1 | 0 | 0 | 1 | 0 | 0 | 0 | 0 | 0 | 0 | 0 | 0 | 0 |
| 211 | 1 | 1 | 0 | 1 | 0 | 0 | 1 | 1 | 0 | 0 | 0 | 0 | 0 | 0 | 0 | 0 |
| 212 | 1 | 1 | 0 | 1 | 0 | 1 | 0 | 0 | 0 | 0 | 0 | 0 | 0 | 0 | 0 | 0 |
| 213 | 1 | 1 | 0 | 1 | 0 | 1 | 0 | 1 | 0 | 0 | 0 | 0 | 0 | 0 | 0 | 0 |
| 214 | 1 | 1 | 0 | 1 | 0 | 1 | 1 | 0 | 0 | 0 | 0 | 0 | 0 | 0 | 0 | 0 |
| 215 | 1 | 1 | 0 | 1 | 0 | 1 | 1 | 1 | 0 | 0 | 0 | 0 | 0 | 0 | 0 | 0 |
| 216 | 1 | 1 | 0 | 1 | 1 | 0 | 0 | 0 | 0 | 0 | 0 | 0 | 0 | 1 | 0 | 0 |
| 217 | 1 | 1 | 0 | 1 | 1 | 0 | 0 | 1 | 0 | 0 | 0 | 0 | 0 | 1 | 0 | 0 |
| 218 | 1 | 1 | 0 | 1 | 1 | 0 | 1 | 0 | 0 | 0 | 0 | 0 | 0 | 0 | 0 | 0 |
| 219 | 1 | 1 | 0 | 1 | 1 | 0 | 1 | 1 | 0 | 0 | 0 | 0 | 0 | 0 | 0 | 0 |
| 220 | 1 | 1 | 0 | 1 | 1 | 1 | 0 | 0 | 0 | 0 | 0 | 0 | 0 | 0 | 0 | 0 |
| 221 | 1 | 1 | 0 | 1 | 1 | 1 | 0 | 1 | 0 | 0 | 0 | 0 | 0 | 0 | 0 | 0 |
| 222 | 1 | 1 | 0 | 1 | 1 | 1 | 1 | 0 | 0 | 0 | 0 | 0 | 0 | 1 | 1 | 0 |
| 223 | 1 | 1 | 0 | 1 | 1 | 1 | 1 | 1 | 0 | 0 | 0 | 0 | 0 | 1 | 1 | 0 |
| 224 | 1 | 1 | 1 | 0 | 0 | 0 | 0 | 0 | 0 | 0 | 0 | 0 | 0 | 1 | 1 | 0 |
| 225 | 1 | 1 | 1 | 0 | 0 | 0 | 0 | 1 | 0 | 0 | 0 | 0 | 0 | 1 | 1 | 0 |
| 226 | 1 | 1 | 1 | 0 | 0 | 0 | 1 | 0 | 0 | 0 | 0 | 0 | 0 | 0 | 0 | 0 |
| 227 | 1 | 1 | 1 | 0 | 0 | 0 | 1 | 1 | 0 | 0 | 0 | 0 | 0 | 0 | 0 | 0 |
| 228 | 1 | 1 | 1 | 0 | 0 | 1 | 0 | 0 | 0 | 0 | 0 | 0 | 0 | 0 | 0 | 0 |
| 229 | 1 | 1 | 1 | 0 | 0 | 1 | 0 | 1 | 0 | 0 | 0 | 0 | 0 | 0 | 0 | 0 |
| 230 | 1 | 1 | 1 | 0 | 0 | 1 | 1 | 0 | 0 | 0 | 0 | 0 | 0 | 0 | 0 | 0 |
| 231 | 1 | 1 | 1 | 0 | 0 | 1 | 1 | 1 | 0 | 0 | 0 | 0 | 0 | 0 | 0 | 0 |
| 232 | 1 | 1 | 1 | 0 | 1 | 0 | 0 | 0 | 0 | 0 | 0 | 0 | 0 | 1 | 0 | 0 |
| 233 | 1 | 1 | 1 | 0 | 1 | 0 | 0 | 1 | 0 | 0 | 0 | 0 | 0 | 1 | 0 | 0 |
| 234 | 1 | 1 | 1 | 0 | 1 | 0 | 1 | 0 | 0 | 0 | 0 | 0 | 0 | 0 | 0 | 0 |
| 235 | 1 | 1 | 1 | 0 | 1 | 0 | 1 | 1 | 0 | 0 | 0 | 0 | 0 | 0 | 0 | 0 |
| 236 | 1 | 1 | 1 | 0 | 1 | 1 | 0 | 0 | 0 | 0 | 0 | 0 | 0 | 0 | 0 | 0 |
| 237 | 1 | 1 | 1 | 0 | 1 | 1 | 0 | 1 | 0 | 0 | 0 | 0 | 0 | 0 | 0 | 0 |
| 238 | 1 | 1 | 1 | 0 | 1 | 1 | 1 | 0 | 0 | 0 | 0 | 0 | 0 | 1 | 1 | 0 |
| 239 | 1 | 1 | 1 | 0 | 1 | 1 | 1 | 1 | 0 | 0 | 0 | 0 | 0 | 1 | 1 | 0 |
| 240 | 1 | 1 | 1 | 1 | 0 | 0 | 0 | 0 | 0 | 0 | 0 | 0 | 0 | 1 | 1 | 0 |
| 241 | 1 | 1 | 1 | 1 | 0 | 0 | 0 | 1 | 0 | 0 | 0 | 0 | 0 | 1 | 1 | 0 |
| 242 | 1 | 1 | 1 | 1 | 0 | 0 | 1 | 0 | 0 | 0 | 0 | 0 | 0 | 0 | 0 | 0 |
| 243 | 1 | 1 | 1 | 1 | 0 | 0 | 1 | 1 | 0 | 0 | 0 | 0 | 0 | 0 | 0 | 0 |
| 244 | 1 | 1 | 1 | 1 | 0 | 1 | 0 | 0 | 0 | 0 | 0 | 0 | 0 | 0 | 0 | 0 |
| 245 | 1 | 1 | 1 | 1 | 0 | 1 | 0 | 1 | 0 | 0 | 0 | 0 | 0 | 0 | 0 | 0 |
| 246 | 1 | 1 | 1 | 1 | 0 | 1 | 1 | 0 | 0 | 0 | 0 | 0 | 0 | 0 | 0 | 0 |
| 247 | 1 | 1 | 1 | 1 | 0 | 1 | 1 | 1 | 0 | 0 | 0 | 0 | 0 | 0 | 0 | 0 |
| 248 | 1 | 1 | 1 | 1 | 1 | 0 | 0 | 0 | 0 | 0 | 0 | 0 | 0 | 1 | 0 | 0 |
| 249 | 1 | 1 | 1 | 1 | 1 | 0 | 0 | 1 | 0 | 0 | 0 | 0 | 0 | 1 | 0 | 0 |
| 250 | 1 | 1 | 1 | 1 | 1 | 0 | 1 | 0 | 0 | 0 | 0 | 0 | 0 | 0 | 0 | 0 |
| 251 | 1 | 1 | 1 | 1 | 1 | 0 | 1 | 1 | 0 | 0 | 0 | 0 | 0 | 0 | 0 | 0 |
| 252 | 1 | 1 | 1 | 1 | 1 | 1 | 0 | 0 | 0 | 0 | 0 | 0 | 0 | 0 | 0 | 0 |
| 253 | 1 | 1 | 1 | 1 | 1 | 1 | 0 | 1 | 0 | 0 | 0 | 0 | 0 | 0 | 0 | 0 |
| 254 | 1 | 1 | 1 | 1 | 1 | 1 | 1 | 0 | 0 | 0 | 0 | 0 | 0 | 1 | 1 | 0 |
| 255 | 1 | 1 | 1 | 1 | 1 | 1 | 1 | 1 | 0 | 0 | 0 | 0 | 0 | 1 | 1 | 0 |

All 40 patterns are thus covered by the combinations (1, 1), (1, 0) and (0, 1) of the (Z, Y) pair of bits. The combination (0, 0) occurs in the free running mode, and in this case, device 116 no longer reproduces at its output on pin 13 the state of a ROM output line. Instead, it reproduces the state of a grounded input (namely pin 12), resulting in S = 0, for the entire free running mode. The other half of circuit 116 (the one associated with output 3) is used to generate on line 51 the signal F, determining the transition between the fixed pattern mode of operation and the free running mode of operation. The state F = 0 establishes the fixed pattern mode of operation and the transition to F = 1 initiates transfer to the free running mode, for voltage requests which are lower than the voltages obtained through the 40th pattern. Accordingly, output 3 of circuit 116 reproduces the state of grounded inputs 4 and 2 respectively when (Z, Y) =(1, 1) or (1, 0), which only occurs in the fixed pattern mode, and it reproduces the state of input 1 (hard wired to logic one), when (Z, Y) = (0, 0), which only occurs in the free running mode. For (Z, Y) = (0, 1), which occurs in the range of voltages for which a mode switching is provided, circuit 116 "watches" output line 7 of the ROM in circuit 115. The state of this line responds only to the state of input signals U, V, W, X and ignores the KLMN byte. It assumes the state 1 for all (U, V, W, X) combinations corresponding to a voltage request lower than the 40th pattern, in the (Z, Y) = (0, 1) range of regulation. It is easy to verify that all such combination are the ones for which $\overline{X}$ = 0. Output 7 of circuit 115 thus reproduces the state of X. This fact is reflected in Tables 11*a* to 11*d*.

Considering device 38 of FIG. 14, this device determines whether comparator 110 is made to operate in the normal mode or in the reverse mode in response to the state of the comparison mode bit S. The rule is that the state of the comparator output COM should be considered as is when S = 0 and should be inverted before processing when S = 1. Thus, if COM* is the state of the comparator recognized by the downstream circuitry, COM* = COM when S = 0 and COM* = $\overline{COM}$ when S = 1. Secondly, it is through circuit 38 that the pattern information valid for the first and second quadrant of the output fundamental is changed to fit the third and fourth quadrant, in response to the state of the cycle reference bit Q. The rule is that the recognized comparator state COM* should be transferred as is to the OUT line (output of circuit 38, pin 4) when Q = 0 and should be inverted before transfer when Q = 1. These two conditions result in the following truth table, valid for the fixed pattern mode only, i.e. when F = 0:

Table 12

| S | COM | Q | OUT |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |

Table 12-continued

| S | COM | Q | OUT |
|---|---|---|---|
| 1 | 1 | 1 | 1 |

This table is incorporated in the ROM program of circuit 38 given hereinafter by Tables 13*a* through 13*d*.

Table 13a.

ROM program for circuit 18.

| Address Nr. ↓ | Z A7 17 | F A6 18 | S A5 19 | M'' A4 20 | L'' A3 21 | K'' A2 1 | COM A1 2 | Q A0 3 | — D8 11 | — D7 10 | — D6 9 | — D5 8 | — D4 7 | $\overline{Z}$ D3 6 | $\overline{F}$ D2 5 | OUT D1 4 |
|---|---|---|---|---|---|---|---|---|---|---|---|---|---|---|---|---|
| 000 | 0 | 0 | 0 | 0 | 0 | 0 | 0 | 0 | 0 | 0 | 0 | 0 | 0 | 1 | 1 | 0 |
| 001 | 0 | 0 | 0 | 0 | 0 | 0 | 0 | 1 | 0 | 0 | 0 | 0 | 0 | 1 | 1 | 1 |
| 002 | 0 | 0 | 0 | 0 | 0 | 0 | 1 | 0 | 0 | 0 | 0 | 0 | 0 | 1 | 1 | 1 |
| 003 | 0 | 0 | 0 | 0 | 0 | 0 | 1 | 1 | 0 | 0 | 0 | 0 | 0 | 1 | 1 | 0 |
| 004 | 0 | 0 | 0 | 0 | 0 | 1 | 0 | 0 | 0 | 0 | 0 | 0 | 0 | 1 | 1 | 0 |
| 005 | 0 | 0 | 0 | 0 | 0 | 1 | 0 | 1 | 0 | 0 | 0 | 0 | 0 | 1 | 1 | 1 |
| 006 | 0 | 0 | 0 | 0 | 0 | 1 | 1 | 0 | 0 | 0 | 0 | 0 | 0 | 1 | 1 | 1 |
| 007 | 0 | 0 | 0 | 0 | 0 | 1 | 1 | 1 | 0 | 0 | 0 | 0 | 0 | 1 | 1 | 0 |
| 008 | 0 | 0 | 0 | 0 | 1 | 0 | 0 | 0 | 0 | 0 | 0 | 0 | 0 | 1 | 1 | 0 |
| 009 | 0 | 0 | 0 | 0 | 1 | 0 | 0 | 1 | 0 | 0 | 0 | 0 | 0 | 1 | 1 | 1 |
| 010 | 0 | 0 | 0 | 0 | 1 | 0 | 1 | 0 | 0 | 0 | 0 | 0 | 0 | 1 | 1 | 1 |
| 011 | 0 | 0 | 0 | 0 | 1 | 0 | 1 | 1 | 0 | 0 | 0 | 0 | 0 | 1 | 1 | 0 |
| 012 | 0 | 0 | 0 | 0 | 1 | 1 | 0 | 0 | 0 | 0 | 0 | 0 | 0 | 1 | 1 | 0 |
| 013 | 0 | 0 | 0 | 0 | 1 | 1 | 0 | 1 | 0 | 0 | 0 | 0 | 0 | 1 | 1 | 1 |
| 014 | 0 | 0 | 0 | 0 | 1 | 1 | 1 | 0 | 0 | 0 | 0 | 0 | 0 | 1 | 1 | 1 |
| 015 | 0 | 0 | 0 | 0 | 1 | 1 | 1 | 1 | 0 | 0 | 0 | 0 | 0 | 1 | 1 | 0 |
| 016 | 0 | 0 | 0 | 1 | 0 | 0 | 0 | 0 | 0 | 0 | 0 | 0 | 0 | 1 | 1 | 0 |
| 017 | 0 | 0 | 0 | 1 | 0 | 0 | 0 | 1 | 0 | 0 | 0 | 0 | 0 | 1 | 1 | 1 |
| 018 | 0 | 0 | 0 | 1 | 0 | 0 | 1 | 0 | 0 | 0 | 0 | 0 | 0 | 1 | 1 | 1 |
| 019 | 0 | 0 | 0 | 1 | 0 | 0 | 1 | 1 | 0 | 0 | 0 | 0 | 0 | 1 | 1 | 0 |
| 020 | 0 | 0 | 0 | 1 | 0 | 1 | 0 | 0 | 0 | 0 | 0 | 0 | 0 | 1 | 1 | 0 |
| 021 | 0 | 0 | 0 | 1 | 0 | 1 | 0 | 1 | 0 | 0 | 0 | 0 | 0 | 1 | 1 | 1 |
| 022 | 0 | 0 | 0 | 1 | 0 | 1 | 1 | 0 | 0 | 0 | 0 | 0 | 0 | 1 | 1 | 1 |
| 023 | 0 | 0 | 0 | 1 | 0 | 1 | 1 | 1 | 0 | 0 | 0 | 0 | 0 | 1 | 1 | 0 |
| 024 | 0 | 0 | 0 | 1 | 1 | 0 | 0 | 0 | 0 | 0 | 0 | 0 | 0 | 1 | 1 | 0 |
| 025 | 0 | 0 | 0 | 1 | 1 | 0 | 0 | 1 | 0 | 0 | 0 | 0 | 0 | 1 | 1 | 1 |
| 026 | 0 | 0 | 0 | 1 | 1 | 0 | 1 | 0 | 0 | 0 | 0 | 0 | 0 | 1 | 1 | 1 |
| 027 | 0 | 0 | 0 | 1 | 1 | 0 | 1 | 1 | 0 | 0 | 0 | 0 | 0 | 1 | 1 | 0 |
| 028 | 0 | 0 | 0 | 1 | 1 | 1 | 0 | 0 | 0 | 0 | 0 | 0 | 0 | 1 | 1 | 0 |
| 029 | 0 | 0 | 0 | 1 | 1 | 1 | 0 | 1 | 0 | 0 | 0 | 0 | 0 | 1 | 1 | 1 |
| 030 | 0 | 0 | 0 | 1 | 1 | 1 | 1 | 0 | 0 | 0 | 0 | 0 | 0 | 1 | 1 | 1 |
| 031 | 0 | 0 | 0 | 1 | 1 | 1 | 1 | 1 | 0 | 0 | 0 | 0 | 0 | 1 | 1 | 0 |
| 032 | 0 | 0 | 1 | 0 | 0 | 0 | 0 | 0 | 0 | 0 | 0 | 0 | 0 | 1 | 1 | 1 |
| 033 | 0 | 0 | 1 | 0 | 0 | 0 | 0 | 1 | 0 | 0 | 0 | 0 | 0 | 1 | 1 | 0 |
| 034 | 0 | 0 | 1 | 0 | 0 | 0 | 1 | 0 | 0 | 0 | 0 | 0 | 0 | 1 | 1 | 0 |
| 035 | 0 | 0 | 1 | 0 | 0 | 0 | 1 | 1 | 0 | 0 | 0 | 0 | 0 | 1 | 1 | 1 |
| 036 | 0 | 0 | 1 | 0 | 0 | 1 | 0 | 0 | 0 | 0 | 0 | 0 | 0 | 1 | 1 | 1 |
| 037 | 0 | 0 | 1 | 0 | 0 | 1 | 0 | 1 | 0 | 0 | 0 | 0 | 0 | 1 | 1 | 0 |
| 038 | 0 | 0 | 1 | 0 | 0 | 1 | 1 | 0 | 0 | 0 | 0 | 0 | 0 | 1 | 1 | 0 |
| 039 | 0 | 0 | 1 | 0 | 0 | 1 | 1 | 1 | 0 | 0 | 0 | 0 | 0 | 1 | 1 | 1 |
| 040 | 0 | 0 | 1 | 0 | 1 | 0 | 0 | 0 | 0 | 0 | 0 | 0 | 0 | 1 | 1 | 1 |
| 041 | 0 | 0 | 1 | 0 | 1 | 0 | 0 | 1 | 0 | 0 | 0 | 0 | 0 | 1 | 1 | 0 |
| 042 | 0 | 0 | 1 | 0 | 1 | 0 | 1 | 0 | 0 | 0 | 0 | 0 | 0 | 1 | 1 | 0 |
| 043 | 0 | 0 | 1 | 0 | 1 | 0 | 1 | 1 | 0 | 0 | 0 | 0 | 0 | 1 | 1 | 1 |
| 044 | 0 | 0 | 1 | 0 | 1 | 1 | 0 | 0 | 0 | 0 | 0 | 0 | 0 | 1 | 1 | 1 |
| 045 | 0 | 0 | 1 | 0 | 1 | 1 | 0 | 1 | 0 | 0 | 0 | 0 | 0 | 1 | 1 | 0 |
| 046 | 0 | 0 | 1 | 0 | 1 | 1 | 1 | 0 | 0 | 0 | 0 | 0 | 0 | 1 | 1 | 0 |
| 047 | 0 | 0 | 1 | 0 | 1 | 1 | 1 | 1 | 0 | 0 | 0 | 0 | 0 | 1 | 1 | 1 |
| 048 | 0 | 0 | 1 | 1 | 0 | 0 | 0 | 0 | 0 | 0 | 0 | 0 | 0 | 1 | 1 | 1 |
| 049 | 0 | 0 | 1 | 1 | 0 | 0 | 0 | 1 | 0 | 0 | 0 | 0 | 0 | 1 | 1 | 0 |
| 050 | 0 | 0 | 1 | 1 | 0 | 0 | 1 | 0 | 0 | 0 | 0 | 0 | 0 | 1 | 1 | 0 |
| 051 | 0 | 0 | 1 | 1 | 0 | 0 | 1 | 1 | 0 | 0 | 0 | 0 | 0 | 1 | 1 | 1 |
| 052 | 0 | 0 | 1 | 1 | 0 | 1 | 0 | 0 | 0 | 0 | 0 | 0 | 0 | 1 | 1 | 1 |
| 053 | 0 | 0 | 1 | 1 | 0 | 1 | 0 | 1 | 0 | 0 | 0 | 0 | 0 | 1 | 1 | 0 |
| 054 | 0 | 0 | 1 | 1 | 0 | 1 | 1 | 0 | 0 | 0 | 0 | 0 | 0 | 1 | 1 | 0 |
| 055 | 0 | 0 | 1 | 1 | 0 | 1 | 1 | 1 | 0 | 0 | 0 | 0 | 0 | 1 | 1 | 1 |
| 056 | 0 | 0 | 1 | 1 | 1 | 0 | 0 | 0 | 0 | 0 | 0 | 0 | 0 | 1 | 1 | 1 |
| 057 | 0 | 0 | 1 | 1 | 1 | 0 | 0 | 1 | 0 | 0 | 0 | 0 | 0 | 1 | 1 | 0 |
| 058 | 0 | 0 | 1 | 1 | 1 | 0 | 1 | 0 | 0 | 0 | 0 | 0 | 0 | 1 | 1 | 0 |
| 059 | 0 | 0 | 1 | 1 | 1 | 0 | 1 | 1 | 0 | 0 | 0 | 0 | 0 | 1 | 1 | 1 |
| 060 | 0 | 0 | 1 | 1 | 1 | 1 | 0 | 0 | 0 | 0 | 0 | 0 | 0 | 1 | 1 | 1 |
| 061 | 0 | 0 | 1 | 1 | 1 | 1 | 0 | 1 | 0 | 0 | 0 | 0 | 0 | 1 | 1 | 0 |
| 062 | 0 | 0 | 1 | 1 | 1 | 1 | 1 | 0 | 0 | 0 | 0 | 0 | 0 | 1 | 1 | 0 |
| 063 | 0 | 0 | 1 | 1 | 1 | 1 | 1 | 1 | 0 | 0 | 0 | 0 | 0 | 1 | 1 | 1 |

Table 13b.

ROM program for circuit 18.

| Address Nr. ↓ | Z A7 17 | F A6 18 | S A5 19 | M'' A4 20 | L'' A3 21 | K'' A2 1 | COM A1 2 | Q A0 3 | — D8 11 | — D7 10 | — D6 9 | — D5 8 | — D4 7 | $\overline{Z}$ D3 6 | $\overline{F}$ D2 5 | OUT D1 4 |
|---|---|---|---|---|---|---|---|---|---|---|---|---|---|---|---|---|
| 064 | 0 | 1 | 0 | 0 | 0 | 0 | 0 | 0 | 0 | 0 | 0 | 0 | 0 | 1 | 0 | 1 |
| 065 | 0 | 1 | 0 | 0 | 0 | 0 | 0 | 1 | 0 | 0 | 0 | 0 | 0 | 1 | 0 | 0 |
| 066 | 0 | 1 | 0 | 0 | 0 | 0 | 1 | 0 | 0 | 0 | 0 | 0 | 0 | 1 | 0 | 0 |
| 067 | 0 | 1 | 0 | 0 | 0 | 0 | 1 | 1 | 0 | 0 | 0 | 0 | 0 | 1 | 0 | 0 |

Table 13b.-continued

ROM program for circuit 18.

| Address Nr. ↓ | Z A7 17 | F A6 18 | S A5 19 | M″ A4 20 | L″ A3 21 | K″ A2 1 | COM A1 2 | Q A0 3 | — D8 11 | — D7 10 | — D6 9 | — D5 8 | — D4 7 | $\overline{Z}$ D3 6 | $\overline{F}$ D2 5 | OUT D1 4 |
|---|---|---|---|---|---|---|---|---|---|---|---|---|---|---|---|---|
| 068 | 0 | 1 | 0 | 0 | 0 | 1 | 0 | 0 | 0 | 0 | 0 | 0 | 0 | 1 | 0 | 0 |
| 069 | 0 | 1 | 0 | 0 | 0 | 1 | 0 | 1 | 0 | 0 | 0 | 0 | 0 | 1 | 0 | 0 |
| 070 | 0 | 1 | 0 | 0 | 0 | 1 | 1 | 0 | 0 | 0 | 0 | 0 | 0 | 1 | 0 | 0 |
| 071 | 0 | 1 | 0 | 0 | 0 | 1 | 1 | 1 | 0 | 0 | 0 | 0 | 0 | 1 | 0 | 0 |
| 072 | 0 | 1 | 0 | 0 | 1 | 0 | 0 | 0 | 0 | 0 | 0 | 0 | 0 | 1 | 0 | 0 |
| 073 | 0 | 1 | 0 | 0 | 1 | 0 | 0 | 1 | 0 | 0 | 0 | 0 | 0 | 1 | 0 | 0 |
| 074 | 0 | 1 | 0 | 0 | 1 | 0 | 1 | 0 | 0 | 0 | 0 | 0 | 0 | 1 | 0 | 0 |
| 075 | 0 | 1 | 0 | 0 | 1 | 0 | 1 | 1 | 0 | 0 | 0 | 0 | 0 | 1 | 0 | 0 |
| 076 | 0 | 1 | 0 | 0 | 1 | 1 | 0 | 0 | 0 | 0 | 0 | 0 | 0 | 1 | 0 | 1 |
| 077 | 0 | 1 | 0 | 0 | 1 | 1 | 0 | 1 | 0 | 0 | 0 | 0 | 0 | 1 | 0 | 0 |
| 078 | 0 | 1 | 0 | 0 | 1 | 1 | 1 | 0 | 0 | 0 | 0 | 0 | 0 | 1 | 0 | 0 |
| 079 | 0 | 1 | 0 | 0 | 1 | 1 | 1 | 1 | 0 | 0 | 0 | 0 | 0 | 1 | 0 | 0 |
| 080 | 0 | 1 | 0 | 1 | 0 | 0 | 0 | 0 | 0 | 0 | 0 | 0 | 0 | 1 | 0 | 1 |
| 081 | 0 | 1 | 0 | 1 | 0 | 0 | 0 | 1 | 0 | 0 | 0 | 0 | 0 | 1 | 0 | 0 |
| 082 | 0 | 1 | 0 | 1 | 0 | 0 | 1 | 0 | 0 | 0 | 0 | 0 | 0 | 1 | 0 | 1 |
| 083 | 0 | 1 | 0 | 1 | 0 | 0 | 1 | 1 | 0 | 0 | 0 | 0 | 0 | 1 | 0 | 1 |
| 084 | 0 | 1 | 0 | 1 | 0 | 1 | 0 | 0 | 0 | 0 | 0 | 0 | 0 | 1 | 0 | 1 |
| 085 | 0 | 1 | 0 | 1 | 0 | 1 | 0 | 1 | 0 | 0 | 0 | 0 | 0 | 1 | 0 | 1 |
| 086 | 0 | 1 | 0 | 1 | 0 | 1 | 1 | 0 | 0 | 0 | 0 | 0 | 0 | 1 | 0 | 1 |
| 087 | 0 | 1 | 0 | 1 | 0 | 1 | 1 | 1 | 0 | 0 | 0 | 0 | 0 | 1 | 0 | 1 |
| 088 | 0 | 1 | 0 | 1 | 1 | 0 | 0 | 0 | 0 | 0 | 0 | 0 | 0 | 1 | 0 | 1 |
| 089 | 0 | 1 | 0 | 1 | 1 | 0 | 0 | 1 | 0 | 0 | 0 | 0 | 0 | 1 | 0 | 1 |
| 090 | 0 | 1 | 0 | 1 | 1 | 0 | 1 | 0 | 0 | 0 | 0 | 0 | 0 | 1 | 0 | 1 |
| 091 | 0 | 1 | 0 | 1 | 1 | 0 | 1 | 1 | 0 | 0 | 0 | 0 | 0 | 1 | 0 | 1 |
| 092 | 0 | 1 | 0 | 1 | 1 | 1 | 0 | 0 | 0 | 0 | 0 | 0 | 0 | 1 | 0 | 1 |
| 093 | 0 | 1 | 0 | 1 | 1 | 1 | 0 | 1 | 0 | 0 | 0 | 0 | 0 | 1 | 0 | 0 |
| 094 | 0 | 1 | 0 | 1 | 1 | 1 | 1 | 0 | 0 | 0 | 0 | 0 | 0 | 1 | 0 | 1 |
| 095 | 0 | 1 | 0 | 1 | 1 | 1 | 1 | 1 | 0 | 0 | 0 | 0 | 0 | 1 | 0 | 1 |
| 096 | 0 | 1 | 1 | 0 | 0 | 0 | 0 | 0 | 0 | 0 | 0 | 0 | 0 | 1 | 0 | 1 |
| 097 | 0 | 1 | 1 | 0 | 0 | 0 | 0 | 1 | 0 | 0 | 0 | 0 | 0 | 1 | 0 | 0 |
| 098 | 0 | 1 | 1 | 0 | 0 | 0 | 1 | 0 | 0 | 0 | 0 | 0 | 0 | 1 | 0 | 0 |
| 099 | 0 | 1 | 1 | 0 | 0 | 0 | 1 | 1 | 0 | 0 | 0 | 0 | 0 | 1 | 0 | 0 |
| 100 | 0 | 1 | 1 | 0 | 0 | 1 | 0 | 0 | 0 | 0 | 0 | 0 | 0 | 1 | 0 | 0 |
| 101 | 0 | 1 | 1 | 0 | 0 | 1 | 0 | 1 | 0 | 0 | 0 | 0 | 0 | 1 | 0 | 0 |
| 102 | 0 | 1 | 1 | 0 | 0 | 1 | 1 | 0 | 0 | 0 | 0 | 0 | 0 | 1 | 0 | 0 |
| 103 | 0 | 1 | 1 | 0 | 0 | 1 | 1 | 1 | 0 | 0 | 0 | 0 | 0 | 1 | 0 | 0 |
| 104 | 0 | 1 | 1 | 0 | 1 | 0 | 0 | 0 | 0 | 0 | 0 | 0 | 0 | 1 | 0 | 0 |
| 105 | 0 | 1 | 1 | 0 | 1 | 0 | 0 | 1 | 0 | 0 | 0 | 0 | 0 | 1 | 0 | 0 |
| 106 | 0 | 1 | 1 | 0 | 1 | 0 | 1 | 0 | 0 | 0 | 0 | 0 | 0 | 1 | 0 | 0 |
| 107 | 0 | 1 | 1 | 0 | 1 | 0 | 1 | 1 | 0 | 0 | 0 | 0 | 0 | 1 | 0 | 0 |
| 108 | 0 | 1 | 1 | 0 | 1 | 1 | 0 | 0 | 0 | 0 | 0 | 0 | 0 | 1 | 0 | 1 |
| 109 | 0 | 1 | 1 | 0 | 1 | 1 | 0 | 1 | 0 | 0 | 0 | 0 | 0 | 1 | 0 | 0 |
| 110 | 0 | 1 | 1 | 0 | 1 | 1 | 1 | 0 | 0 | 0 | 0 | 0 | 0 | 1 | 0 | 0 |
| 111 | 0 | 1 | 1 | 0 | 1 | 1 | 1 | 1 | 0 | 0 | 0 | 0 | 0 | 1 | 0 | 0 |
| 112 | 0 | 1 | 1 | 1 | 0 | 0 | 0 | 0 | 0 | 0 | 0 | 0 | 0 | 1 | 0 | 1 |
| 113 | 0 | 1 | 1 | 1 | 0 | 0 | 0 | 1 | 0 | 0 | 0 | 0 | 0 | 1 | 0 | 0 |
| 114 | 0 | 1 | 1 | 1 | 0 | 0 | 1 | 0 | 0 | 0 | 0 | 0 | 0 | 1 | 0 | 1 |
| 115 | 0 | 1 | 1 | 1 | 0 | 0 | 1 | 1 | 0 | 0 | 0 | 0 | 0 | 1 | 0 | 1 |
| 116 | 0 | 1 | 1 | 1 | 0 | 1 | 0 | 0 | 0 | 0 | 0 | 0 | 0 | 1 | 0 | 1 |
| 117 | 0 | 1 | 1 | 1 | 0 | 1 | 0 | 1 | 0 | 0 | 0 | 0 | 0 | 1 | 0 | 1 |
| 118 | 0 | 1 | 1 | 1 | 0 | 1 | 1 | 0 | 0 | 0 | 0 | 0 | 0 | 1 | 0 | 1 |
| 119 | 0 | 1 | 1 | 1 | 0 | 1 | 1 | 1 | 0 | 0 | 0 | 0 | 0 | 1 | 0 | 1 |
| 120 | 0 | 1 | 1 | 1 | 1 | 0 | 0 | 0 | 0 | 0 | 0 | 0 | 0 | 1 | 0 | 1 |
| 121 | 0 | 1 | 1 | 1 | 1 | 0 | 0 | 1 | 0 | 0 | 0 | 0 | 0 | 1 | 0 | 1 |
| 122 | 0 | 1 | 1 | 1 | 1 | 0 | 1 | 0 | 0 | 0 | 0 | 0 | 0 | 1 | 0 | 1 |
| 123 | 0 | 1 | 1 | 1 | 1 | 0 | 1 | 1 | 0 | 0 | 0 | 0 | 0 | 1 | 0 | 1 |
| 124 | 0 | 1 | 1 | 1 | 1 | 1 | 0 | 0 | 0 | 0 | 0 | 0 | 0 | 1 | 0 | 1 |
| 125 | 0 | 1 | 1 | 1 | 1 | 1 | 0 | 1 | 0 | 0 | 0 | 0 | 0 | 1 | 0 | 0 |
| 126 | 0 | 1 | 1 | 1 | 1 | 1 | 1 | 0 | 0 | 0 | 0 | 0 | 0 | 1 | 0 | 1 |
| 127 | 0 | 1 | 1 | 1 | 1 | 1 | 1 | 1 | 0 | 0 | 0 | 0 | 0 | 1 | 0 | 1 |

Table 13c.

ROM program for circuit 18.

| Address Nr. ↓ | Z A7 17 | F A6 18 | S A5 19 | M″ A4 20 | L″ A3 21 | K″ A2 1 | COM A1 2 | Q A0 3 | — D8 11 | — D7 10 | — D6 9 | — D5 8 | — D4 7 | $\overline{Z}$ D3 6 | $\overline{F}$ D2 5 | OUT D1 4 |
|---|---|---|---|---|---|---|---|---|---|---|---|---|---|---|---|---|
| 128 | 1 | 0 | 0 | 0 | 0 | 0 | 0 | 0 | 0 | 0 | 0 | 0 | 0 | 0 | 1 | 0 |
| 129 | 1 | 0 | 0 | 0 | 0 | 0 | 0 | 1 | 0 | 0 | 0 | 0 | 0 | 0 | 1 | 1 |
| 130 | 1 | 0 | 0 | 0 | 0 | 0 | 1 | 0 | 0 | 0 | 0 | 0 | 0 | 0 | 1 | 1 |
| 131 | 1 | 0 | 0 | 0 | 0 | 0 | 1 | 1 | 0 | 0 | 0 | 0 | 0 | 0 | 1 | 0 |
| 132 | 1 | 0 | 0 | 0 | 0 | 1 | 0 | 0 | 0 | 0 | 0 | 0 | 0 | 0 | 1 | 0 |
| 133 | 1 | 0 | 0 | 0 | 0 | 1 | 0 | 1 | 0 | 0 | 0 | 0 | 0 | 0 | 1 | 1 |
| 134 | 1 | 0 | 0 | 0 | 0 | 1 | 1 | 0 | 0 | 0 | 0 | 0 | 0 | 0 | 1 | 1 |
| 135 | 1 | 0 | 0 | 0 | 0 | 1 | 1 | 1 | 0 | 0 | 0 | 0 | 0 | 0 | 1 | 0 |
| 136 | 1 | 0 | 0 | 0 | 1 | 0 | 0 | 0 | 0 | 0 | 0 | 0 | 0 | 0 | 1 | 0 |
| 137 | 1 | 0 | 0 | 0 | 1 | 0 | 0 | 1 | 0 | 0 | 0 | 0 | 0 | 0 | 1 | 1 |
| 138 | 1 | 0 | 0 | 0 | 1 | 0 | 1 | 0 | 0 | 0 | 0 | 0 | 0 | 0 | 1 | 1 |
| 139 | 1 | 0 | 0 | 0 | 1 | 0 | 1 | 1 | 0 | 0 | 0 | 0 | 0 | 0 | 1 | 0 |
| 140 | 1 | 0 | 0 | 0 | 1 | 1 | 0 | 0 | 0 | 0 | 0 | 0 | 0 | 0 | 1 | 0 |
| 141 | 1 | 0 | 0 | 0 | 1 | 1 | 0 | 1 | 0 | 0 | 0 | 0 | 0 | 0 | 1 | 1 |
| 142 | 1 | 0 | 0 | 0 | 1 | 1 | 1 | 0 | 0 | 0 | 0 | 0 | 0 | 0 | 1 | 1 |
| 143 | 1 | 0 | 0 | 0 | 1 | 1 | 1 | 1 | 0 | 0 | 0 | 0 | 0 | 0 | 1 | 0 |
| 144 | 1 | 0 | 0 | 1 | 0 | 0 | 0 | 0 | 0 | 0 | 0 | 0 | 0 | 0 | 1 | 0 |
| 145 | 1 | 0 | 0 | 1 | 0 | 0 | 0 | 1 | 0 | 0 | 0 | 0 | 0 | 0 | 1 | 1 |
| 146 | 1 | 0 | 0 | 1 | 0 | 0 | 1 | 0 | 0 | 0 | 0 | 0 | 0 | 0 | 1 | 1 |
| 147 | 1 | 0 | 0 | 1 | 0 | 0 | 1 | 1 | 0 | 0 | 0 | 0 | 0 | 0 | 1 | 0 |

Table 13c.-continued

| Address Nr. ↓ | Z A7 17 | F A6 18 | S A5 19 | M'' A4 20 | L'' A3 21 | K'' A2 1 | COM A1 2 | Q A0 3 | — D8 11 | — D7 10 | — D6 9 | — D5 8 | — D4 7 | $\overline{Z}$ D3 6 | $\overline{F}$ D2 5 | OUT D1 4 |
|---|---|---|---|---|---|---|---|---|---|---|---|---|---|---|---|---|
| | | | | | | ROM program for circuit 18. | | | | | | | | | | |
| 148 | 1 | 0 | 0 | 1 | 0 | 1 | 0 | 0 | 0 | 0 | 0 | 0 | 0 | 0 | 1 | 0 |
| 149 | 1 | 0 | 0 | 1 | 0 | 1 | 0 | 1 | 0 | 0 | 0 | 0 | 0 | 0 | 1 | 1 |
| 150 | 1 | 0 | 0 | 1 | 0 | 1 | 1 | 0 | 0 | 0 | 0 | 0 | 0 | 0 | 1 | 1 |
| 151 | 1 | 0 | 0 | 1 | 0 | 1 | 1 | 1 | 0 | 0 | 0 | 0 | 0 | 0 | 1 | 0 |
| 152 | 1 | 0 | 0 | 1 | 1 | 0 | 0 | 0 | 0 | 0 | 0 | 0 | 0 | 0 | 1 | 0 |
| 153 | 1 | 0 | 0 | 1 | 1 | 0 | 0 | 1 | 0 | 0 | 0 | 0 | 0 | 0 | 1 | 1 |
| 154 | 1 | 0 | 0 | 1 | 1 | 0 | 1 | 0 | 0 | 0 | 0 | 0 | 0 | 0 | 1 | 1 |
| 155 | 1 | 0 | 0 | 1 | 1 | 0 | 1 | 1 | 0 | 0 | 0 | 0 | 0 | 0 | 1 | 0 |
| 156 | 1 | 0 | 0 | 1 | 1 | 1 | 0 | 0 | 0 | 0 | 0 | 0 | 0 | 0 | 1 | 0 |
| 157 | 1 | 0 | 0 | 1 | 1 | 1 | 0 | 1 | 0 | 0 | 0 | 0 | 0 | 0 | 1 | 1 |
| 158 | 1 | 0 | 0 | 1 | 1 | 1 | 1 | 0 | 0 | 0 | 0 | 0 | 0 | 0 | 1 | 1 |
| 159 | 1 | 0 | 0 | 1 | 1 | 1 | 1 | 1 | 0 | 0 | 0 | 0 | 0 | 0 | 1 | 0 |
| 160 | 1 | 0 | 1 | 0 | 0 | 0 | 0 | 0 | 0 | 0 | 0 | 0 | 0 | 0 | 1 | 1 |
| 161 | 1 | 0 | 1 | 0 | 0 | 0 | 0 | 1 | 0 | 0 | 0 | 0 | 0 | 0 | 1 | 0 |
| 162 | 1 | 0 | 1 | 0 | 0 | 0 | 1 | 0 | 0 | 0 | 0 | 0 | 0 | 0 | 1 | 0 |
| 163 | 1 | 0 | 1 | 0 | 0 | 0 | 1 | 1 | 0 | 0 | 0 | 0 | 0 | 0 | 1 | 1 |
| 164 | 1 | 0 | 1 | 0 | 0 | 1 | 0 | 0 | 0 | 0 | 0 | 0 | 0 | 0 | 1 | 1 |
| 165 | 1 | 0 | 1 | 0 | 0 | 1 | 0 | 1 | 0 | 0 | 0 | 0 | 0 | 0 | 1 | 0 |
| 166 | 1 | 0 | 1 | 0 | 0 | 1 | 1 | 0 | 0 | 0 | 0 | 0 | 0 | 0 | 1 | 0 |
| 167 | 1 | 0 | 1 | 0 | 0 | 1 | 1 | 1 | 0 | 0 | 0 | 0 | 0 | 0 | 1 | 1 |
| 168 | 1 | 0 | 1 | 0 | 1 | 0 | 0 | 0 | 0 | 0 | 0 | 0 | 0 | 0 | 1 | 1 |
| 169 | 1 | 0 | 1 | 0 | 1 | 0 | 0 | 1 | 0 | 0 | 0 | 0 | 0 | 0 | 1 | 0 |
| 170 | 1 | 0 | 1 | 0 | 1 | 0 | 1 | 0 | 0 | 0 | 0 | 0 | 0 | 0 | 1 | 0 |
| 171 | 1 | 0 | 1 | 0 | 1 | 0 | 1 | 1 | 0 | 0 | 0 | 0 | 0 | 0 | 1 | 1 |
| 172 | 1 | 0 | 1 | 0 | 1 | 1 | 0 | 0 | 0 | 0 | 0 | 0 | 0 | 0 | 1 | 1 |
| 173 | 1 | 0 | 1 | 0 | 1 | 1 | 0 | 1 | 0 | 0 | 0 | 0 | 0 | 0 | 1 | 0 |
| 174 | 1 | 0 | 1 | 0 | 1 | 1 | 1 | 0 | 0 | 0 | 0 | 0 | 0 | 0 | 1 | 0 |
| 175 | 1 | 0 | 1 | 0 | 1 | 1 | 1 | 1 | 0 | 0 | 0 | 0 | 0 | 0 | 1 | 1 |
| 176 | 1 | 0 | 1 | 1 | 0 | 0 | 0 | 0 | 0 | 0 | 0 | 0 | 0 | 0 | 1 | 1 |
| 177 | 1 | 0 | 1 | 1 | 0 | 0 | 0 | 1 | 0 | 0 | 0 | 0 | 0 | 0 | 1 | 0 |
| 178 | 1 | 0 | 1 | 1 | 0 | 0 | 1 | 0 | 0 | 0 | 0 | 0 | 0 | 0 | 1 | 0 |
| 179 | 1 | 0 | 1 | 1 | 0 | 0 | 1 | 1 | 0 | 0 | 0 | 0 | 0 | 0 | 1 | 1 |
| 180 | 1 | 0 | 1 | 1 | 0 | 1 | 0 | 0 | 0 | 0 | 0 | 0 | 0 | 0 | 1 | 1 |
| 181 | 1 | 0 | 1 | 1 | 0 | 1 | 0 | 1 | 0 | 0 | 0 | 0 | 0 | 0 | 1 | 0 |
| 182 | 1 | 0 | 1 | 1 | 0 | 1 | 1 | 0 | 0 | 0 | 0 | 0 | 0 | 0 | 1 | 0 |
| 183 | 1 | 0 | 1 | 1 | 0 | 1 | 1 | 1 | 0 | 0 | 0 | 0 | 0 | 0 | 1 | 1 |
| 184 | 1 | 0 | 1 | 1 | 1 | 0 | 0 | 0 | 0 | 0 | 0 | 0 | 0 | 0 | 1 | 1 |
| 185 | 1 | 0 | 1 | 1 | 1 | 0 | 0 | 1 | 0 | 0 | 0 | 0 | 0 | 0 | 1 | 0 |
| 186 | 1 | 0 | 1 | 1 | 1 | 0 | 1 | 0 | 0 | 0 | 0 | 0 | 0 | 0 | 1 | 0 |
| 187 | 1 | 0 | 1 | 1 | 1 | 0 | 1 | 1 | 0 | 0 | 0 | 0 | 0 | 0 | 1 | 1 |
| 188 | 1 | 0 | 1 | 1 | 1 | 1 | 0 | 0 | 0 | 0 | 0 | 0 | 0 | 0 | 1 | 1 |
| 189 | 1 | 0 | 1 | 1 | 1 | 1 | 0 | 1 | 0 | 0 | 0 | 0 | 0 | 0 | 1 | 0 |
| 190 | 1 | 0 | 1 | 1 | 1 | 1 | 1 | 0 | 0 | 0 | 0 | 0 | 0 | 0 | 1 | 0 |
| 191 | 1 | 0 | 1 | 1 | 1 | 1 | 1 | 1 | 0 | 0 | 0 | 0 | 0 | 0 | 1 | 1 |

Table 13d.

| Address Nr. ↓ | Z A7 17 | F A6 18 | S A5 19 | M'' A4 20 | L'' A3 21 | K'' A2 1 | COM A1 2 | Q A0 3 | — D8 11 | — D7 10 | — D6 9 | — D5 8 | — D4 7 | $\overline{Z}$ D3 6 | $\overline{F}$ D2 5 | OUT D1 4 |
|---|---|---|---|---|---|---|---|---|---|---|---|---|---|---|---|---|
| | | | | | | ROM program for circuit 18. | | | | | | | | | | |
| 192 | 1 | 1 | 0 | 0 | 0 | 0 | 0 | 0 | 0 | 0 | 0 | | 0 | 0 | 0 | 1 |
| 193 | 1 | 1 | 0 | 0 | 0 | 0 | 0 | 1 | 0 | 0 | 0 | 0 | 0 | 0 | 0 | 0 |
| 194 | 1 | 1 | 0 | 0 | 0 | 0 | 1 | 0 | 0 | 0 | 0 | 0 | 0 | 0 | 0 | 0 |
| 195 | 1 | 1 | 0 | 0 | 0 | 0 | 1 | 1 | 0 | 0 | 0 | 0 | 0 | 0 | 0 | 0 |
| 196 | 1 | 1 | 0 | 0 | 0 | 1 | 0 | 0 | 0 | 0 | 0 | 0 | 0 | 0 | 0 | 0 |
| 197 | 1 | 1 | 0 | 0 | 0 | 1 | 0 | 1 | 0 | 0 | 0 | 0 | 0 | 0 | 0 | 0 |
| 198 | 1 | 1 | 0 | 0 | 0 | 1 | 1 | 0 | 0 | 0 | 0 | 0 | 0 | 0 | 0 | 0 |
| 199 | 1 | 1 | 0 | 0 | 0 | 1 | 1 | 1 | 0 | 0 | 0 | 0 | 0 | 0 | 0 | 0 |
| 200 | 1 | 1 | 0 | 0 | 1 | 0 | 0 | 0 | 0 | 0 | 0 | 0 | 0 | 0 | 0 | 0 |
| 201 | 1 | 1 | 0 | 0 | 1 | 0 | 0 | 1 | 0 | 0 | 0 | 0 | 0 | 0 | 0 | 0 |
| 202 | 1 | 1 | 0 | 0 | 1 | 0 | 1 | 0 | 0 | 0 | 0 | 0 | 0 | 0 | 0 | 0 |
| 203 | 1 | 1 | 0 | 0 | 1 | 0 | 1 | 1 | 0 | 0 | 0 | 0 | 0 | 0 | 0 | 0 |
| 204 | 1 | 1 | 0 | 0 | 1 | 1 | 0 | 0 | 0 | 0 | 0 | 0 | 0 | 0 | 0 | 1 |
| 205 | 1 | 1 | 0 | 0 | 1 | 1 | 0 | 1 | 0 | 0 | 0 | 0 | 0 | 0 | 0 | 0 |
| 206 | 1 | 1 | 0 | 0 | 1 | 1 | 1 | 0 | 0 | 0 | 0 | 0 | 0 | 0 | 0 | 0 |
| 207 | 1 | 1 | 0 | 0 | 1 | 1 | 1 | 1 | 0 | 0 | 0 | 0 | 0 | 0 | 0 | 0 |
| 208 | 1 | 1 | 0 | 1 | 0 | 0 | 0 | 0 | 0 | 0 | 0 | 0 | 0 | 0 | 0 | 1 |
| 209 | 1 | 1 | 0 | 1 | 0 | 0 | 0 | 1 | 0 | 0 | 0 | 0 | 0 | 0 | 0 | 0 |
| 210 | 1 | 1 | 0 | 1 | 0 | 0 | 1 | 0 | 0 | 0 | 0 | 0 | 0 | 0 | 0 | 1 |
| 211 | 1 | 1 | 0 | 1 | 0 | 0 | 1 | 1 | 0 | 0 | 0 | 0 | 0 | 0 | 0 | 1 |
| 212 | 1 | 1 | 0 | 1 | 0 | 1 | 0 | 0 | 0 | 0 | 0 | 0 | 0 | 0 | 0 | 1 |
| 213 | 1 | 1 | 0 | 1 | 0 | 1 | 0 | 1 | 0 | 0 | 0 | 0 | 0 | 0 | 0 | 1 |
| 214 | 1 | 1 | 0 | 1 | 0 | 1 | 1 | 0 | 0 | 0 | 0 | 0 | 0 | 0 | 0 | 1 |
| 215 | 1 | 1 | 0 | 1 | 0 | 1 | 1 | 1 | 0 | 0 | 0 | 0 | 0 | 0 | 0 | 1 |
| 216 | 1 | 1 | 0 | 1 | 1 | 0 | 0 | 0 | 0 | 0 | 0 | 0 | 0 | 0 | 0 | 1 |
| 217 | 1 | 1 | 0 | 1 | 1 | 0 | 0 | 1 | 0 | 0 | 0 | 0 | 0 | 0 | 0 | 1 |
| 218 | 1 | 1 | 0 | 1 | 1 | 0 | 1 | 0 | 0 | 0 | 0 | 0 | 0 | 0 | 0 | 1 |
| 219 | 1 | 1 | 0 | 1 | 1 | 0 | 1 | 1 | 0 | 0 | 0 | 0 | 0 | 0 | 0 | 1 |
| 220 | 1 | 1 | 0 | 1 | 1 | 1 | 0 | 0 | 0 | 0 | 0 | 0 | 0 | 0 | 0 | 1 |
| 221 | 1 | 1 | 0 | 1 | 1 | 1 | 0 | 1 | 0 | 0 | 0 | 0 | 0 | 0 | 0 | 0 |
| 222 | 1 | 1 | 0 | 1 | 1 | 1 | 1 | 0 | 0 | 0 | 0 | 0 | 0 | 0 | 0 | 1 |
| 223 | 1 | 1 | 0 | 1 | 1 | 1 | 1 | 1 | 0 | 0 | 0 | 0 | 0 | 0 | 0 | 1 |
| 224 | 1 | 1 | 1 | 0 | 0 | 0 | 0 | 0 | 0 | 0 | 0 | 0 | 0 | 0 | 0 | 1 |
| 225 | 1 | 1 | 1 | 0 | 0 | 0 | 0 | 1 | 0 | 0 | 0 | 0 | 0 | 0 | 0 | 0 |
| 226 | 1 | 1 | 1 | 0 | 0 | 0 | 1 | 0 | 0 | 0 | 0 | 0 | 0 | 0 | 0 | 0 |
| 227 | 1 | 1 | 1 | 0 | 0 | 0 | 1 | 1 | 0 | 0 | 0 | 0 | 0 | 0 | 0 | 0 |

Table 13d.-continued

| Address Nr. ↓ | Z A7 17 | F A6 18 | S A5 19 | M" A4 20 | L" A3 21 | K" A2 1 | COM A1 2 | Q A0 3 | — D8 11 | — D7 10 | — D6 9 | — D5 8 | — D4 7 | $\overline{Z}$ D3 6 | $\overline{F}$ D2 5 | OUT D1 4 |
|---|---|---|---|---|---|---|---|---|---|---|---|---|---|---|---|---|
| | | | | | | ROM program for circuit 18. | | | | | | | | | | |
| 228 | 1 | 1 | 1 | 0 | 0 | 1 | 0 | 0 | 0 | 0 | 0 | 0 | 0 | 0 | 0 | 0 |
| 229 | 1 | 1 | 1 | 0 | 0 | 1 | 0 | 0 | 0 | 0 | 0 | 0 | 0 | 0 | 0 | 0 |
| 230 | 1 | 1 | 1 | 0 | 0 | 1 | 1 | 0 | 0 | 0 | 0 | 0 | 0 | 0 | 0 | 0 |
| 231 | 1 | 1 | 1 | 0 | 0 | 1 | 1 | 1 | 0 | 0 | 0 | 0 | 0 | 0 | 0 | 0 |
| 232 | 1 | 1 | 1 | 0 | 1 | 0 | 0 | 0 | 0 | 0 | 0 | 0 | 0 | 0 | 0 | 0 |
| 233 | 1 | 1 | 1 | 0 | 1 | 0 | 0 | 1 | 0 | 0 | 0 | 0 | 0 | 0 | 0 | 0 |
| 234 | 1 | 1 | 1 | 0 | 1 | 0 | 1 | 0 | 0 | 0 | 0 | 0 | 0 | 0 | 0 | 0 |
| 235 | 1 | 1 | 1 | 0 | 1 | 0 | 1 | 1 | 0 | 0 | 0 | 0 | 0 | 0 | 0 | 0 |
| 236 | 1 | 1 | 1 | 0 | 1 | 1 | 0 | 0 | 0 | 0 | 0 | 0 | 0 | 0 | 0 | 1 |
| 237 | 1 | 1 | 1 | 0 | 1 | 1 | 0 | 1 | 0 | 0 | 0 | 0 | 0 | 0 | 0 | 0 |
| 238 | 1 | 1 | 1 | 0 | 1 | 1 | 1 | 0 | 0 | 0 | 0 | 0 | 0 | 0 | 0 | 0 |
| 239 | 1 | 1 | 1 | 0 | 1 | 1 | 1 | 1 | 0 | 0 | 0 | 0 | 0 | 0 | 0 | 0 |
| 240 | 1 | 1 | 1 | 1 | 0 | 0 | 0 | 0 | 0 | 0 | 0 | 0 | 0 | 0 | 0 | 1 |
| 241 | 1 | 1 | 1 | 1 | 0 | 0 | 0 | 1 | 0 | 0 | 0 | 0 | 0 | 0 | 0 | 0 |
| 242 | 1 | 1 | 1 | 1 | 0 | 0 | 1 | 0 | 0 | 0 | 0 | 0 | 0 | 0 | 0 | 1 |
| 243 | 1 | 1 | 1 | 1 | 0 | 0 | 1 | 1 | 0 | 0 | 0 | 0 | 0 | 0 | 0 | 1 |
| 244 | 1 | 1 | 1 | 1 | 0 | 1 | 0 | 0 | 0 | 0 | 0 | 0 | 0 | 0 | 0 | 1 |
| 245 | 1 | 1 | 1 | 1 | 0 | 1 | 0 | 1 | 0 | 0 | 0 | 0 | 0 | 0 | 0 | 1 |
| 246 | 1 | 1 | 1 | 1 | 0 | 1 | 1 | 0 | 0 | 0 | 0 | 0 | 0 | 0 | 0 | 1 |
| 247 | 1 | 1 | 1 | 1 | 0 | 1 | 1 | 1 | 0 | 0 | 0 | 0 | 0 | 0 | 0 | 1 |
| 248 | 1 | 1 | 1 | 1 | 1 | 0 | 0 | 0 | 0 | 0 | 0 | 0 | 0 | 0 | 0 | 1 |
| 249 | 1 | 1 | 1 | 1 | 1 | 0 | 0 | 1 | 0 | 0 | 0 | 0 | 0 | 0 | 0 | 1 |
| 250 | 1 | 1 | 1 | 1 | 1 | 0 | 1 | 0 | 0 | 0 | 0 | 0 | 0 | 0 | 0 | 1 |
| 251 | 1 | 1 | 1 | 1 | 1 | 0 | 1 | 1 | 0 | 0 | 0 | 0 | 0 | 0 | 0 | 1 |
| 252 | 1 | 1 | 1 | 1 | 1 | 1 | 0 | 0 | 0 | 0 | 0 | 0 | 0 | 0 | 0 | 1 |
| 253 | 1 | 1 | 1 | 1 | 1 | 1 | 0 | 1 | 0 | 0 | 0 | 0 | 0 | 0 | 0 | 0 |
| 254 | 1 | 1 | 1 | 1 | 1 | 1 | 1 | 0 | 0 | 0 | 0 | 0 | 0 | 0 | 0 | 1 |
| 255 | 1 | 1 | 1 | 1 | 1 | 1 | 1 | 1 | 0 | 0 | 0 | 0 | 0 | 0 | 0 | 1 |

OPERATION OF THE MODULATOR IN THE FREE RUNNING MODE

The free running mode is initiated when the reference output voltage V* on line 16 drops below 39.1% of maximum (i.e. after the 40th step on Table 3). In a drive having a base frequency of 60 Hz, this control voltage will normally occur below 24 Hz under a constant $V/f$ mode of voltage control. The waveform synthesis rules in the free running mode are inspired from the "triangulation method" used with analog modulator circuits, which is recognized as an effective modulation approach for low fundamental frequencies and low fundamental voltages.

Figure 18:
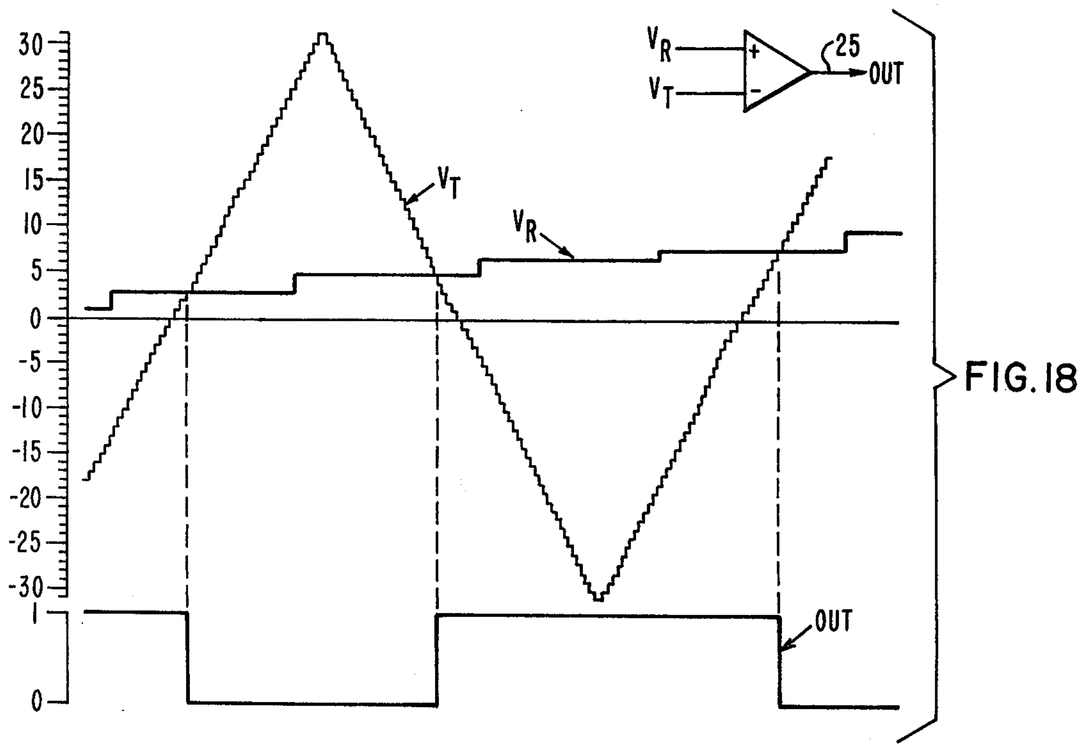
FIG. 18 shows a digital ramp signal intersecting a stepped sinusoidal wave in the free running mode according to the present invention.

Conceptually, a digital UP-DOWN ramp is generated by an independent, fixed frequency time base, unrelated to the inverter output frequency. Such ramp is typically represented by a staircase-shaped analog voltage $V_T$ such as shown in FIG. 18. Signal $V_T$ varies from a positive level 31 to a negative level −31 and may receive 63 discrete levels. Simultaneously, another staircase signal $V_R$ is generated. The height of the steps is such that the $V_R$ signal approximates a sinusoid, at a frequency equal to the desired inverter output frequency. The instants at which the steps occur in the $V_R$ waveform are not coincident with the instants at which the steps occur in the $V_T$ waveform, but the level assumed at any instant by any of the two waveforms must be one of the 63 available levels. A comparator is made to respond to the relative magnitude of the two waveforms and the modulator output is made dependent from the comparator output in such a manner that the state of the modulator output is "one" whenever the $V_R$ signal is more positive than the $V_T$ signal and the state of the modulator output is zero whenever the $V_R$ signal is equal to $V_T$ or more negative than $V_T$.

Figure 19:
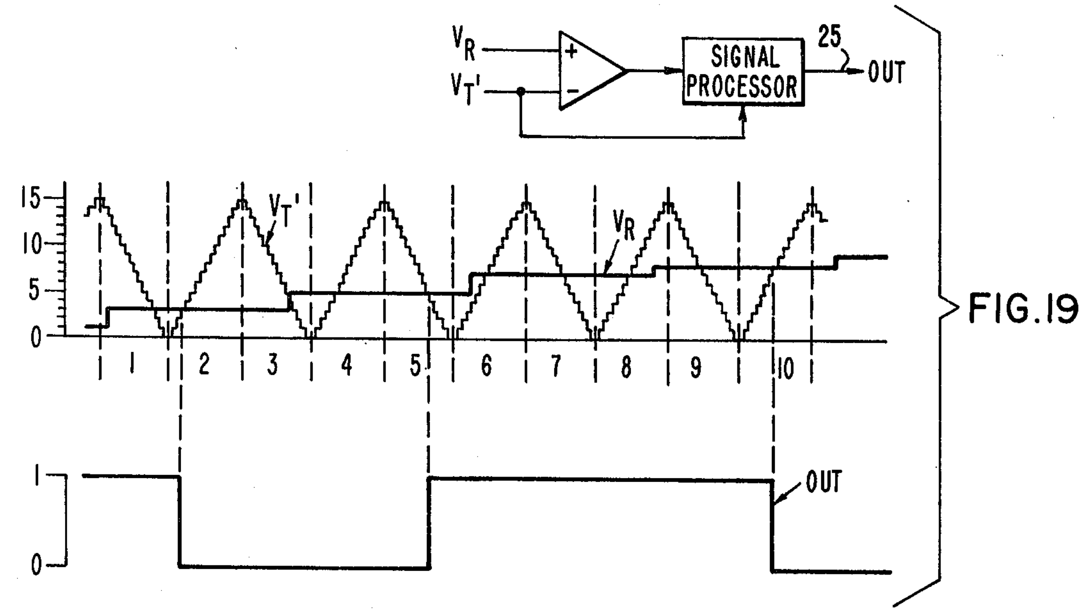
FIG. 19 is a modification of the intersection method of FIG. 18.

In this way, the mechanism of the triangulation method used in analog circuits is reproduced with $V_T$ representing the triangular timing wave and $V_R$ the sinusoidal reference voltage. Typically, when the range of voltage control does not exceed the lower 39% of the overall voltage regulation range, $V_R$ will not exceed in amplitude one half of the crest value of $V_T$. This fact can be utilized as shown in FIG. 19 which is a modification of FIG. 18. In this case, the digital ramp represented by $V_T'$ has only 16 discrete levels, implementable with 4 bits of information instead of the 6 bits required for the ramp represented by $V_T$ of FIG. 18. Yet the resolution of the waveforms and the final effect on the modulator output is the same, if the following rules are applied in relating the comparator response to the state of the comparator output. For slope 1 of the $V_T'$ signal, the state of the modulator output is made dependent from the relative amplitude of $V_T'$ and $V_R$, as for FIG. 18. For slopes 2 and 3, the intercepts between $V_T'$ and $V_R$ (and the comparator response) are ignored and the modulator output is set at the "zero" level. For slope 4, the comparator is again in control, as for slope 1. For slopes 5, 6, 7 and 8, the intercepts are again ignored, the comparator response again overidden and the modulator output is set at the "one" level. Then the cycle starts again, with slope 9 handled as slope 1, slope 10 as slope 2, etc.

This technique is valid for the first and second quadrant of $V_R$. For the third and fourth quadrant, it is sufficient to repeat $V_R$ with the positive polarity as in FIG. 19, and somewhat modify the above comparison rules. The details of the modifications will be made more explicit herebelow.

Figure 20:
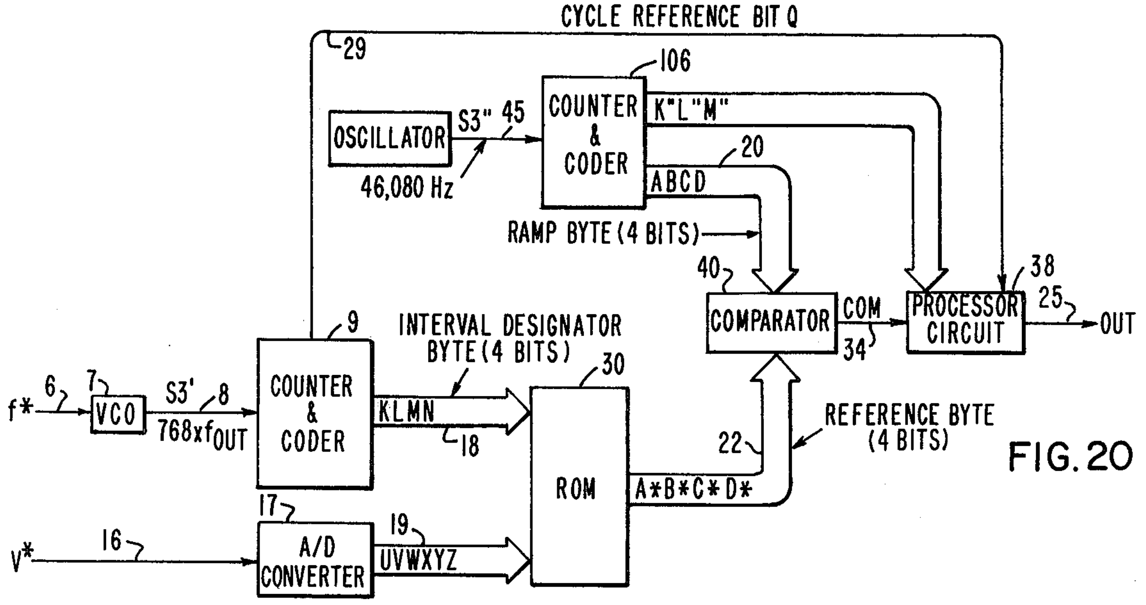
FIG. 20 is a block diagram of the operation of the modulator according to the invention in the free running mode for a single phase.

Referring to the functional block diagram of FIG. 20, the operation of the modulator of FIG. 13 is now described for the free running mode of operation and a single phase output. The same numeral references are used for corresponding elements found in FIG. 13 and the circuitry used only in the free running mode is shown with reference numerals found in FIG. 14. The output fundamental frequency is still determined by signal $f$* on line 6 and the $VCO_7$ as in FIG. 13. The same counter-coder device 9 is used, resulting in the interval designator byte KLMN on lines 18. These signals are used together with the outputs UVWXYZ on lines 19 from the A/D converter 17 to address the ROM system 30 as previously. A first difference from the fixed pattern mode resides in the ROM programming philosophy. The ROM is now programmed to generate at its outputs A*B*C*D* the digital equivalent of the reference wave $V_R$ of FIGS. 20 and 21 rather than a stored PWM programmed wave. The amplitude of the selected programmed sinusoidal wave depends on the state of the UVWXYZ lines (formerly the pattern designator byte, renamed here the reference wave designator) which can assume any of the last 24 combinations listed on aforestated Table 3. The shape approximates a sinusoid as close as possible considering the constraints allowing only 16 discrete levels and one staircase step per interval. The code adopted for the interval designator byte ensures that the staircase reference sine wave A*B*C*D* is symmetrical with respect to its 90° axis.

This reference byte is applied to comparator 40 as before. The other main difference from the fixed pattern mode is in the nature of the information ABCD with which the comparison is performed. Here ia fixed frequency oscillator OSC 43 is provided. Its output signal $S_3''$ is applied on line 45 to a counting-coding circuitry 106 whose output ABCD on lines 20 is the digital equivalent of the ramp waveform $V_T'$ on FIG. 19. This ramp byte is applied to comparator 20, which responds with a change of state on line 34 (COM) whenever this is an intercept between the ramp signal and the reference signal. The comparator output is processed in response to information on the ramp condition (signals K", L" and M") and on the output cycle quadrant (bit Q), to implement the comparison rules outlined previously. The modulator output OUT duplicates the output of an analog circuit operating according to the triangulation method. The frequency of the triangular timing wave in an equivalent analog circuit would be 128 times lower than the frequency of the oscillator producing $S_{3'',i.e.}$ 360 Hertz in our case.

All circuits so far described in FIG. 14 for the fixed pattern mode are still used, in an almost identical role. In addition, circuit 43 is wired as an astable multivibrator oscillating at 46,080 Hz. The output signal $S_3''$ is used to clock circuit 106. This is a 7-bit binary counter, whose outputs rank in the following sequence, by order of significance: D", C", B", A", K", L", M". The four least significative bits will form the digital ramp represented by the staircase triangle wave on FIG. 19. As they emerge from circuit 106, these signals form an "UP-only" ramp, reset after 16 counts. To convert them in an UP-DOWN ramp as required, they must be combined with K" in an exclusive-OR circuit. For that purpose, A"B"C"D" are routed through circuit 107 to the exclusive-OR gates 109. Dispatch circuit 107 normally routes to these gates the outputs of circuit 129 (A'B'C'D') when in the fixed pattern mode. As soon as F on line 53 changes from 0 to 1, reflecting a change to the free running mode, circuit 107 starts routing to 109 the A"B"C"D" signals. A similar dispatching role in response to the state of F is played by circuit 108, routing to the exclusive-OR gates 109 either K' or K" depending upon whether F = 0 or F = 1. In this manner, the required ramp byte ABCD is applied to comparator 110.

The comparison rules and the comparator overriding signals as outlined earlier are controlled by circuit 38, in response to signals K", L" and M".

The three-phase operation is handled in a similar manner as for the fixed pattern mode. At each step of the digital ramp, the reference byte A*B*C*D* assumes successively the states appropriate for Phase 3, 1 and 2. After each change in the succession, the output on line 25 is sampled by the corresponding flip-flop in circuits 118, 119 and 120. The changes in A*B*C*D* are the consequence of changes in the interval designator KLMN, originated by the varying states of $x$, $y$. Through dispatching circuit 108, these signals are made identical to $x''$ and $y''$ in the free running mode, instead of reproducing $x'$, $y'$ as they were doing in the fixed pattern mode. The relationships between $x''$, $y''$ and the sampling instants of the output flip-flops 118, 119, 120 can be derived from FIG. 16, which applies in the free running mode if the single quoted symbols are replaced with double quoted symbols.

The operation of the circuitry of FIG. 14 can easily be understood for the free running mode from the explanation given earlier for operation in the fixed pattern mode.

Figure 21:
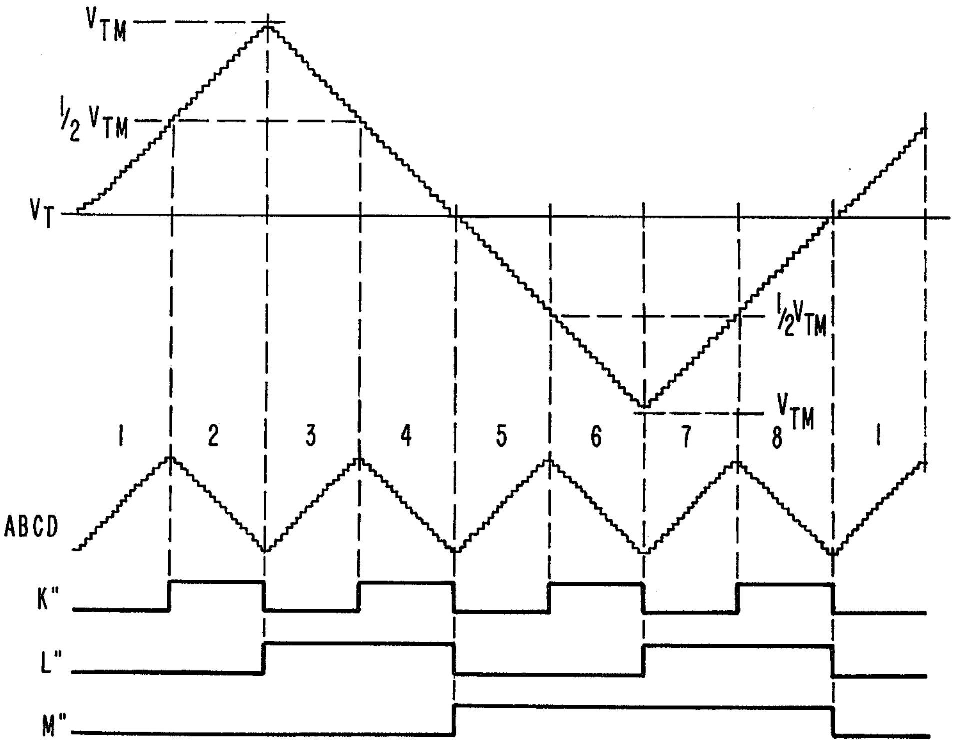
FIG. 21 illustrates the operation of the comparator with respect to the inputted words ABCD and K"L"M" of the circuit of FIG. 14.

The response of comparator 40 is such that COM on line 34 is in the "one" state whenever the ramp byte ABCD equals or exceeds the reference byte A*B*C*D*. When an intercept between ramp and reference occurs in a quadrant for which the reference signal looks positive (i.e. the first and second quadrant, characterized by Q=0), it is necessary to invert the comparator output (if the analog behavior is to be duplicated,) with the conventions of FIG. 18. Referring to FIG. 21, in which the ramp ABCD is represented in relationship with signals K", L" and M" and with an hypothetical triangular timing wave $V_T$, this means that the comparator output has to be inverted in coincidence with slope 1 and 4 of the ramp, which are characterized by (K", L", M") = (0, 0, 0) and (1, 1, 0) respectively. For these two conditions, circuit 38 must produce on line 25 OUT=$\overline{COM}$. Furthermore, the intercepts occurring in coincidence with slopes 2 and 3 must be ignored and the output set to the zero level, since in these positions a fictitious analog ramp rides through its positive crest and would not intercept the reference. This means that for (K", L", M") = (1, 0, 0) and (0, 1, 0), circuit 38 must ensure OUT = 0, no matter what the state of COM on line 34 is. Finally, all intercepts must be ignored and the output set to "one" for slopes 5, 6, 7 and 8 of ABCD on FIG. 21, since they correspond to the negative half wave of $V_T$, as seen from FIG. 18. Thus, circuit 38 must ensure OUT= 1 for M" = 1 on pin 3 of device 106 to pin 20 of circuit 38.

The above conclusions can be summarized in the following truth table 14a, partially describing the function of circuit 38, for F = 1.

Table 14a

| Q | M" | L" | K" | COM | OUT |
|---|----|----|----|-----|-----|
| 0 | 0  | 0  | 0  | 0   | 1   |
| 0 | 0  | 0  | 0  | 1   | 0   |
| 0 | 0  | 0  | 1  | 0   | 0   |
| 0 | 0  | 0  | 1  | 1   | 0   |
| 0 | 0  | 1  | 0  | 0   | 0   |
| 0 | 0  | 1  | 0  | 1   | 0   |
| 0 | 0  | 1  | 1  | 0   | 1   |
| 0 | 0  | 1  | 1  | 1   | 0   |
| 0 | 1  | 0  | 0  | 0   | 1   |
| 0 | 1  | 0  | 0  | 1   | 1   |
| 0 | 1  | 0  | 1  | 0   | 1   |
| 0 | 1  | 0  | 1  | 1   | 1   |
| 0 | 1  | 1  | 0  | 0   | 1   |
| 0 | 1  | 1  | 0  | 1   | 1   |
| 0 | 1  | 1  | 1  | 0   | 1   |
| 0 | 1  | 1  | 1  | 1   | 1   |

The behavior of the circuit in the third and fourth quadrants of the output fundamental (characterized by Q=1) is different. In this case the reference voltage being reproduced looks negative. The slopes of ABCD in FIG. 81 for which an intercept must be recognized are 5 and 8. For these slopes, the comparator signal is taken as is (no inversion). Therefore, if (K", L", M") = (0, 0, 1) or (1, 1, 1), we must have OUT = COM. Slopes 6 and 7 represent the negative crest of $V_T$, (FIG. 18) and thus must correspond to an output state "one", which means OUT = 1 for (K", L", M") = (1, 0, 1) and (0, 1, 1). Slopes 1, 2, 3 and 4 must correspond to an output of zero, i.e. OUT = k0 for M" = 0. Table 14*b* herebelow summarizes these conclusions for F = 1.

Table 14b

| Q | M" | L" | K" | COM | OUT |
|---|---|---|---|---|---|
| 1 | 0 | 0 | 0 | 0 | 0 |
| 1 | 0 | 0 | 0 | 1 | 0 |
| 1 | 0 | 0 | 1 | 0 | 0 |
| 1 | 0 | 0 | 1 | 1 | 0 |
| 1 | 0 | 1 | 0 | 0 | 0 |
| 1 | 0 | 1 | 0 | 1 | 0 |
| 1 | 0 | 1 | 1 | 0 | 0 |
| 1 | 0 | 1 | 1 | 1 | 0 |
| 1 | 1 | 0 | 0 | 0 | 0 |
| 1 | 1 | 0 | 0 | 1 | 0 |
| 1 | 1 | 0 | 1 | 0 | 1 |
| 1 | 1 | 0 | 1 | 1 | 1 |
| 1 | 1 | 1 | 0 | 0 | 1 |
| 1 | 1 | 1 | 0 | 1 | 1 |
| 1 | 1 | 1 | 1 | 0 | 0 |
| 1 | 1 | 1 | 1 | 1 | 1 |

The results of Tables 14*a* and 14*b*, as well as those of Table 12 are used in compiling the ROM program for circuit 38. The aforementioned Tables 13*a* to 13*d* typically describe such a program, using the same conventions to define the input and output signals as have been used for aforementioned Tables 2*a* to 2*d*.

For the remaining 24 steps of the voltage control range for which the system operates in the free running mode, the information relating to 24 different reference waveforms can be stored in the ROM. These waveforms are in the form of a staircase defining the reference sine wave $V_R$ referred to in FIG. 18. The amplitude of each suit quasi sinusoidal waveform is selected to provide the required output fundamental voltage step which is one of the last 24 steps listed on aforementioned Table 3. In response to the level of the voltage demand V*, the system retrieves stored data corresponding to one particular reference such quasi sinusoidal waveform in the same fashion as it is done for the retrieval of a stored set of digital representations defining a pattern in the fixed pattern mode as described hereabove.

The list of stored reference waveforms is given on the following Table 15.

Table 15

| Waveform N° | Waveform level $g_i$ throughout interval i (in 15ths of max. achievable level) | | | | | | | | | | | | Fundamental Voltage (in p.u. of max.) | |
|---|---|---|---|---|---|---|---|---|---|---|---|---|---|---|
| | $g_1$ | $g_2$ | $g_3$ | $g_4$ | $g_5$ | $g_6$ | $g_7$ | $g_8$ | $g_9$ | $g_{10}$ | $g_{11}$ | $g_{12}$ | Desired | Actual |
| 41 | 1 | 3 | 5 | 7 | 8 | 10 | 11 | 13 | 14 | 15 | 15 | 15 | .375 | .376 |
| 42 | 1 | 3 | 5 | 7 | 8 | 10 | 11 | 12 | 13 | 14 | 14 | 15 | .359 | .361 |
| 43 | 1 | 3 | 5 | 6 | 8 | 9 | 11 | 11 | 13 | 13 | 14 | 14 | .344 | .345 |
| 44 | 1 | 3 | 5 | 6 | 7 | 9 | 10 | 11 | 12 | 13 | 13 | 13 | .328 | .328 |
| 45 | 1 | 3 | 4 | 6 | 7 | 8 | 10 | 10 | 12 | 12 | 12 | 13 | .313 | .313 |
| 46 | 1 | 2 | 4 | 5 | 7 | 8 | 9 | 10 | 11 | 12 | 12 | 12 | .297 | .299 |
| 47 | 1 | 2 | 4 | 5 | 6 | 8 | 8 | 10 | 10 | 11 | 11 | 12 | .281 | .282 |
| 48 | 1 | 2 | 3 | 5 | 6 | 7 | 8 | 9 | 10 | 10 | 11 | 11 | .266 | .267 |
| 49 | 1 | 2 | 3 | 5 | 5 | 7 | 8 | 8 | 9 | 10 | 10 | 10 | .250 | .249 |
| 50 | 1 | 2 | 3 | 4 | 5 | 6 | 7 | 8 | 9 | 9 | 9 | 10 | .234 | .234 |
| 51 | 1 | 2 | 3 | 4 | 5 | 6 | 7 | 7 | 8 | 8 | 9 | 9 | .219 | .219 |
| 52 | 1 | 2 | 3 | 3 | 5 | 5 | 6 | 7 | 8 | 8 | 8 | 8 | .203 | .203 |
| 53 | 1 | 2 | 3 | 3 | 4 | 5 | 6 | 6 | 7 | 7 | 7 | 8 | .188 | .186 |
| 54 | 1 | 1 | 2 | 3 | 4 | 5 | 5 | 6 | 6 | 7 | 7 | 7 | .172 | .173 |
| 55 | 1 | 1 | 2 | 3 | 4 | 4 | 5 | 5 | 6 | 6 | 6 | 6 | .156 | .155 |
| 56 | 1 | 1 | 2 | 3 | 3 | 4 | 4 | 5 | 5 | 5 | 6 | 6 | .141 | .142 |
| 57 | 0 | 1 | 2 | 2 | 3 | 3 | 4 | 4 | 5 | 5 | 5 | 5 | .125 | .126 |
| 58 | 0 | 1 | 1 | 2 | 2 | 3 | 3 | 4 | 4 | 4 | 4 | 5 | .109 | .108 |
| 59 | 0 | 1 | 1 | 2 | 2 | 2 | 3 | 3 | 3 | 4 | 4 | 4 | .094 | .094 |
| 60 | 0 | 1 | 1 | 1 | 2 | 2 | 2 | 3 | 3 | 3 | 3 | 3 | .078 | .077 |
| 61 | 0 | 1 | 1 | 1 | 2 | 2 | 2 | 3 | 3 | 3 | 3 | 3 | .063 | .077 |
| 62 | 0 | 1 | 1 | 1 | 2 | 2 | 2 | 3 | 3 | 3 | 3 | 3 | .047 | .077 |
| 63 | 0 | 1 | 1 | 1 | 2 | 2 | 2 | 3 | 3 | 3 | 3 | 3 | .031 | .077 |
| 64 | 0 | 1 | 1 | 1 | 2 | 2 | 2 | 3 | 3 | 3 | 3 | 3 | .016 | .077 |

The 24 available waveforms are numbered 41 to 64 in decreasing order of the output fundamental voltage they produce. The numbering is consistent with numbering in the list of the 40 patterns stored for the fixed pattern mode (Table 4). Following the 40th pattern, the system retrieves the 41st reference quasi sinusoidal and sets the 41st step of the voltage control range.

Each waveform on Table 15 is defined by the level it assumes at each interval in its first quadrant, in the process of forming the staircase sine wave. The level is defined by a number $g_i$ ($g_1$ for the 1st interval, $g_2$ for the second interval, etc.), varying between 0 and 15. A value of 32 for $g_i$ represents a reference wave level equal in amplitude to the triangular timing wave level and thus would not produce an intercept. A value of 15 for $g_i$ represents a reference level equal to 15/32 of the crest of the triangular wave.

Table 15 lists for each waveform under "desired fundamental voltage" the output voltage it should produce if the voltage control range were exactly divided in 64 steps, of which the lower 24 steps are used in the free running mode. Such a voltage is expressed as a fraction of the full conduction voltage obtained with pattern 1 and thus this column of numbers reproduces the last 24 lines of Table 3, p. 35. Under the heading "actual fundamental voltage", Table 15 lists for each waveform the voltage it actually produces. The discrepancy between the desired and actual voltage is the result of the system constraints i.e., the limitation in the number of steps (12 per quarter of wave) and in the step resolution (16 discrete levels). For the last 4 waveforms, there is an intentional discrepancy, built-in in the system, to provide voltage "boost" at very low frequency when the modulator is operated with $f^* = V^*$.

Figure 22:
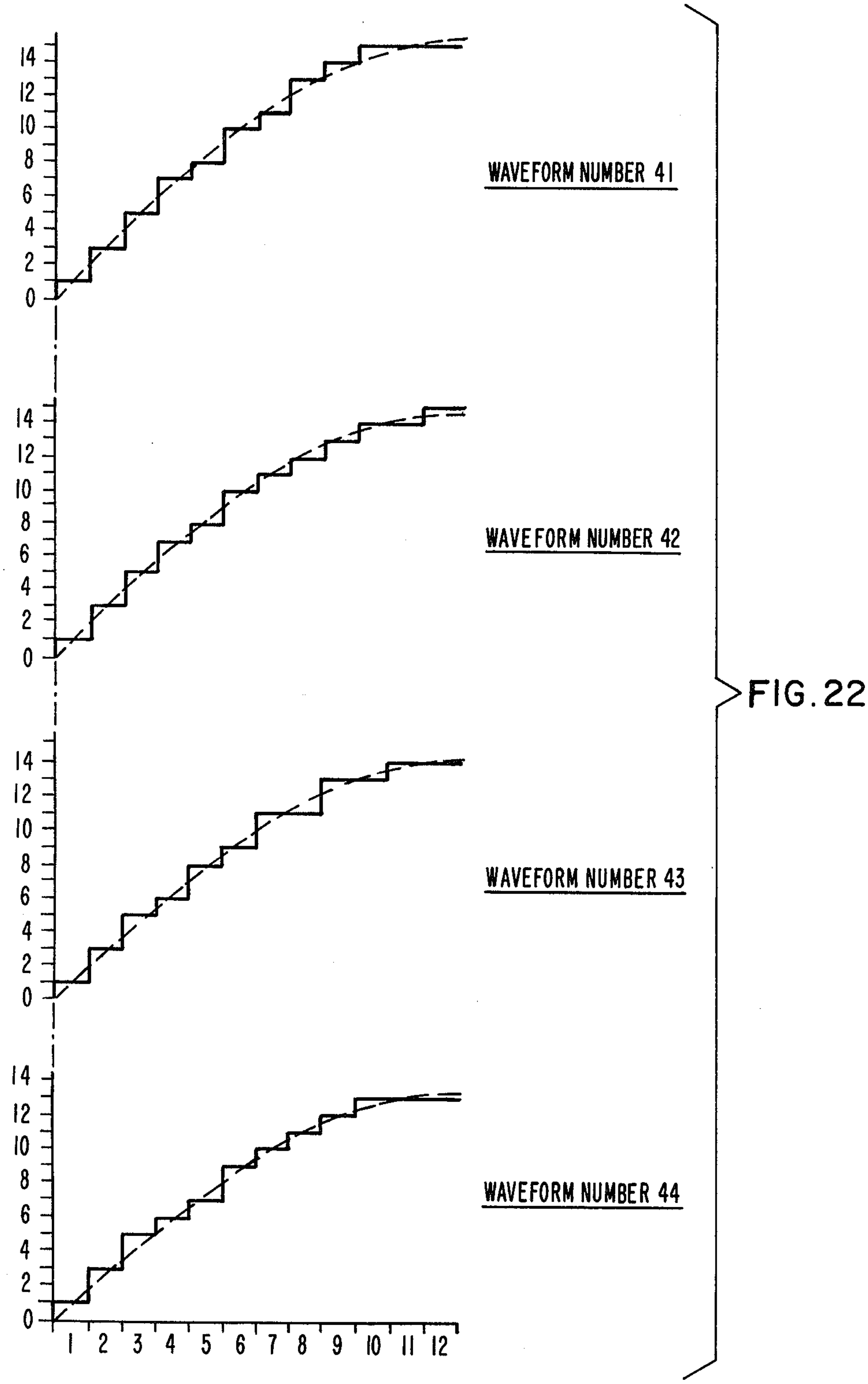
FIG. 22 is typical of a sinusoidal wave represented digitally by successive levels as can be stored at additional locations of the central memory of the modulator.

The generation of waveforms of amplitude lower than the 60th is possible but generally, in practice, operation of the drive in this range is effected by voltage boost. Therefore waveforms 60 to 64 are all made identical. For the purpose of illustration waveforms 41–44 of Table 15 are represented in FIG. 22 for the 1st quadrant of each waveform as a plot of the $g_i$ versus the interval N° indicated on the horizontal axis. The 2nd quadrant is symmetrical to the first relative to a 90° axis. The 3rd and 4th quadrant are identical to the first two quadrants, except for a level polarity inversion. The dashed line superimposed on each wave represents the fundamental sinusoid of the corresponding staircase wave.

The fundamental voltage produced by a given waveform can be expressed in p.u. of the full conduction voltage by the integral:

$$E_1 = \frac{1}{32} \int_0^{\frac{\pi}{2}} g_i \sin \times dx$$

where $g_i$ assumes its successive values listed in Table 15 for the given waveform, when $x$ travels through each successive interval of the 1st quadrant. Effecting the integration, we obtain:

$$E_1 = \sum_{i=1}^{12} g_i \left[\cos \frac{i-1}{24}\pi - \cos \frac{i}{24}\pi\right]$$

i.e., $$E_1 = (1/32)\,(0.00856\,g_1 + 0.02551\,g_2 + 0.04205\,g_3 + 0.05785\,g_4 + 0.07268\,g_5 + 0.08624\,g_6 + 0.09835\,g_7 + 0.10876\,g_8 + 0.11732\,g_9 + 0.12386\,g_{10} + 0.12829\,g_{11} + 0.13053\,g_{12})$$

To construct a given reference waveform, one can apply a graphical method making use of a millimeter chart paper marked with 12 horizontal divisions and 15 vertical divisions. One traces on the paper a quarter of a sinusoid spanning the 12 horizontal divisions and having a crest value of $(4/\pi) \times 32 \times E_1$, expressed in vertical divisions. $E_1$ is the fundamental output amplitude desired from the waveform to be constructed. For instance, if each vertical division is 5 mm as in FIG. 15*d,* and the waveform to be constructed is No. 50 with $E_1 = 0.234$, one traces a sinusoid of amplitude 9.53 divisions or 47.7 mm. One tries then to approximate the sinusoid with steps placed at the closest integer ordinate value within each of the 12 intervals defined by the horizontal divisions. This tentatively defined the $g_1$ for the waveform. The actual $E_1$ is then calculated with the above formula and the steps are slightly rearranged if necessary to provide a small increase or decrease of the fundamental voltage to match the desired value.

The information to implement the waveforms defined by Table 15 is stored in a Read Only Memory contained in circuit of memory 30 of FIG. 14. Part of this ROM contains pattern generating information used in the fixed pattern mode, but the bulk of the available storage space is used to memorize the reference waveform data used in the free running mode.

I claim:

1. A pulsewidth modulator comprising:

means for counting successive discrete time intervals, memory means for storing a series of digital representations, said memory means having stored therein a plurality of sets of said series of digital representations, each set representing a given pulse-width modulation pattern corresponding to a given magnitude of a control variable;

digital means for retrieving one set of said stored digital representations from said memory in time relation with said discrete time intervals and in response to a digital representation of the magnitude of said control variable; and output means for generating a pulse-width modulated signal in accordance with a retrieved set of stored digital representations.

2. The pulse-width modulator of claim 1 with each of said discrete time intervals including a plurality of successive elementary time intervals;

with each of said digital representations of a set representing for a particular one of said discrete time intervals a predetermined integrated value of a selected number of elementary time intervals;

comparator means being provided responsive to said counting means and to said retrieved set for controlling said output means to generate a corresponding pulse-width modulated signal.

3. The pulse-width modulator of claim 2 with said comparator means establishing one of two opposite signal levels along said pulse width modulated signal in accordance with a threshold value instantaneously reached by said counting means within a discrete time interval and defined by the digital representation stored for such discrete time interval.

4. The pulse-width modulator of claim 3 with said comparator means causing a change of signal level to occur in response to such threshold value within a discrete time interval.

5. The pulse-width modulator of claim 4 with said comparator means causing a change of signal level to occur at a selected boundary between successive discrete time intervals.

6. The pulse-width modulator of claim 3 with said counting means counting in the opposite order from one discrete interval to the next.

7. The pulse-width modulator of claim 1 with said memory means being a Read-Only-Memory (ROM);

with said counter means generating a time address signal for selecting said digital representations as a function of time; with said retrieving means generating a set address signal for selecting a stored set; said ROM being read-out in accordance with said time address and set address signals.

8. The pulse-width modulator of claim 1 with said stored digital representations corresponding to one quadrant of said pulse width modulated signal;

means being provided responsive to said counter means and operative on said retrieving means for coding said one-quadrant retrieved stored digital representations to generate a mirror image representation thereof for the second quadrant of said retrieved stored digital representations.

9. The pulse-width modulator of claim 8 with means responsive to said memory means and to said coding means for generating an opposite sign representation of said one-quadrant retrieved stored digital representations and said second-quadrant mirror image representations during two quadrants subsequent to said first quadrant and said second quadrant.

10. The pulse-width modulator of claim 9 with phase shifting means being provided responsive to said four quadrant representations for deriving a plurality of phase-shifted four quadrant representations associated to respective phase line pulse-width modulated signals, whereby said output means generate a plurality of phase-line pulse-width modulated signals.

11. The pulse-width modulator of claim 1 with said memory means further including digital representations of a stepped reference wave; means being provided operatively conditioned by said couting means for addressing said reference wave digital representations as a function of time to generate said pulse width modulated signal; concurrent operation in accordance with said stored sets of digital representations being inhibited.

12. A digital system for generating a pulse-width modulated signal comprising:

means for deriving a digital ramp signal defining successive discrete time intervals between ramps;

memory means having stored therein at least one set of digital representations, each of said digital representations defining a predetermined signal level related to a corresponding one of said discrete time intervals;

comparator means responsive to said ramp generating means and to said memory means for establishing a notch boundary in said pulse-width modulated signal in time relation with a threshold past a relative one of said predetermined signal levels.

13. The digital system of claim 12 in which said predetermined signal levels correspond to a predetermined integrated value of a selected number of elementary time intervals, each said elementary time interval representing a predetermined submultiple of a discrete time interval, whereby a notch occurs only once for such said discrete time interval, and said pulse-width modulated signal has a fundamental frequency defined by the rate of said discrete time intervals.

14. The digital system of claim 12 in which said predetermined signal levels correspond to a predetermined step value on a reference sinusoidal wave, whereby a notch occurs in relation to such said discrete time interval and said pulse-width modulated signal has a fundamental frequency defined by said reference sinusoidal wave.

15. In an AC motor drive including at least one AC motor, a DC supply, an inverter connected in circuit between said DC supply and said AC motor, and a pulse-width modulator responsive to a frequency reference signal representing a desired motor frequency and to a voltage reference signal representing desired motor voltage levels for controlling said inverter in accordance with an outputted pulse-width modulated signal to operate said AC motor at a speed determined by said frequency reference signal and under flux conditions determined by said voltage reference signal, the combination of:

Read-Only-Memory (ROM) means having stored therein a plurality of sets of digital representations, each of said sets being associated with respective discrete values of said voltage reference signal and defining corresponding pulse-width modulated (PWM) waves;

means responsive to said voltage reference signal for addressing said ROM means to drive therefrom one of said sets at a time; and timing means responsive to said frequency reference signal for converting in real time said selected one set to generate a corresponding pulse-width modulated signal to control said inverter;

whereby said motor is controlled as a function of said voltage reference signal.

16. The AC motor drive of claim 14 in which the frequency of said reference frequency signal is varied over two adjoining frequency ranges, the motor drive being operated in the upper frequency range according to the fixed pattern triangulation method and operated in the lower frequency range according to the free running triangulation method, said fixed pattern triangulation being defined by digital information stored in a first region of said ROM means, said free running triangulation being defined by digital information stored in a second region of said ROM means, means being provided for shifting operation from said first region to said second region when said frequency reference signal exceeds a predetermined limit and conversely.

17. In a static AC power supply providing AC power to an AC load at a given fundamental frequency and given voltage with reduced harmonic contents and including a DC supply, an inverter connected in circuit between said DC supply and said AC load and a pulse-width modulator responsive to a frequency reference signal representing the desired fundamental frequency, and to a voltage reference signal representing the desired power supply fundamental voltage for controlling said inverter in accordance with an outputted pulse-width modulated signal to energize said AC load at the fundamental frequency under voltage conditions defined by said voltage reference signal, the combination of:

Read-Only-Memory (ROM) means having stored therein a plurality of sets of digital representations, each of said sets being associated with respective discrete values of said voltage reference signal and defining corresponding pulse-width modulated (PWM) waves;

means responsive to said voltage reference signal for addressing ROM means to derive therefrom one of said sets at a time; and timing means responsive to said frequency reference signal for converting in real time said selected one set to generate a corresponding pulse-width modulated signal to control said inverter;

whereby said AC load is energized with power at said fundamental frequency and under said desired fundamental voltage.

* * * * *